United States Patent
Tanaka et al.

(10) Patent No.: US 6,639,729 B2
(45) Date of Patent: *Oct. 28, 2003

(54) REFLECTING TYPE OF ZOOM LENS

(75) Inventors: Tsunefumi Tanaka, Kanagawa-ken (JP); Toshiya Kurihashi, Tokyo (JP); Shigeo Ogura, Tokyo (JP); Keisuke Araki, Kanagawa-ken (JP); Makoto Sekita, Kanagawa-ken (JP); Nobuhiro Takeda, Kanagawa-ken (JP); Yoshihiro Uchino, Fukuoka-ken (JP); Kenichi Kimura, Kanagawa-ken (JP); Toshikazu Yanai, Kanagawa-ken (JP); Norihiro Nanba, Kanagawa-ken (JP); Hiroshi Saruwatari, Kanagawa-ken (JP); Takeshi Akiyama, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

This patent is subject to a terminal disclaimer.

(21) Appl. No.: 09/968,515

(22) Filed: Oct. 2, 2001

(65) Prior Publication Data

US 2002/0149854 A1 Oct. 17, 2002

Related U.S. Application Data

(63) Continuation of application No. 08/606,825, filed on Feb. 26, 1996, now abandoned.

(30) Foreign Application Priority Data

Feb. 28, 1995 (JP) .............................. 7-065109
Apr. 24, 1995 (JP) .............................. 7-123236

(51) Int. Cl.$^7$ .......................... G02B 15/14; G02B 27/10
(52) U.S. Cl. .................. 359/676; 359/630; 359/631; 359/727; 359/729
(58) Field of Search .................. 359/676, 630, 359/631, 729, 727

(56) References Cited

U.S. PATENT DOCUMENTS 3,012,464 A    12/1961    Papke .................. 88/2.4

(List continued on next page.)

FOREIGN PATENT DOCUMENTS

EP    0365406    4/1990
EP    0 722 106    7/1996

(List continued on next page.)

OTHER PUBLICATIONS

Walter E. Woehl, "An all–reflective zoom optical system for the Infrared", Optical Engineering, vol. 20, No. 3, (1981), pp 450–459.

(List continued on next page.)

Primary Examiner—Scott J. Sugarman
(74) Attorney, Agent, or Firm—Fitzpatrick, Cella, Harper & Scinto

(57) ABSTRACT

A reflecting type of zoom optical system comprises a plurality of optical elements each of which includes a transparent body and two refracting surfaces and a plurality of reflecting surfaces formed on the transparent body and is arranged so that a light beam enters the transparent body from one of the two refracting surfaces, repeatedly undergoes reflection by the plurality of reflecting surfaces, and exits from the other of the two refracting surfaces, and/or a plurality of optical elements on each of which a plurality of reflecting surfaces made from surface reflecting mirrors are integrally formed, and each of which is arranged so that an entering light beam repeatedly undergoes reflection by the plurality of reflecting surfaces and exits from the optical element. In the reflecting type of zoom optical system, an image of an object is formed via the plurality of optical elements and zooming is performed by causing at least two optical elements from among the plurality of optical elements to vary their relative positions.

79 Claims, 65 Drawing Sheets

U.S. PATENT DOCUMENTS

| | | | |
|---|---|---|---|
| 3,305,294 A | 2/1967 | Alvarez | 351/169 |
| 3,674,334 A | 7/1972 | Offner | 350/55 |
| 3,677,621 A | 7/1972 | Smith | 350/157 |
| 3,741,622 A | 6/1973 | Cox | 350/40 |
| 3,810,221 A | 5/1974 | Plummer | 88/1.5 |
| 3,897,133 A | 7/1975 | Warner et al. | 350/55 |
| 3,914,011 A | 10/1975 | Mallinson et al. | 350/50 |
| 4,192,573 A | 3/1980 | Brown, Jr. | 350/55 |
| 4,249,793 A | 2/1981 | Uehara | 359/676 |
| 4,265,510 A | 5/1981 | Cook | 350/55 |
| 4,407,567 A | 10/1983 | Michelet et al. | 350/423 |
| 4,477,156 A | 10/1984 | Gebelein et al. | 350/503 |
| 4,571,036 A | 2/1986 | Gebelein et al. | 350/503 |
| 4,650,292 A | 3/1987 | Baker et al. | 350/432 |
| 4,737,021 A | 4/1988 | Korsch | 350/405 |
| 4,743,103 A | 5/1988 | Estelle | 350/445 |
| 4,775,217 A | 10/1988 | Ellis | 350/538 |
| 4,812,030 A | 3/1989 | Pinson | 350/620 |
| 4,812,864 A | 3/1989 | Baker | 354/224 |
| 4,971,428 A | 11/1990 | Moskovich | 350/442 |
| 4,993,818 A | 2/1991 | Cook | 350/505 |
| 5,034,764 A | 7/1991 | Inabata | 354/223 |
| 5,063,586 A | 11/1991 | Jewell et al. | 378/34 |
| 5,134,526 A | 7/1992 | Inabata | 359/726 |
| 5,144,476 A | 9/1992 | Kebo | 359/366 |
| 5,148,308 A | 9/1992 | Miyauchi | 359/689 |
| 5,231,534 A | 7/1993 | Kato | 359/432 |
| 5,381,265 A | 1/1995 | Ohshita | 359/422 |
| 5,448,411 A | 9/1995 | Morooka | 359/676 |
| 5,452,126 A | 9/1995 | Johnson | 359/407 |
| 5,453,877 A | 9/1995 | Gerbe et al. | 359/633 |
| 5,557,454 A | 9/1996 | Takahashi | 359/223 |
| 5,559,629 A | 9/1996 | Sheets et al. | 359/364 |
| 5,594,588 A | 1/1997 | Togino | 359/631 |
| 5,640,632 A | 6/1997 | Koyama et al. | 396/382 |
| 5,644,436 A | 7/1997 | Togino et al. | 359/731 |
| 5,663,833 A | 9/1997 | Nanba et al. | 359/631 |
| 5,687,025 A | 11/1997 | Nanba | 359/633 |
| 5,689,736 A | 11/1997 | Okuyama et al. | 396/51 |
| 5,699,194 A | 12/1997 | Takahashi | 359/633 |
| 5,701,202 A | 12/1997 | Takahashi | 359/631 |
| 5,726,807 A | 3/1998 | Nakaoka et al. | 359/631 |
| 5,734,505 A | 3/1998 | Togino et al. | 359/631 |
| 5,739,956 A | 4/1998 | Ohtake | 359/643 |
| 5,777,804 A | 7/1998 | Nakamura et al. | 359/727 |
| 5,912,769 A | 6/1999 | Iizuka et al. | 359/631 |
| 5,917,662 A | 6/1999 | Sekita | 359/729 |
| 5,973,858 A | 10/1999 | Sekita | 359/729 |
| 5,995,287 A | 11/1999 | Sekita | 359/599 |
| 5,999,311 A | 12/1999 | Nanba et al. | 359/365 |
| 6,021,004 A * | 2/2000 | Sekita et al. | 359/676 |
| 6,049,429 A | 4/2000 | Iizuka et al. | 359/631 |
| 6,124,986 A | 9/2000 | Sekita et al. | 359/691 |
| 6,163,400 A | 12/2000 | Nanba | 359/365 |
| 6,166,866 A | 12/2000 | Kimura et al. | 359/729 |
| 6,301,064 B1 | 10/2001 | Araki et al. | 359/834 |

FOREIGN PATENT DOCUMENTS

| | | |
|---|---|---|
| EP | 0 730 180 | 9/1996 |
| EP | 0 790 513 | 8/1997 |
| GB | 2 126 746 | 3/1984 |
| JP | 48-24057 | 3/1973 |
| JP | 2-297516 | 12/1990 |
| JP | 4-40688 | 7/1992 |
| JP | 5-12704 | 1/1993 |
| JP | 6-139612 | 5/1994 |
| JP | 6-347699 | 12/1994 |
| JP | 7-5364 | 1/1995 |
| JP | 7-36959 | 2/1995 |
| WO | WO 92/21054 | 11/1992 |
| WO | WO 94/12905 | 6/1994 |

OTHER PUBLICATIONS

S. Yamazaki, et al., "Development of Super Compact HMD with Sight Line Input," Proceedings 3D Image Conference '95 (Jul. 6, 1995), pp. 70–75 (and translation).

* cited by examiner

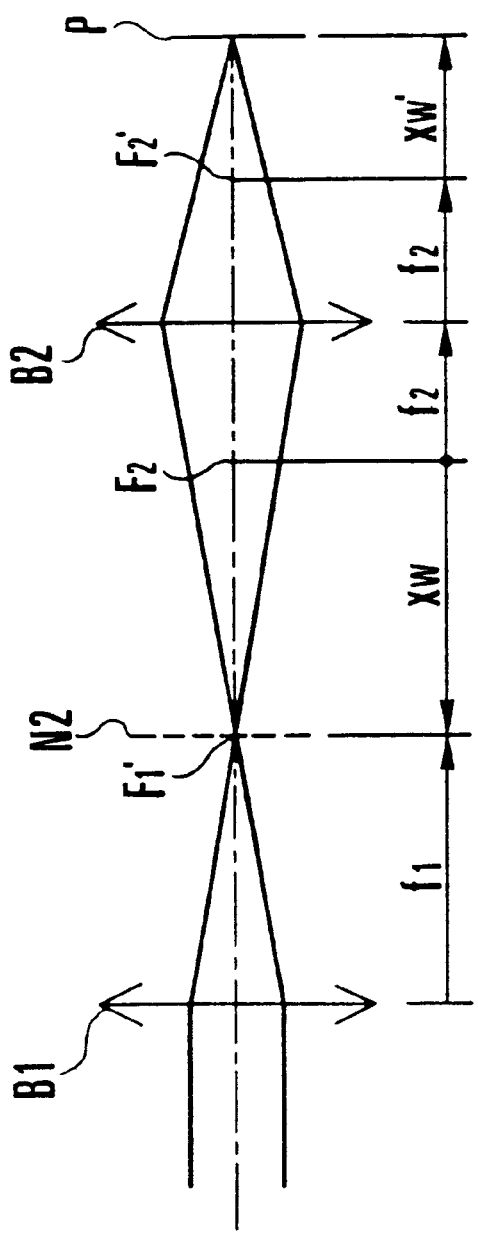
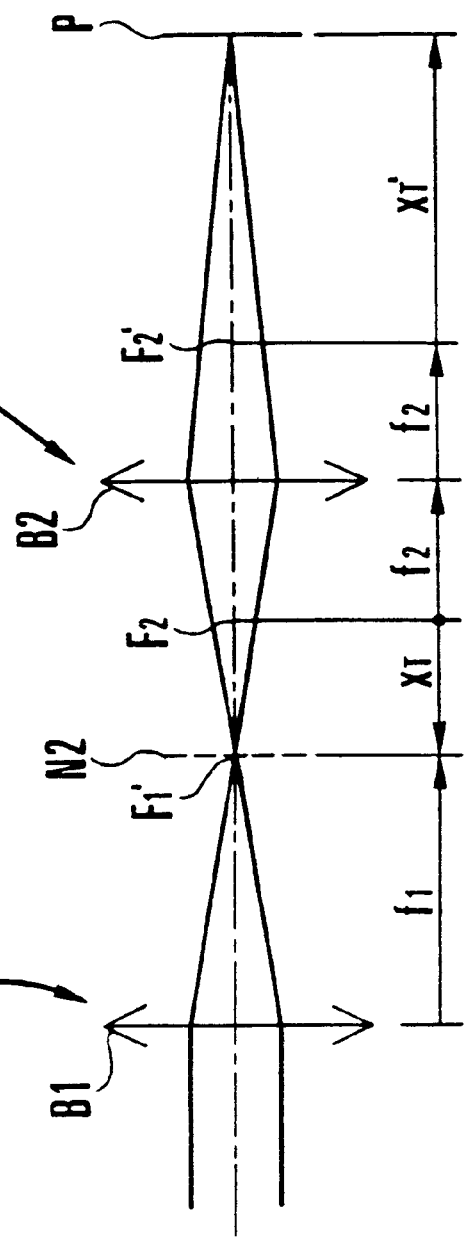
F I G. 3A
F I G. 3B

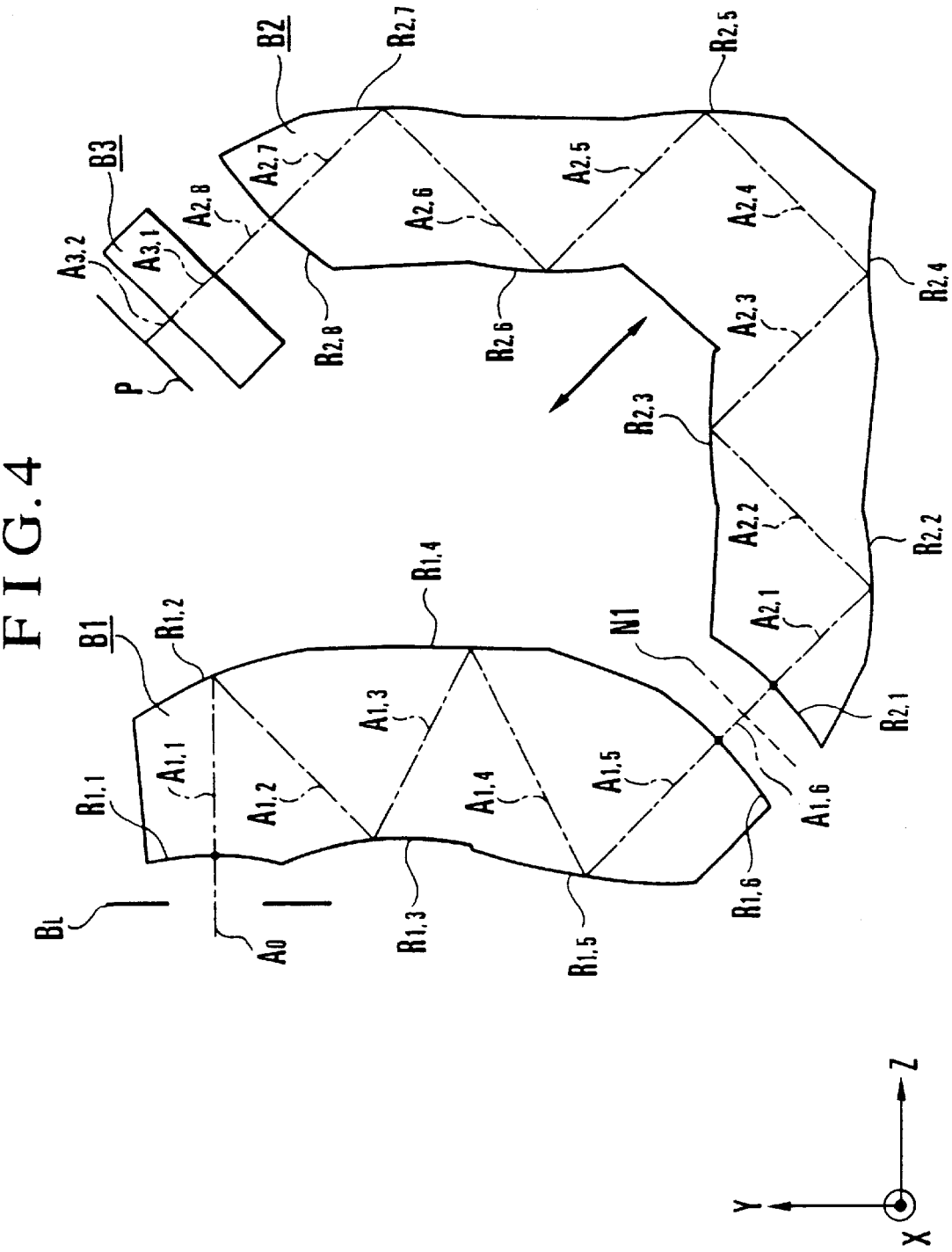

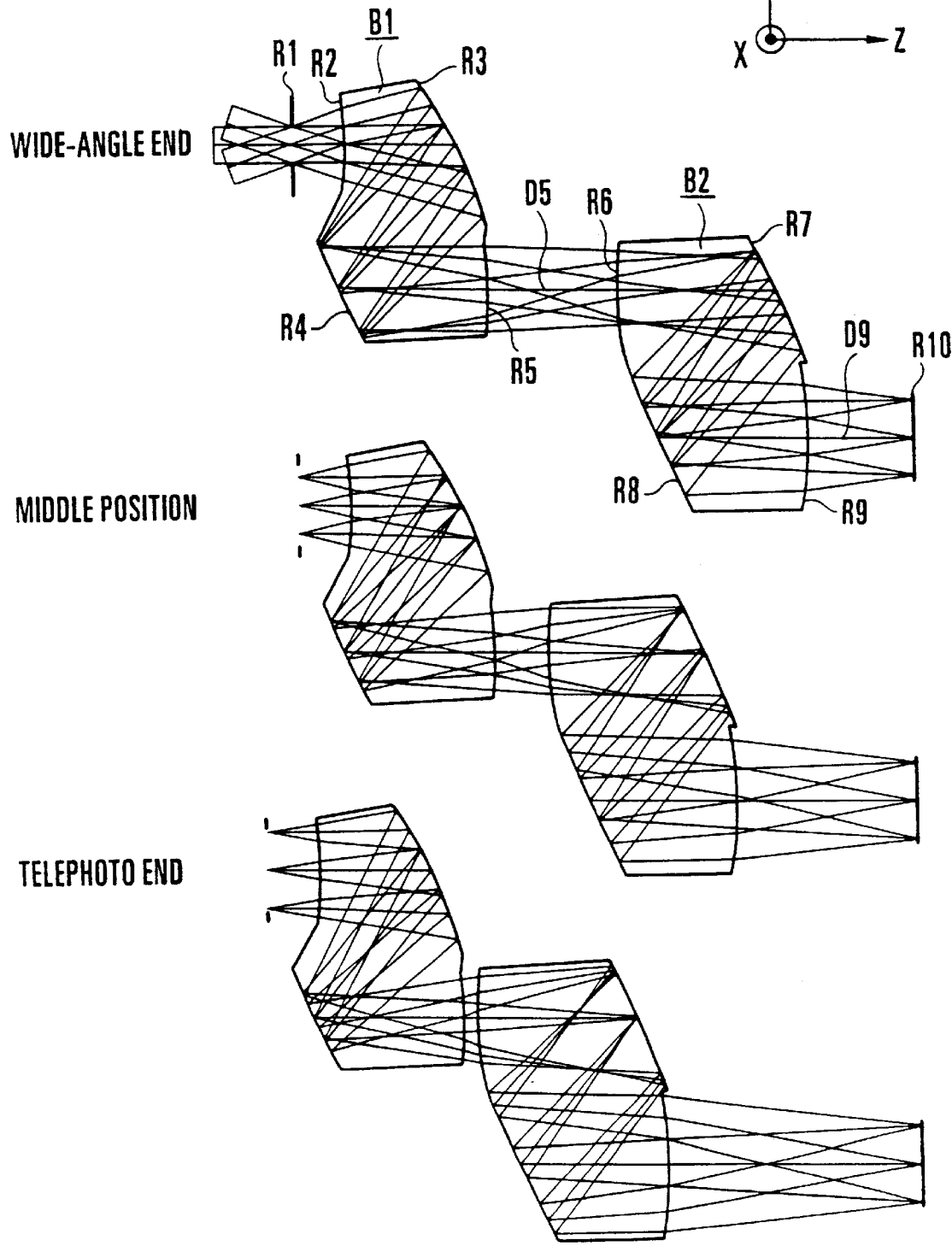

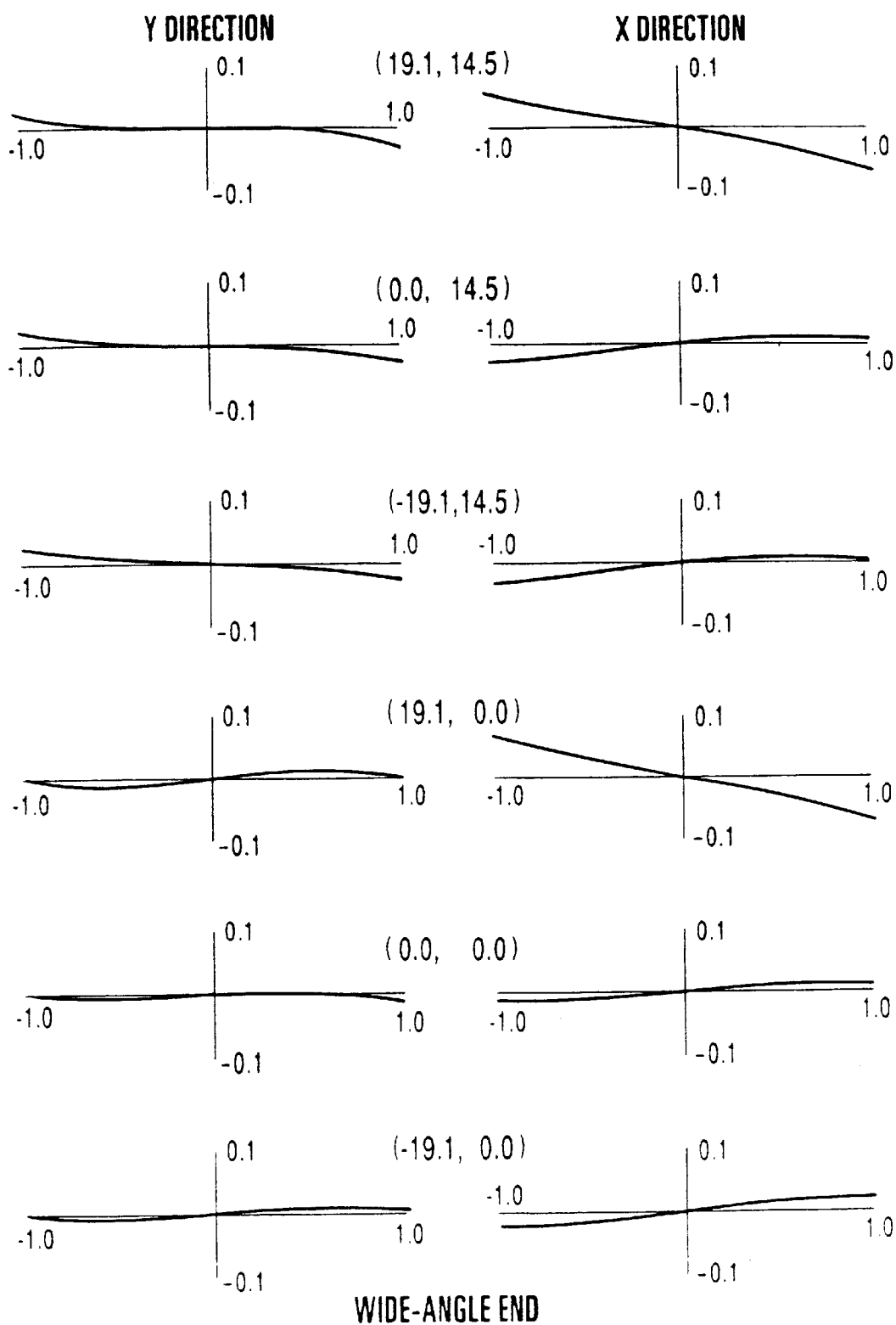

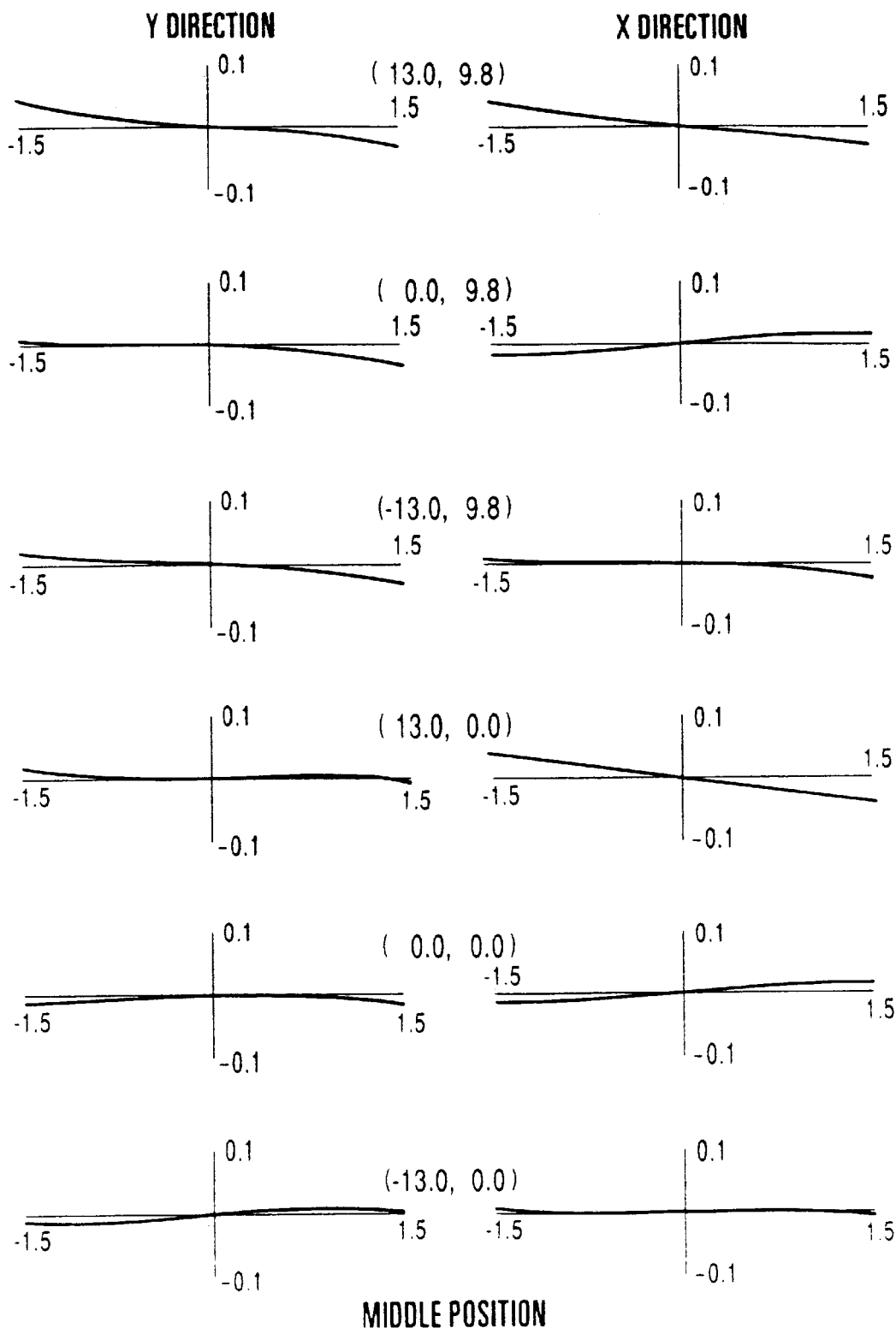

WIDE-ANGLE END

MIDDLE POSITION

TELEPHOTO END

FIG. 21
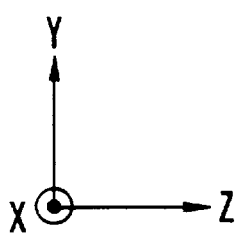
WIDE-ANGLE END
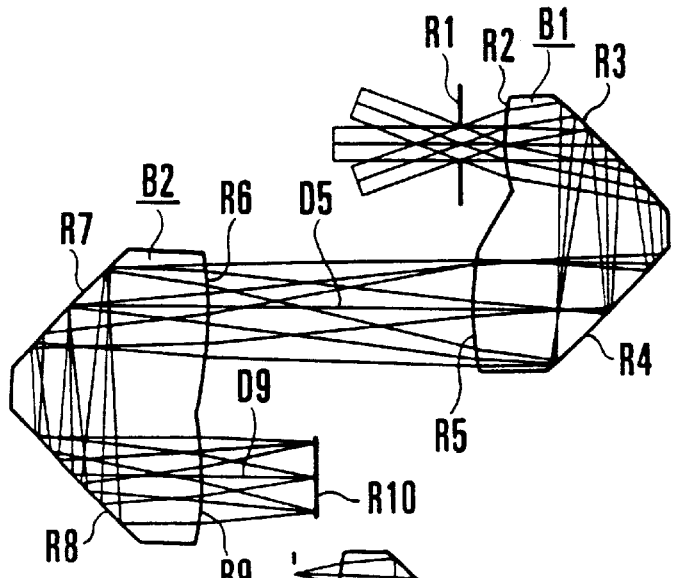
MIDDLE POSITION
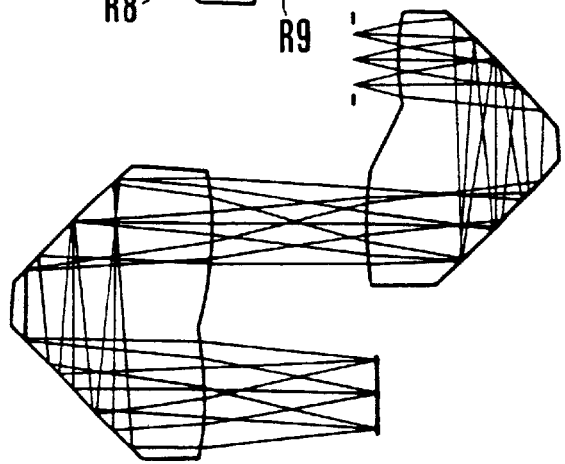
TELEPHOTO END
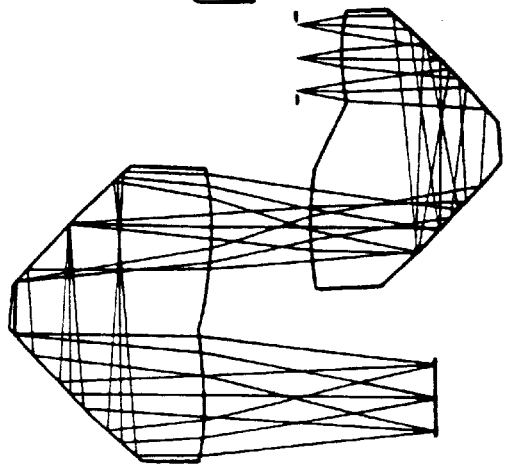

FIG. 25
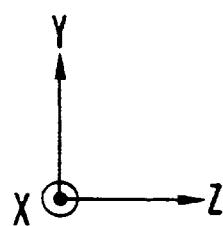
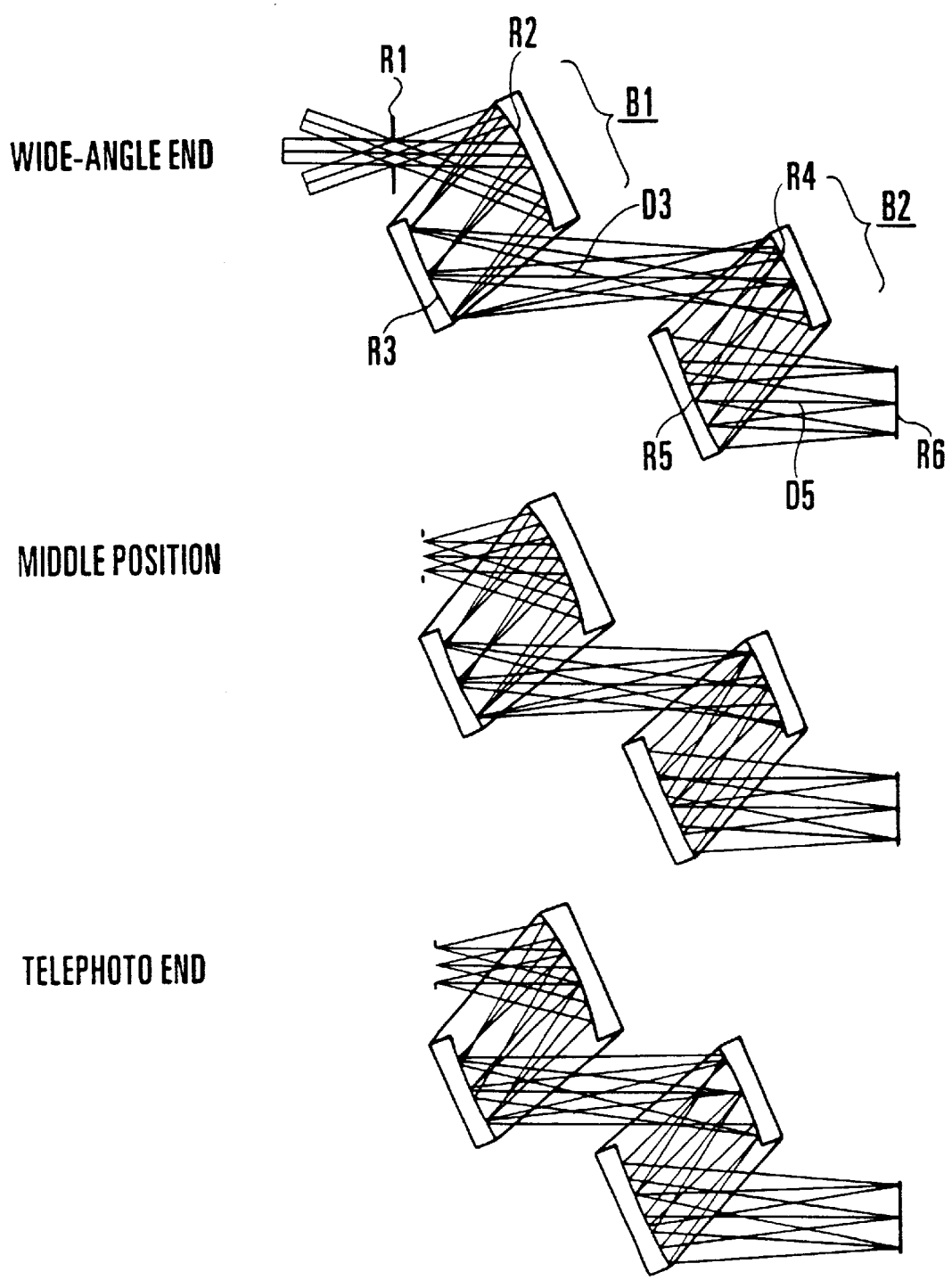
WIDE-ANGLE END
MIDDLE POSITION
TELEPHOTO END

FIG. 33
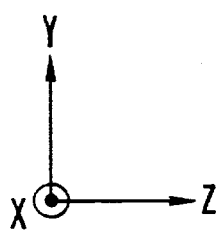
WIDE-ANGLE END
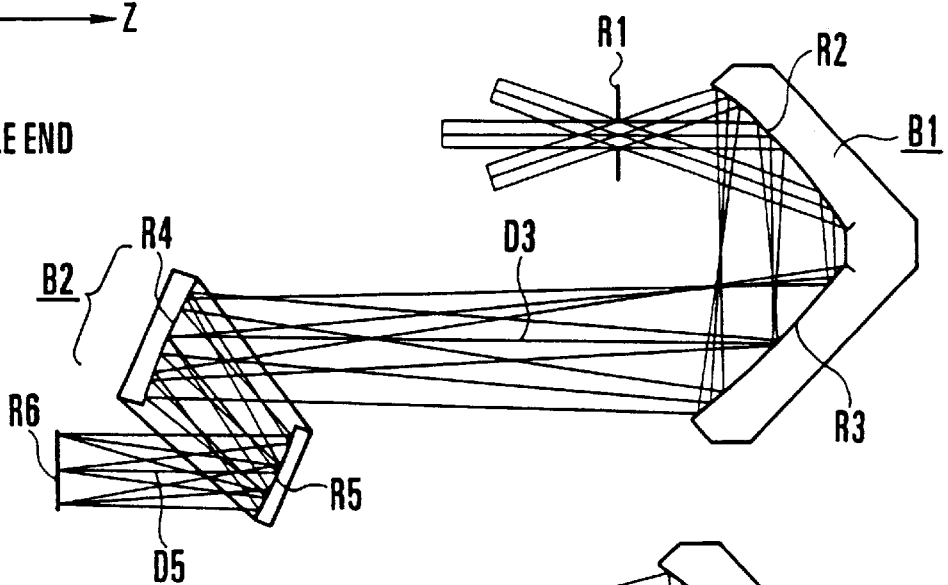
MIDDLE POSITION
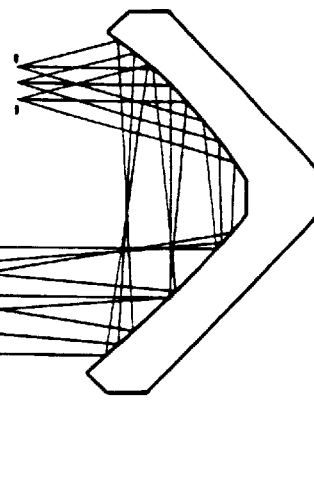
TELEPHOTO END
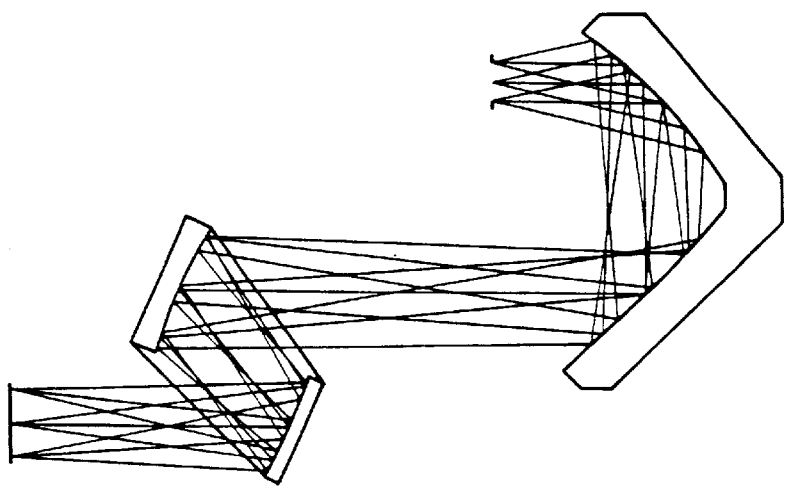

WIDE-ANGLE END

TELEPHOTO END

FIG. 41
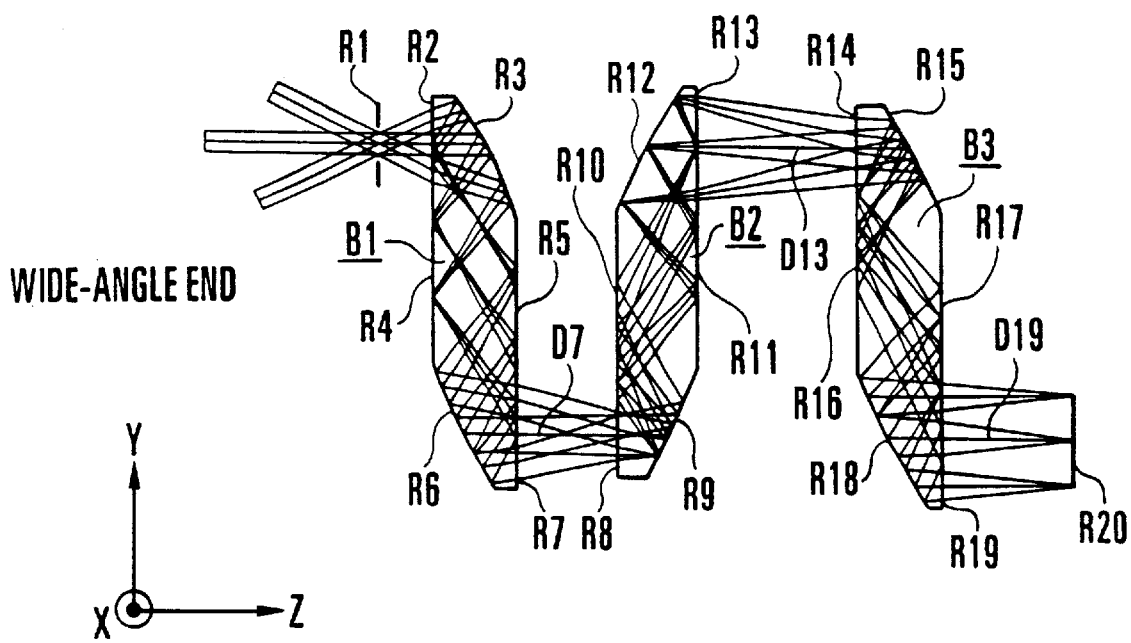
WIDE-ANGLE END
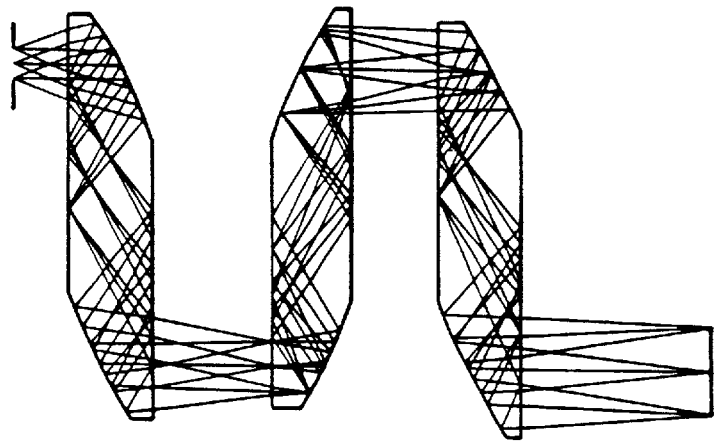
MIDDLE POSITION
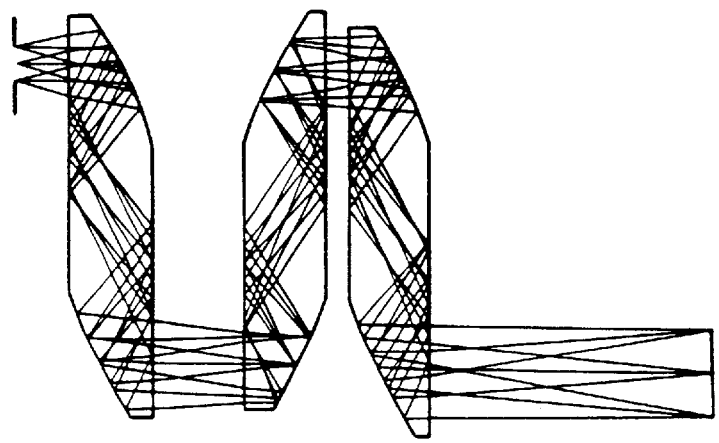
TELEPHOTO END

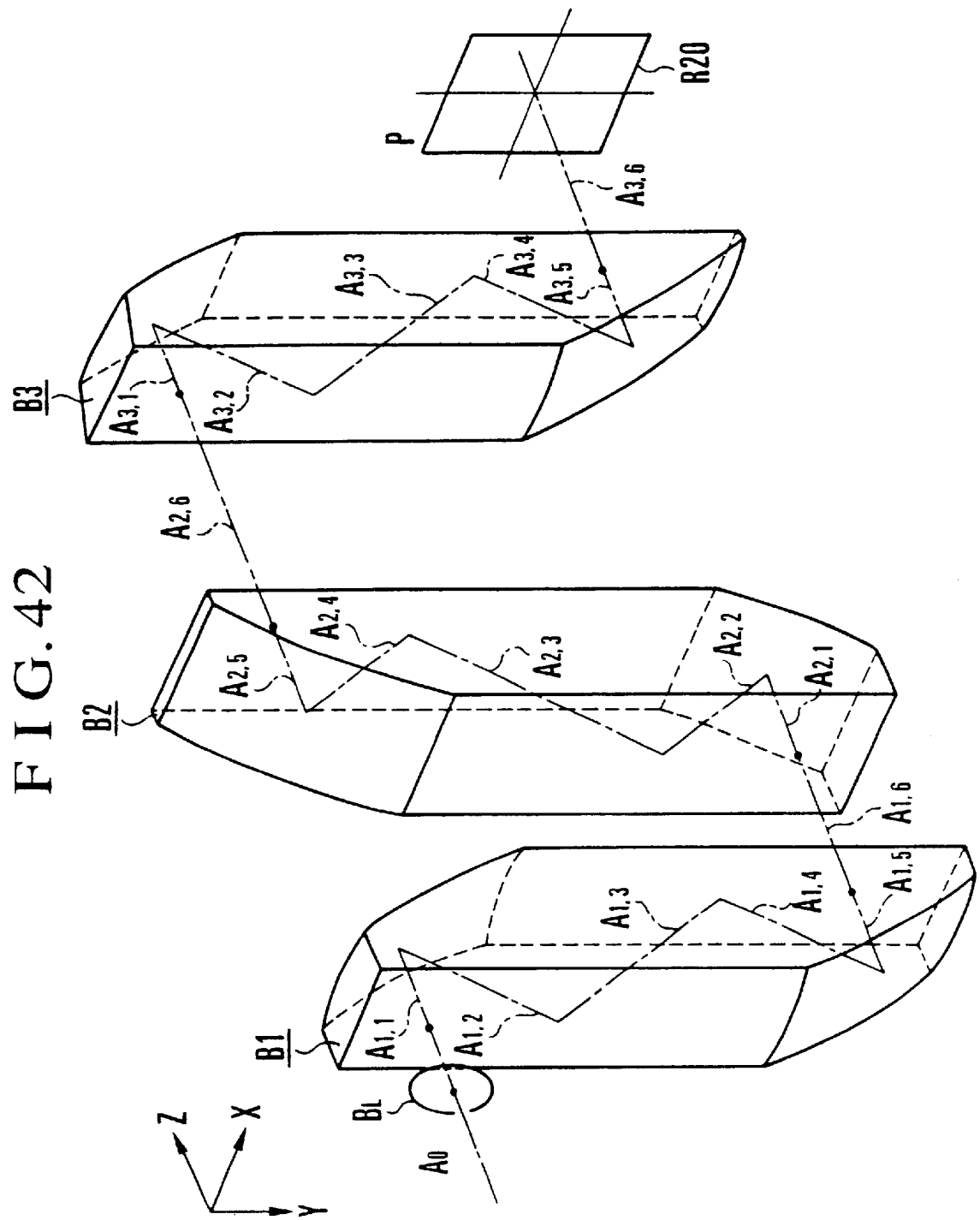
F I G. 42

FIG. 46
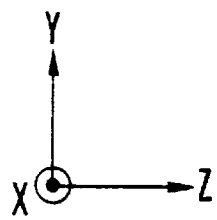
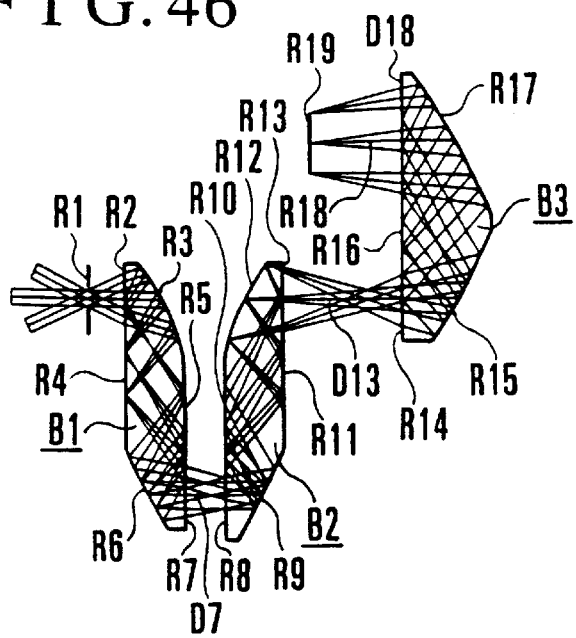
WIDE-ANGLE END
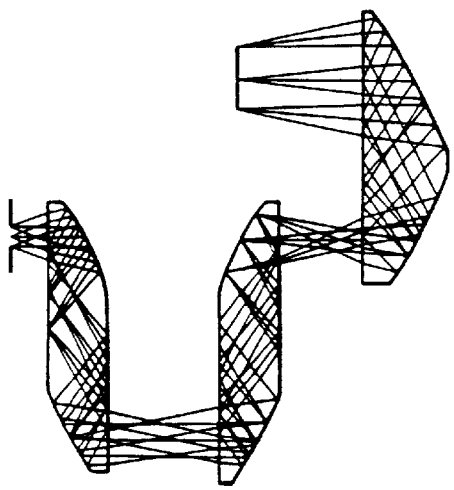
MIDDLE POSITION
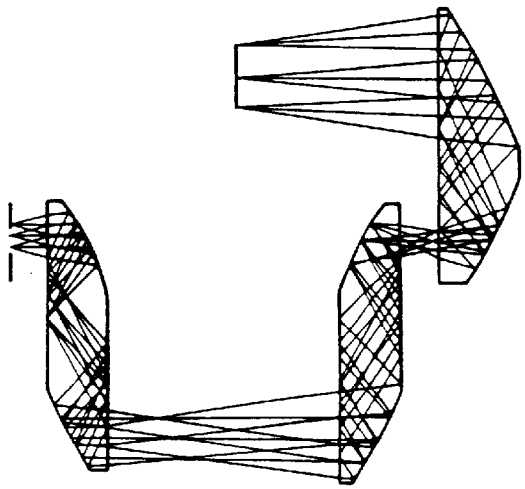
TELEPHOTO END FIG.50
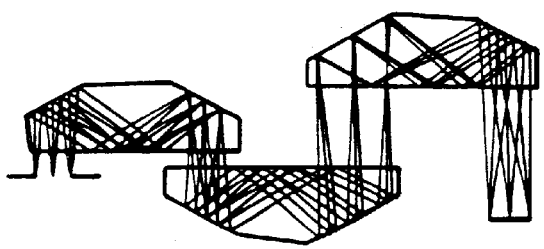
TELEPHOTO END
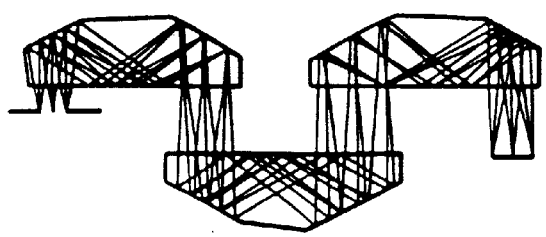
MIDDLE POSITION
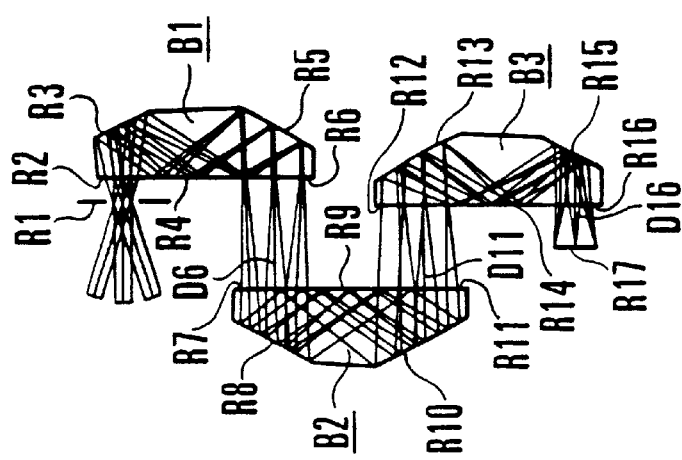
WIDE-ANGLE END
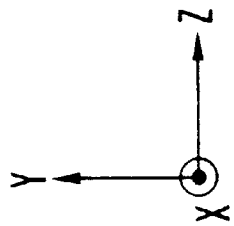

MIDDLE POSITION

TELEPHOTO END

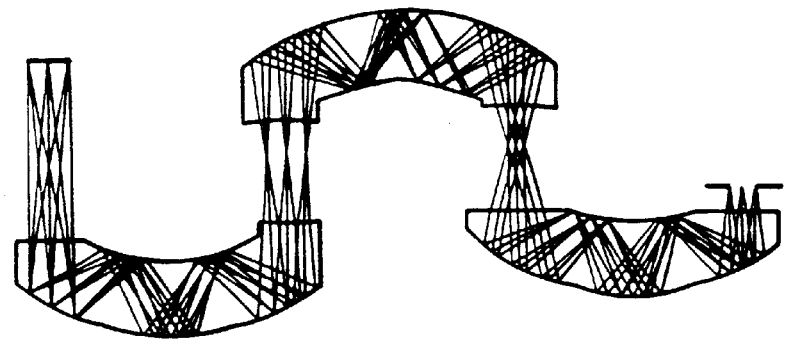
TELEPHOTO END
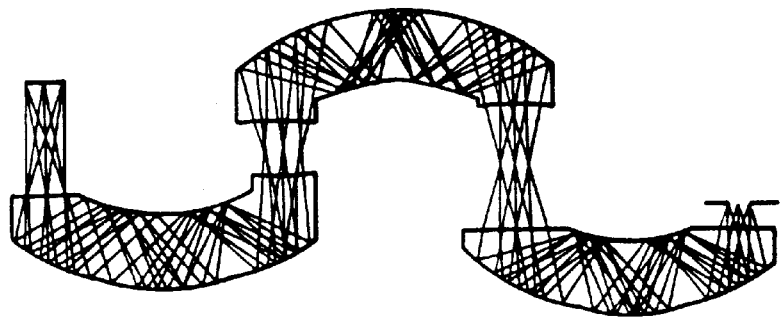
MIDDLE POSITION
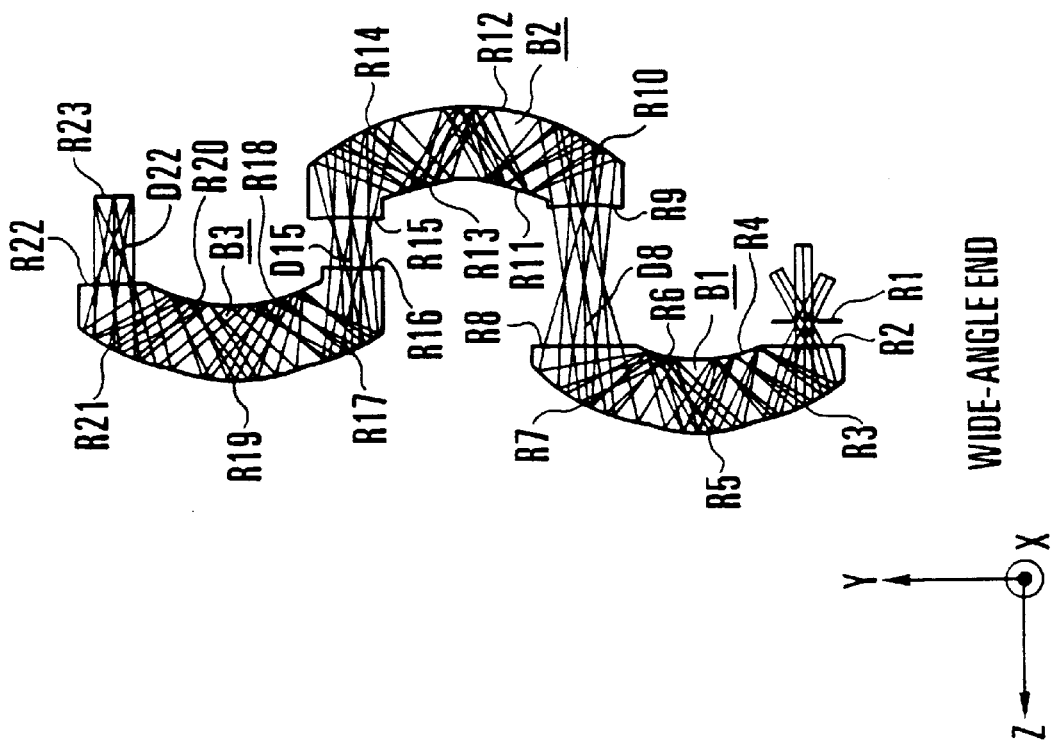
FIG. 54
WIDE-ANGLE END

REFLECTING TYPE OF ZOOM LENS

This application is a continuation of application Ser. No. 08/606,825, filed Feb. 26, 1996, now abandoned.

BACKGROUND OF THE INVENTION

1. Field of the Invention

The present invention relates to a reflecting type of zoom optical system and an image pickup device employing the same and, more particularly, to an optical arrangement which is suitable for use in a video camera, a still video camera, a copying machine or the like and which employs a plurality of optical elements each having a plurality of reflecting surfaces and performs zooming (variation of magnification) by varying the relative position between at least two optical elements from among the plurality of optical elements.

2. Description of the Related Art

Various photographing optical systems which utilize reflecting surfaces, such as concave mirror surfaces and convex mirror surfaces, have heretofore been proposed. FIG. 59 is a schematic view of a so-called mirror optical system which is composed of one concave mirror and one convex mirror.

In the mirror optical system shown in FIG. 59, an object light beam 104 from an object is reflected by a concave mirror 101 and travels toward an object side while being converged, and after having been reflected by a convex mirror 102, the object light beam 104 forms an image of the object on an image plane 103.

This mirror optical system is based on the construction of a so-called Cassegrainian reflecting telescope, and is intended to reduce the entire length of the optical system by folding, by using the two opposed reflecting mirrors, the optical path of a telephoto lens system which is composed of refracting lenses and has an entire large length.

For similar reasons, in the field of an objective lens system which constitutes part of a telescope as well, in addition to the Cassegrainian type, various other types which are arranged to reduce the entire length of an optical system by using a plurality of reflecting mirrors have been known.

As is apparent from the above description, it has heretofore been proposed to provide a compact mirror optical system by efficiently folding an optical path by using reflecting mirrors in place of lenses which are commonly used in a photographing lens whose entire length is large.

However, in general, the mirror optical system, such as the Cassegrainian reflecting telescope, has the problem that part of an object ray is blocked by the convex mirror 102. This problem is due to the fact that the convex mirror 102 is placed in the area through which the object light beam 104 passes.

To solve the problem, it has been proposed to provide a mirror optical system which employs decentered reflecting mirrors to prevent a portion of the optical system from blocking the area through the object light beam 104 passes, i.e., to separate a principal ray 106 of the object light beam 104 from an optical axis 105.

FIG. 60 is a schematic view of the mirror optical system disclosed in U.S. Pat. No. 3,674,334. This mirror optical system solves the above-described blocking problem by separating the principal ray of an object light beam from an optical axis by using part of reflecting mirrors which are rotationally symmetrical about the optical axis.

In the mirror optical system shown in FIG. 60, a concave mirror 111, a convex mirror 113 and a concave mirror 112 are arranged in the order of passage of the light beam, and these mirrors 111, 113 and 112 are reflecting mirrors which are rotationally symmetrical about an optical axis 114, as shown by two-dot chain lines in FIG. 60. In the shown mirror optical system, a principal ray 116 of an object light beam 115 is separated from the optical axis 114 to prevent blockage of the object light beam 115, by using only the upper portion of the concave mirror 111 which is above the optical axis 114 as viewed in FIG. 60, only the lower portion of the convex mirror 113 which is below the optical axis 114 as viewed in FIG. 60, and only the lower portion of the concave mirror 112 which is below the optical axis 114 as viewed in FIG. 60.

FIG. 61 is a schematic view of the mirror optical system disclosed in U.S. Pat. No. 5,063,586. The shown mirror optical system solves the above-described problem by decentering the central axis of each reflecting mirror from an optical axis and separating the principal ray of an object light beam from the optical axis.

As shown in FIG. 61 in which an axis perpendicular to an object plane 121 is defined as an optical axis 127, a convex mirror 122, a concave mirror 123, a convex mirror 124 and a concave mirror 125 are arranged in the order of passage of the light beam, and the central coordinates and central axes 122a, 123a, 124a and 125a (axes which respectively connect the centers of reflecting surfaces and the centers of curvature thereof) of the reflecting surfaces of the respective mirrors 122 to 125 are decentered from the optical axis 127. In the shown mirror optical system, by appropriately setting the amount of decentering and the radius of curvature of each of the surfaces, each of the reflecting mirrors is prevented from blocking an object light beam 128, so that an object image is efficiently formed on an image plane 126.

In addition, U.S. Pat. Nos. 4,737,021 and 4,265,510 also disclose an arrangement for preventing the blocking problem by using part of a reflecting mirror which is rotationally symmetrical about an optical axis, or an arrangement for preventing the blocking problem by decentering the central axis of the reflecting mirror from the optical axis.

In addition, a zooming art is known which varies the image forming magnification (focal length) of a photographing optical system by relatively moving a plurality of reflecting mirrors which constitute part of the aforesaid type of mirror optical system.

For example, U.S. Pat. No. 4,812,030 discloses an art for performing variation of the magnification of the photographing optical system by relatively varying the distance between the concave mirror 101 and the convex mirror 102 and the distance between the convex mirror 102 and the image plane 103 in the construction of the Cassegrainian reflecting telescope shown in FIG. 59.

FIG. 62 is a schematic view of another embodiment disclosed in U.S. Pat. No. 4,812,030. In the shown embodiment, an object light beam 138 from an object is incident on and reflected by a first concave mirror 131, and travels toward an object side as a converging light beam and is incident on a first convex mirror 132. The light beam is reflected toward an image forming plane by the first convex mirror 132 and is incident on a second convex mirror 134 as an approximately parallel light beam. The light beam is reflected by the second convex mirror 134 and is incident on a second concave mirror 135 as a diverging light beam. The light beam is reflected by the second concave mirror 135 as a converging light beam and forms an image of the object on an image plane 137.

In this arrangement, by varying the distance between the first concave mirror 131 and the first convex mirror 132 and the distance between the second convex mirror 134 and the second concave mirror 135, zooming is performed and the focal length of the entire mirror optical system is varied.

In the arrangement disclosed in U.S. Pat. No. 4,993,818, an image formed by the Cassegrainian reflecting telescope shown in FIG. 59 is secondarily formed by another mirror optical system provided in a rear stage, and the magnification of the entire photographing optical system is varied by varying the image forming magnification of that secondary image forming mirror optical system.

In any of the above-described reflecting types of photographing optical systems, a large number of constituent components are needed and individual optical components need to be assembled with high accuracy to obtain the required optical performance. Particularly since the relative position accuracy of each of the reflecting mirrors is strict, it is indispensable to adjust the position and the angle of each of the reflecting mirrors.

One proposed approach to solving this problem is to eliminate the incorporation error of optical components which occurs during assembly, as by forming a mirror system as one block.

A conventional example in which a multiplicity of reflecting surfaces are formed as one block is an optical prism, such as a pentagonal roof prism and a Porro prism, which is used in, for example, a viewfinder optical system.

In the case of such a prism, since a plurality of reflecting surfaces are integrally formed, the relative positional relationships between the respective reflecting surfaces are set with high accuracy, so that adjustment of the relative positions between the respective reflecting surfaces is not needed. Incidentally, the primary function of the prism is to reverse an image by varying the direction in which a ray travels, and each of the reflecting surfaces consists of a plane surface.

Another type of optical system, such as a prism having reflecting surfaces with curvatures, is also known.

FIG. 63 is a schematic view of the essential portion of the observing optical system which is disclosed in U.S. Pat. No. 4,775,217. This observing optical system is an optical system which not only allows an observer to observe a scene of the outside but also allows the observer to observe a display image displayed on an information display part, in the form of an image which overlaps the scene.

In this observing optical system, a display light beam 145 which exits from the display image displayed on an information display part 141 is reflected by a surface 142 and travels toward an object side and is incident on a half-mirror surface 143 consisting of a concave surface. After having been reflected by the half-mirror surface 143, the display light beam 145 is formed into an approximately parallel light beam by the refractive power of the half-mirror surface 143. This approximately parallel light beam is refracted by and passes through the surface 142, and forms a magnified virtual image of the display image and enters a pupil 144 of an observer so that the observer recognizes the display image.

In the meantime, an object light beam 146 from an object is incidence on a surface 147 which is approximately parallel to the reflecting surface 142, and is then refracted by the surface 147 and reaches the half-mirror surface 143 which is a concave surface. Since the concave surface 143 is coated with an evaporated semi-transparent film, part of the object light beam 146 passes through the concave surface 143, is refracted by and passes through the surface 142, and enters the pupil 144 of the observer. Thus, the observer can visually recognize the display image as an image which overlaps the scene of the outside.

FIG. 64 is a schematic view of the essential portion of the observing optical system disclosed in Japanese Laid-Open Patent Application No. Hei 2-297516. This observing optical system is also an optical system which not only allows an observer to observe a scene of the outside but also allows the observer to observe a display image displayed on an information display part, as an image which overlaps the scene.

In this observing optical system, a display light beam 154 which exits from an information display part 150 passes through a plane surface 157 which constitutes part of a prism Pa, and is incident on a parabolic reflecting surface 151. The display light beam 154 is reflected by the reflecting surface 151 as a converging light beam, and forms an image on a focal plane 156. At this time, the display light beam 154 reflected by the reflecting surface 151 reaches the focal plane 156 while being totally reflected between two parallel plane surfaces 157 and 158 which constitute part of the prism Pa. Thus, the thinning of the entire optical system is achieved.

Then, the display light beam 154 which exits from the focal plane 156 as a diverging light beam is totally reflected between the plane surface 157 and the plane surface 158, and is incident on a half-mirror surface 152 which consists of a parabolic surface. The display light beam 154 is reflected by the half-mirror surface 152 and, at the same time, not only is a magnified virtual image of a display image formed but also the display light beam 154 is formed into an approximately parallel light beam by the refractive power of the half-mirror surface 152. The obtained light beam passes through the surface 157 and enters a pupil 153 of the observer, so that the observer can recognize the display image.

In the meantime, an object light beam 155 from the outside passes through a surface 158b which constitutes part of a prism Pb, then through the half-mirror surface 152 which consists of a parabolic surface, then through the surface 157, and is then incident on the pupil 153 of the observer. Thus, the observer visually recognizes the display image as an image which overlaps the scene of the outside.

As another example which uses an optical element on a reflecting surface of a prism, optical heads for optical pickups are disclosed in, for example, Japanese Laid-Open Patent Application Nos. Hei 5-12704 and Hei 6-139612. In these optical heads, after the light outputted from a semiconductor laser has been reflected by a Fresnel surface or a hologram surface, the reflected light is focused on a surface of a disk and the light reflected from the disk is conducted to a detector.

In any of the above-described mirror optical systems having the decentered mirrors, which are disclosed in U.S. Pat. Nos. 3,674,334, 5,063,586 and 4,265,510, since the individual reflecting mirrors are disposed with different amounts of decentering, the mounting structure of each of the reflecting mirrors is very complicated and the mounting accuracy of the reflecting mirrors is very difficult to ensure.

In either of the above-described photographing optical systems having the magnification varying functions, which are disclosed in U.S. Pat. Nos. 4,812,030 and 4,993,818, since a large number of constituent components, such as a reflecting mirror or an image forming lens, are needed, it is necessary to assemble each optical part with high accuracy to realize the required optical performance.

In particular, since the relative position accuracy of the reflecting mirrors is strict, it is necessary to adjust the position and the angle of each of the reflecting mirrors.

As is known, conventional reflecting types of photographing optical systems have constructions which are suited to a so-called telephoto lens using an optical system having an entire large length and a small angle of view. However, if a photographing optical system which needs fields of view from a standard field of view to a wide angle of view is to be obtained, the number of reflecting surfaces which are required for aberration correction must be increased, so that a far higher component accuracy and assembly accuracy are needed and the cost and the entire size of the optical system tend to increase.

Either of the observing optical systems disclosed in U.S. Pat. No. 4,775,217 and Japanese Laid-Open Patent Application No. Hei 2-297516 is primarily intended to vary the direction of travel of a ray and a pupil's image forming action for efficiently transmitting a display image displayed on the information display part which is disposed away from the pupil of an observer. However, neither of them directly discloses an art for performing positive aberration correction by using a reflecting surface having a curvature.

The range of applications of either of the optical systems for optical pickups which are disclosed in, for example, Japanese Laid-Open Patent Application Nos. Hei 5-12704 and Hei 6-139612 is limited to the field of a detecting optical system, and neither of them satisfies the image forming performance required for, particularly, an image pickup device which uses an area type of image pickup element, such as a CCD.

SUMMARY OF THE INVENTION

It is, therefore, a first object of the present invention to provide a reflecting type of zoom optical system in which a small-sized mirror optical system can be used and reflecting mirrors can be arranged with a reduced arrangement accuracy (assembly accuracy) because the zoom optical system employs a plurality of optical elements on each of which a plurality of curved reflecting surfaces and plane reflecting surfaces are integrally formed and is capable of performing zooming by appropriately varying the relative position between at least two of the plurality of optical elements. Further, the first object of the present invention is to provide an image pickup device employing such a reflecting type of zoom optical system.

A second object of the present invention is to provide a reflecting type of zoom optical system which has a wide angle of view in spite of its reduced effective diameter owing to an arrangement in which a stop is disposed at a location closest to the object side of the optical system and an object image is formed in the optical system at least once, and also which has an entire length which is reduced in a predetermined direction by bending an optical path in the optical system into a desired shape by using optical elements each having a plurality of reflecting surfaces of appropriate refractive powers and decentering the reflecting surfaces which constitute each of the optical elements. Further, the second object of the present invention is to provide an image pickup device employing such a reflecting type of zoom optical system.

A reflecting type of zoom optical system according to the present invention comprises a plurality of optical elements each of which includes a transparent body and two refracting surfaces and a plurality of reflecting surfaces formed on the transparent body, and each of which is arranged so that a light beam enters the transparent body from one of the two refracting surfaces, repeatedly undergoes reflection by the plurality of reflecting surfaces, and exits from the other of the two refracting surfaces, and/or a plurality of optical elements on each of which a plurality of reflecting surfaces made from surface reflecting mirrors are integrally formed, and each of which is arranged so that an entering light beam repeatedly undergoes reflection by the plurality of reflecting surfaces and exits from the optical element, wherein an image of an object is formed via the plurality of optical elements and zooming is performed by causing at least two optical elements from among the plurality of optical elements to vary their relative positions.

Further, a reference axis which enters each of the at least two optical elements which are caused to vary the relative positions is parallel to a reference axis which exits from that optical element of the at least two optical elements.

Further, the at least two optical elements which are caused to vary the relative positions move on one movement plane in parallel with each other.

Further, the reference axis which enters each of the at least two optical elements which are caused to vary the relative positions is the same in direction as the reference axis which exits from that optical element of the at least two optical elements.

Further, the reference axis which enters one of the at least two optical elements which are caused to vary the relative positions is the same in direction as the reference axis which exits from the one of the at least two optical elements, while the reference axis which enters another of the at least two optical elements is opposite in direction to the reference axis which exits from the other optical element.

Further, the reference axis which enters each of the at least two optical elements which are caused to vary the relative positions is opposite in direction to the reference axis which exits from that optical element of the at least two optical elements.

Further, focusing is performed by moving one of the at least two optical elements which are caused to vary the relative positions.

Further, focusing is performed by moving an optical element other than the at least two optical elements which are caused to vary the relative positions.

Further, in the reflecting type of zoom optical system, an object image is intermediately formed in an optical path at least once.

Further, each curved reflecting surface from among the plurality of reflecting surfaces is of a shape having only one plane of symmetry.

Further, all reference axes of the at least two optical elements which are caused to vary the relative positions are present on one plane.

Further, at least part of reference axes of an optical element other than the at least two optical elements which are caused to vary the relative positions are present on the one plane.

Further, at least one of the plurality of optical elements has a reflecting surface in such a manner that a normal to the reflecting surface at an intersection point of a reference axis and the reflecting surface is inclined with respect to a movement plane on which the at least two optical elements which are caused to vary the relative positions move.

Further, the at least two optical elements which are caused to vary the relative positions respectively move on two movement planes which are inclined with respect to each other.

Further, an image pickup device according to the present invention includes the reflecting type of zoom optical system, and is arranged to form an image of the object on an image pickup surface of an image pickup medium.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIGS. 3A and 3B are explanatory views aiding in describing the magnification varying operation of Embodiment 1;

FIG. 4 is a schematic view of the essential portion of Embodiment 2 of the present invention;

FIG. 9 is a view showing an optical cross section taken on a Y, Z plane, of Embodiment 5 of the present invention;

FIG. 10 shows lateral aberration charts of Embodiment 5 (wide-angle end);

FIG. 11 shows lateral aberration charts of Embodiment 5 (middle position);

FIG. 21 is a view showing an optical cross section taken on the Y, Z plane, of Embodiment 8 of the present invention;

FIG. 25 is a view showing an optical cross section taken on the Y, Z plane, of Embodiment 9 of the present invention;

FIG. 33 is a view showing an optical cross section taken on the Y, Z plane, of Embodiment 11 of the present invention;

FIG. 41 is a view showing an optical cross section taken on the Y, Z plane, of Embodiment 13 of the present invention;

FIG. 42 is a perspective view of Embodiment 13;

FIG. 46 is a view showing an optical cross section taken on the Y, Z plane, of Embodiment 14 of the present invention;

FIG. 50 is a view showing an optical cross section taken on the Y, Z plane, of Embodiment 15 of the present invention;

FIG. 54 is a view showing an optical cross section taken on the Y, Z plane, of Embodiment 16 of the present invention;

Ri, $R_{m,n}$ surface
Bi i-th optical element
Di surface-to-surface distance taken along reference axis
Ndi index of refraction
vdi Abbe number
$A_{i,j}$ reference axis
$B_L$=R1 stop
P final image plane
Ni intermediate formed image

DETAILED DESCRIPTION OF THE PREFERRED EMBODIMENTS

Prior to the detailed description of individual embodiments, reference will be made to terms which are herein used to express various constituent elements of the embodiments, and matters common to all the embodiments.

Figure 1:
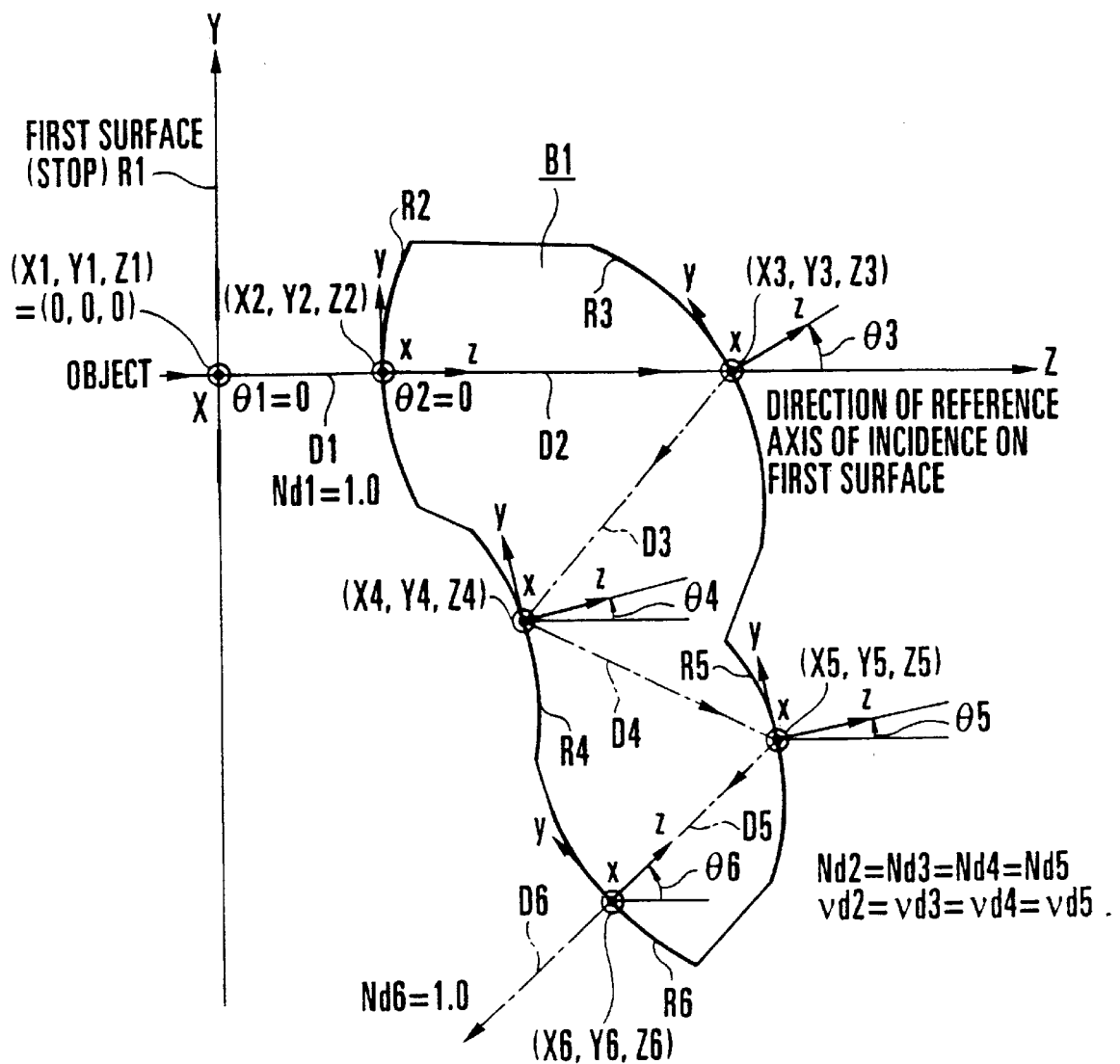
FIG. 1 is an explanatory view of a coordinate system for Embodiments of the present invention.

FIG. 1 is an explanatory view of a coordinate system which defines the constituent data of an optical system according to the present invention. In each of the embodiments of the present invention, the i-th surface is a surface which lies at the i-th position numbered from an object side from which a ray travels toward an image plane (the ray is shown by alternate long and short dash lines in FIG. 1 and is hereinafter referred to as the reference axis ray).

In FIG. 1, a first surface R1 is a stop, a second surface R2 is a refracting surface coaxial with the first surface R1, a third surface R3 is a reflecting surface which is tilted with respect to the second surface R2, a fourth surface R4 is a reflecting surface which is shifted and tilted with respect to the third surface R3, a fifth surface R5 is a reflecting surface which is shifted and tilted with respect to the fourth surface R4, and a sixth surface R6 is a refracting surface which is shifted and tilted with respect to the fifth surface R5. All of the second surface R2 to the sixth surface R6 are arranged on one optical element composed of a medium such as glass or plastics. In FIG. 1, such optical element is shown as a first optical element B1.

Accordingly, in the arrangement shown in FIG. 1, the medium between an object plane (not shown) and the second surface R2 is air, the second surface R2 to the sixth surface R6 are arranged on a certain common medium, and the medium between the sixth surface R6 and a seventh surface R7 (not shown) is air.

Since the optical system according to the present invention is a decentered optical system, the surfaces which constitute part of the optical system do not have a common optical axis. For this reason, in each of the embodiments of the present invention, an absolute coordinate system is set the origin of which is the central point of an effective ray diameter at the first surface.

In each of the embodiments of the present invention, the central point of the effective ray diameter at the first surface is set as the origin, and the path of the ray (reference axis ray) which passes through this origin and the center of a final image forming plane is defined as a reference axis (or axes) of the optical axis. In each of the present embodiments, the reference axes have directions, respectively. The directions correspond to the directions in which the reference axis ray travels to form an image.

In the embodiments of the present invention, although the reference axes which provide a reference for the optical system are set in the above-described manner, axes which are convenient for optical design, aberration correction or representation of the shape of each surface which constitutes part of the optical system may be adopted as the reference axes which provide a reference for the optical system. However, in general, the path of a ray which passes through the center of an image plane and through any one selected from among the center of the stop, the center of an entrance pupil, the center of an exit pupil, the center of the first surface of the optical system and the center of the final surface of the optical system is set as the reference axes which provide a reference for the optical system.

Specifically, in the embodiments of the present invention, although the ray (reference axis ray) which passes through the first surface, i.e., the central point of the effective ray diameter at the surface of the stop, and leads to the center of the final image forming plane is refracted and reflected along a path by individual refracting or reflecting surfaces, this path is set as the reference axis (axes). The order of the surfaces is set to the order in which the reference axis ray is subjected to refraction and reflection.

Accordingly, the reference axis finally reaches the center of the image plane while changing its direction in the order of the surfaces in accordance with the law of refraction or reflection.

Tilting planes which constitute part of the optical system of each of the embodiments of the present invention are basically tilted in the same plane. For this reason, each axis of the absolute coordinate system is defined as follows:

Z axis: reference axis which passes through the origin and extends to the second surface R2;

Y axis: straight line which passes through the origin and makes an angle of 90° with the z axis in the counterclockwise direction in a tilting plane (on the surface of the sheet of FIG. 1); and X axis: straight line which passes through the origin and is perpendicular to each of the Z and Y axes (perpendicular to the surface of the sheet of FIG. 1).

If the surface shape of the i-th surface which constitutes part of the optical system is to be expressed, it is possible to more readily understand and recognize such surface shape by setting a local coordinate system the origin of which is a point at which the reference axis intersects the i-th surface, and expressing the surface shape of the i-th surface by using the local coordinate system than by expressing the surface shape of the i-th surface by using the absolute coordinate system. Accordingly, in some embodiments of the present invention the constituent data of which are shown herein, the surface shape of the i-th surface is expressed by its local coordinate system.

The tilting angle of the i-th surface in the Y, Z plane is expressed by an angle θi (unit: degree) which shows a positive value in the counterclockwise direction with respect to the Z axis of the absolute coordinate system. Accordingly, in each of the embodiments of the present invention, the origins of the local coordinate systems of the respective surfaces are located on the Y, Z plane, as shown in FIG. 1. The decentering of the surfaces is absent in the X, Z plane or the X, Y plane. In addition, the y and z axes of the local coordinates (x, y, z) of the i-th surface are inclined by the angle θi in the Y, Z plane with respect to the absolute coordinate system (X, Y, Z). Specifically, the x, y and z axes of the local coordinates (x, y, z) are set in the follow manner:

- z axis: straight line which passes through the origin of the local coordinates and makes the angle θi with the Z direction of the absolute coordinate system in the counterclockwise direction in the Y, Z plane;
- y axis: straight line which passes through the origin of the local coordinates and makes an angle of 90° with the z direction of the local coordinates in the counterclockwise direction in the Y, Z plane; and
- x axis: straight line which passes through the origin of the local coordinates and is perpendicular to the Y, Z plane.

Symbol Di indicates a scalar which represents the distance between the origin of the local coordinates of the i-th surface and that of the (i+1)-st surface. Symbols Ndi and vdi respectively indicate the refractive index and the Abbe number of the medium between the i-th surface and the (i+1)-st surface.

The optical system of each of the embodiments of the present invention varies its entire focal length (magnification) by the movement of a plurality of optical elements. Regarding each of the embodiments which have numerical data shown herein, the cross section of its optical system and the numerical data are shown with respect to three positions, i.e., a wide-angle end (W), a telephoto end (T) and a middle position (M).

If the optical element shown in FIG. 1 moves in the Y, Z plane, the origin (Yi, Zi) of each of the local coordinate systems which represent the positions of the respective surfaces takes on a different value for each varied magnification position. However, in the case of the embodiments having the numerical data shown herein, since the optical element is assumed to move in only the Z direction for the purpose of variation of magnification, the coordinate value Zi is expressed by Zi(W), Zi(M) and Zi(T) in the order of the wide-angle end, the middle position and the telephoto end which respectively correspond to three states to be taken by the optical system.

Incidentally, the coordinate values of each of the surfaces represent those obtained at the wide-angle end, and each of the middle position and the telephoto end is expressed as a difference between the coordinate values obtained at the wide-angle end and the coordinate values obtained at the respective one of the middle position and the telephoto end. Specifically, letting "a" and "b" be the respective amounts of movements of the optical element at the middle position (M) and the telephoto end (T) with respect to the wide-angle end (W), these amounts of movements are expressed by the following expressions:

$$Zi(M)=Zi(W)+a,$$

$$Zi(T)=Zi(W)+b.$$

If all the surfaces move in their Z plus directions, the signs of "a" and "b" are positive, whereas if they move in their Z minus directions, the signs "a" and "b" are negative. The surface-to-surface distance Di which varies with these movements is a variable, and the values of the variable at the respective varied magnification positions are collectively shown on tables which will be referred to later.

Each of the embodiments of the present invention has spherical surfaces and aspheric surfaces of rotational asymmetry. Each of the spherical surfaces has a spherical shape expressed by a radius of curvature $R_i$. The sign of the radius of curvature $R_i$ is minus if the center of curvature is located on the side of the first surface along the reference axis (shown by the alternate long and short dash lines in FIG. 1) which travels from the first surface to the image plane, whereas if the center of curvature is located on the side of the image forming plane along the reference axis, the sign of the radius of curvature $R_i$ is plus.

Each of the spherical surfaces is a shape expressed by the following expression:

$$z = \frac{(x^2+y^2|)/R_i}{1+\{1-(x^2+y^2)/R_i^2\}^{1/2}}.$$

In addition, the optical system according to the present invention has at least one aspherical surface of rotational asymmetry, and its shape is expressed by the following expressions:

$$A=(a+b)\cdot(y^2$$

$$\cdot\cos^2 t + x^2), B=2a\cdot b$$

$$\cdot\cos t\,[1+\{(b-a)\cdot y$$

$$\cdot\sin t/(2a\cdot b)\}+[1$$

$$\{(b-a)\cdot y\cdot\sin t/(a\cdot b)\}$$

$$-\{y^2/(a\cdot b)\}-\{4a\cdot b\cdot$$

$$\cos^2 t+(a+b)^2$$

$$\sin^2 t\}x^2/(4a^2 b^2$$

$$\cos^2 t)]^{1/2}],$$

so that $$z=A/B+C_{02}y^2+C_{20}x^2$$

$$+C_{03}y^3$$

$$+C_{21}x^2 y+C_{04}y^4$$

$$+C_{22}x^2 y^2+C_{40}x^4.$$

Since the above curved-surface expression contains only even-degree polynomials regarding x, the curved surface expressed by the above curved-surface expression has a shape symmetrical with respect to the Y, Z plane. Further, if the following condition is satisfied, a shape symmetrical with respect to the X, Z plane is obtained:

$C_{03}=C_{21}=t=0$.

Further, if the following expression is satisfied, a shape of rotational symmetry is obtained:

$C_{02}=C_{20} \; C_{04}=C_{40}=C_{22}/2$.

If the above conditions are not satisfied, a shape of rotational asymmetry is obtained.

In each of the embodiments of the present invention, as shown in FIG. 1, the first surface (the entrance side of the optical system) is the stop. A horizontal half-angle of view $u_Y$ is the maximum angle of view of a light beam incident on the stop R1 in the Y, Z plane of FIG. 1, while a vertical half-angle of view $u_X$ is the maximum angle of view of a light beam incident on the stop R1 in the X, Z plane of FIG. 1. The diameter of the stop which is the first surface is shown as an aperture diameter which relates to the brightness of the optical system. Since an entrance pupil is located at the first surface, the aperture diameter is equal to the diameter of the entrance pupil.

The effective image area in the image plane is represented by an image size which is represented by a rectangular region having a horizontal size taken in the y direction of the local coordinate system and a vertical size taken in the x direction of the local coordinate system.

Regarding each of the embodiments the constituent data of which are shown herein, the size of its optical system is also shown. The size is determined by the effective ray diameter at the wide-angle end.

Regarding the embodiments which are illustrated together with the constituent data, their respective lateral aberration charts are shown. Each of the lateral aberration charts shows the lateral aberrations of a light beam for the wide-angle end (W), the middle position (M) and the telephoto end (T), and the lateral aberrations are those of the light beam which is incident on the stop R1 at an angle of incidence which is defined by a horizontal angle of incidence and a vertical angle of incidence which are $(u_Y, u_X)$, $(0, u_X)$, $(-u_Y, u_X)$, $(u_Y, 0)$, $(0, 0)$ and $(-u_Y, 0)$, respectively. In each of the lateral aberration charts, the horizontal axis represents the height of incidence on the pupil, and the vertical axis represents the amount of aberration. In any of the embodiments, since each of the surfaces basically has a shape symmetrical with respect to the Y, Z plane, the plus and minus directions of a vertical angle of view are the same in the lateral aberration chart. For this reason, the lateral aberration chart in the minus direction is omitted for the sake of simplicity.

Embodiments 1 to 4 which will be described below are qualitative embodiments the constituent data of which are not shown herein, while the constituent data of Embodiments 5 to 16 are shown herein.

Incidentally, in each of Embodiments 1 to 4, surface symbols or the like are attached to each constituent optical element, independently of the above-described nomenclature. Specifically, the stop is denoted by $B_L$ and the final image plane is denoted by P, and the surfaces of the M-th optical element are respectively denoted by $R_{m,1}, R_{m,2}, \ldots R_{m,n}$ in that order as viewed from the first surface.

Embodiment 1

Figure 2:
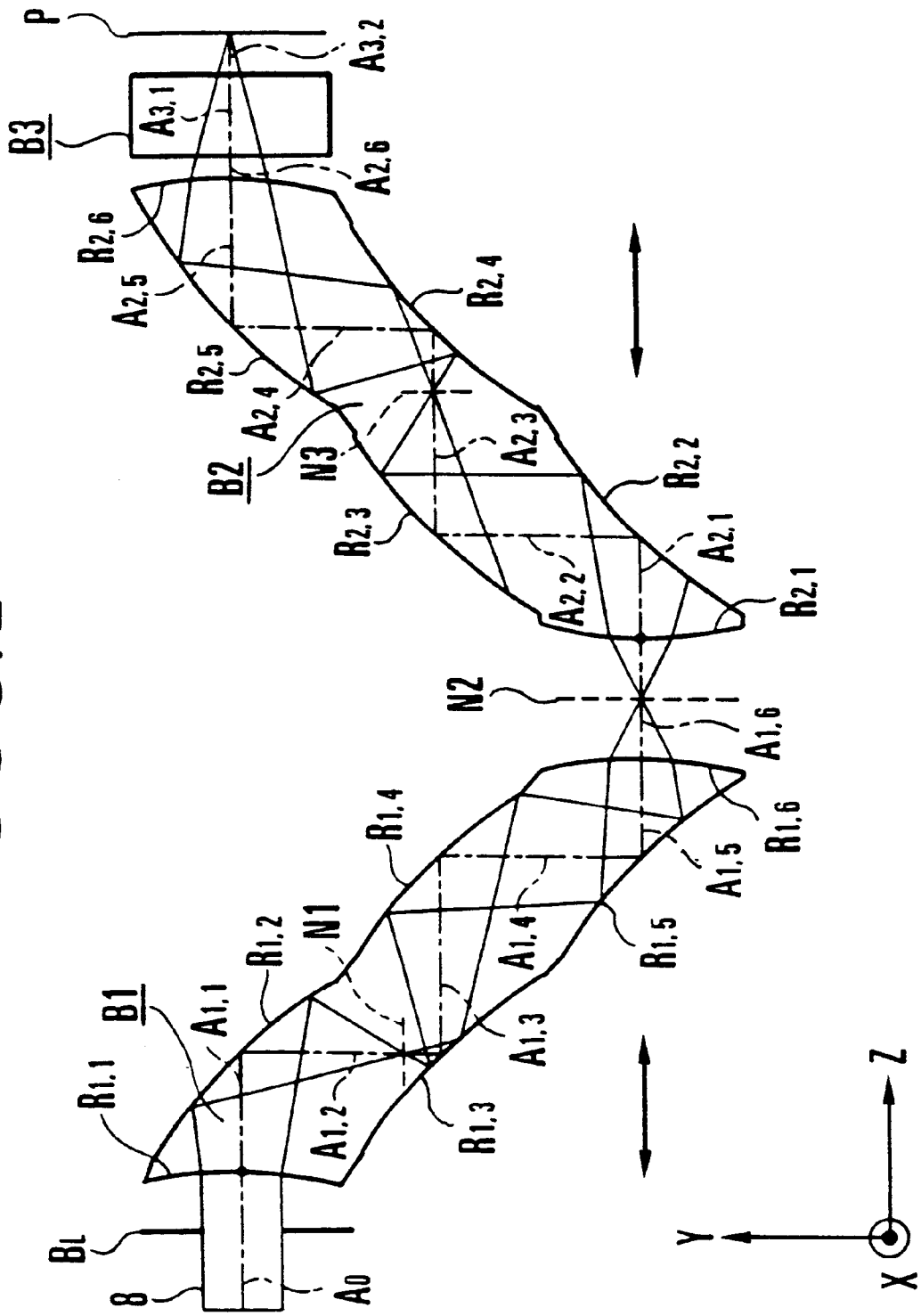
FIG. 2 is a schematic view of the essential portion of Embodiment 1 of the present invention.

FIG. 2 is a schematic view of the essential portion of Embodiment 1 of the present invention. The present embodiment is intended for an image pickup optical system which constitutes a so-called two-group type of zoom lens. The image pickup optical system shown in FIG. 2 includes a first optical element B1 and a second optical element B2 each having a plurality of curved reflecting surfaces. The first optical element B1 includes a concave refracting surface $R_{1,1}$, four reflecting surfaces, i.e., a concave mirror $R_{1,2}$, a convex mirror $R_{1,3}$, a concave mirror $R_{1,4}$ and a convex mirror $R_{1,5}$, and a convex refracting surface $R_{1,6}$ in that order as viewed from the object side. The direction of the reference axis which enters the first optical element B1 and the direction of the reference axis which exits from the first optical element B1 are parallel to and the same as each other.

The second optical element B2 includes a convex refracting surface $R_{2,1}$, four reflecting surfaces, i.e., a convex mirror $R_{2,2}$, a concave mirror $R_{2,3}$, a convex mirror $R_{2,4}$ and a concave mirror $R_{2,5}$, and a convex refracting surface $R_{2,6}$ in that order as viewed from the object side. Similarly to the first optical element B1, the direction of the reference axis which enters the second optical element B2 and the direction of the reference axis which exits from the second optical element B2 are parallel to and the same as each other.

The image pickup optical system shown in FIG. 2 also includes an optical correcting plate B3 which employs a plane parallel plate and is composed of a low-pass filter made of a quartz material, an infrared cut filter or the like.

The image pickup optical system shown in FIG. 2 also includes an image pickup element surface P which serves as the final image plane, such as the image pickup surface of a CCD (image pickup medium), and the stop $B_L$ which is disposed on the object side of the first optical element B1 (the light-beam entrance side of the optical system). In FIG. 2, symbol Ai represents the reference axis of the image pickup optical system.

The first optical element B1 and the second optical element B2 constitute part of the two-group zoom lens.

The image forming action of the present embodiment will be described below. A light beam 8 from an object is limited to a required amount of incidence by the stop $B_L$, and is then incident on the concave refracting surface $R_{1,1}$ of the first optical element B1.

The light beam which has been refracted by and passed through the concave refracting surface $R_{1,1}$ is reflected from the concave mirror $R_{1,2}$ toward a primary image forming plane N1. Thus, an image of the object is formed on the primary image forming plane N1 by the power of the concave mirror $R_{1,2}$.

By temporarily forming the image of the object in the first optical element B1 in this manner, it is possible to effectively suppress an increase in the effective ray diameter of each surface disposed on the image side of the stop $B_L$.

The light beam which has formed such primary image on the primary image forming plane N1 is repeatedly reflected by the convex mirror $R_{1,3}$, the concave mirror $R_{1,4}$ and the convex mirror $R_{1,5}$ in that order while undergoing convergence or divergence due to the power of each of these reflecting mirrors. When the light beam reaches the convex refracting surface $R_{1,6}$, the light beam is refracted by the convex refracting surface $R_{1,6}$ and forms the object image on a secondary image forming plane N2.

As described above, the first optical element B1 functions as a lens unit which is provided with desired optical performance and has a positive power as a whole, owing to the refractions by the entrance and exit surfaces and the repeated reflections by the plurality of curved reflecting mirrors.

The light beam from the object image formed on the secondary image forming plane N2 passes through the convex refracting surface $R_{2,1}$ of the second optical element B2, and then forms the object image on a ternary image forming plane N3 via the convex mirror $R_{2,2}$ and the concave mirror $R_{2,3}$.

For a reason similar to the reason why the object image is formed in the first optical element B1, the above-described step is effective for suppressing an increase in the effective ray diameter of each surface in the second optical element B2.

The light beam which has formed the image on the ternary image forming plane N3 is repeatedly reflected by the convex mirror $R_{2,4}$ and the concave mirror $R_{2,5}$ in that order while undergoing the influence of the power of each of these reflecting mirrors. When the light beam reaches the convex refracting surface $R_{2,6}$, the light beam is refracted by the convex refracting surface $R_{2,6}$ and passes through the optical correcting plate B3 to form the object image on the image pickup element surface P.

As described above, the second optical element B2 is arranged to again form on the image pickup element surface P the object image formed on the secondary image forming plane N2 by the first optical element B1, and, similarly to the first optical element B1, functions as a lens unit which is provided with desired optical performance and has a positive power as a whole, owing to the refractions by the entrance and exit surfaces and the repeated reflections by the plurality of curved reflecting mirrors.

In addition, in the present embodiment, the focal length (image forming magnification) of the photographing optical system is varied by relatively moving the first and second optical elements B1 and B2 with respect to the image pickup element surface (image forming plane) P. (This operation is called "variation of magnification" or "zooming".)

The magnification varying operation will be described below with reference to FIGS. 3A and 3B. FIGS. 3A and 3B are optical layout views each showing the first and second optical elements B1 and B2 of Embodiment 1 as single thin lenses, and show different states in which the photographing optical system is developed with respect to the reference axis. Incidentally, FIG. 3A is a layout view of the state in which the optical system is set to the wide-angle end (W), while FIG. 3B is a layout view of the state in which the optical system is set to the telephoto end (T).

In FIGS. 3A and 3B, $f_1$ represents the focal length of the first optical element B1, $f_2$ represents the focal length of the second optical element B2, $x_W(-)$ represents the distance between a front focal point $F_2$ of the second optical element B2 and the secondary image forming plane N2 with the optical system being set to the wide-angle end (W), and $x_W'$ represents the distance between a rear focal point $F_2'$ of the second optical element B2 and the image forming plane P with the optical system being set to the wide-angle end (W). (The respective subscripts $_W$ and $_T$ indicate that the optical system is set to the wide-angle end and that a value indicating that the optical system is set to the telephoto end.)

From Newton's formula for image formation, if $$x_W * x_W' = -f_2^2$$

is satisfied, an image forming magnification $\beta_{2W}$ of the second optical element B2 becomes:

$$\beta_{2W} = -(x_W' + f_2)/(-x_W + f_2) \quad (1)$$
$$= f_2/x_W$$
$$= -x_W'/f_2,$$

and also a focal length $f_W$ of the optical system at the wide-angle end becomes:

$$f_W = f_1 * \beta_{2W} \quad (2)$$
$$= f_1 * f_2/x_W.$$

Thus, if the second optical element B2 moves while satisfying Newton's formula for image formation and the first optical element B1 moves to correct the positional variation of the intermediate image forming plane N2 due to the movement of the second optical element B2, the optical system varies the focal length without varying the final image forming position P.

Suppose that the second optical element B2 has moved by a predetermined amount and the optical system has shifted from the wide-angle end (W) to the telephoto end (T). Let $x_T(-)$ be the distance between the front focal point $F_2$ of the second optical element B2 and the intermediate image forming plane N2, and let $x_T'$ be the distance between the rear focal point $F_2'$ of the second optical element B2 and the image forming plane P. An image forming magnification $\beta_{2T}$ of the second optical element B2 becomes:

$$\beta_{2T} = (x_T' + f_2)/(-x_T + f_2) \quad (3)$$
$$= f_2/x_T$$
$$= -x_T'/f_2,$$

and also a focal length $f_T$ of the optical system at the telephoto end becomes:

$$f_T = f_1 * \beta_{2T} \quad (4)$$
$$= f_1 * f_2/x_T.$$

Therefore, a magnification variation ratio Z of the optical system becomes:

$$Z = f_T/f_W \quad (5)$$
$$= x_W/x_T.$$

Accordingly, the optical system is able to vary the focal length (image forming magnification) without varying the final image forming position P, by varying the positional relationships between the first optical element B1 and the second optical element B2 and between the second optical element B2 and the final image forming position P.

Although focusing in Embodiment 1 can be achieved by moving an arbitrary optical element which constitutes part of the optical system, it is preferable to move an optical element of lightest weight, in terms of the load of a focusing actuator.

In addition, if the amount of movement of the optical element is to be fixed with respect to the distance to an object to be photographed, irrespective of the variation of magnification, it is preferable to move the first optical element B1 disposed at a location closest to the object side.

Incidentally, if the second optical element B2 which moves during the variation of magnification is arranged to move during focusing as well, both the focusing actuator and a magnification varying actuator can be achieved by a common arrangement.

The effects and advantages of the present embodiment will be described below.

In the present embodiment, since the reflecting surfaces which move during variation of magnification are realized in the form of a unit, it is possible to guarantee the accuracy of the relative positions between the respective reflecting surfaces which require a highest position accuracy in conventional mirror optical systems. Accordingly, in the present embodiment, it is only necessary to ensure the position accuracy between the first optical element B1 and the second optical element B2, and, hence, the position accuracy may be similar to that of a moving lens group used in a conventional refracting lens system.

As compared with a refracting lens system, since each of the optical elements is constructed as a lens unit in which a plurality of curved reflecting surfaces are integrally formed, the required number of components of the entire optical system is reduced so that a reduction in the cost of the optical system can be achieved and accumulated errors due to the mounting of other components can be reduced.

By adopting the arrangement which transmits an object image by repeating image formation by a plurality of times, the effective ray diameter of each surface can be reduced so that each of the optical elements and the entire photographing optical system can be made compact.

Since the image formation size of an intermediate image forming plane is set to be comparatively small with respect to the size of the image pickup surface, it is possible to reduce the effective ray diameter of each surface which is required to transmit the object image.

In the case of many conventional photographing optical systems, stops are disposed in optical systems. If a stop is disposed in an optical system, there is the problem that as an angle of view increases, a lens which is disposed on the object side of the stop at a greater distance therefrom requires a greater effective ray diameter.

In the present embodiment, since the stop $B_L$ is disposed in the vicinity of the entrance surface of the first optical element B1 located on the object side of the photographing optical system, the effective ray diameter of the front lens group of the photographing optical system is prevented from increasing when the focal length of the photographing optical system is shifted to a wide-angle side.

In addition, since the object image is formed in each of the optical elements, an increase in the effective ray diameter of each surface disposed on the image side of the stop $B_L$ is effectively suppressed.

The reference axes of each of the first optical element B1 and the second optical element B2 are completely contained in the Y, Z plane. Accordingly, by setting the movement of each of the optical elements so that they move on a plane parallel to the Y, Z plane, even if the first optical element B1 and the second optical element B2 move during variation of magnification, it is possible to readily maintain the parallelism between the Y, Z plane which contains the reference axes and the plane on which each of the optical elements moves. Accordingly, it is possible to readily eliminate the parallelism decentering in the X-axis direction of the optical elements B1 and B2 and the rotations about the Y- and Z-axes of each of the optical elements B1 and B2.

However, even if the Y, Z plane which contains the reference axes and the plane on which both optical elements move are oblique, no decentering aberration occurs as long as the movement plane is parallel to direction vectors obtained when the Y, Z plane which contains the reference axes moves during the variation of magnification.

Since the optical elements are disposed on one plane, both optical elements can be incorporated from one direction, so that assembly becomes very easy.

Although in the present embodiment the secondary image forming plane N2 is formed at an intermediate position between the first optical element B1 and the second optical element B2, the secondary image forming plane N2 may also be provided in the inside of the first optical element B1 or the second optical element B2.

Regarding the directions in which the respective optical elements move during variation of magnification, if the position of the incidence point of the reference axis on each reflecting surface is not changed during the movement of each of the optical elements from the wide-angle end to the telephoto end, the amount of error which occurs in such directions during the variation of magnification can be minimized. For this reason, the directions in which the reference axis enters and exits from each of the optical elements B1 and B2 are made parallel, and, in addition, the optical elements B1 and B2 are made to move in parallel with the reference axis which enters and exits from each of the optical elements B1 and B2.

In the present embodiment, if the optical elements are to be arranged in such a manner that the directions in which the reference axis enters and exits from each of the optical elements are parallel to each other, two kinds of patterns are available, i.e., one pattern is to make the exit direction of the reference axis the same as the entrance direction thereof, and the other pattern is to make the former direction opposite to the latter direction. If the exit direction is made opposite to the entrance direction, the distance between the entrance side and the exit side varies with the movement of the optical elements by the same amount as the amount of such movement so that the optical path length can be varied by a total amount equivalent to twice the amount of the movement.

If the exit direction is made the same as the entrance direction, the position at which the reference axis enters and the position at which the reference axis exits can be shifted to desired positions.

Since the embodiment of the present invention can be constructed in either of the aforesaid two kinds of patterns, it is possible to expand the freedom of optical layout design.

However, it is not necessary that the moving directions of the two optical elements be made parallel to the directions in which the reference axis enters and exits from these optical elements, and, for example, the directions in which the reference axis enters the optical elements may make a certain angle, such as 30°, 45° or 60°, with the moving directions of the optical elements.

Embodiment 2

FIG. 4 is a schematic view of the essential portion of Embodiment 2 of the present invention. The present embodiment is intended for an image pickup optical system which constitutes a so-called two-group type of zoom lens. The arrangement of the present embodiment is such that the moving directions in which optical elements move during variation of magnification are not parallel to the direction in which a reference axis enters an optical element disposed at a location closest to the object side.

The image pickup optical system shown in FIG. 4 includes the first optical element B1 and the second optical element B2 each having a plurality of curved reflecting surfaces. The first optical element B1 includes the concave refracting surface $R_{1,1}$, four reflecting surfaces, i.e., the concave mirror $R_{1,2}$, the convex mirror $R_{1,3}$, the concave mirror $R_{1,4}$ and the concave mirror $R_{1,5}$, and the convex refracting surface $R_{1,6}$ in that order as viewed from the object side. The first optical element B1 is a lens unit which has a positive refractive power as a whole. The direction of the reference axis which enters the first optical element B1 and the direction of the reference axis which exits from the first optical element B1 make an inclination of approximately 45° with respect to each other.

The second optical element B2 includes the concave refracting surface $R_{2,1}$, six reflecting surfaces, i.e., the concave mirror $R_{2,2}$, the concave mirror $R_{2,3}$, the convex mirror $R_{2,4}$, the concave mirror $R_{2,5}$ the concave mirror $R_{2,6}$ and a concave mirror $R_{2,7}$ and a convex refracting surface $R_{2,8}$ in that order as viewed from the object side. The second optical element B2 is a lens unit which has a positive refractive power as a whole. The direction of the reference axis which enters the second optical element B2 and the direction of the reference axis which exits from the second optical element B2 are parallel to and opposite to each other.

The image pickup optical system shown in FIG. 4 also includes the optical correcting plate B3 which employs a plane parallel plate and is composed of a quartz low-pass filter, an infrared cut filter or the like.

The image pickup optical system shown in FIG. 4 also includes the image pickup element surface P, such as the image pickup surface of a CCD (image pickup medium), and the stop $B_L$ which is disposed on the object side of the first optical element B1. In FIG. 4, symbol Ai represents the reference axis of the image pickup optical system.

The image forming action of the present embodiment will be described below. A light beam from an object is limited to a required amount of incidence by the stop $B_L$, and is then incident on the concave refracting surface $R_{1,1}$ of the first optical element B1. The light beam is refracted by and passes through the concave refracting surface $R_{1,1}$, and is then repeatedly reflected by the concave mirror $R_{1,2}$, the convex mirror $R_{1,3}$, the concave mirror $R_{1,4}$ and the concave mirror $R_{1,5}$ in that order while undergoing convergence or divergence due to the power of each of these reflecting mirrors. When the light beam reaches the convex refracting surface $R_{1,6}$, the light beam is refracted by the convex refracting surface $R_{1,6}$ and forms the object image on the intermediate image forming plane N1. Incidentally, an intermediate image of the object is temporarily formed in the first optical element B1 as well.

The light beam from the object image on the intermediate image forming plane N1 passes through the concave refracting surface $R_{2,1}$ of the second optical element B2, and reaches the convex refracting surface $R_{2,8}$ via the concave mirror $R_{2,2}$, the concave mirror $R_{2,3}$, the convex mirror $R_{2,4}$, the concave mirror $R_{2,5}$, the concave mirror $R_{2,6}$ and the concave mirror $R_{2,7}$. The light beam is refracted by the convex refracting surface $R_{2,8}$ and exits from the second optical element B2. Incidentally, an intermediate image of the object is temporarily formed in the second optical element B2 as well.

The light beam which has exited from the second optical element B2 passes through the optical correcting plate B3 and then forms the object image on the image pickup element surface P.

In the present embodiment, focusing for different object distances is effected by moving the second optical element B2. At this time, the second optical element B2 moves in parallel with the direction of a reference axis $A_{1,6}$ which exits from the first optical element B1. However, since the direction of a reference axis $A_0$ which enters the first optical element B1 and the direction of the reference axis $A_{1,6}$ which exits from the first optical element B1 make an inclination of approximately 45° with respect to each other, the direction in which the second optical element B2 moves during focusing is inclined at approximately 45° from the direction of the reference axis $A_0$ which enters the first optical element B1.

Accordingly, during focusing, the second optical element B2 moves in parallel with both the direction of the reference axis $A_{1,6}$ which enters the second optical element B2 and the direction of a reference axis $A_{2,8}$ which exits from the second optical element B2. At the same time, the second optical element B2 moves with an inclination of approximately 45° with respect to the direction of the reference axis $A_0$ which enters the first optical element B1.

In the present embodiment as well, similarly to the first embodiment, the image forming magnification of the photographing optical system is varied by relatively moving the first and second optical elements B1 and B2 with respect to the image forming plane P. However, unlike Embodiment 1 in which the directions in which the reference axis enters and exits from each of the optical elements and the moving directions of the respective optical elements are all parallel to one another, the direction of the reference axis which enters the first optical element B1 and the direction of the reference axis which exits from the first optical element B1 make an inclination of approximately 45° with respect to each other. For this reason, during a magnification varying operation, to maintain the direction of the reference axis which enters the second optical element B2 from the first optical element B1, the first optical element B1 is made to move in parallel with the direction of the reference axis which enters the second optical element B2.

Embodiment 3

Figure 5:
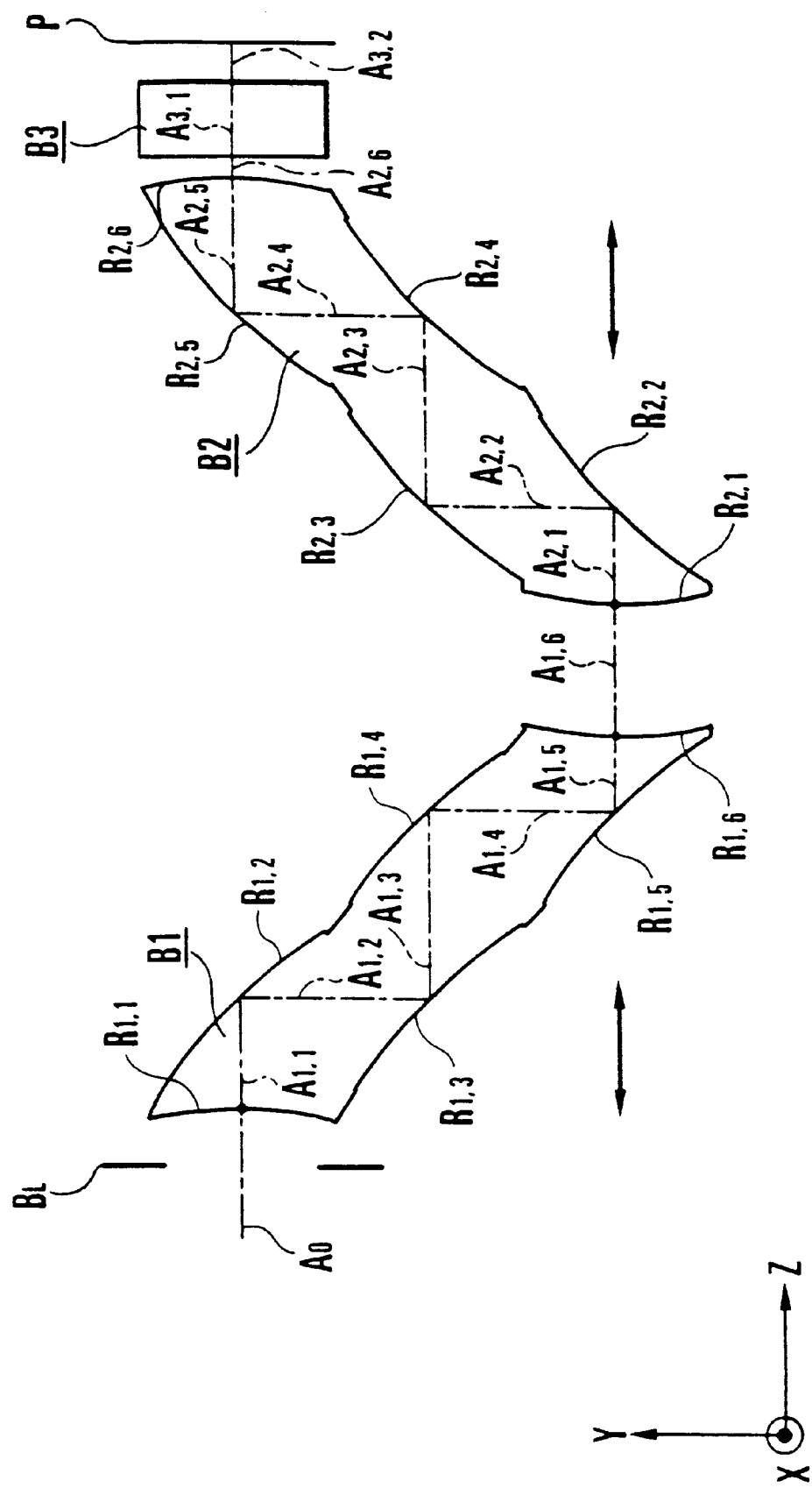
FIG. 5 is a schematic view of the essential portion of Embodiment 3 of the present invention.

FIG. 5 is a schematic view of the essential portion of Embodiment 3 of the present invention. The present embodiment is intended for an image pickup optical system which constitutes a so-called two-group type of zoom lens. The image pickup optical system shown in FIG. 5 includes the first optical element B1 and the second optical element B2 each having a plurality of curved reflecting surfaces. The first optical element B1 includes the concave refracting surface $R_{1,1}$, four reflecting surfaces, i.e., the concave mirror $R_{1,2}$, the convex mirror $R_{1,3}$, the concave mirror $R_{1,4}$ and the convex mirror $R_{1,5}$, and the concave refracting surface $R_{1,6}$ in that order as viewed from the object side. The first optical element B1 is a lens unit which has a negative refractive power as a whole. Similarly to Embodiment 1, the direction of the reference axis $A_0$ which enters the first optical element B1 and the direction of the reference axis $A_{1,6}$ which exits from the first optical element B1 are parallel to and the same as each other.

The second optical element B2 includes the convex refracting surface $R_{2,1}$, four reflecting surfaces, i.e., the convex mirror $R_{2,2}$, the concave mirror $R_{2,3}$, the convex mirror $R_{2,4}$ and the concave mirror $R_{2,5}$, and the convex refracting surface $R_{2,6}$ in that order as viewed from the object side. The second optical element B2 is a lens unit which has a positive refractive power as a whole. Similarly to the first optical element B1, the direction of the reference axis $A_{1,6}$ which enters the second optical element B2 and the direction of a reference axis $A_{2,6}$ which exits from the second optical element B2 are parallel to and the same as each other.

The image pickup optical system shown in FIG. 5 also includes the optical correcting plate B3 which employs a plane parallel plate and is composed of a quartz low-pass filter, an infrared cut filter or the like.

The image pickup optical system shown in FIG. 5 also includes the image pickup element surface P, such as the image pickup surface of a CCD (image pickup medium), and the stop $B_L$ which is disposed on the object side of the first optical element B1. In FIG. 5, symbol Ai represents the reference axis of the image pickup optical system.

The image forming action of the present embodiment will be described below. A light beam from an object is limited to a required amount of incidence by the stop $B_L$, and is then incident on the concave refracting surface $R_{1,1}$ of the first optical element B1. The light beam is refracted by and passes through the concave refracting surface $R_{1,1}$, and is then repeatedly reflected by the concave mirror $R_{1,2}$, the convex mirror $R_{1,3}$, the concave mirror $R_{1,4}$ and the convex mirror $R_{1,5}$ in that order while undergoing convergence or divergence due to the power of each of these reflecting mirrors. When the light beam reaches the concave refracting surface $R_{1,6}$, the light beam is refracted by the concave refracting surface $R_{1,6}$ and exits from the first optical element B1. Incidentally, an intermediate image of the object is temporarily formed in the first optical element B1.

Then, the light beam passes through the convex refracting surface $R_{2,1}$ of the second optical element B2, and is then repeatedly reflected by the convex mirror $R_{2,2}$, the concave mirror $R_{2,3}$, the convex mirror $R_{2,4}$ and the concave mirror $R_{2,5}$. When the light beam reaches the convex refracting surface $R_{2,6}$, the light beam is refracted by the convex refracting surface $R_{2,6}$ and exits from the second optical element B2. Incidentally, an intermediate image of the object is temporarily formed in the second optical element B2.

The light beam which has exited from the second optical element B2 passes through the optical correcting plate B3 to form the object image on the image pickup element surface P.

In the present embodiment as well, similarly to Embodiment 1, the focal length (image forming magnification) of the optical system is varied without varying the final image forming position P, by relatively moving the first and second optical elements B1 and B2 with respect to the image forming plane P.

Figure 6A:
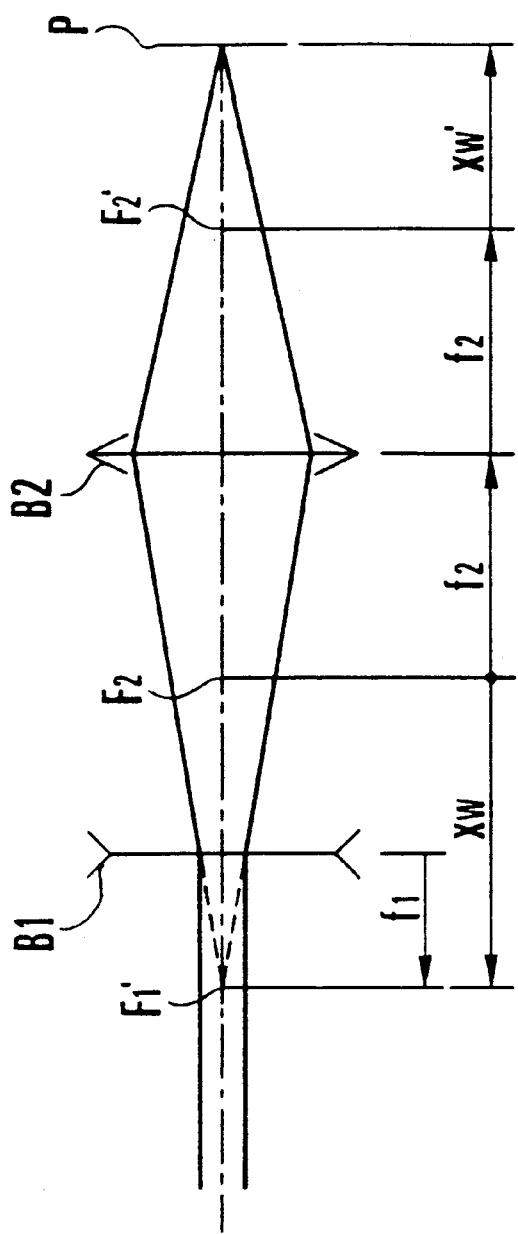
FIGS. 6A and 6B are explanatory views aiding in describing the magnification varying operation of Embodiment 3.
Figure 6B:
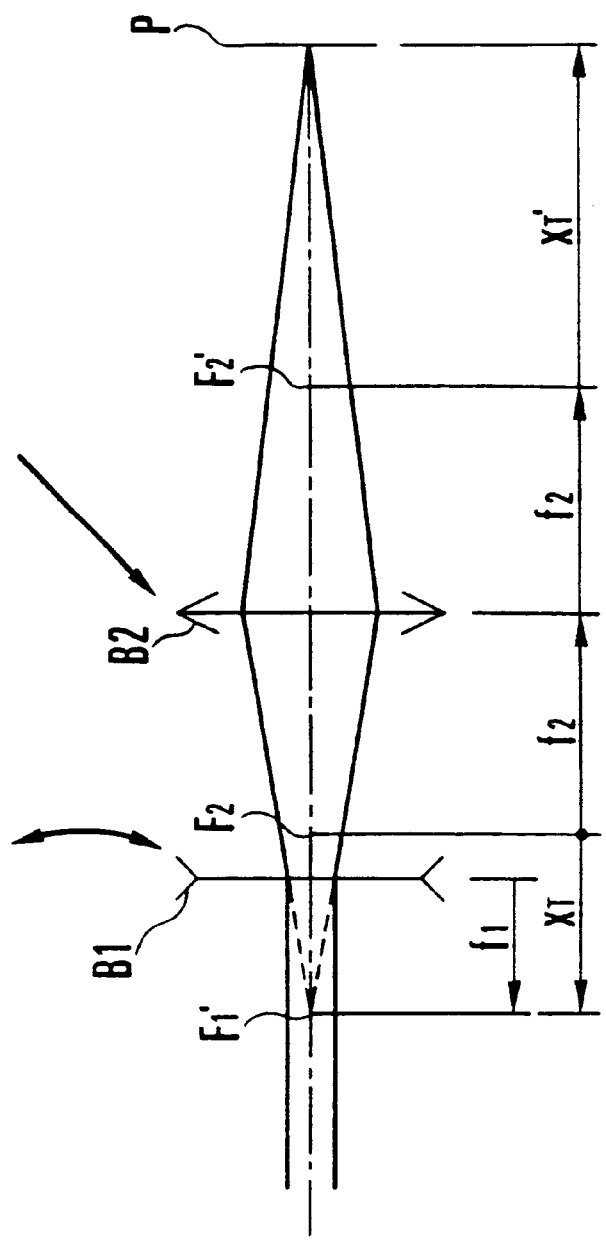

The magnification varying operation of the present embodiment will be described below with reference to FIGS. 6A and 6B. FIGS. 6A and 6B are optical layout views each showing the first and second optical elements B1 and B2 of Embodiment 3 as single thin lenses, and show different states in which the optical system is developed with respect to the reference axis. Incidentally, FIG. 6A is a layout view of the state in which the optical system is set to the wide-angle end (W), while FIG. 6B is a layout view of the state in which the optical system is set to the telephoto end (T).

In FIGS. 6A and 6B, let $f_1(-)$ be the focal length of the first optical element B1, let $f_2$ be the focal length of the second optical element B2, let $x_W(-)$ be the distance between the front focal point $F_2$ of the second optical element B2 and the image point of the first optical element B1, and let $x_W'$ be the distance between the rear focal point $F_2'$ of the second optical element B2 and the image forming plane P. If Newton's formula for image formation:

$$x_W * x_W' = -f_2^2$$

is satisfied, the image forming magnification $\beta_{2W}$ of the second optical element B2 becomes:

$$\beta_{2W} = -(x_W' + f_2)/(-x_W + f_2) \tag{6}$$

$$= f_2 / x_W$$

$$= -x_W' / f_2,$$

and also the focal length $f_W$ of the optical system at the wide-angle end becomes:

$$f_W = f_1 * \beta_{2W} \tag{7}$$

$$= f_1 * f_2 / x_W.$$

Thus, if the second optical element B2 moves while satisfying Newton's formula for image formation and the first optical element B1 moves to correct the positional variation of the object point of the second optical element B2 due to the movement of the second optical element B2, the optical system can vary the entire focal length without varying the final image forming position P.

Suppose that the second optical element B2 has moved by a predetermined amount and the optical system has shifted from the wide-angle end (W) to the telephoto end (T). Let $x_T(-)$ be the distance between the front focal point $F_2$ of the second optical element B2 and the image point of the first optical element B1 with the optical system being set to the telephoto end (T), and let $x_T'$ be the distance between the rear focal point $F_2'$ of the second optical element B2 and the image forming plane P with the optical system being set to the telephoto end (T). The image forming magnification $\beta_{2T}$ of the second optical element B2 becomes:

$$\beta_{2T} = (x_T' + f_2)/(-x_T + f_2) \tag{8}$$

$$= f_2 / x_T$$

$$= -x_T' / f_2,$$

and also the focal length $f_T$ of the optical system at the telephoto end becomes:

$$f_T = f_1 * \beta_{2T} \tag{9}$$

$$= f_1 * f_2 / x_T.$$

Therefore, the magnification variation ratio Z of the optical system becomes:

$$Z = f_T / f_W \tag{10}$$

$$= x_W / x_T.$$

In Embodiment 1, the secondary image forming plane N2 is present at an intermediate position between the first optical element B1 and the second optical element B2; whereas, in the present embodiment, the first optical element B1 has a negative refractive power as a whole and forms the light beam from the object on the object side as a virtual image, and the image forming relationship of the second optical element B2 is established by using the position of the virtual image as the object point.

Even in the case of another optical arrangement in which both optical elements are arranged in the reverse order to the present embodiment, i.e., an optical element having a positive refractive power as a whole and an optical element having a negative refractive power as a whole are arranged in that order as viewed from the object side, it is possible to vary the focal length (image forming magnification) of the photographing optical system by relatively moving each of the optical elements.

Embodiment 4

Figure 7:
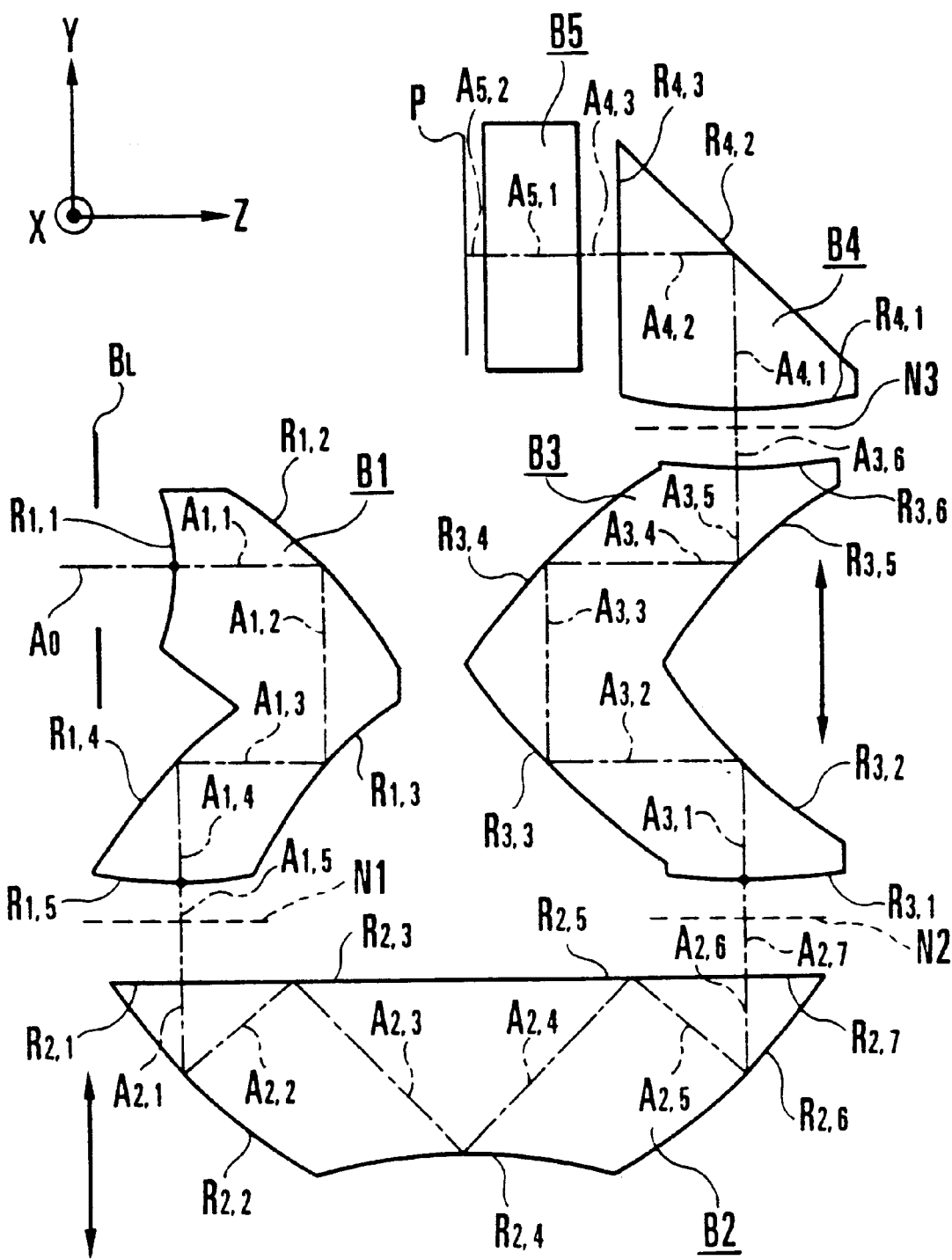
FIG. 7 is a schematic view of the essential portion of Embodiment 4 of the present invention.

FIG. 7 is a schematic view of the essential portion of Embodiment 4 of the present invention. The present embodiment is intended for an image pickup optical system which constitutes a so-called three-group type of zoom lens. The image pickup optical system shown in FIG. 7 includes the first optical element B1, the second optical element B2 and a third optical element B3 each of which has a plurality of curved reflecting surfaces. The first optical element B1 includes the concave refracting surface $R_{1,1}$, three reflecting surfaces, i.e., the concave mirror $R_{1,2}$, the convex mirror $R_{1,3}$ and the concave mirror $R_{1,4}$, and the convex refracting surface $R_{1,5}$ in that order as viewed from the object side. The first optical element B1 has a positive refractive power as a whole, and the direction of the reference axis $A_0$ which enters the first optical element B1 and the direction of the reference axis $A_{1,5}$ which exits from the first optical element B1 are approximately perpendicular to each other.

The second optical element B2 includes the plane surface $R_{2,1}$ five reflecting surfaces, i.e., the concave mirror $R_{2,2}$ the plane mirror $R_{2,3}$, the convex mirror $R_{2,4}$, the plane mirror $R_{2,5}$ and the concave mirror $R_{2,6}$, and the plane surface $R_{2,7}$, in that order as viewed from the object side. The second optical element B2 has a positive refractive power as a whole, and the direction of the reference axis $A_{1,5}$ which enters the second optical element B2 and the direction of a reference axis $A_{2,7}$ which exits from the second optical element B2 are parallel to and opposite to each other.

The third optical element B3 includes a convex refracting surface $R_{3,1}$, four reflecting surfaces, i.e., a convex mirror $R_{3,2}$, a concave mirror $R_{3,3}$, a concave mirror $R_{3,4}$ and a convex mirror $R_{3,5}$, and a concave refracting surface $R_{3,6}$ in that order as viewed from the object side. The third optical element B3 has a positive refractive power as a whole, and the direction of the reference axis $A_{2,7}$ which enters the third optical element B3 and the direction of a reference axis $A_{3,6}$ which exits from the optical correcting plate B3 are parallel to and the same as each other.

A fourth optical element B4 is a triangular prism which includes a convex refracting surface $R_{4,1}$, a plane mirror $R_{4,2}$ and a plane surface $R_{4,3}$ in that order as viewed from the object side, and the direction of a reference axis $A_{3,6}$ which enters the fourth optical element B4 and the direction of a reference axis $A_{4,3}$ which exits from the fourth optical element B4 are approximately perpendicular to each other.

The image pickup optical system shown in FIG. 7 also includes an optical correcting plate B5 which employs a plane parallel plate and is composed of a low-pass filter made of a quartz material, an infrared cut filter or the like.

The image pickup optical system shown in FIG. 7 also includes the image pickup element surface P, such as the image pickup surface of a CCD (image pickup medium), and the stop $B_L$ which is disposed on the object side of the first optical element B1. In FIG. 7, symbol Ai represents the reference axis of the image pickup optical system.

The image forming action of the present embodiment will be described below. A light beam from an object is limited to a required amount of incidence by the stop $B_L$, and then enters the first optical element B1. The first optical element B1 forms the primary image forming plane N1 between its exit surface $R_{1,5}$ and the entrance surface $R_{2,1}$ of the second optical element B2.

The object image formed on the primary image forming plane N1 is again formed on the secondary image forming plane N2 between the exit surface $R_{2,7}$ of the second optical element B2 and the entrance surface $R_{3,1}$ of the third optical element B3 by the second optical element B2.

The object image formed on the intermediate image forming plane N2 is again formed on the ternary image forming plane N3 between the exit surface $R_{3,6}$ of the third optical element B3 and the entrance surface $R_{4,1}$ of the fourth optical element B4 by the third optical element B3.

The fourth optical element B4 converges the light beam from the object image formed on the ternary image forming plane N3 and forms the object image on the image pickup element surface P via the optical correcting plate B5.

In the present embodiment, to reduce the length of the optical system, particularly, in the Z direction of FIG. 7, the optical elements are disposed so that the optical path of the optical system can be effectively folded to remarkably reduce the length in the Z direction.

Specifically, the light beam which has entered the first optical element B1 is incident on the concave refracting surface $R_{1,1}$, and is then reflected in a direction perpendicular to the entrance direction, i.e., in the Y(−) direction, by the concave mirror $R_{1,2}$ disposed behind the concave refracting surface $R_{1,1}$.

The object light beam is then reflected in the Z(−) direction by the convex mirror $R_{1,3}$ so that the length of the optical system is reduced in the Z-axis direction.

The object light beam which has been reflected in the Z(−) direction is again reflected in the Y(−) direction by the concave mirror $R_{1,4}$, and then passes through the convex refracting surface $R_{1,5}$ and enters the second optical element B2.

In the second optical element B2, the object light beam is totally reflected at the plane surface $R_{2,3}$ and the plane surface $R_{2,5}$, an effective ray area on the entrance surface $R_{2,1}$ of the second optical element B2 and that on the plane surface $R_{2,3}$ of the second optical element B2 overlap each other, and an effective ray area on the entrance surface $R_{2,7}$ of the second optical element B2 and that on the plane surface $R_{2,5}$ of the second optical element B2 overlap each other. Thus, the length of the second optical element B2 is reduced in the Z-axis direction.

Then, the object light beam which has entered the second optical element B2 in the Y(−) direction exits in the Y(+) direction and enters the third optical element B3.

In the third optical element B3, the object light beam is reflected in the Z(−) direction by the convex mirror $R_{3,2}$, and after the object light beam is reflected in the Y(+) direction by the concave mirror $R_{3,3}$ at a position which does interfere with the first optical element B1, the object light beam is temporarily reflected in the Z(+) direction by the concave mirror $R_{3,4}$. Then, the object light beam is reflected in the Y(+) direction at a Z-axis position approximately identical to the point of incidence of the object light beam on the convex mirror $R_{3,2}$, and the thus-reflected object light beam passes through the concave refracting surface $R_{3,6}$ and enters the fourth optical element B4.

In the fourth optical element B4, after the object light beam is reflected in the Z(−) direction by the plane mirror $R_{4,2}$, the object light beam passes through the optical correcting plate B5 and forms the object image on the image pickup element surface P.

The first, second and third optical elements B1, B2 and B3 of the present embodiment constitute part of a so-called three-group type or zoom lens. The focal length (image forming magnification) of the photographing optical system is varied by relatively moving the second optical element B2 and the third optical element B3.

The magnification varying operation of the present embodiment will be described below. During variation of magnification, the first optical element B1, the fourth optical element B4, the optical correcting plate B5 and the image pickup element surface P are fixed, while the second optical element B2 and the third optical element B3 are moved.

During variation of magnification from the wide-angle end to the telephoto end, the second optical element B2 moves in the Y(−) direction away from the first optical element B1.

Accordingly, the distance between the optical elements B1 and B2 increases, but, unlike the case of Embodiment 1 in which the direction of the entrance reference axis and the direction of the exit reference axis are the same as each other, the distance between the optical elements B2 and B3 also increases by the same amount as the distance between the optical elements B1 and B2, because the direction of the reference axis which enters the second optical element B2 and the direction of the reference axis which exits from the second optical element B2 are parallel to and opposite to each other.

Specifically, letting δ be the amount of movement of the second optical element B2, even if the first optical element B1 and the image forming plane P are fixed during variation of magnification, the entire length of the photographing optical system becomes larger by twice the amount of movement δ of the second optical element B2.

Figure 8A:
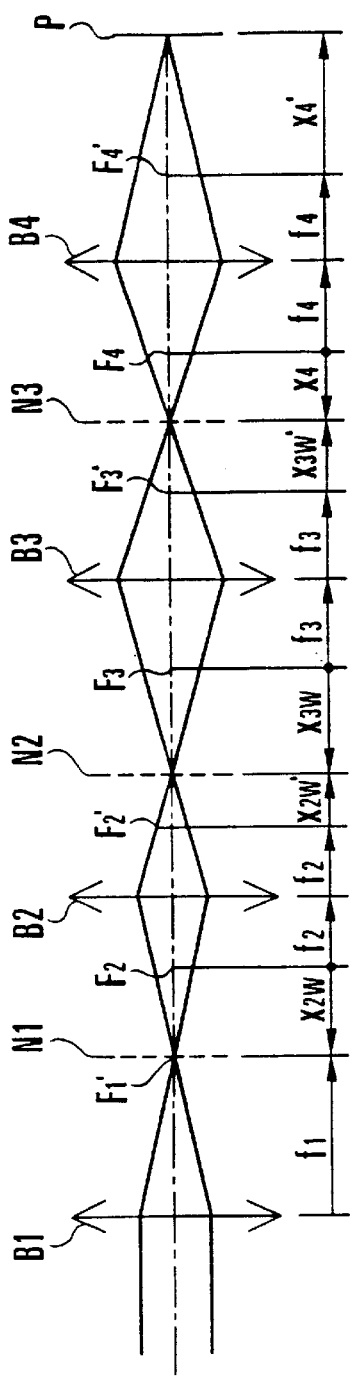
FIGS. 8A and 8B are explanatory views aiding in describing the magnification varying operation of Embodiment 4.
Figure 8B:
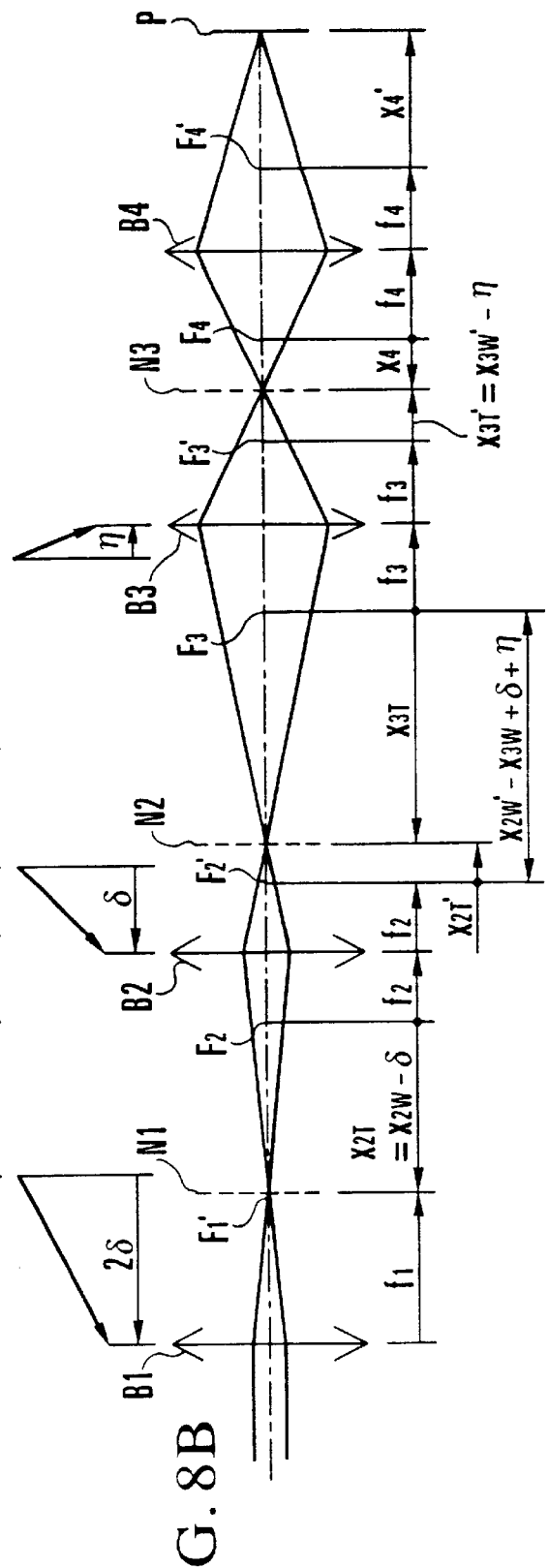

FIGS. 8A and 8B are optical layout views each showing the optical elements of Embodiment 4 as single thin lenses, and show different states in which the photographing optical system is developed with respect to the reference axis. The magnification varying operation of Embodiment 4 will be described below with reference to FIGS. 8A and 8B. Incidentally, FIG. 8A is a layout view of the state in which the optical system is set to the wide-angle end (W), while FIG. 8B is a layout view of the state in which the optical system is set to the telephoto end (T).

In FIGS. 8A and 8B, $f_1$ represents the focal length of the first optical element B1, $f_2$ represents the focal length of the second optical element B2, $f_3$ represents the focal length of the third optical element B3, and $f_4$ represents the focal length of the fourth optical element B4.

Assuming that the optical system is set to the wide-angle end (W), $x_{2W}(-)$ represents the distance between the front focal point $F_2$ of the second optical element B2 and the primary image forming plane N1, $x_{2W}'$ represents the distance between the rear focal point $F_2'$ of the second optical element B2 and the secondary image forming plane N2, $x_{3W}(-)$ represents the distance between a front focal point $F_3$ of the third optical element B3 and the secondary image forming plane N2, $x_{3W}'$ represents the distance between a rear focal point $F_3'$ of the third optical element B3 and a ternary image forming plane N3, $x_4(-)$ represents the distance between a front focal point $F_4$ of a fourth optical element B4 and the ternary image forming plane N3, and $x_4'$ represents the distance between a rear focal point $F_4'$ of the fourth optical element B4 and the image forming plane P.

Let $\beta_{2W}$ be the image forming magnification of the second optical element B2, let $\beta_{3W}$ be the image forming magnification of the third optical element B3, and let $\beta_4$ be the image forming magnification of the fourth optical element B4. (The respective subscripts $_W$ and $_T$ indicate that the optical system is set to the wide-angle end and that the optical system is set to the telephoto end.)

If Newton's formula for image formation is satisfied with respect to each intermediate formed image and each image forming plane, a composite magnification $\beta_W$ determined by the optical elements disposed behind the first optical element B1 becomes:

$$\beta_W = \beta_{2W} * \beta_{3W} * \beta_4 \quad (11)$$
$$= (f_2/x_{2W}) * (f_3/x_{3W}) * (f_4/x_4)$$
$$= (f_2 * f_3 * f_4)/(x_{2W} * x_{3W} * x_{4W}),$$

and the focal length $f_W$ of the optical system at the wide-angle end is expressed as:

$$f_W = f_1 * \beta_W \quad (12)$$
$$= (f_1 * f_2 * f_3 * f_4)/(x_{2W} * x_{3W} * x_4).$$

Thus, if the third optical element B3 is moved by η to prevent a positional variation of the ternary image forming plane N3 by correcting the position of the ternary image forming plane N3 according to a positional variation of the secondary image forming plane N2 which occurs when the second optical element B2 moves by δ with respect to the first optical element B1, the optical system can vary the focal length without varying the position of the final image forming P.

Referring to the developed view of the optical layout shown in FIG. 8B, since the image forming plane P is fixed, the first optical element B1 which is originally fixed is shown to be relatively moved by 2δ with respect to the first optical element B1.

Since the second optical element B2 is moved by δ with respect to the first optical element B1, a distance $x_{2T}(-)$ between the primary image forming plane N1 and the front focal point $F_2$ of the second optical element B2 becomes:

$$x_{2T} = x_{2W} - \delta. \quad (13)$$

In addition, since the third optical element B3 is moved by η with respect to the ternary image forming plane N3, a distance $x_{3T}'$ between the ternary image forming plane N3 and the front focal point $F_3'$ of the third optical element B3 becomes:

$$x_{3T}' = x_{3W}' - \eta \quad (14)$$
$$= -(f_3^2/x_{3W} + \eta).$$

In addition, since the entire length of the photographing optical system becomes longer by 2δ, a distance $x_{2T}' - x_{3T}$ between the rear focal point $F_2'$ of the second optical element B2 and the front focal point $F_3$ of the third optical element B3 becomes:

$$x_{2T}' - x_{3T} = x_{2W}' - x_{3W} + \delta + \eta \quad (15)$$
$$= -f_2^2/x_{2W} - x_{3W} + \delta + \eta.$$

By using Expressions (13) and (14), $X_{2T}'$ and $X_{3T}$ of Expression (15) are expressed as:

$$x'_{2T} = -f_2^2 / x_{2T} \quad (16)$$
$$= -f_2^2 / (x_{2W} - \delta)$$

$$x_{3T} = -f_3^2 / x'_{3T} \quad (17)$$
$$= (f_3^2 * x_{3W}) / (f_3^2 + x_{3W} * \eta).$$

Therefore, Expression (15) becomes:

$$-f_2^2(x_{2W}-\delta)-(f_3^{2*}x_{3W})/(f_3^2+x_{3W}{}^*\eta)=-f_2^2/x_{2W}-x_{3W}+\delta+\eta. \quad (18)$$

Accordingly, the relationship of the movement of the third optical element B3 with respect to the movement of the second optical element B2 is expressed from Expression (18).

In addition, since a composite magnification $\beta_T$ of the optical elements disposed on the image side of the first optical element B1 is expressed:

$$\beta_T = \beta_{2T} * \beta_{3T} * \beta_4 \quad (19)$$
$$= (f_2 / x_{2T}) * (f_3 / x_{3T}) * (f_4 / x_4)$$
$$= (f_2 * f_3 * f_4) / (x_{2T} * x_{3T} * x_4),$$

the focal length $f_T$ of the optical system at the telephoto end after the movement of the optical elements becomes:

$$f_T = f_1 * \beta_T = (f_1 * f_2 * f_3 * f_4)/(x_{2T} * x_{3T} * x_4) \quad (20)$$
$$= f_1 * f_2 * f_3 * f_4 * (f_3^2 + x_{3W} * \eta) / \{(x_{2W} - \delta) * f_3^2 * x_{3W} * x_4\}.$$

Accordingly, the magnification variation ratio Z of the photographing optical system becomes:

$$Z = f_T / f_W \quad (21)$$
$$= x_{2W} * x_{3W} / (x_{2T} * x_{3T})$$
$$= x_{2W} * x_{3W} * (f_3^2 + x_{3W} * \eta) / \{(x_{2W} - \delta) * f_3^2 * x_{3W}\}$$
$$= x_{2W} * (f_3^2 + x_{3W} * \eta) / \{(x_{2W} - \delta) * f_3^2\}.$$

In the present embodiment, the length of the optical system in the Z direction is remarkably reduced by adopting the arrangement in which the optical path is effectively folded by using the optical elements in the above-described manner. In addition, since the shape of the third optical element B3 is selected to fill a dead space which follows the first optical element B1, the layout of all the optical elements involves no unnecessary space.

In addition, by adopting the arrangement in which the second optical element B2 and the third optical element B3 are moved in the Y-axis direction during variation of magnification, the length in the Z-axis direction is kept unchanged over the entire range of variation of magnification.

Although in the present embodiment the direction of the reference axis $A_{4,3}$ which exits from the fourth optical element B4 is bent by an angle of 90° with respect to the direction of the reference axis $A_{3,6}$ which enters the fourth optical element B4, the direction and the angle of the exiting reference axis $A_{4,3}$ are not limited to those of the present embodiment. For example, a reflecting surface may be added so that the exiting reference axis $A_{4,3}$ is bent in a direction perpendicular to the surface of the sheet of FIG. FIG. 1 (the X direction).

In addition, the reference axis $A_0$ may be made to enter the optical system in a different direction in such a way that the reference axis $A_0$ enters in the direction perpendicular to the surface of the sheet, as by disposing a 45° mirror or the like on the object side of the stop $B_L$.

In addition, in the present embodiment, since the first optical element B1 is fixed during variation of magnification, the first optical element B1 and its reflecting surfaces for bending the entering reference axis may be integrally formed in advance.

In the following description of embodiments, there are shown constituent data for each of the embodiments. Embodiments 5 to 12 are intended for two-group types of zoom lenses similar to Embodiment 1, and Embodiments 13 to 16 are intended for three-group types of zoom lenses which include three optical elements.

In each of the following embodiments, reflecting surfaces which constitute part of an optical system are designed so that the curvatures of reflecting surfaces parallel to the surface of the sheet of the corresponding figure are different from the curvatures of reflecting surfaces perpendicular to the surface of the sheet of the same, so as to correct decentering aberrations which are caused by decentering reflecting mirrors for the purpose of preventing a light beam from being blocked in a mirror optical system.

In addition, by arranging these reflecting surfaces as rotationally asymmetrical surfaces, various aberrations can be fully corrected and optical elements having desired optical performance can be achieved.

Embodiment 5

FIG. 9 is a view showing an optical cross section taken on the Y, Z plane, of Embodiment 5 of the present invention. The present embodiment is intended for an image pickup optical system which constitutes a zoom lens having a magnification variation ratio of approximately 2×.

Constituent Data for Embodiment 5 are Shown Below

|  | WIDE-ANGLE END | MIDDLE POSITION | TELEPHOTO END |
|---|---|---|---|
| HORIZONTAL HALF-ANGLE OF VIEW | 19.1 | 13.0 | 9.8 |
| VERTICAL HALF-ANGLE OF VIEW | 14.5 | 9.8 | 7.4 |
| APERTURE DIAMETER | 2.0 | 3.0 | 4.0 |

IMAGE SIZE      HORIZONTAL 4 mm × VERTICAL 3 mm
SIZE OF OPTICAL SYSTEM (X × Y × Z) = 6.6 × 21.4 × 32.9
AT WIDE-ANGLE END

| i | Yi | Zi(W) | θi | Di | Ndi | νdi |

-continued

| | | | | | | | |
|---|---|---|---|---|---|---|---|
| 1 | 0.00 | 0.00 | 0.00 | 2.74 | 1. | | STOP |

FIRST OPTICAL ELEMENT

| | | | | | | | |
|---|---|---|---|---|---|---|---|
| 2 | 0.00 | 2.74 | 0.00 | 6.00 | 1.51633 | 64.15 | REFRACTING SURFACE |
| 3 | 0.00 | 8.74 | 25.00 | 10.00 | 1.51633 | 64.15 | REFLECTING SURFACE |
| 4 | −7.66 | 2.31 | 25.00 | 8.00 | 1.51633 | 64.15 | REFLECTING SURFACE |
| 5 | −7.66 | 10.31 | 0.00 | VARIABLE | 1 | | REFRACTING SURFACE |

SECOND OPTICAL ELEMENT

| | | | | | | | |
|---|---|---|---|---|---|---|---|
| 6 | −7.66 | 17.14 | 0.00 | 8.50 | 1.51633 | 64.15 | REFRACTING SURFACE |
| 7 | −7.66 | 25.64 | 25.00 | 10.00 | 1.51633 | 64.15 | REFLECTING SURFACE |
| 8 | −15.32 | 19.21 | 25.00 | 8.00 | 1.51633 | 64.15 | REFLECTING SURFACE |
| 9 | −15.32 | 27.21 | 0.00 | VARIABLE | 1 | | REFRACTING SURFACE |
| 10 | −15.32 | 32.90 | 0.00 | 0.00 | 1 | | IMAGE PLANE |

| | WIDE-ANGLE END | MIDDLE POSITION | TELEPHOTO END |
|---|---|---|---|
| D5 | 6.82 | 2.79 | 0.70 |
| D9 | 5.69 | 9.66 | 13.66 |
| D1–D5 | $Z_i(M) = Z_i(W) + 0.06$ | | $Z_i(T) = Z_i(W) − 1.85$ |
| D6–D9 | $Z_i(M) = Z_i(W) − 3.96$ | | $Z_i(T) = Z_i(W) − 7.97$ |
| D10 | $Z_i(M) = Z_i(W)$ | | $Z_i(T) = Z_i(W)$ |

SPHERICAL SHAPE

R1 = ∞
R2 = −18.881
R5 = −20.000
R6 = 20.000
R9 = −21.267
R10 = ∞

ASPHERICAL SHAPE

| | | | | |
|---|---|---|---|---|
| R3 | a = −1.34677e+01 | b = −4.11138e+01 | | t = 2.21286e+01 |
| | $C_{02}$ = 0. | $C_{20}$ = 0. | | |
| | $C_{03}$ = −1.50202e−04 | $C_{21}$ = −1.86036e−04 | | |
| | $C_{04}$ = −2.91075e−05 | $C_{22}$ = 3.12691e−05 | $C_{40}$ = −2.88791e−05 | |
| R4 | a = −3.30421e+00 | b = 2.84464e+00 | | t = −3.10932e+01 |
| | $C_{02}$ = 0. | $C_{20}$ = 0. | | |
| | $C_{03}$ = 1.25682e−03 | $C_{21}$ = 5.54423e−04 | | |
| | $C_{04}$ = −1.86175e−04 | $C_{22}$ = 1.94371e−04 | $C_{40}$ = 1.48755e−04 | |
| R7 | a = 1.11832e+01 | b = −7.18551e+00 | | t = −2.44560e+01 |
| | $C_{02}$ = 0. | $C_{20}$ = 0. | | |
| | $C_{03}$ = 7.66740e−04 | $C_{21}$ = 8.86240e−04 | | |
| | $C_{04}$ = 2.93867e−05 | $C_{22}$ = 4.93024e−05 | $C_{40}$ = −4.02913e−06 | |
| R8 | a = 2.55234e+01 | b = −1.52536e+02 | | t = −3.00410e+01 |
| | $C_{02}$ = 0. | $C_{20}$ = 0. | | |
| | $C_{03}$ = 5.17718e−04 | $C_{21}$ = 5.48567e−04 | | |
| | $C_{04}$ = −2.62930e−05 | $C_{22}$ = −9.31187e−06 | $C_{40}$ = −2.01776e−05 | |

In the present embodiment, the first surface R1 is an aperture plane which is an entrance pupil, the second surface R2 to the fifth surface R5 constitute part of the first optical element B1, the sixth surface R6 to the ninth surface R9 constitute part of the second optical element B2, and the tenth surface R10 is an image plane.

An image forming operation for an object lying at infinity will be described below. First, a light beam passes through the first surface R1 and enters the first optical element B1. In the first optical element B1, the light beam is refracted by the second surface R2, then reflected by the third surface R3 and the fourth surface R4, then refracted by the fifth surface R5, and then exits from the first optical element B1. During this time, a primary image is formed on an intermediate image forming plane near to the fourth surface R4.

Then, the light beam enters the second optical element B2. In the second optical element B2, the light beam is refracted by the sixth surface R6, then reflected by the seventh surface R7 and the eighth surface R8, then refracted by the ninth surface R9, and then exits from the second optical element B2. During this time, a pupil is formed in the vicinity of the seventh surface R7 in the second optical element B2. The light beam which has exited from the second optical element B2 finally forms an object image on the tenth surface R10 (the image pickup surface of the image pickup medium such as a CCD).

In the present embodiment, the direction of the reference axis which enters the first optical element B1 and the direction of the reference axis which exits from the first optical element B1 are parallel to and the same as each other.

In addition, the direction of the reference axis which enters the second optical element B2 and the direction of the reference axis which exits from the second optical element B2 are parallel to and the same as each other.

A magnification varying operation effected by the movements of the respective optical elements will be described below. During variation of magnification, the first optical element B1 temporarily moves in the Z plus direction from the wide-angle end toward the telephoto end, and then moves in the Z minus direction. The second optical element B2 moves in the Z minus direction from the wide-angle end toward the telephoto end. The tenth surface R10 which is the image plane does not move during the variation of magnification. Thus, when the variation of magnification from the wide-angle end toward the telephoto end is effected, the distance between the first optical element B1 and the second optical element B2 is decreased, whereas the distance between the second optical element B2 and the image plane R10 is increased.

Figure 12:
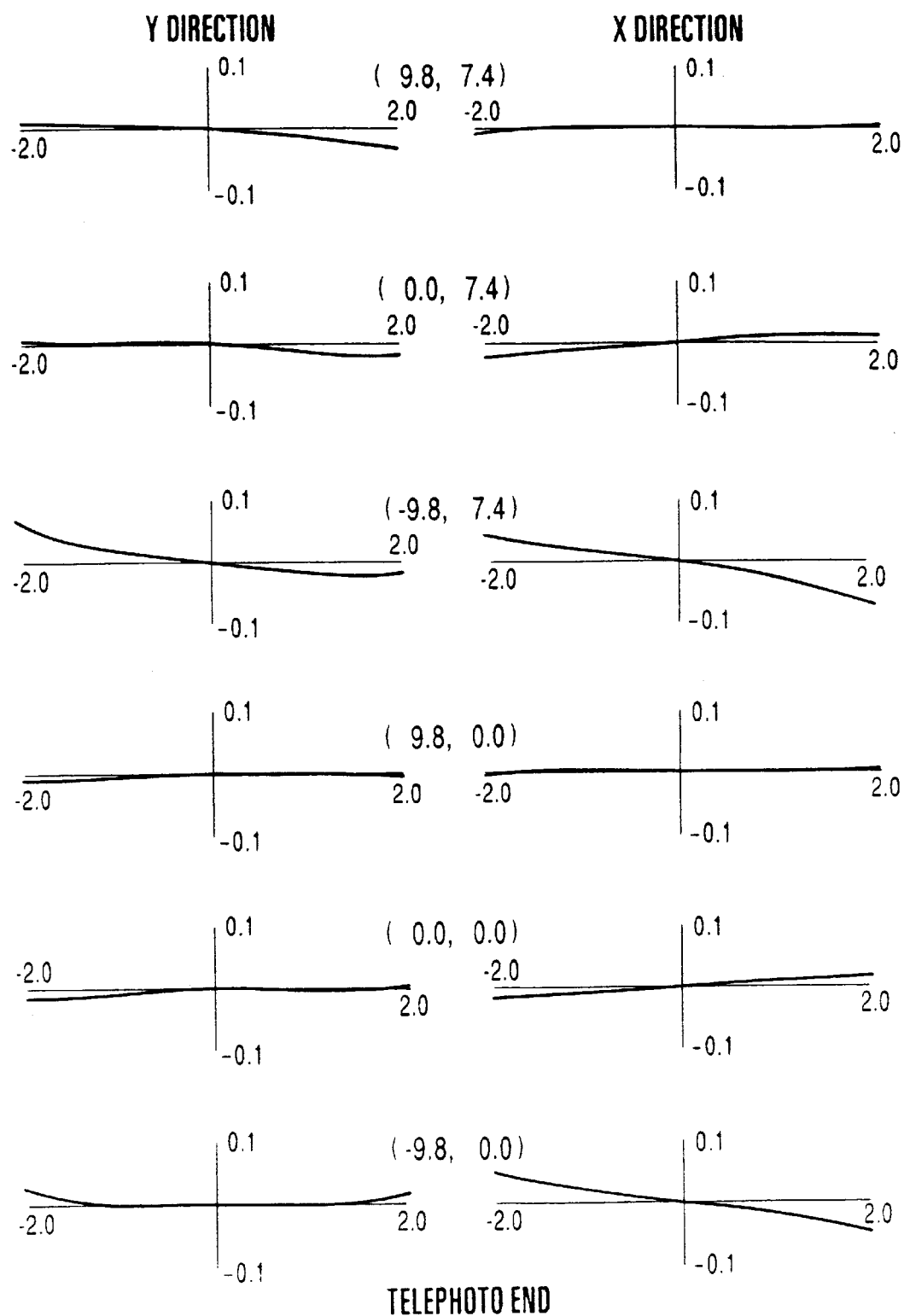
FIG. 12 shows lateral aberration charts of Embodiment 5 (telephoto end)

Each of FIGS. 10, 11 and 12 shows lateral aberration charts of the present embodiment. The respective lateral aberration charts show lateral aberrations in the Y and X directions, relative to six light beams which enter the present embodiment at different angles of incidence of $(u_Y, u_X)$, $(0, u_X)$, $(-u_Y, u_X)$, $(u_Y, 0)$, $(0, 0)$ and $(-u_Y, 0)$, respectively. The horizontal axis of each of the lateral aberration charts represents the height of incidence in the Y or X direction of a light beam which is incident on the first surface.

FIG. 10 shows lateral aberration charts of lateral aberrations occurring when the present embodiment is set to the wide-angle end (W), FIG. 11 shows lateral aberration charts of lateral aberrations occurring when the present embodiment is set to the middle position (M), and FIG. 12 shows lateral aberration charts of lateral aberrations occurring when the present embodiment is set to the telephoto end (T).

As can be seen from these figures, according to the present embodiment, it is possible to achieve well-balanced aberration correction if the optical system is set to any of the wide-angle end, the middle position (M) and the telephoto end (T).

In addition, the present embodiment is compact since the overall dimensions of the optical system are 32.9 mm long×21.4 mm wide×6.6 mm thick for an image size of 4 mm×3 mm. In the present embodiment, particularly because each of the optical elements and the entire optical system has a small thickness and each of the optical elements can be constructed by forming reflecting surfaces on predetermined sides of a plate-shaped block, it is possible to readily construct a zoom lens which is thin as a whole, by adopting a mechanism which causes two optical elements to move along a surface of one base plate.

Embodiment 6

Figure 13:
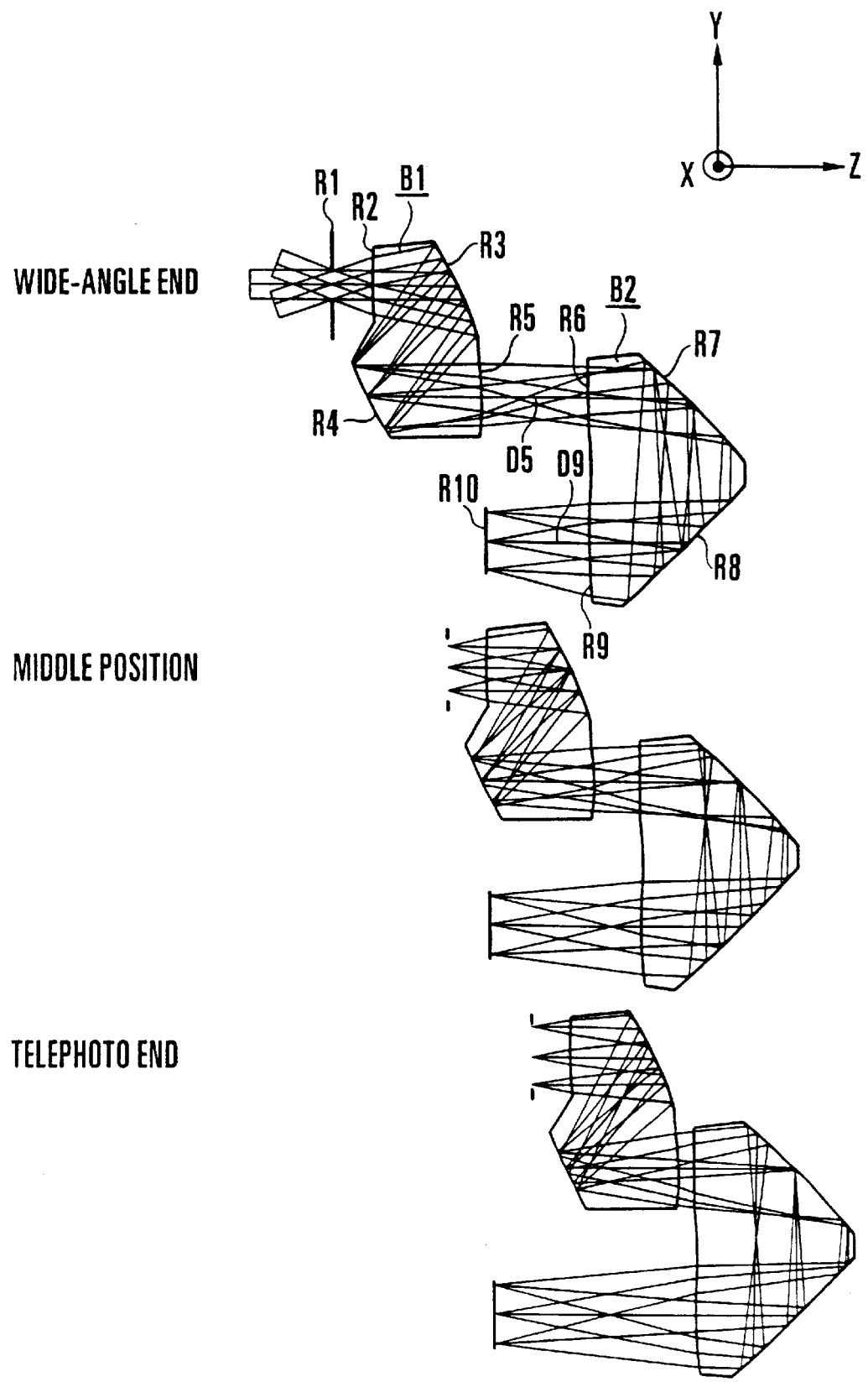
FIG. 13 is a view showing an optical cross section taken on the Y, Z plane, of Embodiment 6 of the present invention.

FIG. 13 is a view showing an optical cross section taken on the Y, Z plane, of Embodiment 6 of the present invention. The present embodiment is intended for an image pickup optical system which constitutes a zoom lens having a magnification variation ratio of approximately 2×.

Constituent Data for Embodiment 6 are Shown Below

|  | WIDE-ANGLE END | MIDDLE POSITION | TELEPHOTO END |
|---|---|---|---|
| HORIZONTAL HALF-ANGLE OF VIEW | 19.1 | 13.0 | 9.8 |
| VERTICAL HALF-ANGLE OF VIEW | 14.5 | 9.8 | 7.4 |
| APERTURE DIAMETER | 2.0 | 3.0 | 4.0 |

IMAGE SIZE    HORIZONTAL 4 mm × VERTICAL 3 mm
SIZE OF OPTICAL SYSTEM (X × Y × Z) = 8.0 × 24.4 × 28.0
AT WIDE-ANGLE END

| i | Yi | Zi(W) | θi | Di | Ndi | vdi |  |
|---|---|---|---|---|---|---|---|
| 1 | 0.00 | 0.00 | 0.00 | 2.74 | 1 |  | STOP |

FIRST OPTICAL ELEMENT

| i | Yi | Zi(W) | θi | Di | Ndi | vdi |  |
|---|---|---|---|---|---|---|---|
| 2 | 0.00 | 2.74 | 0.00 | 6.00 | 1.51633 | 64.15 | REFRACTING SURFACE |
| 3 | 0.00 | 8.74 | 25.00 | 10.00 | 1.51633 | 64.15 | REFLECTING SURFACE |
| 4 | −7.66 | 2.31 | 25.00 | 8.00 | 1.51633 | 64.15 | REFLECTING SURFACE |
| 5 | −7.66 | 10.31 | 0.00 | VARIABLE | 1 |  | REFRACTING SURFACE |

SECOND OPTICAL ELEMENT

| i | Yi | Zi(W) | θi | Di | Ndi | vdi |  |
|---|---|---|---|---|---|---|---|
| 6 | −7.66 | 17.80 | 0.00 | 7.00 | 1.51633 | 64.15 | REFRACTING SURFACE |
| 7 | −7.66 | 24.80 | 45.00 | 10.00 | 1.51633 | 64.15 | REFLECTING SURFACE |
| 8 | −17.66 | 24.80 | 45.00 | 7.00 | 1.51633 | 64.15 | REFLECTING SURFACE |
| 9 | −17.66 | 17.80 | 0.00 | VARIABLE | 1 |  | REFRACTING SURFACE |
| 10 | −17.66 | 10.51 | 0.00 | 0.00 | 1 |  | IMAGE PLANE |

|  | WIDE-ANGLE END | MIDDLE POSITION | TELEPHOTO END |
|---|---|---|---|
| D5 | 7.49 | 3.26 | 1.05 |

-continued

| | | |
|---|---|---|
| D9 | 7.29    10.75 | 14.23 |
| D1–D5 | Zi(M) = Zi(W) + 7.68 | Zi(T) = Zi(W) + 13.38 |
| D6–D9 | Zi(M) = Zi(W) + 3.46 | Zi(T) = Zi(W) + 6.94 |
| D10 | Zi(M) = Zi(W) | Zi(T) = Zi(W) |

SPHERICAL SHAPE

R1 = ∞
R2 = 35.606
R3 = −20.000
R6 = 89.388
R9 = −31.916
R10 = ∞

ASPHERICAL SHAPE

| | | | | |
|---|---|---|---|---|
| R3 | a = −1.34677e+01 | b = −4.11138e+01 | | t = 2.21286e+01 |
| | $C_{02}$ = 0. | $C_{20}$ = 0. | | |
| | $C_{03}$ = −2.31569e−04 | $C_{21}$ = 5.03411e−04 | | |
| | $C_{04}$ 1.27221e−04 | $C_{22}$ = 9.41583e−05 | $C_{40}$ = −1.26848e−06 | |
| R4 | a = −2.31109e+00 | b = 2.08891e+00 | | t = 1.56365e+01 |
| | $C_{02}$ = 0. | $C_{20}$ = 0. | | |
| | $C_{03}$ = −1.20863e−03 | $C_{21}$ = 7.93176e−04 | | |
| | $C_{04}$ = 1.71195e−04 | $C_{22}$ = 6.38568e−04 | C40 = 1.28236e−03 | |
| R7 | a = 1.42789e+01 | b = −8.21248e+00 | | t = −4.43130e+01 |
| | $C_{02}$ = 0. | $C_{20}$ = 0. | | |
| | $C_{03}$ = 7.10530e−04 | $C_{21}$ = 1.00559e−03 | | |
| | $C_{04}$ = 2.28616e−05 | $C_{22}$ = 5.78746e−05 | $C_{40}$ = −2.08449e−05 | |
| R8 | a = 2.90886e+01 | b = −1.49117e+02 | | t = −4.82601e+01 |
| | $C_{02}$ = 0. | $C_{20}$ = 0. | | |
| | $C_{03}$ = 3.59594e−04 | $C_{21}$ = 1.99532e−04 | | |
| | $C_{04}$ = −2.18573e−06 | $C_{22}$ = −1.79136e−06 | $C_{40}$ = −1.09373e−05 | |

In the present embodiment, the first surface R1 is an aperture plane which is an entrance pupil, the second surface R2 to the fifth surface R5 constitute part of the first optical element B1, the sixth surface R6 to the ninth surface R9 constitute part of the second optical element B2, and the tenth surface R10 is an image plane.

An image forming operation for an object lying at infinity will be described below. First, a light beam passes through the first surface R1 and enters the first optical element B1. In the first optical element B1, the light beam is refracted by the second surface R2, then reflected by the third surface R3 and the fourth surface R4, then refracted by the fifth surface R5, and then exits from the first optical element B1. During this time, a primary image is formed on an intermediate image forming plane near to the fourth surface R4.

Then, the light beam enters the second optical element B2. In the second optical element B2, the light beam is refracted by the sixth surface R6, then reflected by the seventh surface R7 and the eighth surface R8, then refracted by the ninth surface R9, and then exits from the second optical element B2. During this time, a pupil is formed in the vicinity of the seventh surface R7 in the second optical element B2. The light beam which has exited from the second optical element B2 finally forms an object image on the tenth surface R10 (the image pickup surface of the image pickup medium such as a CCD).

In the present embodiment, the direction of the reference axis which enters the first optical element B1 and the direction of the reference axis which exits from the first optical element B1 are parallel to and the same as each other. Unlike Embodiment 5, the direction of the reference axis which enters the second optical element B2 and the direction of the reference axis which exits from the second optical element B2 are parallel to and opposite to each other.

A magnification varying operation effected by the movements of the respective optical elements will be described below. During variation of magnification, the first optical element B1 moves in the Z plus direction from the wide-angle end toward the telephoto end. The second optical element B2 also moves in the Z plus direction from the wide-angle end toward the telephoto end. The tenth surface R10 which is the image plane does not move during the variation of magnification. Thus, when the variation of magnification from the wide-angle end toward the telephoto end is effected, the distance between the first optical element B1 and the second optical element B2 is decreased, whereas the distance between the second optical element B2 and the image plane R10 is increased. According to the present embodiment, since the directions of the respective entering and exiting reference axes are opposite to those of Embodiment 5, the present embodiment is more compact than Embodiment 5 in terms of the entire magnification variation range.

Figure 14:
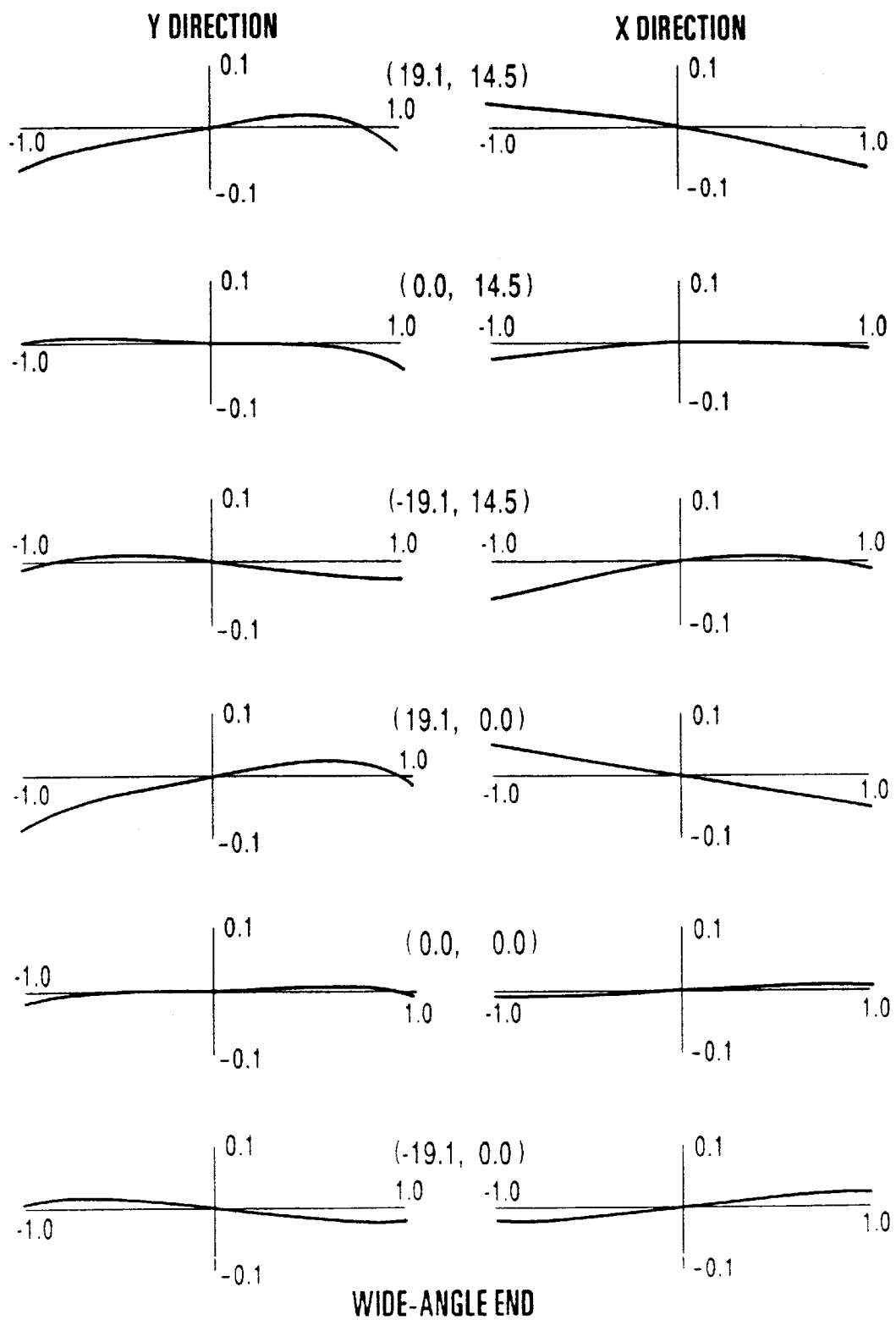
FIG. 14 shows lateral aberration charts of Embodiment 6 (wide-angle end)
Figure 15:
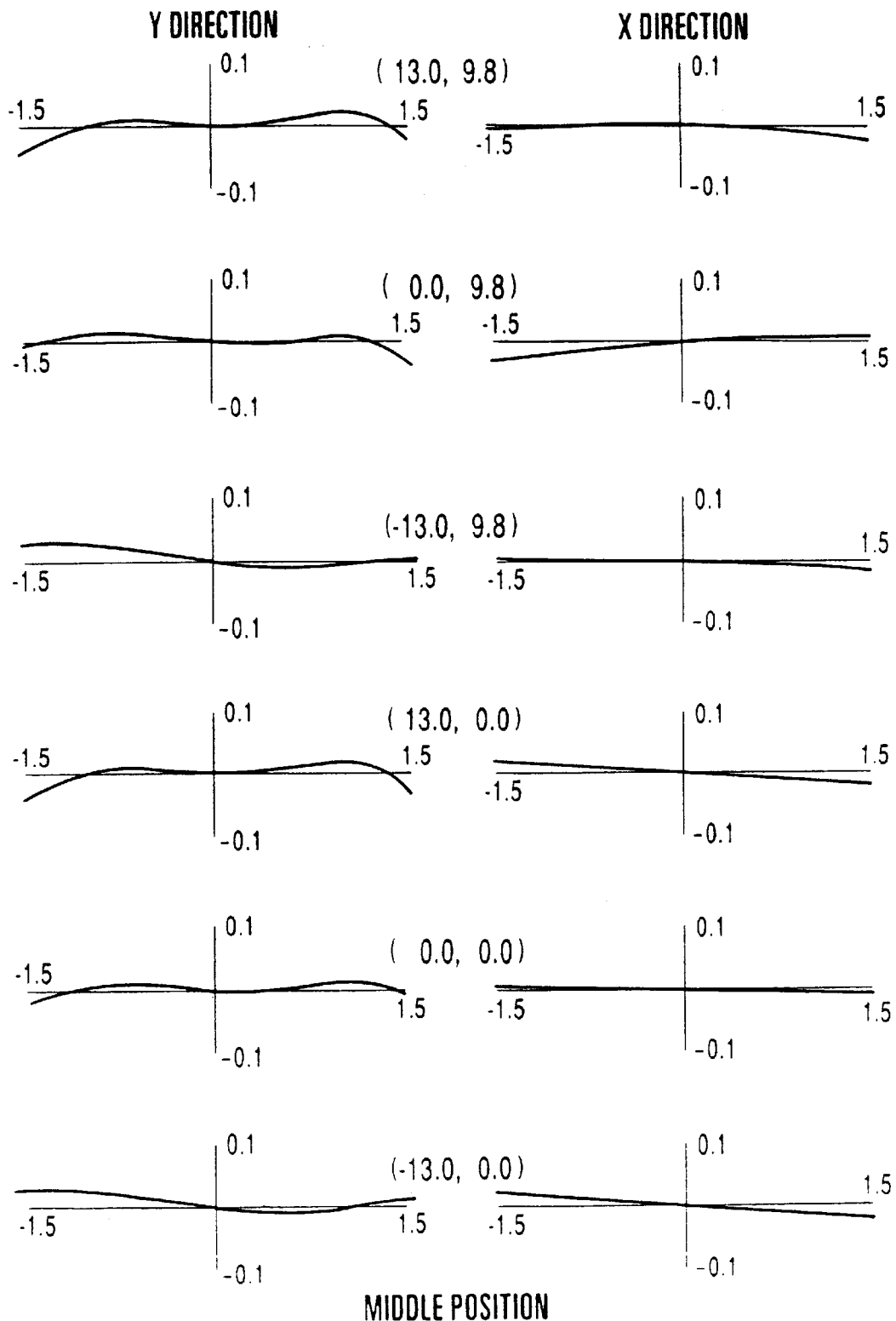
FIG. 15 shows lateral aberration charts of Embodiment 6 (middle position)
Figure 16:
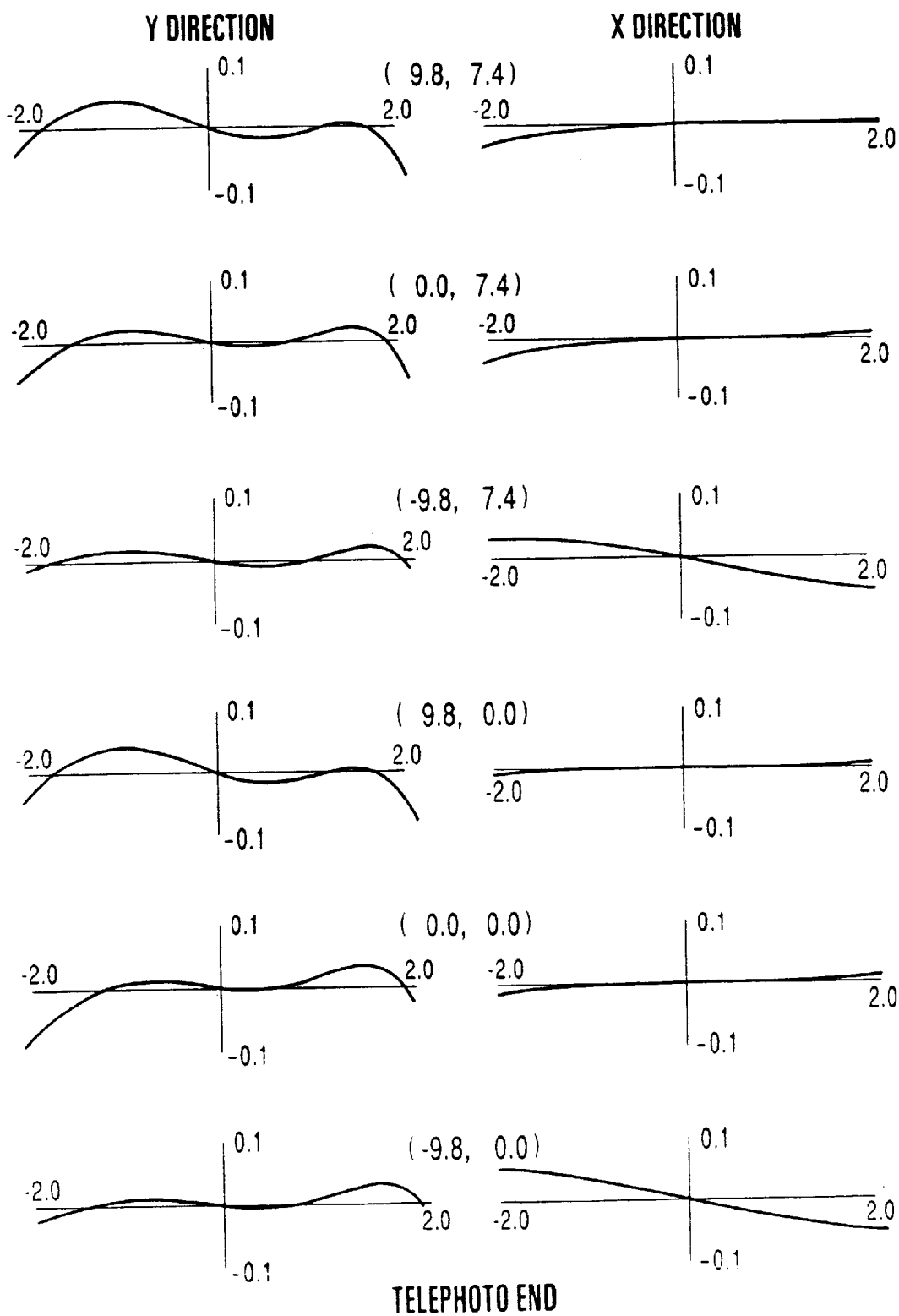
FIG. 16 shows lateral aberration charts of Embodiment 6 (telephoto end)

Each of FIGS. 14, 15 and 16 shows lateral aberration charts of the present embodiment.

Embodiment 7

Figure 17:
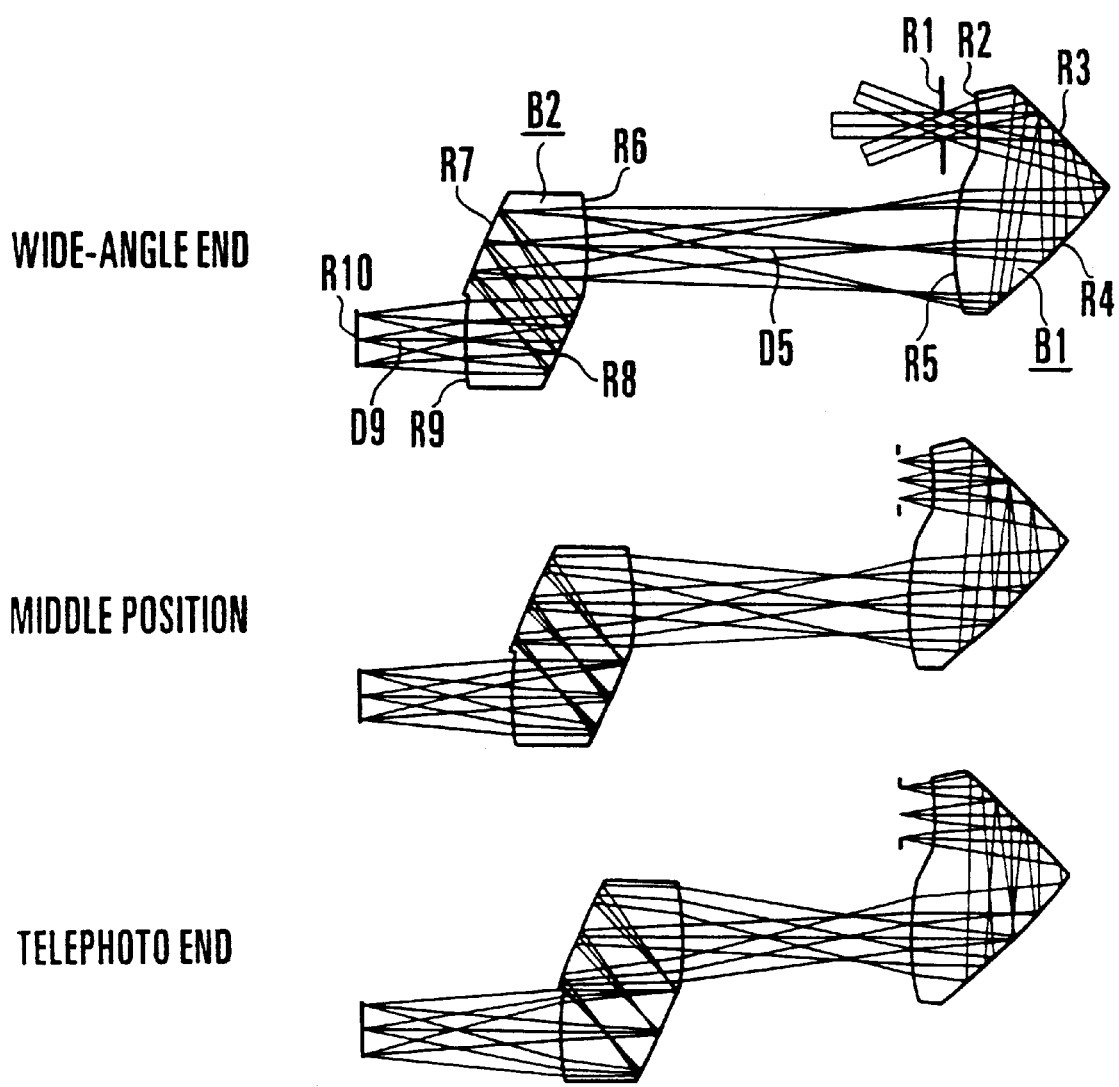
FIG. 17 is a view showing an optical cross section taken on the Y, Z plane, of Embodiment 7 of the present invention.

FIG. 17 is a view showing an optical cross section taken on the Y, Z plane, of Embodiment 7 of the present invention. The present embodiment is intended for an image pickup optical system which constitutes a zoom lens having a magnification variation ratio of approximately 2×.

Constituent Data for Embodiment 7 are Shown Below

|  | WIDE-ANGLE END | MIDDLE POSITION | TELEPHOTO END |
|---|---|---|---|
| HORIZONTAL HALF ANGLE OF VIEW | 19.1 | 13.0 | 9.8 |
| VERTICAL HALF-ANGLE OF VIEW | 14.5 | 9.8 | 7.4 |
| APERTURE DIAMETER | 2.0 | 3.0 | 4.0 |

IMAGE SIZE HORIZONTAL 4 mm × VERTICAL 3 mm
SIZE OF OPTICAL SYSTEM (X × Y × Z) = 9.4 × 22.9 × 61.4
AT WIDE-ANGLE END

| i | Yi | Zi(W) | θi | Di | Ndi | νdi |  |
|---|---|---|---|---|---|---|---|
| 1 | 0.00 | 0.00 | 0.00 | 2.74 | 1 |  | STOP |

FIRST OPTICAL ELEMENT

| 2 | 0.00 | 2.74 | 0.00 | 6.00 | 1.51633 | 64.15 | REFRACTING SURFACE |
| 3 | 0.00 | 8.74 | 45.00 | 10.00 | 1.51633 | 64.15 | REFLECTING SURFACE |
| 4 | −10.00 | 8.74 | 45.00 | 8.00 | 1.51633 | 64.15 | REFLECTING SURFACE |
| 5 | −10.00 | 0.74 | 0.00 | VARIABLE | 1 |  |  |

SECOND OPTICAL ELEMENT

| 6 | −10.00 | −29.12 | 0.00 | 8.50 | 1.51633 | 64.15 | REFRACTING SURFACE |
| 7 | −10.00 | −37.62 | −25.00 | 10.00 | 1.51633 | 64.15 | REFLECTING SURFACE |
| 8 | −17.66 | −31.19 | −25.00 | 8.00 | 1.51633 | 64.15 | REFLECTING SURFACE |
| 9 | −17.66 | −39.19 | 0.00 | VARIABLE | 1 |  | REFRACTING SURFACE |
| 10 | −17.66 | −48.07 | 0.00 | 0.00 | 1 |  | IMAGE PLANE |

|  | WIDE-ANGLE END | MIDDLE POSITION | TELEPHOTO END |
|---|---|---|---|
| D5 | 29.86 | 22.58 | 18.84 |
| D9 | 8.88 | 12.44 | 16.08 |
| D1–D5 |  | Zi(M) = Zi(W) − 3.71 | Zi(T) = Zi(W) − 3.82 |
| D6–D9 |  | Zi(M) = Zi(W) + 3.56 | Zi(T) = Zi(W) + 7.20 |
| D10 |  | Zi(M) = Zi(W) | Zi(T) = Zi(W) |

SPHERICAL SHAPE $R1 = \infty$
$R2 = -18.881$
$R5 = -20.000$
$R6 = 20.000$
$R9 = -21.267$
$R10 = \infty$

ASPHERICAL SHAPE

| R3 | $a = -6.67353e+00$ | $b = 7.79065e+00$ | $t = 2.02110e+00$ |
|---|---|---|---|
|  | $C_{02} = 0.$ | $C_{20} = 0.$ |  |
|  | $C_{03} = -3.95435e-04$ | $C_{21} = -1.49104e-04$ |  |
|  | $C_{04} = -9.70215e-06$ | $C_{22} = -3.70464e-05$ | $C_{40} = -2.27820e-05$ |
| R4 | $a = 3.15397e+01$ | $b = 7.47248e+01$ | $t = 4.90324e+01$ |
|  | $C_{02} = 0.$ | $C_{20} = 0.$ |  |
|  | $C_{03} = -9.12121e-05$ | $C_{21} = 1.62890e-04$ |  |
|  | $C_{04} = 9.24276e-06$ | $C_{22} = -3.10030e-05$ | $C_{40} = -2.06901e-05$ |
| R7 | $a = 1.24790e+01$ | $b = -9.62671e+00$ | $t = 2.34935e+00$ |
|  | $C_{02} = 0.$ | $C_{20} = 0.$ |  |
|  | $C_{03} = -1.13535e-04$ | $C_{21} = -1.02319e-04$ |  |
|  | $C_{04} = -6.38259e-06$ | $C_{22} = -2.90197e-06$ | $C_{40} = 8.19147e-08$ |
| R8 | $a = 3.48639e+02$ | $b = 4.91238e+01$ | $t = -4.10204e+01$ |
|  | $C_{02} = 0.$ | $C_{20} = 0.$ |  |
|  | $C_{03} = 7.30891e-08$ | $C_{21} = 4.50703e-05$ |  |
|  | $C_{04} = -1.95562e-05$ | $C_{22} = -3.38641e-05$ | $C_{40} = -2.11694e-05$ |

In the present embodiment, the first surface R1 is an aperture plane which is an entrance pupil, the second surface R2 to the fifth surface R5 constitute part of the first optical element B1, the sixth surface R6 to the ninth surface R9 constitute part of the second optical element B2, and the tenth surface R10 is an image plane.

An image forming operation for an object lying at infinity will be described below. First, a light beam passes through the first surface R1 and enters the first optical element B1. In the first optical element B1, the light beam is refracted by the second surface R2, then reflected by the third surface R3 and the fourth surface R4, then refracted by the fifth surface R5, and then exits from the first optical element B1. During this time, a primary image is formed on an intermediate image forming plane near to the fifth surface R5.

Then, the light beam enters the second optical element B2. In the second optical element B2, the light beam is refracted by the sixth surface R6, then reflected by the seventh surface R7 and the eighth surface R8, then refracted by the ninth surface R9, and then exits from the second optical element B2. During this time, a pupil is formed in the vicinity of the seventh surface R7. The light beam which has exited from the second optical element B2 finally forms an object image on the tenth surface R10 (the image pickup surface of the image pickup medium such as a CCD).

In the present embodiment, the direction of the reference axis which enters the first optical element B1 and the direction of the reference axis which exits from the first optical element B1 are parallel to and opposite to each other. The direction of the reference axis which enters the second optical element B2 and the direction of the reference axis which exits from the second optical element B2 are parallel to and the same as each other.

A magnification varying operation effected by the movements of the respective optical elements will be described below. During variation of magnification, the first optical element B1 moves in the Z minus direction from the wide-angle end toward the telephoto end. The second optical element B2 moves in the Z plus direction from the wide-angle end toward the telephoto end. The tenth surface R10 which is the image plane does not move during the variation of magnification. Thus, when the variation of magnification from the wide-angle end toward the telephoto end is effected, the distance between the first optical element B1 and the second optical element B2 is decreased, whereas the distance between the second optical element B2 and the image plane R10 is increased.

Figure 18:
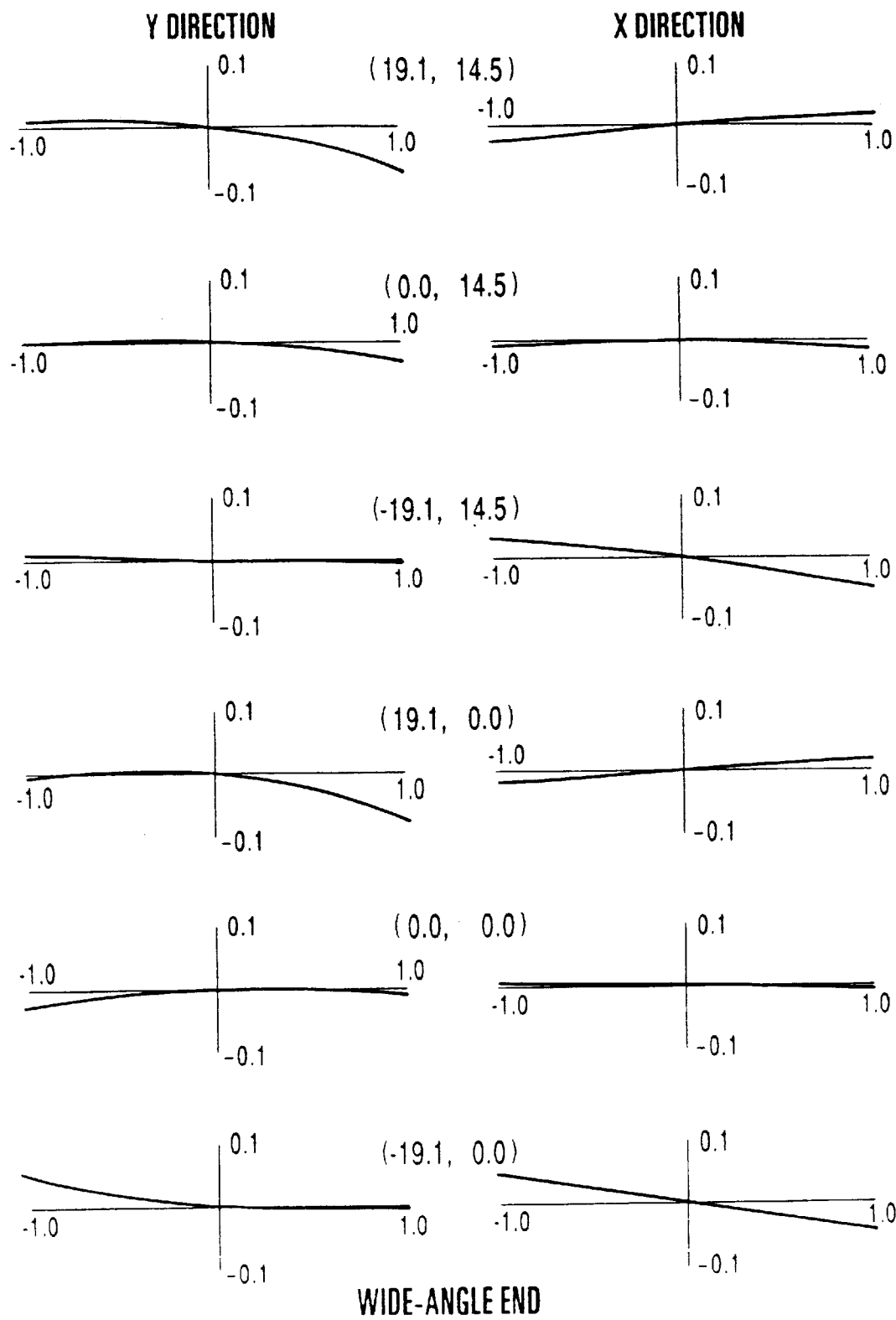
FIG. 18 shows lateral aberration charts of Embodiment 7 (wide-angle end)
Figure 19:
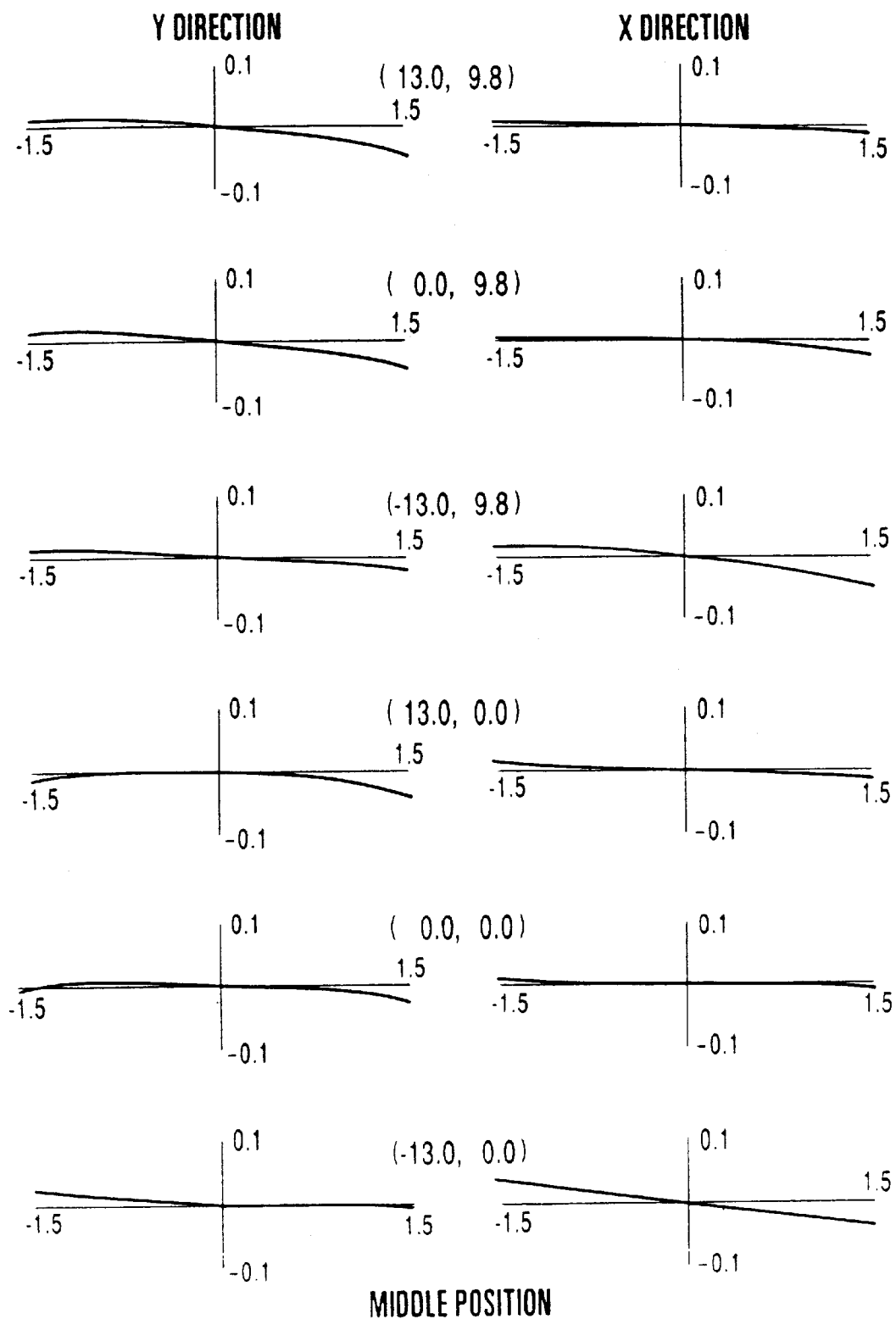
FIG. 19 shows lateral aberration charts of Embodiment 7 (middle position)
Figure 20:
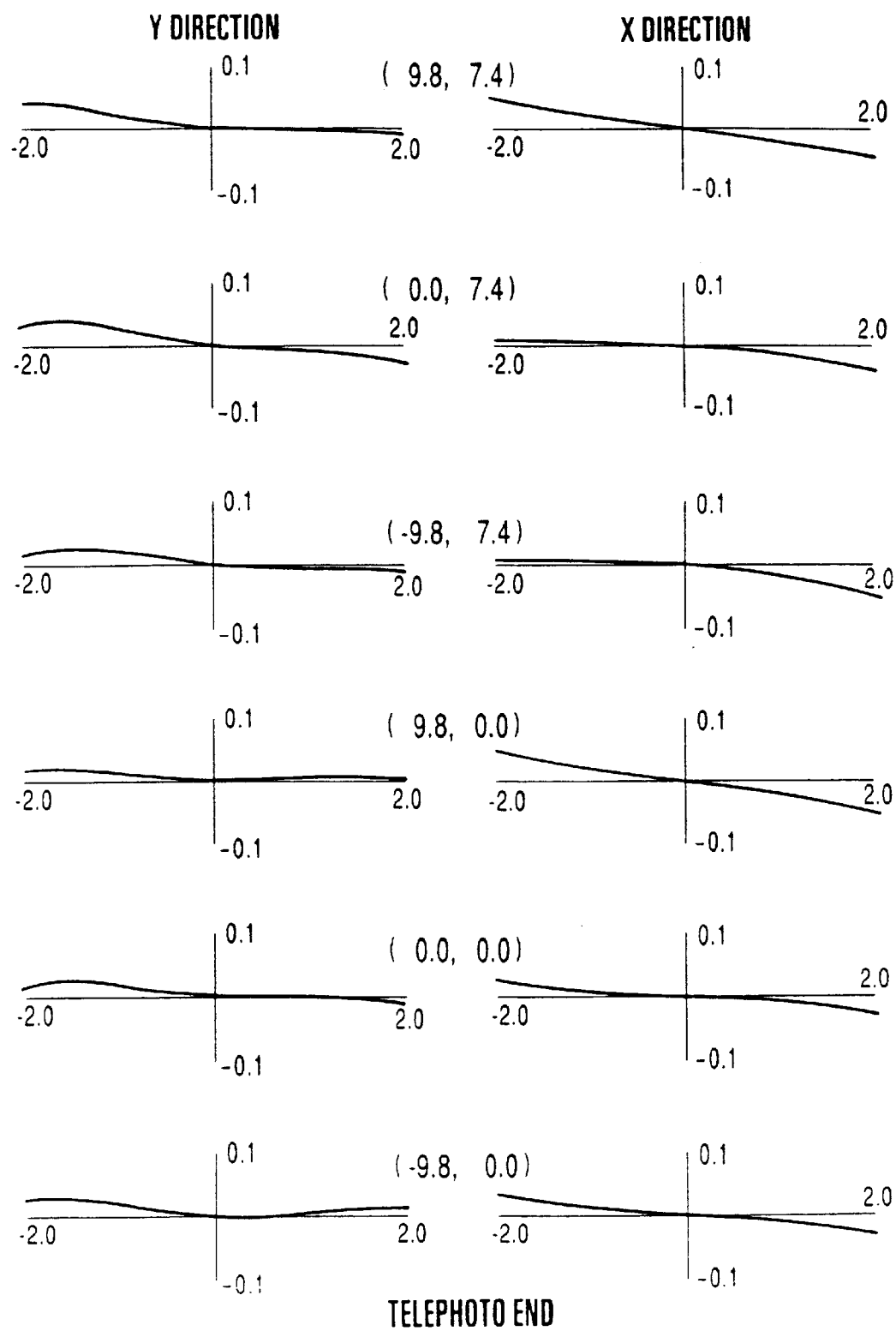
FIG. 20 shows lateral aberration charts of Embodiment 7 (telephoto end)

Each of FIGS. 18, 19 and 20 shows lateral aberration charts of the present embodiment.

Embodiment 8

FIG. 21 is a view showing an optical cross section taken on the Y, Z plane, of Embodiment 8 of the present invention. The present embodiment is intended for an image pickup optical system which constitutes a zoom lens having a magnification variation ratio of approximately 2×.

Constituent Data for Embodiment 8 are Shown Below

|  |  | WIDE-ANGLE END | MIDDLE POSITION | TELEPHOTO END |
|---|---|---|---|---|
| HORIZONTAL HALF-ANGLE OF VIEW |  | 19.1 | 13.0 | 9.8 |
| VERTICAL HALF-ANGLE OF VIEW |  | 14.5 | 9.8 | 7.4 |
| APERTURE DIAMETER |  | 2.0 | 3.0 | 4.0 |

IMAGE SIZE  HORIZONTAL 4 mm × VERTICAL 3 mm
SIZE OF OPTICAL SYSTEM (X × Y × Z) = 6.6 × 25.4 × 38.3
AT WIDE-ANGLE END

| i | Yi | Zi(W) | θi | Di | Ndi | vdi |  |
|---|---|---|---|---|---|---|---|
| 1 | 0.00 | 0.00 | 0.00 | 2.74 | 1 |  | STOP |

FIRST OPTICAL ELEMENT

| 2 | 0.00 | 2.74 | 0.00 | 6.00 | 1.51633 | 64.15 | REFRACTING SURFACE |
| 3 | 0.00 | 8.74 | 45.00 | 10.00 | 1.51633 | 64.15 | REFLECTING SURFACE |
| 4 | 10.00 | 8.74 | 45.00 | 8.00 | 1.51633 | 64.15 | REFLECTING SURFACE |
| 5 | 10.00 | 0.74 | 0.00 | VARIABLE | 1 |  | REFRACTING SURFACE |

SECOND OPTICAL ELEMENT

| 6 | −10.00 | −15.27 | 0.00 | 8.50 | 1.51633 | 64.15 | REFRACTING SURFACE |
| 7 | −10.00 | −23.77 | 45.00 | 10.00 | 1.51633 | 64.15 | REFLECTING SURFACE |
| 8 | −20.00 | −23.77 | 45.00 | 8.00 | 1.51633 | 64.15 | REFLECTING SURFACE |
| 9 | −20.00 | −15.77 | 0.00 | VARIABLE | 1 |  | REFRACTING SURFACE |
| 10 | −20.00 | −8.87 | 0.00 | 0.00 | 1 |  | IMAGE PLANE |

|  | WIDE-ANGLE END | MIDDLE POSITION | TELEPHOTO END |
|---|---|---|---|
| D5 | 16.01 | 9.40 | 6.10 |
| D9 | 6.90 | 10.49 | 14.10 |
| D1–D5 |  | Zi(M) = Zi(W) − 10.20 | Zi(T) = Zi(W) − 17.11 |
| D6–D9 |  | Zi(M) = Zi(W) − 3.59 | Zi(T) = Zi(W) − 7.20 |
| D10 |  | Zi(M) = Zi(W) | Zi(T) = Zi(W) |

SPHERICAL SHAPE

R1 = ∞
R2 = 13.302

-continued

R5 = −20.000
R6 = 20.000
R9 = −18.886
R10 = ∞
ASPHERICAL SHAPE

| | | | |
|---|---|---|---|
| R3 | a = −1.38265e+01 | b = 2.99760e+01 | t = 3.24111e+01 |
| | $C_{02}$ = 0. | $C_{20}$ = 0. | |
| | $C_{03}$ = 5.24667e−05 | $C_{21}$ = 6.24839e−04 | |
| | $C_{04}$ = 3.94622e−06 | $C_{22}$ = 3.14394e−05 | $C_{40}$ = 3.57024e−05 |
| R4 | a = −1.02695e+01 | b = 6.35702e+00 | t = 4.101336e+01 |
| | $C_{02}$ = 0. | $C_{20}$ = 0. | |
| | $C_{03}$ = −8.68140e−04 | $C_{21}$ = −9.61122e−05 | |
| | $C_{04}$ = −1.54916e−04 | $C_{22}$ = −1.53251e−04 | $C_{40}$ = −7.70985e−05 |
| R7 | a = 9.91952e+00 | b = 7.60901e+00 | t = 4.08306e+01 |
| | $C_{02}$ = 0. | $C_{20}$ = 0. | |
| | $C_{03}$ = −4.25157e−04 | $C_{21}$ = −5.94574e−04 | |
| | $C_{04}$ = 2.16100e−05 | $C_{22}$ = 3.66328e−05 | $C_{40}$ = 8.09379e−07 |
| R8 | a = 2.71963e+01 | b = −1.17872e+02 | t = −3.07167e+02 |
| | $C_{02}$ = 0. | $C_{20}$ = 0. | |
| | $C_{03}$ = 7.31990e−05 | $C_{21}$ = 1.14069e−04 | |
| | $C_{04}$ = −1.11662e−05 | $C_{22}$ = −1.95630e−05 | $C_{40}$ = −1.35460e−05 |

In the present embodiment, the first surface R1 is an aperture plane which is an entrance pupil, the second surface R2 to the fifth surface R5 constitute part of the first optical element B1, the sixth surface R6 to the ninth surface R9 constitute part of the second optical element B2, and the tenth surface R10 is an image plane.

An image forming operation for an object lying at infinity will be described below. First, a light beam passes through the first surface R1 and enters the first optical element B1. In the first optical element B1, the light beam is refracted by the second surface R2, then reflected by the third surface R3 and the fourth surface R4, then refracted by the fifth surface R5, and then exits from the first optical element B1. During this time, a primary image is formed on an intermediate image forming plane near to the fourth surface R4.

Then, the light beam enters the second optical element B2. In the second optical element B2, the light beam is refracted by the sixth surface R6, then reflected by the seventh surface R7 and the eighth surface R8, then refracted by the ninth surface R9, and then exits from the second optical element B2. During this time, a pupil is formed in the vicinity of the seventh surface R7. The light beam which has exited from the second optical element B2 finally forms an object image on the tenth surface R10 (the image pickup surface of the image pickup medium such as a CCD).

In the present embodiment, the direction of the reference axis which enters the first optical element B1 and the direction of the reference axis which exits from the first optical element B1 are parallel to and opposite to each other. The direction of the reference axis which enters the second optical element B2 and the direction of the reference axis which exits from the second optical element B2 are parallel to and opposite to each other.

A magnification varying operation effected by the movements of the respective optical elements will be described below. During variation of magnification, the first optical element B1 moves in the Z minus direction from the wide-angle end toward the telephoto end. The second optical element B2 moves in the Z minus direction from the wide-angle end toward the telephoto end. The tenth surface R10 which is the image plane does not move during the variation of magnification. Thus, when the variation of magnification from the wide-angle end toward the telephoto end is effected, the distance between the first optical element B1 and the second optical element B2 is decreased, whereas the distance between the second optical element B2 and the image plane R10 is increased.

Figure 22:
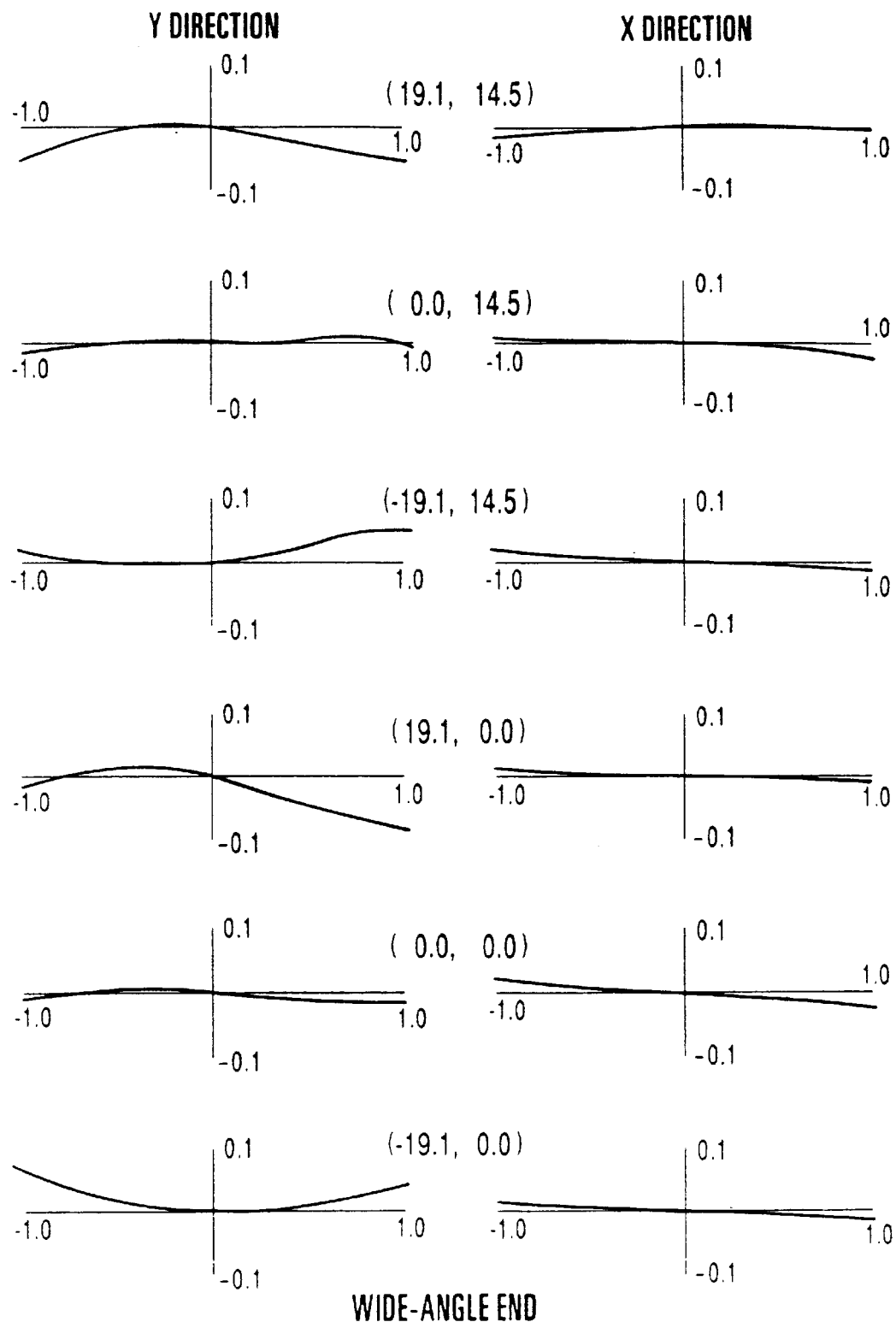
FIG. 22 shows lateral aberration charts of Embodiment 8 (wide-angle end)
Figure 23:
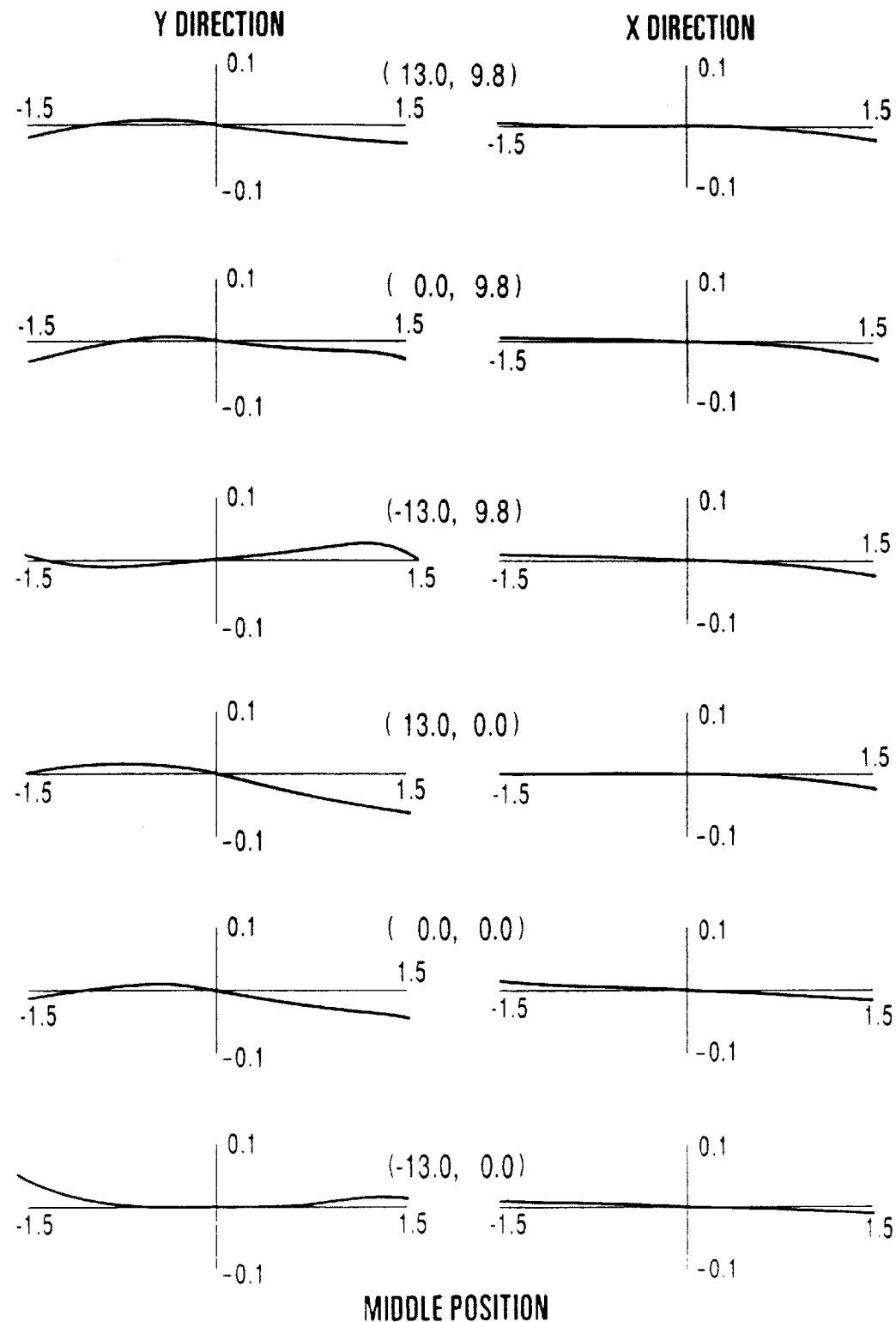
FIG. 23 shows lateral aberration charts of Embodiment 8 (middle position)
Figure 24:
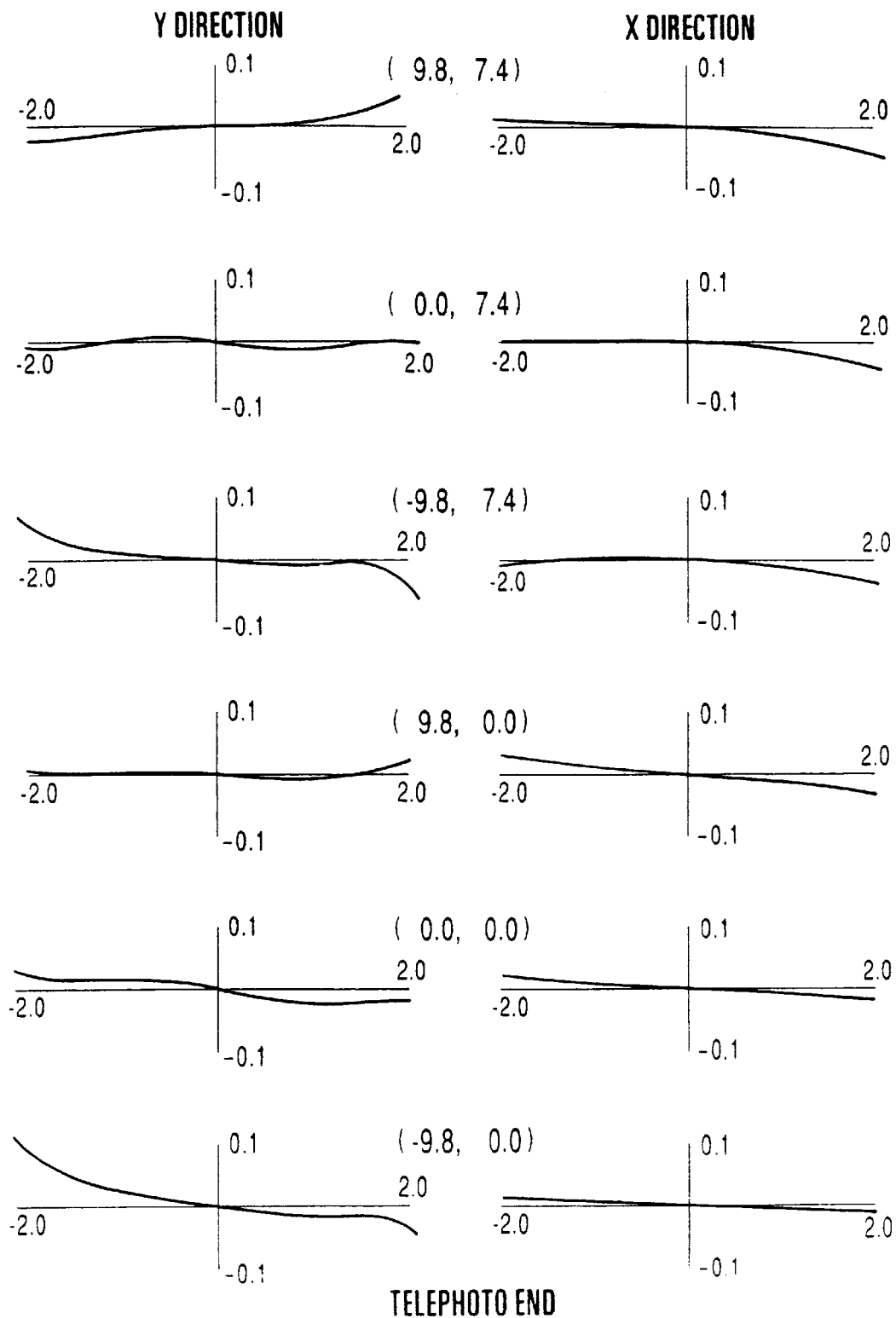
FIG. 24 shows lateral aberration charts of Embodiment 8 (telephoto end)

Each of FIGS. 22, 23 and 24 shows lateral aberration charts of the present embodiment.

Embodiments 9 to 12 are intended for two-group types of zoom lenses similarly to Embodiments 5 to 8. Each of Embodiments 5 to 8 uses optical elements each having curved reflecting surfaces or the like formed on the surface of a block of transparent plastics, glass or the like, and a ray from an object passes through the block while repeating a reflection therein. In contrast, in each of Embodiments 9 to 12 which will be described below, any decentered reflecting surface which constitutes each group is formed by a surface mirror made of plastics, glass, metal or the like, and two surface mirrors which constitute each group are integrally connected outside the optical path.

Embodiment 9

FIG. 25 is a view showing an optical cross section taken on the Y, Z plane, of Embodiment 9 of the present invention. The present embodiment is intended for an image pickup optical system which constitutes a two-group zoom lens having a magnification variation ratio of approximately 1.5×.

Constituent Data for Embodiment 9 are Shown Below

|  | WIDE-ANGLE END | MIDDLE POSITION | TELEPHOTO END |
|---|---|---|---|
| HORIZONTAL HALF-ANGLE OF VIEW | 19.1 | 15.5 | 13.0 |
| VERTICAL HALF-ANGLE OF VIEW | 14.5 | 11.7 | 9.8 |
| APERTURE DIAMETER | 1.5 | 1.8 | 2.2 |

IMAGE SIZE   HORIZONTAL 4 mm × VERTICAL 3 mm
SIZE OF OPTICAL SYSTEM (X × Y × Z) = 13.2 × 21.54 × 32.1
AT WIDE-ANGLE END

| i | Yi | Zi(W) | θi | Di | Ndi | νdi |  |
|---|---|---|---|---|---|---|---|
| 1 | 0.00 | 0.00 | 0.00 | 2.74 | 1 |  | STOP |

FIRST OPTICAL ELEMENT

| i | Yi | Zi(W) | θi | Di | Ndi | νdi |  |
|---|---|---|---|---|---|---|---|
| 2 | 0.00 | 8.74 | 25.00 | 10.00 | 1 |  | REFLECTING SURFACE |
| 3 | −7.66 | 2.31 | 25.00 | VARIABLE | 1 |  | REFLECTING SURFACE |

SECOND OPTICAL ELEMENT

| i | Yi | Zi(W) | θi | Di | Ndi | νdi |  |
|---|---|---|---|---|---|---|---|
| 4 | −7.66 | 25.50 | 25.00 | 10.00 | 1 |  | REFLECTING SURFACE |
| 5 | −15.32 | 19.07 | 25.00 | VARIABLE | 1 |  | REFLECTING SURFACE |
| 6 | −15.32 | 32.07 | 0.00 | 0.00 | 1 |  | IMAGE PLANE |

|  | WIDE-ANGLE END | MIDDLE POSITION | TELEPHOTO END |
|---|---|---|---|
| D3 | 23.19 | 19.63 | 17.15 |
| D5 | 13.00 | 14.74 | 16.59 |
| D1–D3 |  | Zi(M) = Zi(W) + 1.81 | Zi(T) = Zi(W) + 2.44 |
| D4–D5 |  | Zi(M) = Zi(W) − 1.74 | Zi(T) = Zi(W) − 3.59 |
| D6 |  | Zi(M) = Zi(W) | Zi(T) = Zi(W) |

SPHERICAL SHAPE $R1 = \infty$
$R6 = \infty$

ASPHERICAL SHAPE

| R2 | $a = -2.59864e+02$ | $b = -7.87075e+00$ | $t = -3.10132e+01$ |
|---|---|---|---|
|  | $C_{20} = 0.$ | $C_{20} = 0.$ |  |
|  | $C_{03} = 5.91346e-04$ | $C_{21} = -2.93517e-03$ |  |
|  | $C_{04} = 6.17346e-05$ | $C_{22} = -2.82803e-04$ | $C_{40} = -1.43423e-04$ |
| R3 | $a = 1.60603e+01$ | $b = 1.41145e+02$ | $t = 4.51434e+01$ |
|  | $C_{02} = 0.$ | $C_{20} = 0.$ |  |
|  | $C_{03} = 8.20375e-05$ | $C_{21} = 2.14115e-03$ |  |
|  | $C_{04} = -3.00603e-05$ | $C_{22} = 8.38013e-04$ | $C_{40} = -3.06131e-04$ |
| R4 | $a = -1.86291e+02$ | $b = -1.76943e+01$ | $t = 2.42099e+01$ |
|  | $C_{02} = 0.$ | $C_{20} = 0.$ |  |
|  | $C_{03} = 1.17485e-04$ | $C_{21} = 3.75999e-04$ |  |
|  | $C_{04} = 2.20557e-05$ | $C_{22} = 3.87815e-06$ | $C_{40} = 4.07058e-06$ |
| R5 | $a = -2.08325e+01$ | $b = 1.04872e+01$ | $t = 2.05417e+01$ |
|  | $C_{02} = 0.$ | $C_{20} = 0.$ |  |
|  | $C_{03} = 2.49839e-04$ | $C_{21} = 1.43001e-03$ |  |
|  | $C_{04} = 1.12443e-05$ | $C_{22} = -1.02575e-04$ | $C_{40} = -1.99974e-05$ |

In the present embodiment, the first surface R1 is an aperture plane which is an entrance pupil, and the second surface R2 and the third surface R3, each of which is a reflecting surface made from a surface mirror, constitute the first optical element B1 with the surface mirrors being integrally connected on either side, while the fourth surface R4 and the fifth surface R5, each of which is a reflecting surface made from a surface mirror, constitute the second optical element B2 with the surface mirrors being integrally connected on either side. The sixth surface R6 is an image plane.

An image forming operation for an object lying at infinity will be described below. First, a light beam passes through the first surface R1 and enters the portion of the first optical element B1. In the first optical element B1, the light beam is reflected by the second surface R2 and the third surface R3 and then exits from the portion of the first optical element B1. During this time, a primary image is formed on an intermediate image forming plane near to the third surface R3.

Then, the light beam enters the portion of the second optical element B2. In the second optical element B2, the light beam is reflected by the fourth surface R4 and the fifth surface R5 and then exits from the portion of the second optical element B2. During this time, a pupil is formed in the vicinity of the fourth surface R4. The light beam which has exited from the portion of the second optical element B2 finally forms an object image on the sixth surface R6 (the image pickup surface of the image pickup medium such as a CCD).

In the present embodiment, the direction of the reference axis which enters the first optical element B1 and the direction of the reference axis which exits from the first optical element B1 are parallel to and the same as each other. The direction of the reference axis which enters the second optical element B2 and the direction of the reference axis which exits from the second optical element B2 are parallel to and the same as each other.

A magnification varying operation effected by the movements of the respective optical elements will be described below. During variation of magnification, the first optical element B1 moves in the Z plus direction from the wide-angle end toward the telephoto end. The second optical element B2 moves in the Z minus direction from the wide-angle end toward the telephoto end. The tenth surface R10 which is the image plane does not move during the variation of magnification. Thus, when the variation of magnification from the wide-angle end toward the telephoto end is effected, the distance between the first optical element B1 and the second optical element B2 is decreased, whereas the distance between the second optical element B2 and the image plane R10 is increased.

Figure 26:
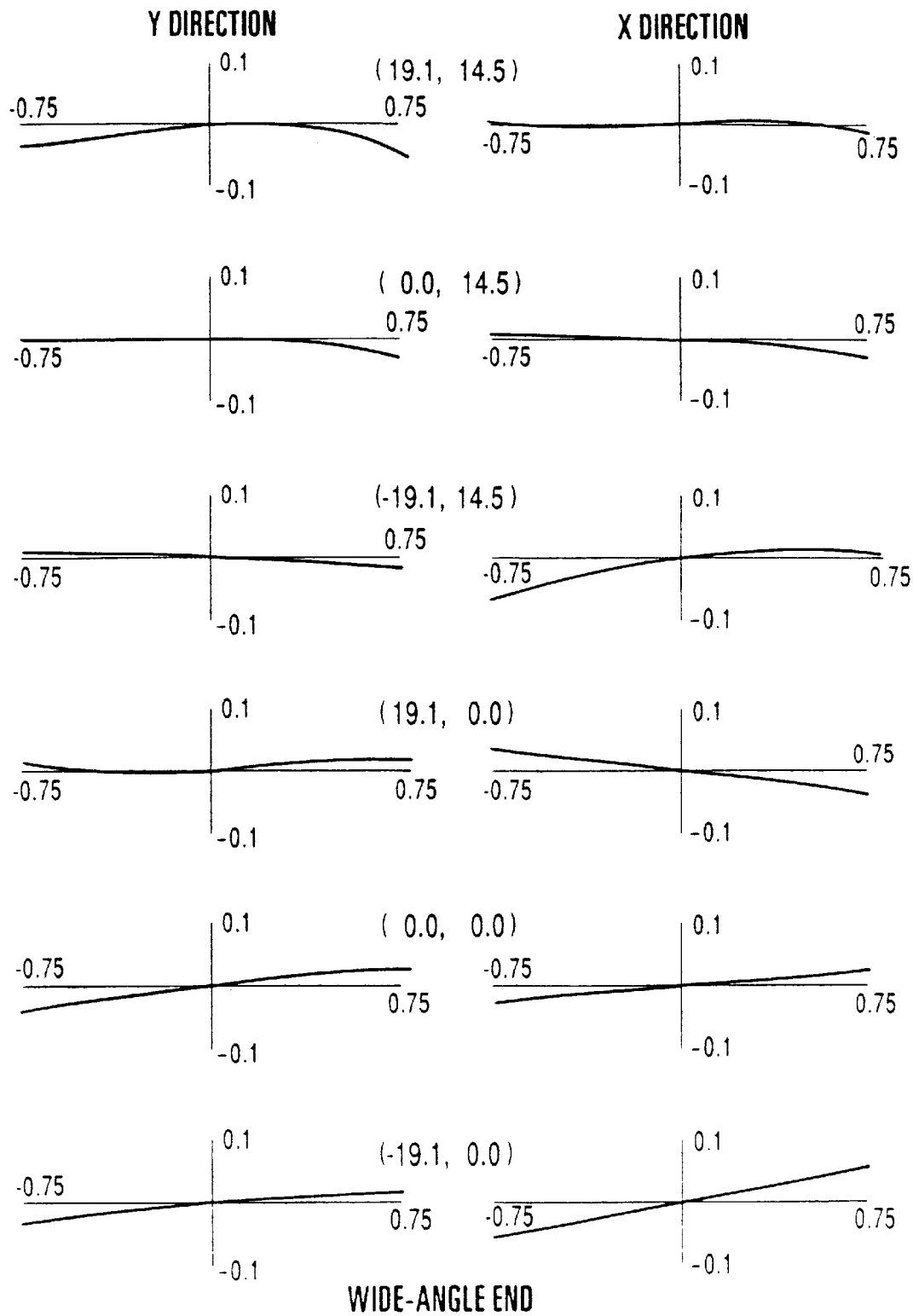
FIG. 26 shows lateral aberration charts of Embodiment 9 (wide-angle end)
Figure 27:
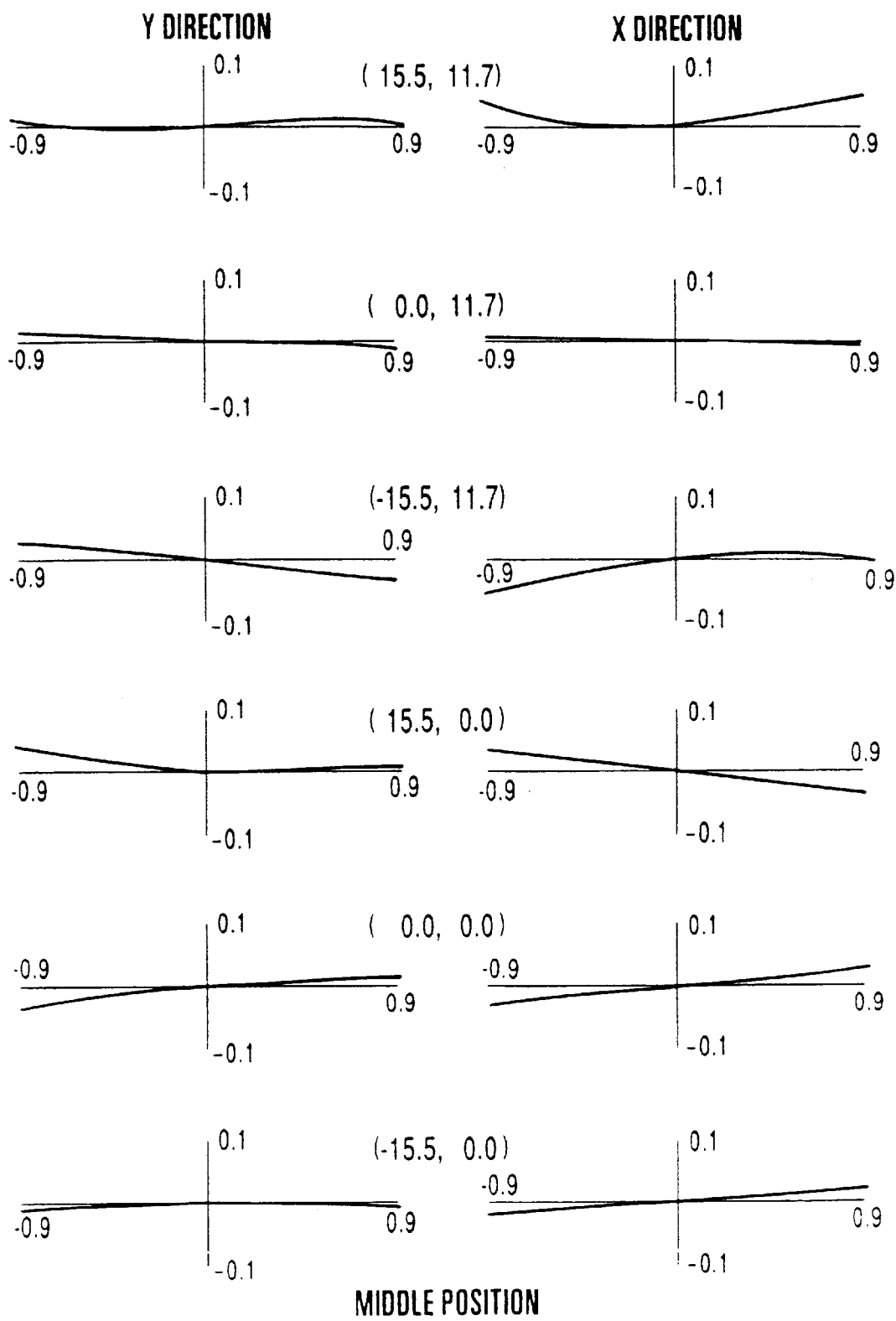
FIG. 27 shows lateral aberration charts of Embodiment 9 (middle position)
Figure 28:
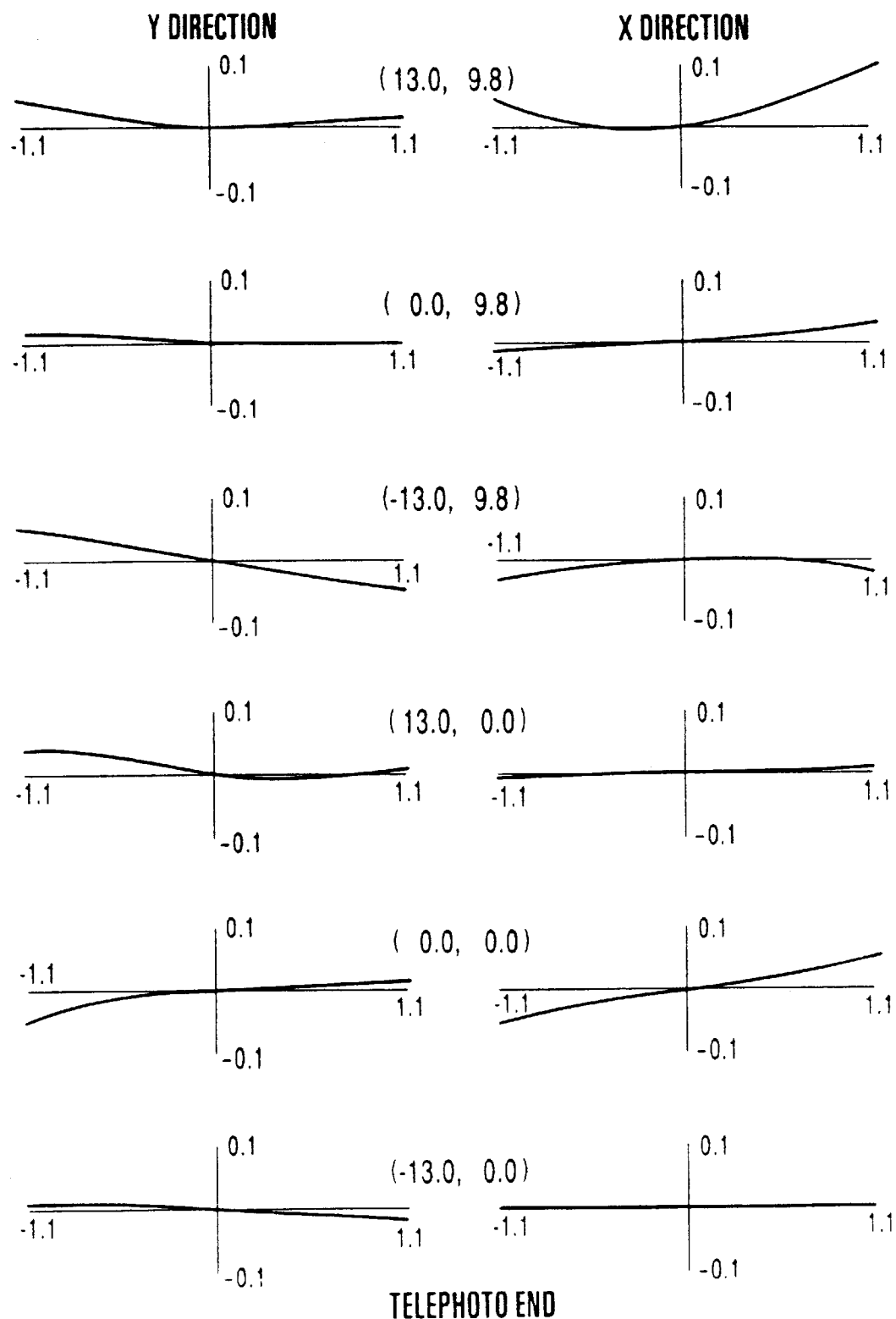
FIG. 28 shows lateral aberration charts of Embodiment 9 (telephoto end)

Each of FIGS. 26, 27 and 28 shows lateral aberration charts of the present embodiment.

Embodiment 10

Figure 29:
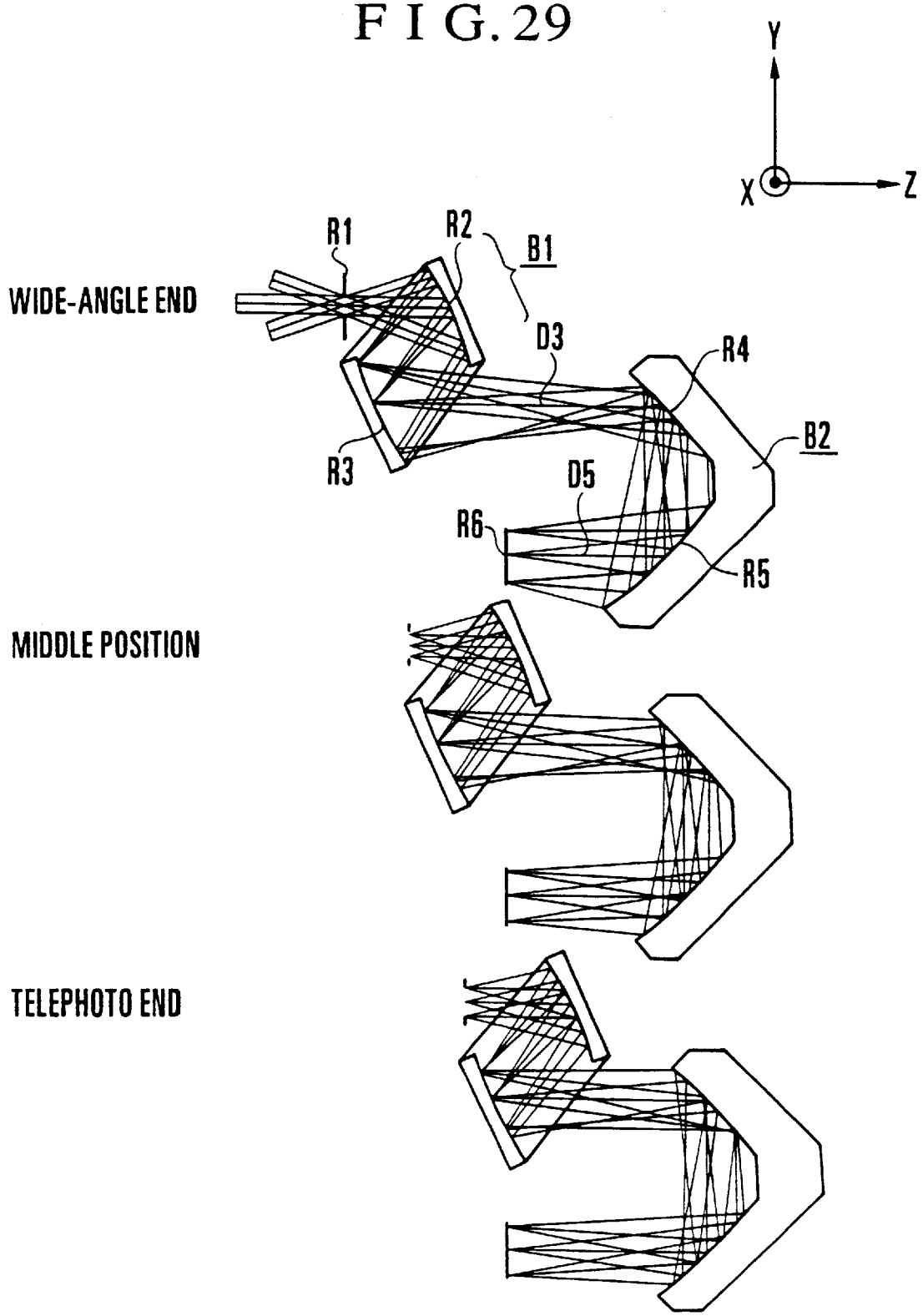
FIG. 29 is a view showing an optical cross section taken on the Y, Z plane, of Embodiment 10 of the present invention.

FIG. 29 is a view showing an optical cross section taken on the Y, Z plane, of Embodiment 10 of the present invention. The present embodiment is intended for an image pickup optical system which constitutes a two-group zoom lens having a magnification variation ratio of approximately 1.5×.

Constituent Data for Embodiment 10 are Shown Below

|  | WIDE-ANGLE END | MIDDLE POSITION | TELEPHOTO END |
|---|---|---|---|
| HORIZONTAL HALF-ANGLE OF VIEW | 19.1 | 15.5 | 13.0 |
| VERTICAL HALF-ANGLE OF VIEW | 14.5 | 11.7 | 9.8 |
| APERTURE DIAMETER | 1.5 | 1.8 | 2.2 |

IMAGE SIZE     HORIZONTAL 4 mm × VERTICAL 3 mm
SIZE OF OPTICAL SYSTEM (X × Y × Z) = 13.6 × 27.0 × 30.4
AT WIDE-ANGLE END

| i | Yi | Zi(W) | θi | Di | Ndi | vdi |  |
|---|---|---|---|---|---|---|---|
| 1 | 0.00 | 0.00 | 0.00 | 2.74 | 1 |  | STOP |

FIRST OPTICAL ELEMENT

| 2 | 0.00 | 8.74 | 25.00 | 10.00 | 1 |  | REFLECTING SURFACE |
| 3 | −7.66 | 2.31 | 25.00 | VARIABLE | 1 |  | REFLECTING SURFACE |

SECOND OPTICAL ELEMENT

| 4 | −7.66 | 26.21 | 45.00 | 12.00 | 1 |  | REFLECTING SURFACE |
| 5 | −19.66 | 26.21 | 45.00 | VARIABLE | 1 |  | REFLECTING SURFACE |
| 6 | −19.66 | 13.21 | 0.00 | 0.00 | 1 |  | IMAGE PLANE |

|  | WIDE-ANGLE END | MIDDLE POSITION | TELEPHOTO END |
|---|---|---|---|
| D3 | 23.89 | 20.30 | 17.62 |
| D5 | 13.00 | 14.61 | 16.44 |
| D1–D3 |  | Zi(M) = Zi(W) + 5.20 | Zi(T) = Zi(W) + 9.71 |
| D4–D5 |  | Zi(M) = Zi(W) + 1.61 | Zi(T) = Zi(W) + 3.44 |
| D6 |  | Zi(M) = Zi(W) | Zi(T) = Zi(W) |

SPHERICAL SHAPE $R1 = \infty$
$R6 = \infty$

ASPHERICAL SHAPE

R2    a = −7.32966e+01    b = −9.51142e+00    t = −3.70087e+01
    $C_{02}$ = 0.    $C_{20}$ = 0.
    $C_{03}$ = −3.98870e−04    $C_{21}$ = 8.34713e−04
    $C_{04}$ = 1.15028e−04    $C_{22}$ = −1.65925e−05    $C_{40}$ = 1.17016e−05
R3    a = 5.69699e+01    b = 2.41277e+01    t = −4.35565e+01
    $C_{02}$ = 0.    $C_{20}$ = 0.
    $C_{03}$ = 1.29196e−04    $C_{21}$ = 3.82727e−03
    $C_{04}$ = 1.39986e−04    $C_{22}$ = 1.58164e−04    $C_{40}$ = 7.40783e−05
R4    a = −4.79501e+02    b = −1.86763e+01    t = 4.98014e+01
    $C_{02}$ = 0.    $C_{20}$ = 0.
    $C_{03}$ = −1.99399e−04    $C_{21}$ = −4.93360e−04
    $C_{04}$ = 2.88484e−06    $C_{22}$ = −4.10330e−06    $C_{40}$ = 8.35173e−06
R5    a = −2.75382e+03    b = 1.79616e+01    t = 3.20821e+01

-continued $C_{02} = 0.$
$C_{03} = 3.86551e{-}04$
$C_{04} = 1.12591e{-}05$
$C_{20} = 0.$
$C_{21} = 5.20330e{-}04$
$C_{22} = -1.72743e{-}05$
$C_{40} = 7.83047e{-}06$ In the present embodiment, the first surface R1 is an aperture plane which is an entrance pupil, and the second surface R2 and the third surface R3, each of which is a reflecting surface made from a surface mirror, constitute the first optical element B1 with the surface mirrors being integrally connected on either side, while the fourth surface R4 and the fifth surface R5, each of which is a reflecting surface, are formed on the second optical element B2 which is an integral optical element. The sixth surface R6 is an image plane.

An image forming operation for an object lying at infinity will be described below. First, a light beam passes through the first surface R1 and enters the portion of the first optical element B1. In the first optical element B1, the light beam is reflected by the second surface R2 and the third surface R3 and then exits from the portion of the first optical element B1. During this time, a primary image is formed on an intermediate image forming plane near to the third surface R3.

Then, the light beam enters the portion of the second optical element B2. In the second optical element B2, the light beam is reflected by the fourth surface R4 and the fifth surface R5 and then exits from the portion of the second optical element B2. During this time, a pupil is formed in the vicinity of the fourth surface R4. The light beam which has exited from the portion of the second optical element B2 finally forms an object image on the sixth surface R6 (the image pickup surface of the image pickup medium such as a CCD).

In the present embodiment, the direction of the reference axis which enters the first optical element B1 and the direction of the reference axis which exits from the first optical element B1 are parallel to and the same as each other. The direction of the reference axis which enters the second optical element B2 and the direction of the reference axis which exits from the second optical element B2 are parallel to and opposite to each other.

A magnification varying operation effected by the movements of the respective optical elements will be described below. During variation of magnification, the first optical element B1 moves in the Z plus direction from the wide-angle end toward the telephoto end. The second optical element B2 moves in the Z plus direction from the wide-angle end toward the telephoto end. The sixth surface R6 which is the image plane does not move during the variation of magnification. Thus, when the variation of magnification from the wide-angle end toward the telephoto end is effected, the distance between the first optical element B1 and the second optical element B2 is decreased, whereas the distance between the second optical element B2 and the image plane R6 is increased.

Figure 30:
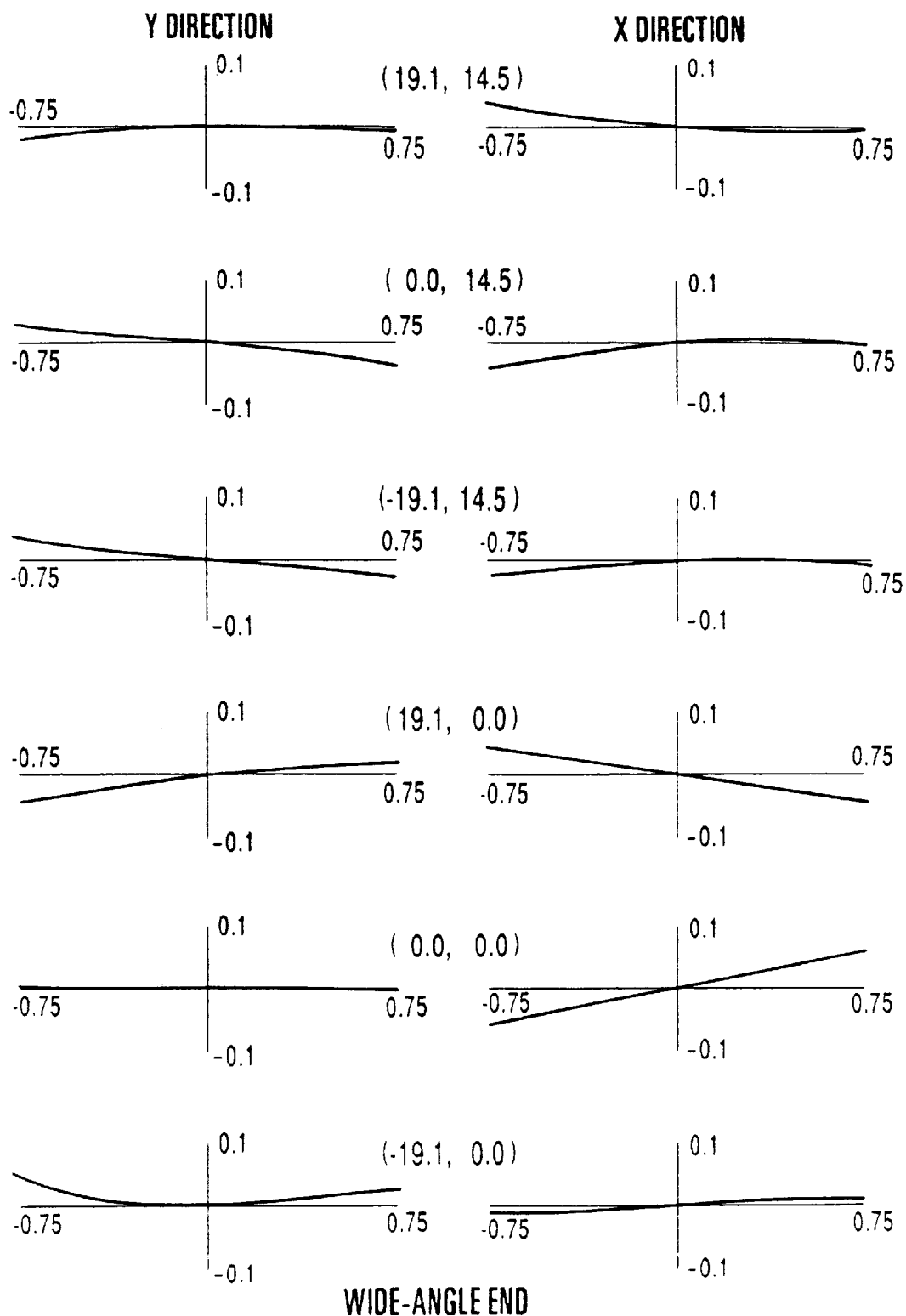
FIG. 30 shows lateral aberration charts of Embodiment 10 (wide-angle end)
Figure 31:
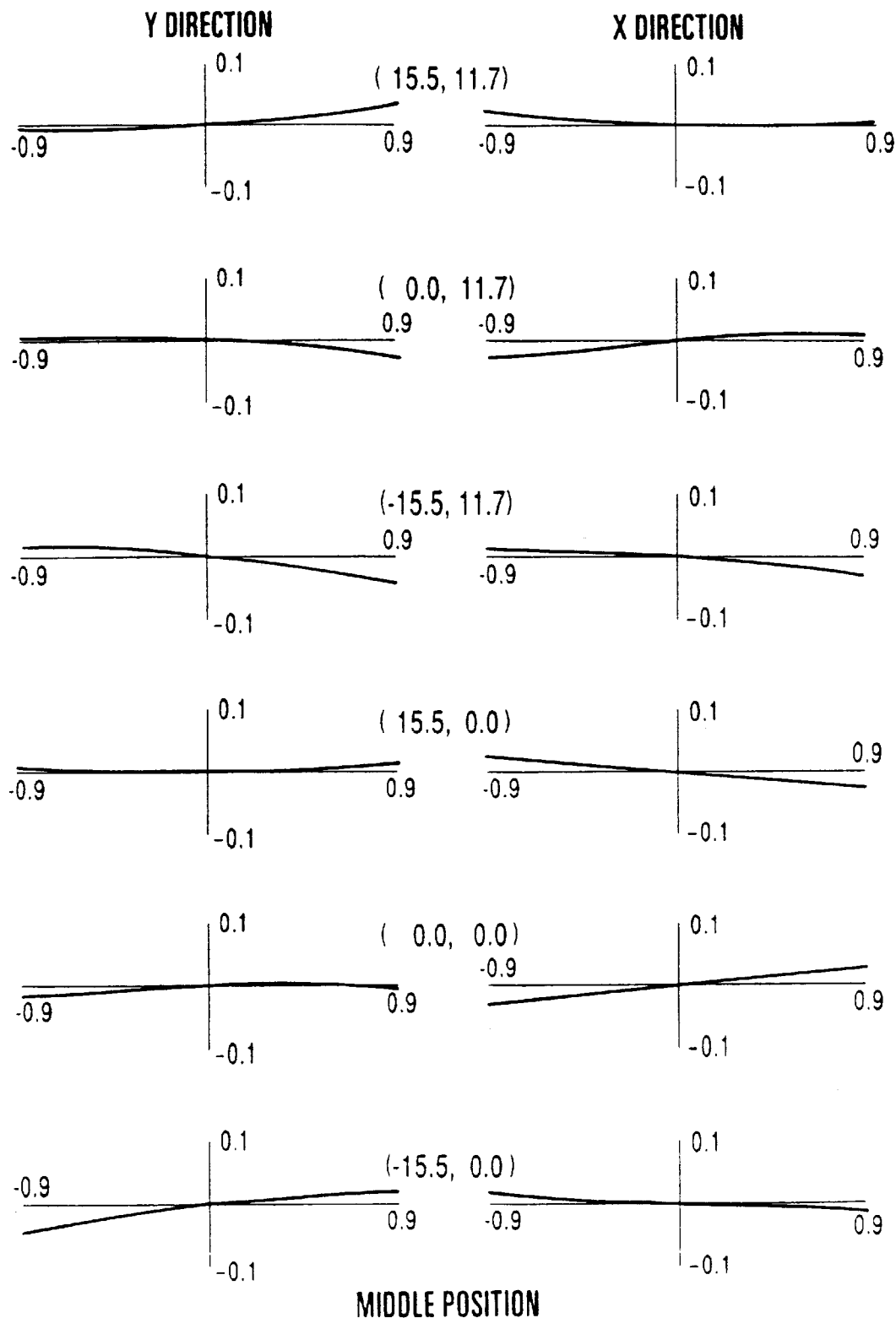
FIG. 31 shows lateral aberration charts of Embodiment 10 (middle position)
Figure 32:
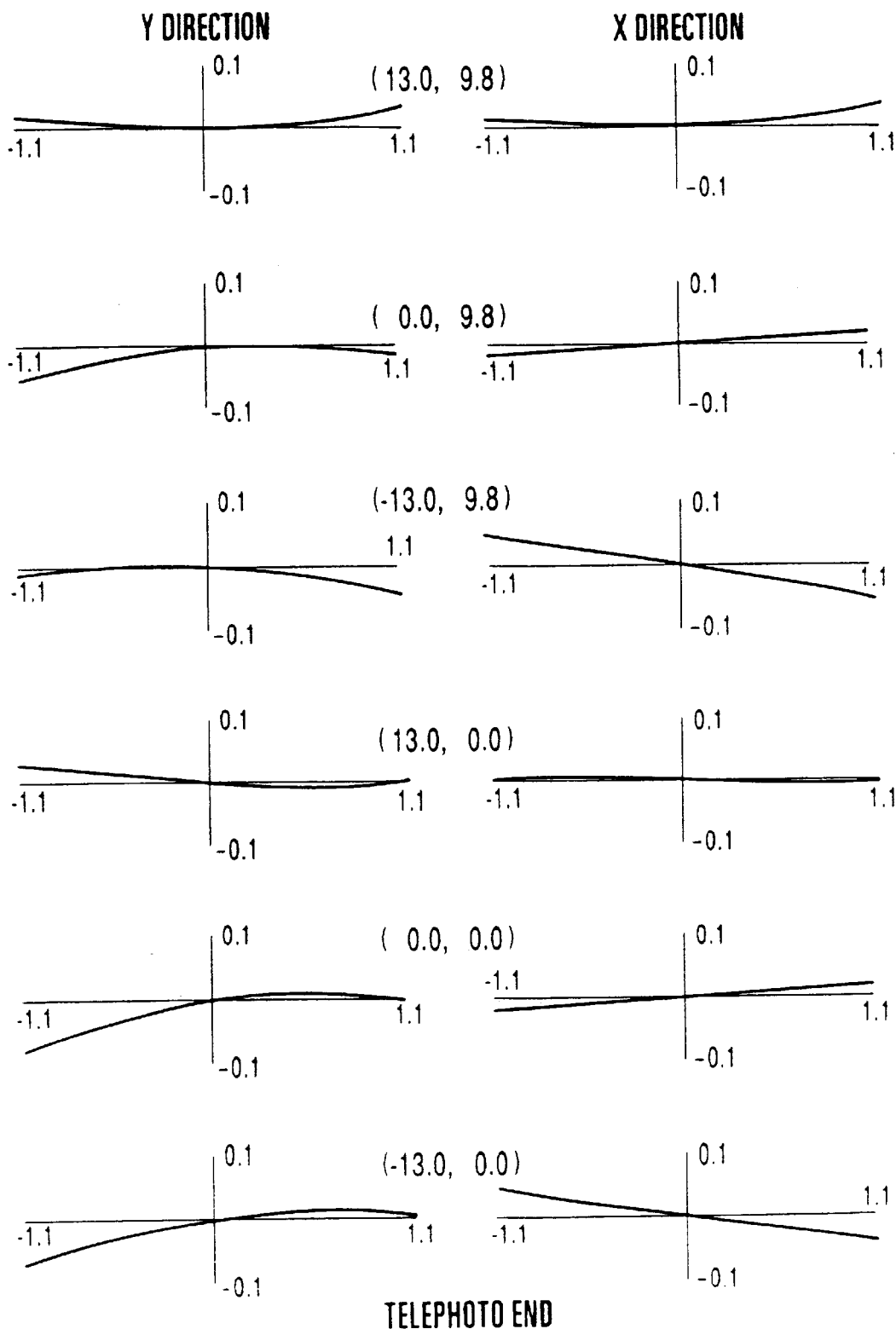
FIG. 32 shows lateral aberration charts of Embodiment 10 (telephoto end)

Each of FIGS. 30, 31 and 32 shows lateral aberration charts of the present embodiment.

Embodiment 11

FIG. 33 is a view showing an optical cross section taken on the Y, Z plane, of Embodiment 11 of the present invention. The present embodiment is intended for an image pickup optical system which constitutes a two-group zoom lens having a magnification variation ratio of approximately 1.5×.

Constituent data for Embodiment 11 are Shown Below

|  | WIDE-ANGLE END | MIDDLE POSITION | TELEPHOTO END |
|---|---|---|---|
| HORIZONTAL HALF-ANGLE OF VIEW | 19.5 | 15.5 | 13.0 |
| VERTICAL HALF-ANGLE OF VIEW | 14.5 | 11.7 | 9.8 |
| APERTURE DIAMETER | 1.5 | 1.9 | 2.2 |

IMAGE SIZE    HORIZONTAL 4 mm × VERTICAL 3 mm
SIZE OF OPTICAL SYSTEM (X × Y × Z) = 11.6 × 24.6 × 46.0
AT WIDE-ANGLE END

| i | Yi | Zi(W) | θi | Di | Ndi | vdi |  |
|---|---|---|---|---|---|---|---|
| 1 | 0.00 | 0.00 | 0.00 | 2.74 | 1 |  | STOP |

FIRST OPTICAL ELEMENT

| 2 | 0.00 | 8.74 | 45.00 | 12.00 | 1 |  | REFLECTING SURFACE |
| 3 | −12.00 | 8.74 | 45.00 | VARIABLE | 1 |  | REFLECTING SURFACE |

SECOND OPTICAL ELEMENT

| 4 | −12.00 | −26.43 | 25.00 | 10.00 | 1 |  | REFLECTING SURFACE |
| 5 | −19.66 | −20.00 | 25.00 | VARIABLE | 1 |  | REFLECTING SURFACE |
| 6 | −19.66 | −33.00 | 0.00 | 0.00 | 1 |  | IMAGE PLANE |

|  | WIDE-ANGLE END | MIDDLE POSITION | TELEPHOTO END |
|---|---|---|---|

-continued

|  |  |  |
|---|---|---|
| D3 | 35.17 | 30.33 | 27.18 |
| D5 | 13.00 | 14.69 | 16.39 |
| D1–D3 | Zi(M) = Zi(W) − 3.14 | Zi(T) = Zi(W) − 4.60 |
| D4–D5 | Zi(M) = Zi(W) + 1.69 | Zi(T) = Zi(W) + 3.39 |
| D6 | Zi(M) = Zi(W) | Zi(T) = Zi(W) |

SPHERICAL SHAPE $R1 = \infty$
$R6 = \infty$
ASPHERICAL SHAPE

| R2 | a = 2.47149e+01 | b = −9.145020e+00 | t = 9.21754e−01 |
|---|---|---|---|
|  | $C_{20} = 0.$ | $C_{20} = 0.$ |  |
|  | $C_{03} = -5.13200e-04$ | $C_{21} = 1.92296e-03$ |  |
|  | $C_{04} = -4.03069e-05$ | $C_{22} = 1.76049e-04$ | $C_{40} = 3.06636e-04$ |
| R3 | a = 5.87463e+01 | b = 1.86088e+01 | t = 6.15169e+01 |
|  | $C_{02} = 0.$ | $C_{20} = 0.$ |  |
|  | $C_{03} = -2.89808e-05$ | $C_{21} = -2.02543e-04$ |  |
|  | $C_{04} = -4.32883e-05$ | $C_{22} = 6.17232e-05$ | $C_{40} = -1.85875e-04$ |
| R4 | a = −3.97374e+01 | b = −2.86784e+01 | t = 2.13848e+01 |
|  | $C_{02} = 0.$ | $C_{20} = 0.$ |  |
|  | $C_{03} = -1.27524e-05$ | $C_{21} = -3.53558e-05$ |  |
|  | $C_{04} = -1.29314e-06$ | $C_{22} = -3.56795e-05$ | $C_{40} = 3.20379e-06$ |
| R5 | a = 2.42672e+01 | b = −1.08103e+02 | t = 5.08828e+01 |
|  | $C_{02} = 0.$ |  | $C_{20} = 0.$ |
|  | $C_{03} = 4.41590e-04$ | $C_{21} = -2.61556e-04$ |  |
|  | $C_{04} = 2.97724e-06$ | $C_{22} = -3.79471e-05$ | $C_{40} = 5.76230e-05$ |

In the present embodiment, the first surface R1 is an aperture plane which is an entrance pupil, and the second surface R2 and the third surface R3, each of which is a reflecting surface, are formed on the first optical element B1 which is an integral optical element, while the fourth surface R4 and the fifth surface R5, each of which is a reflecting surface made from a surface mirror, constitute the second optical element B2 with the surface mirrors being integrally connected on either side. The sixth surface R6 is an image plane.

An image forming operation for an object lying at infinity will be described below. First, a light beam passes through the first surface R1 and enters the portion of the first optical element B1. In the first optical element B1, the light beam is reflected by the second surface R2 and the third surface R3 and then exits from the portion of the first optical element B1. During this time, a primary image is formed on an intermediate image forming plane near to the third surface R3.

Then, the light beam enters the portion of the second optical element B2. In the second optical element B2, the light beam is reflected by the fourth surface R4 and the fifth surface R5 and then exits from the portion of the second optical element B2. During this time, a pupil is formed in the vicinity of the fourth surface R4. The light beam which has exited from the portion of the second optical element B2 finally forms an object image on the sixth surface R6 (the image pickup surface of the image pickup medium such as a CCD).

In the present embodiment, the direction of the reference axis which enters the first optical element B1 and the direction of the reference axis which exits from the first optical element B1 are parallel to and opposite to each other.

The direction of the reference axis which enters the second optical element B2 and the direction of the reference axis which exits from the second optical element B2 are parallel to and the same as each other.

A magnification varying operation effected by the movements of the respective optical elements will be described below. During variation of magnification, the first optical element B1 moves in the Z minus direction from the wide-angle end toward the telephoto end. The second optical element B2 moves in the Z plus direction from the wide-angle end toward the telephoto end. The sixth surface R6 which is the image plane does not move during the variation of magnification. Thus, when the variation of magnification from the wide-angle end toward the telephoto end is effected, the distance between the first optical element B1 and the second optical element B2 is decreased, whereas the distance between the second optical element B2 and the image plane R6 is increased.

Figure 34:
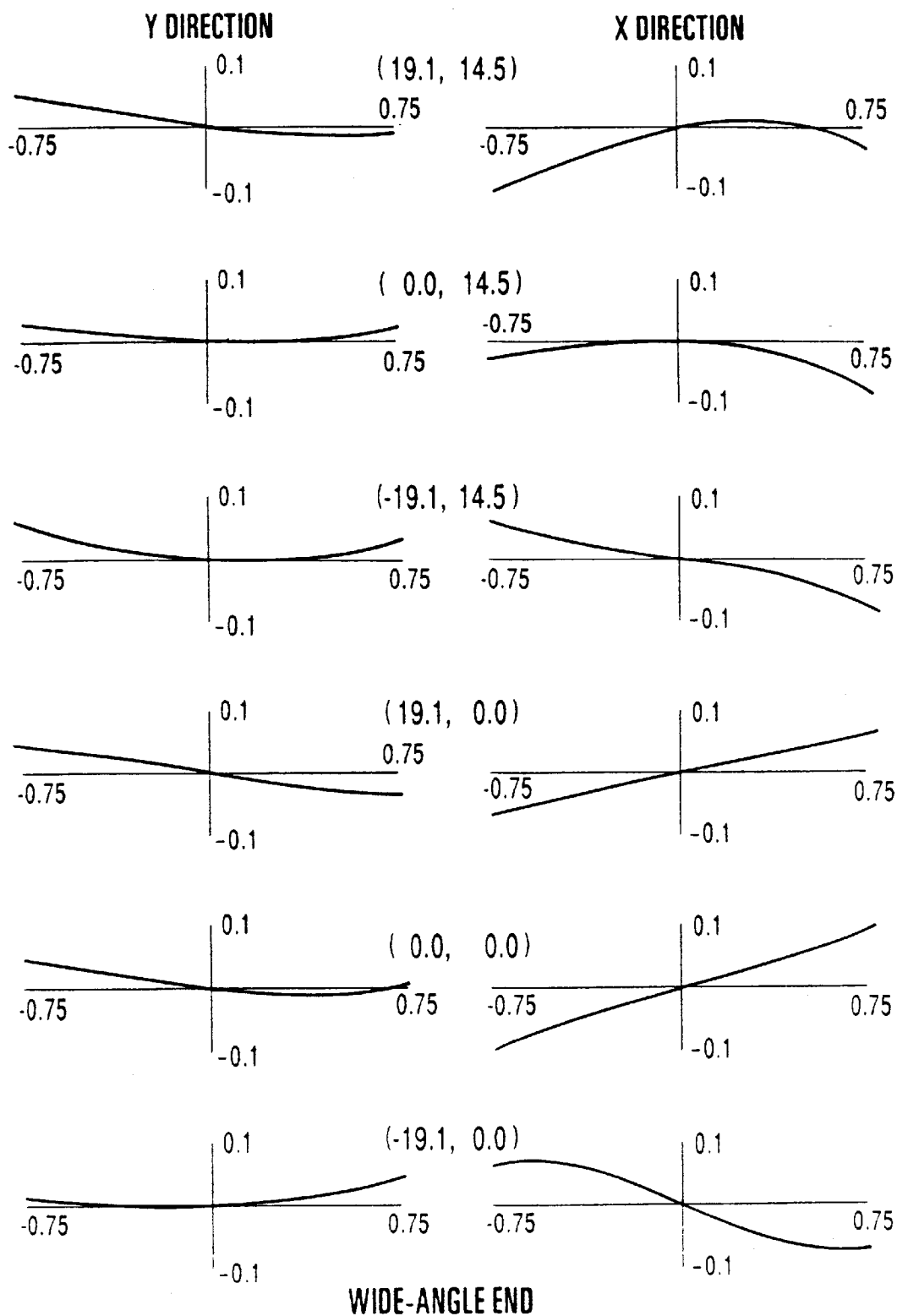
FIG. 34 shows lateral aberration charts of Embodiment 11 (wide-angle end)
Figure 35:
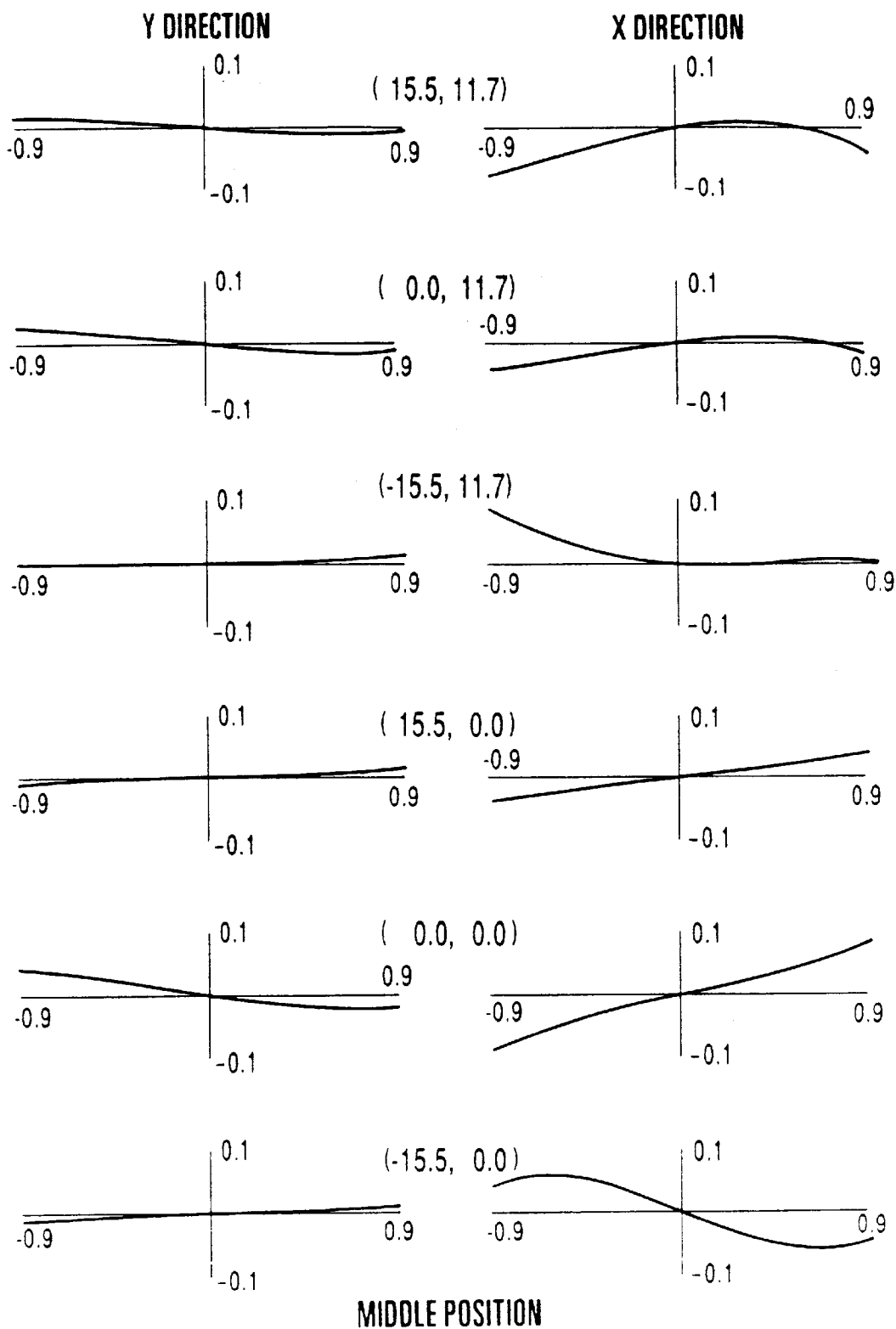
FIG. 35 shows lateral aberration charts of Embodiment 11 (middle position)
Figure 36:
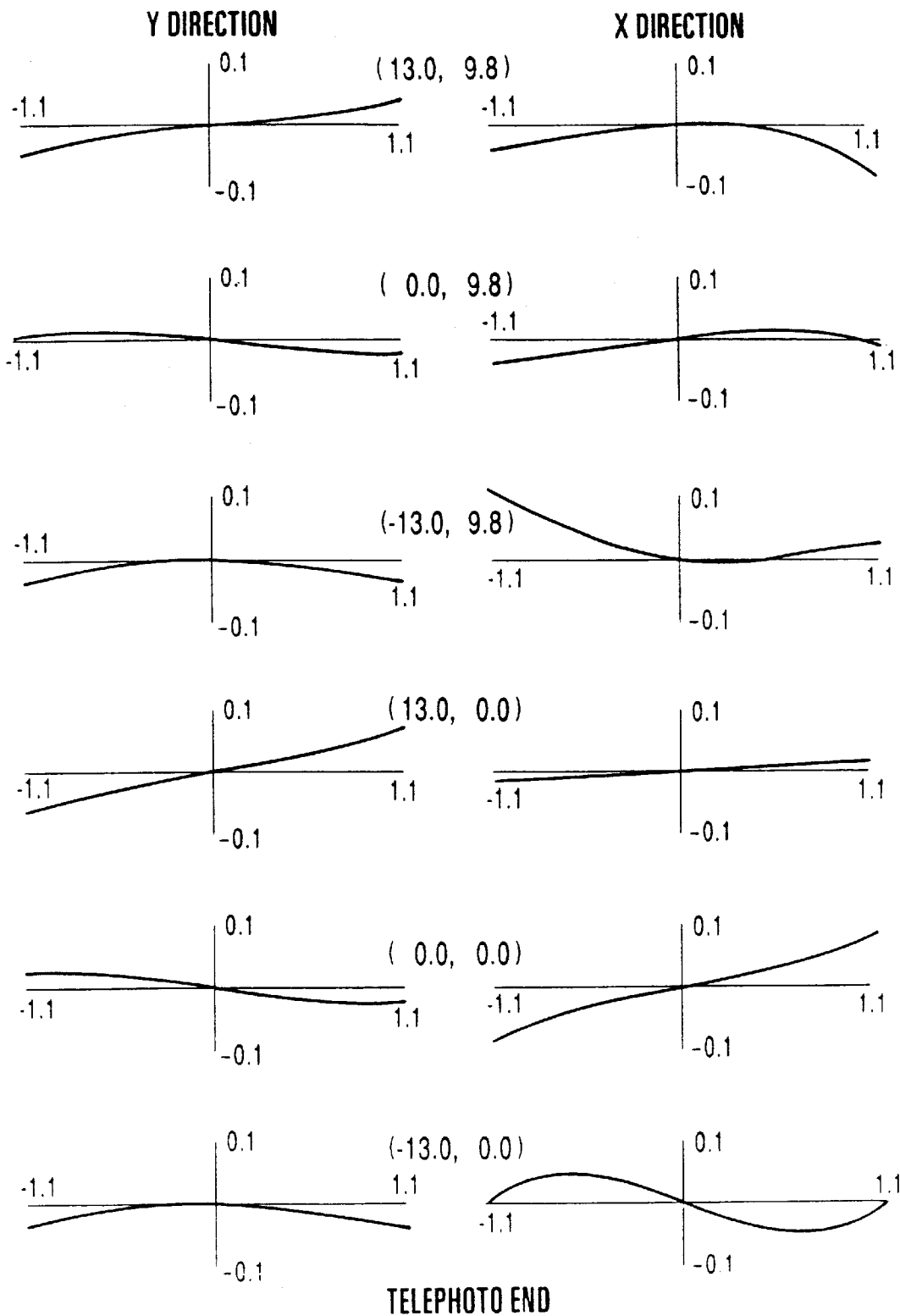
FIG. 36 shows lateral aberration charts of Embodiment 11 (telephoto end)

Each of FIGS. 34, 35 and 36 shows lateral aberration charts of the present embodiment.

Embodiment 12

Figure 37:
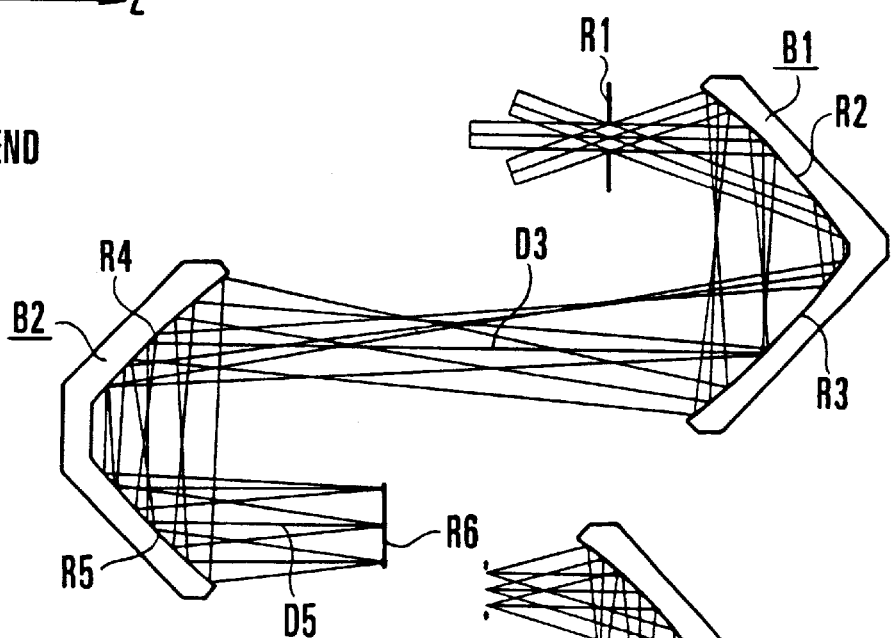
FIG. 37 is a view showing an optical cross section taken on the Y, Z plane, of Embodiment 12 of the present invention.

FIG. 37 is a view showing an optical cross section taken on the Y, Z plane, of Embodiment 12 of the present invention. The present embodiment is intended for an image pickup optical system which constitutes a two-group zoom lens having a magnification variation ratio of approximately 1.5×.

Constituent Data for Embodiment 12 are Shown Below

|  | WIDE-ANGLE END | MIDDLE POSITION | TELEPHOTO END |
|---|---|---|---|
| HORIZONTAL HALF-ANGLE OF VIEW | 19.1 | 15.5 | 13.0 |
| VERTICAL HALF-ANGLE OF VIEW | 14.5 | 11.7 | 9.8 |
| APERTURE DIAMETER | 1.5 | 1.9 | 2.2 |

IMAGE SIZE     HORIZONTAL 4 mm × VERTICAL 3 mm
SIZE OF OPTICAL SYSTEM (X × Y × Z) = 8.2 × 28.1 × 42.0
AT WIDE-ANGLE END

| i | Yi | Zi(W) | θi | Di | Ndi | νdi |  |
|---|---|---|---|---|---|---|---|
| 1 | 0.00 | 0.00 | 0.00 | 2.74 | 1 |  | STOP |

FIRST OPTICAL ELEMENT

| i | Yi | Zi(W) | θi | Di | Ndi | | |
|---|---|---|---|---|---|---|---|
| 2 | 0.00 | 8.74 | 45.00 | 12.00 | 1 | | REFLECTING SURFACE |
| 3 | −12.00 | 8.74 | 45.00 | VARIABLE | 1 | | REFLECTING SURFACE |

SECOND OPTICAL ELEMENT

| i | Yi | Zi(W) | θi | Di | Ndi | | |
|---|---|---|---|---|---|---|---|
| 4 | −12.00 | −25.97 | 45.00 | 10.00 | 1 | | REFLECTING SURFACE |
| 5 | −22.00 | −25.97 | 45.00 | VARIABLE | 1 | | REFLECTING SURFACE |
| 6 | −22.00 | −12.97 | 0.00 | 0.00 | 1 | | IMAGE PLANE |

|  | WIDE-ANGLE END | MIDDLE POSITION | TELEPHOTO END |
|---|---|---|---|
| D3 | 34.71 | 29.12 | 25.68 |
| D5 | 13.00 | 14.42 | 15.83 |
| D1–D3 | Zi(M) = Zi(W) − 7.01 | Zi(T) = Zi(W) − 11.86 | |
| D4–D5 | Zi(M) = Zi(W) −1.42 | Zi(T) = Zi(W) − 2.83 | |
| D6 | Zi(M) = Zi(W) | Zi(T) = Zi(W) | |

SPHERICAL SHAPE $R1 = \infty$
$R6 = \infty$

ASPHERICAL SHAPE

R2  $a = -2.98091e+02$     $b = -1.25116e+01$     $t = -3.22288e+01$
    $C_{02} = 0.$          $C_{20} = 0.$
    $C_{03} = -6.41930e-04$  $C_{21} = 1.35323e-05$
    $C_{04} = -1.62835e-05$  $C_{22} = 6.79248e-05$   $C_{40} = 3.50376e-06$

R3  $a = 4.88259e+02$      $b = 1.73371e-01$      $t = 3.87170e+01$
    $C_{02} = 0.$          $C_{20} = 0.$
    $C_{03} = -2.42094e-04$  $C_{21} = 7.00094e-05$
    $C_{04} = -3.43767e-05$  $C_{22} = 4.19720e-05$   $C_{40} = -6.81038e-05$

R4  $a = -5.16839e+01$     $b = -3.34488e+01$     $t = 3.15288e+01$
    $C_{02} = 0.$          $C_{20} = 0.$
    $C_{03} = 4.95963e-05$  $C_{21} = 3.61954e-04$
    $C_{04} = 9.13275e-06$  $C_{22} = 5.58245e-05$   $C_{40} = 2.28780e-05$

R5  $a = 2.06473e+01$      $b = -2.56460e+02$     $t = 6.09634e+01$
    $C_{02} = 0.$          $C_{20} = 0.$
    $C_{03} = 2.56862e-04$  $C_{21} = 4.12449e-04$
    $C_{04} = -1.87665e-06$  $C_{22} = 2.35916e-05$   $C_{40} = 2.75677e-06$

In the present embodiment, the first surface R1 is an aperture plane which is an entrance pupil, and the second surface R2 and the third surface R3, each of which is a surface mirror, are formed on the first optical element B1, while the fourth surface R4 and the fifth surface R5, each of which is a surface mirror, are formed on the second optical element B2. The sixth surface R6 is an image plane.

An image forming operation for an object lying at infinity will be described below. First, a light beam passes through the first surface R1 and enters the portion of the first optical element B1. In the first optical element B1, the light beam is reflected by the second surface R2 and the third surface R3 and then exits from the portion of the first optical element B1. During this time, a primary image is formed on an intermediate image forming plane near to the third surface R3.

Then, the light beam enters the portion of the second optical element B2. In the second optical element B2, the light beam is reflected by the fourth surface R4 and the fifth surface R5 and then exits from the portion of the second optical element B2. During this time, a pupil is formed in the vicinity of the fourth surface R4. The light beam which has exited from the portion of the second optical element B2 finally forms an object image on the sixth surface R6 (the image pickup surface of the image pickup medium such as a CCD).

In the present embodiment, the direction of the reference axis which enters the first optical element B1 and the direction of the reference axis which exits from the first optical element B1 are parallel to and opposite to each other. The direction of the reference axis which enters the second optical element B2 and the direction of the reference axis which exits from the second optical element B2 are parallel to and opposite to each other.

A magnification varying operation effected by the movements of the respective optical elements will be described below. During variation of magnification, the first optical element B1 moves in the Z minus direction from the wide-angle end toward the telephoto end. The second optical element B2 moves in the Z minus direction from the wide-angle end toward the telephoto end. The sixth surface R6 which is the image plane does not move during the variation of magnification. Thus, when the variation of magnification from the wide-angle end toward the telephoto end is effected, the distance between the first optical element B1 and the second optical element B2 is decreased, whereas the distance between the second optical element B2 and the image plane R6 is increased.

Figure 38:
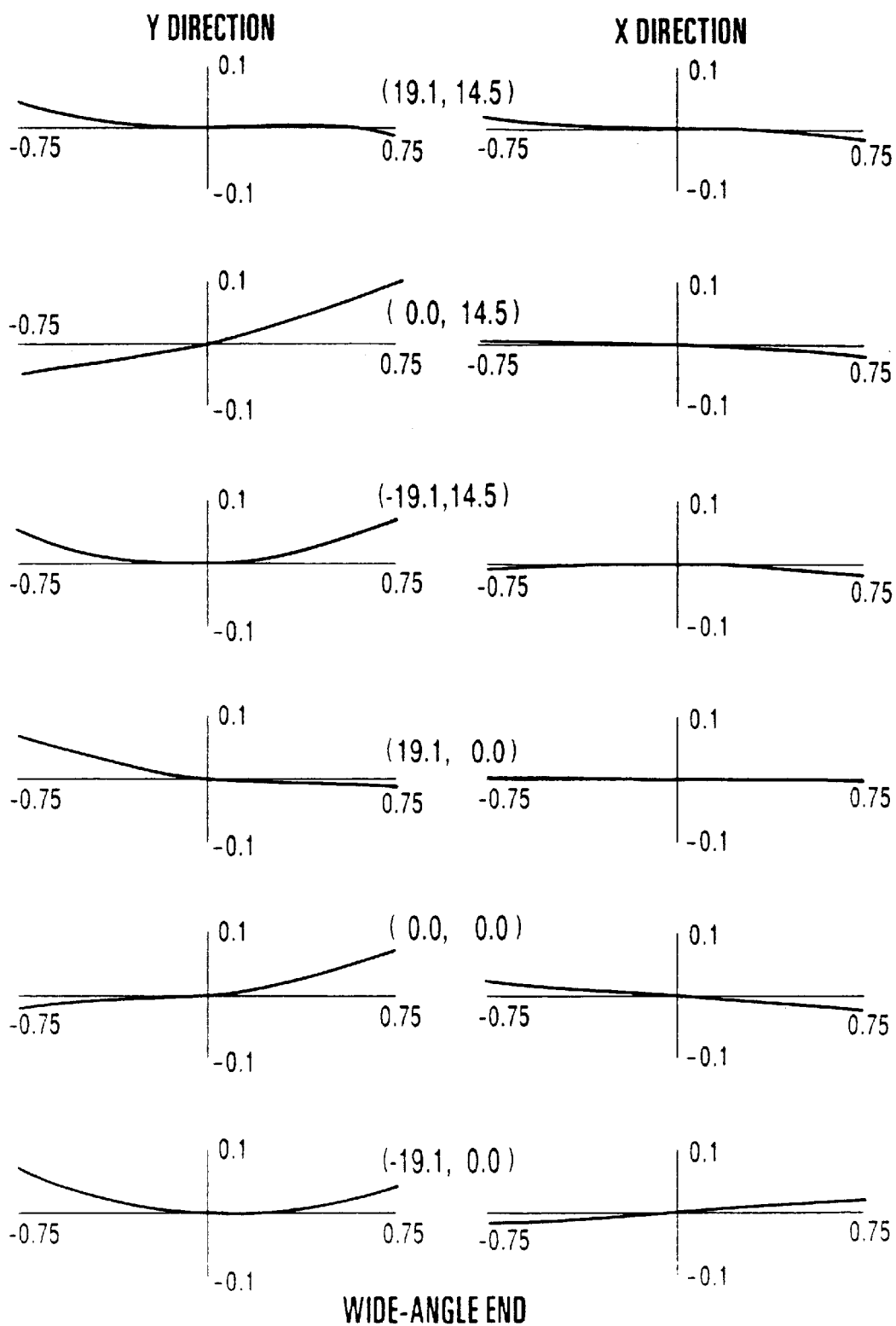
FIG. 38 shows lateral aberration charts of Embodiment 12 (wide-angle end)
Figure 39:
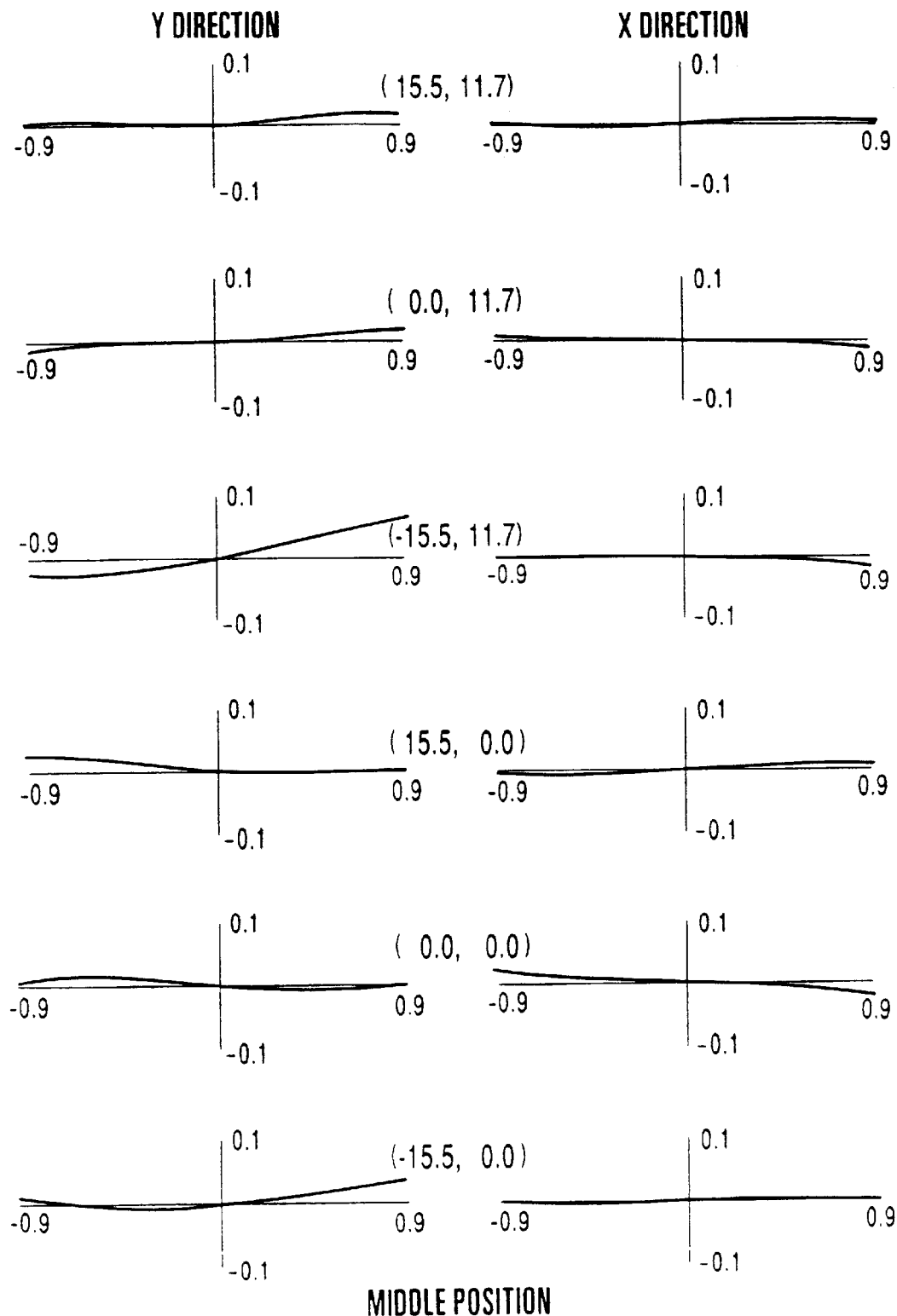
FIG. 39 shows lateral aberration charts of Embodiment 12 (middle position)
Figure 40:
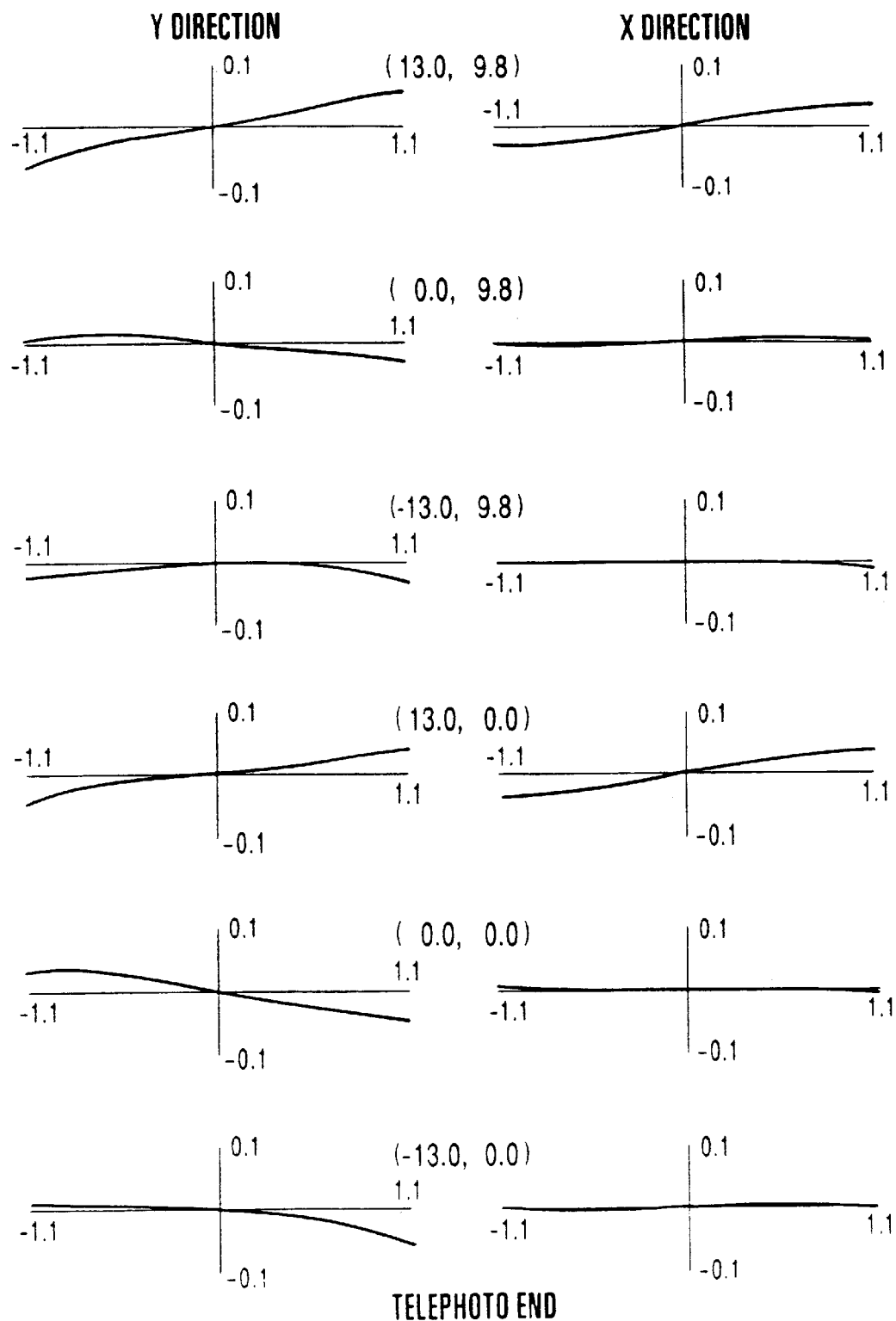
FIG. 40 shows lateral aberration charts of Embodiment 12 (telephoto end)

Each of FIGS. 38, 39 and 40 shows lateral aberration charts of the present embodiment.

Embodiments 13 to 16 are intended for so-called three-group zoom lenses.

Embodiment 13

FIG. 41 is a view showing an optical cross section taken on the Y, Z plane, of Embodiment 13 of the present invention. The present embodiment is intended for an image pickup optical system which constitutes a three-group zoom lens having a magnification variation ratio of approximately 2×.

Constituent Data for Embodiment 13 are Shown Below

|  | WIDE-ANGLE END | MIDDLE POSITION | TELEPHOTO END |
|---|---|---|---|
| HORIZONTAL HALF-ANGLE OF VIEW | 26.0 | 20.1 | 13.7 |
| VERTICAL HALF-ANGLE OF VIEW | 20.0 | 15.3 | 10.3 |
| APERTURE DIAMETER | 2.0 | 2.5 | 3.0 |

IMAGE SIZE    HORIZONTAL 8 mm × VERTICAL 6 imu
SIZE OF OPTICAL SYSTEM (X × Y × Z) = 11.4 × 37.0 × 65.8
AT WIDE-ANGLE END

| i | Yi | Zi(W) | θi | Di | Ndi | νdi |  |
|---|---|---|---|---|---|---|---|
| 1 | 0.00 | 0.00 | 0.00 | 5.00 | 1 |  | STOP |

FIRST OPTICAL ELEMENT

| i | Yi | Zi(W) | θi | Di | Ndi | νdi |  |
|---|---|---|---|---|---|---|---|
| 2 | 0.00 | 5.00 | 0.00 | 5.00 | 1.51633 | 64.15 | REFRACTING SURFACE |
| 3 | 0.00 | 10.00 | 28.00 | 8.94 | 1.51633 | 64.15 | REFLECTING SURFACE |
| 4 | −7.41 | 5.00 | 0.00 | 14.00 | 1.51633 | 64.15 | TOTAL REFLECTING SURFACE |
| 5 | −19.02 | 12.83 | 0.00 | 8.94 | 1.51633 | 64.15 | TOTAL REFLECTING SURFACE |
| 6 | −26.43 | 7.83 | 28.00 | 5.00 | 1.51633 | 64.15 | REFLECTING SURFACE |
| 7 | −26.43 | 12.83 | 0.00 | VARIABLE | 1 |  | REFRACTING SURFACE |

SECOND OPTICAL ELEMENT

| i | Yi | Zi(W) | θi | Di | Ndi | νdi |  |
|---|---|---|---|---|---|---|---|
| 8 | −26.43 | 22.23 | 0.00 | 5.00 | 1.51633 | 64.15 | REFRACTING SURFACE |
| 9 | −26.43 | 27.23 | −28.00 | 8.94 | 1.51633 | 64.15 | REFLECTING SURFACE |
| 10 | −19.02 | 22.23 | 0.00 | 14.00 | 1.51633 | 64.15 | TOTAL REFLECTING SURFACE |
| 11 | −7.41 | 30.06 | 0.00 | 8.94 | 1.51633 | 64.15 | TOTAL REFLECTING SURFACE |
| 12 | 0.00 | 25.06 | −28.00 | 5.00 | 1.51633 | 64.15 | REFLECTING SURFACE |
| 13 | 0.00 | 30.06 | 0.00 | VARIABLE | 1 |  | REFRACTING SURFACE |

THIRD OPTICAL ELEMENT

| i | Yi | Zi(W) | θi | Di | Ndi | νdi |  |
|---|---|---|---|---|---|---|---|
| 14 | −0.00 | 45.61 | 0.00 | 5.00 | 1.51633 | 64.15 | REFRACTING SURFACE |
| 15 | −0.00 | 50.61 | 28.00 | 8.94 | 1.51633 | 64.15 | REFLECTING SURFACE |
| 16 | −7.41 | 45.61 | 0.00 | 14.00 | 1.51633 | 64.15 | TOTAL REFLECTING SURFACE |
| 17 | −19.02 | 53.44 | 0.00 | 8.94 | 1.51633 | 64.15 | TOTAL REFLECTING SURFACE |

-continued

| 18 | −26.43 | 48.44 | 28.00 | 5.00 | 1.51633 | 64.15 | REFLECTING SURFACE |
| 19 | −26.43 | 53.44 | 0.00 | VARIABLE | 1 | | REFRACTING SURFACE |
| 20 | −26.43 | 65.84 | 0.00 | 0.00 | 1 | | IMAGE PLANE |

| | WIDE-ANGLE END | MIDDLE POSITION | TELEPHOTO END |
|---|---|---|---|
| D7 | 9.40 | 11.15 | 8.46 |
| D13 | 15.55 | 8.58 | 2.43 |
| D19 | 12.40 | 17.63 | 26.47 |
| D1–D7 | Zi(M) = Zi(W) | | Zi(T) = Zi(W) |
| D8–D13 | Zi(M) = Zi(W) + 1.75 | | Zi(T) = Zi(W) − 0.94 |
| D14–D27 | Zi(M) = Zi(W) − 5.22 | | Zi(T) = Zi(W) − 14.06 |
| D20 | Zi(M) = Zi(W) | | Zi(T) = Zi(W) |

SPHERICAL SHAPE $R1 = \infty$
$R2 = \infty$
$R4 = \infty$
$R5 = \infty$
$R7 = \infty$
$R8 = \infty$
$R10 = \infty$
$R11 = \infty$
$R13 = \infty$
$R14 = \infty$
$R16 = \infty$
$R17 = \infty$
$R19 = \infty$
$R20 = \infty$

ASPHERICAL SHAPE

| R3 | $a = \infty$ | $b = \infty$ | $t = 0.$ |
| | $C_{02} = 1.71821e-02$ | $C_{20} = -2.64466e-02$ | |
| | $C_{03} = -1.10859e-04$ | $C_{21} = -3.08647e-06$ | |
| | $C_{04} = -7.44756e-06$ | $C_{22} = -8.73792e-05$ | $C_{40} = -7.07245e-06$ |
| R6 | $a = \infty$ | $b = \infty$ | $t = 0.$ |
| | $C_{02} = 9.25173e-03$ | $C_{20} = 1.06374e-02$ | |
| | $C_{03} = 1.06641e-04$ | $C_{21} = -1.75379e-04$ | |
| | $C_{04} = 1.00577e-07$ | $C_{22} = -7.09789e-06$ | $C_{40} = -1.11339e-05$ |
| R9 | $a = \infty$ | $b = \infty$ | $t = 0.$ |
| | $C_{02} = -9.25352e-03$ | $C_{20} = -7.71705e-03$ | |
| | $C_{03} = -1.27415e-04$ | $C_{21} = 2.24577e-04$ | |
| | $C_{04} = -2.04074e-06$ | $C_{22} = 9.85041e-06$ | $C_{40} = -4.54405e-06$ |
| R12 | $a = \infty$ | $b = \infty$ | $t = 0.$ |
| | $C_{02} = 1.07705e-02$ | $C_{20} = 2.85032e-03$ | |
| | $C_{03} = 6.49026e-06$ | $C_{21} = -4.04876e-04$ | |
| | $C_{04} = 1.78001e-05$ | $C_{22} = -3.44175e-06$ | $C_{40} = 2.28114e-06$ |
| R15 | $a = \infty$ | $b = \infty$ | $t = 0.$ |
| | $C_{02} = -6.89123e-03$ | $C_{20} = -8.823606e-03$ | |
| | $C_{03} = 2.19277e-05$ | $C_{21} = 9.35962e-05$ | |
| | $C_{04} = -4.51558e-07$ | $C_{22} = -3.39663e-06$ | $C_{40} = 5.46067e-06$ |
| R18 | $a = \infty$ | $b = \infty$ | $t = 0.$ |
| | $C_{02} = 8.38005e-03$ | $C_{20} = 1.59192e-02$ | |
| | $C_{03} = -2.38916e-06$ | $C_{21} = -7.12086e-04$ | |
| | $C_{04} = -2.19374e-06$ | $C_{22} = 1.69386e-05$ | $C_{40} = 5.50667e-06$ |

In the present embodiment, the first surface R1 is an aperture plane which is an entrance pupil, and the second surface R2 to the seventh surface R7, the eighth surface R8 to a thirteenth surface R13, and a fourteenth surface R14 to a nineteenth surface R19 respectively constitute the first optical element B1, the second optical element B2 and the third optical element B3 each of which is an integral optical element. A twentieth surface R20 is an image plane.

An image forming operation for an object lying at infinity will be described below. First, a light beam passes through the first surface R1 and enters the first optical element B1. In the first optical element B1, the light beam is refracted by the second surface R2, then reflected by the third surface R3, then totally reflected by the fourth surface R4 and the fifth surface R5, then reflected by the sixth surface R6, then refracted by the seventh surface R7, and then exits from the first optical element B1. The second surface R2 and the fourth surface R4 are formed as the same surface which serves as both a refracting surface and a total reflecting surface, and the fifth surface R5 and the seventh surface R7 are also similarly formed. The light beam forms an intermediate image between the fourth surface R4 and the fifth surface R5.

Then, the light beam enters the second optical element B2. In the second optical element B2, the light beam is refracted by the eighth surface R8, then reflected by the ninth surface R9, then totally reflected by the tenth surface R10 and the eleventh surface R11, then reflected by the twelfth surface R12, then refracted by the thirteenth surface R13, and then exits from the second optical element B2. The eighth surface R8 and the tenth surface R10 are formed as the same surface which serves as both a refracting surface and a total reflecting surface, and the eleventh surface R11 and the thirteenth surface R13 are also similarly formed. The light beam forms an intermediate image in the vicinity of the twelfth surface R12.

Then, the light beam enters the third optical element B3. In the third optical element B3, the light beam is refracted by the fourteenth surface R14, then reflected by the fifteenth surface R15, then totally reflected by the sixteenth surface R16 and the seventeenth surface R17, then reflected by the eighteenth surface R18, then refracted by the nineteenth surface R19, and then exits from the third optical element B3. The fourteenth surface R14 and the sixteenth surface R16 are formed as the same surface which serves as both a refracting surface and a total reflecting surface, and the seventeenth surface R17 and the nineteenth surface R19 are also similarly formed. The light beam forms an intermediate image between the fifteenth surface R15 and the sixteenth surface R16.

The light beam which has exited from the third optical element B3 forms an object image on the final image forming surface R20 (the image pickup surface of the image pickup medium such as a CCD).

A magnification varying operation effected by the movements of the respective optical elements will be described below. During variation of magnification, the first optical element B1 is fixed. The second optical element B2 moves along a convex locus in the Z plus direction from the wide-angle end toward the telephoto end. The third optical element B3 moves in the Z minus direction from the wide-angle end toward the telephoto end. The twentieth surface R20 which is the image plane does not move during the variation of magnification.

Incidentally, during the variation of magnification from the wide-angle end to the telephoto end, the entire length of the optical path from the first surface R1 to the final image forming surface R20 is constant.

In the present embodiment, the direction of the reference axis which enters each of the three optical elements and the direction of the reference axis which exits from each of the three optical elements are parallel to and the same as each other.

Figure 43:
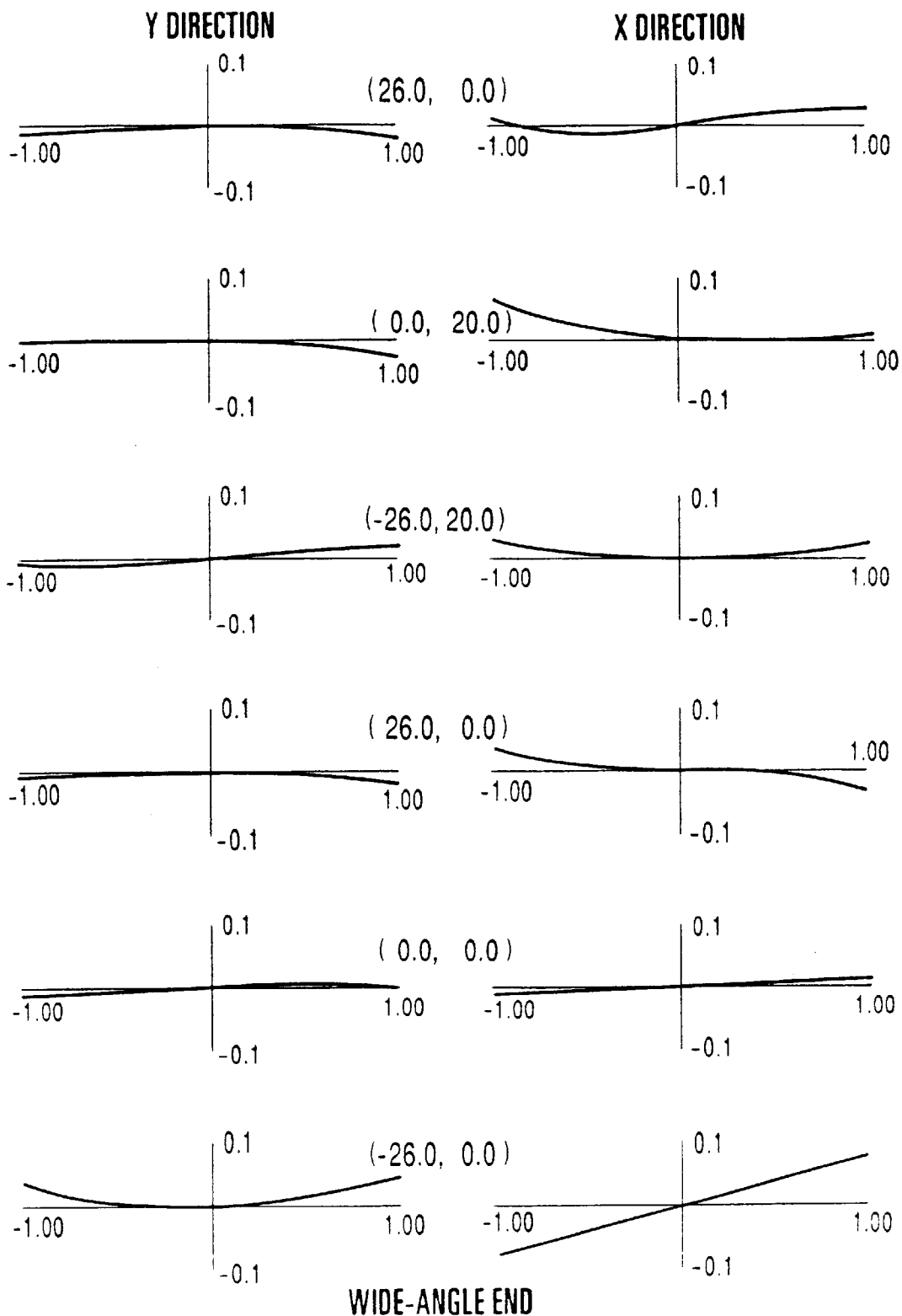
FIG. 43 shows lateral aberration charts of Embodiment 13 (wide-angle end)
Figure 44:
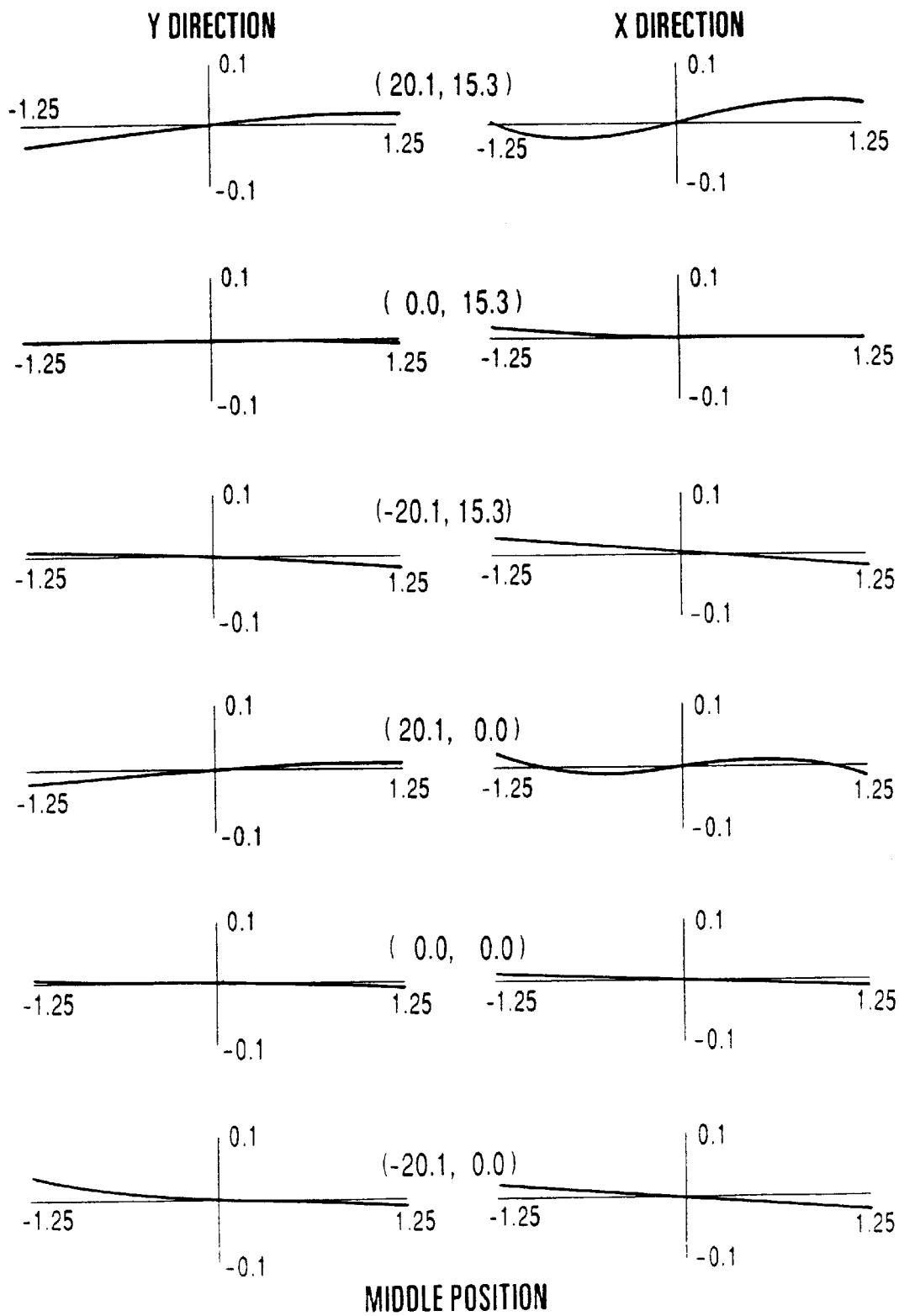
FIG. 44 shows lateral aberration charts of Embodiment 13 (middle position)
Figure 45:
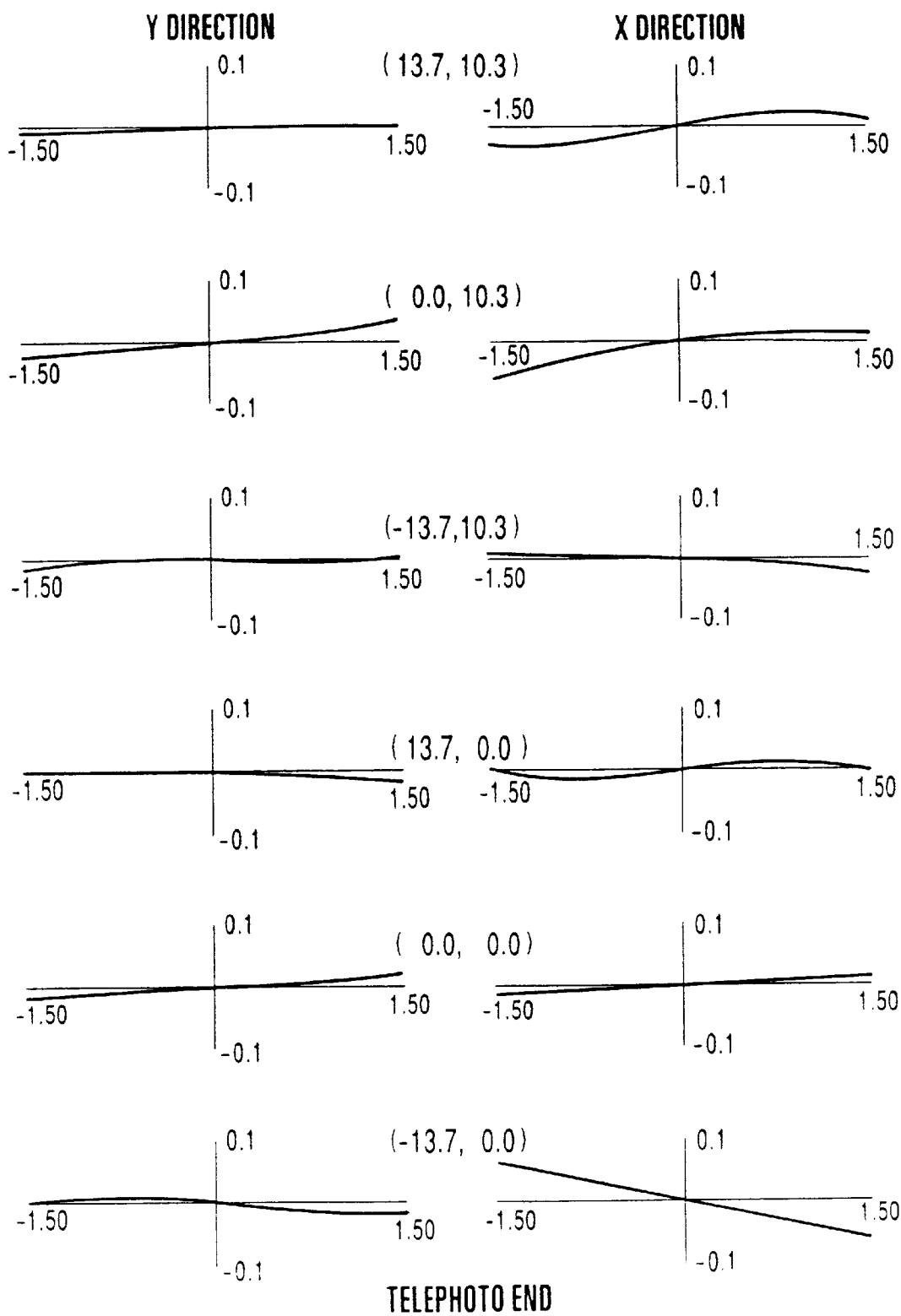
FIG. 45 shows lateral aberration charts of Embodiment 13 (telephoto end)

Each of FIGS. 43, 44 and 45 shows lateral aberration charts of the present embodiment. In the present embodiment, as can be seen from the figures, balanced aberration correction is achieved at each focal length.

In addition, in the case of the present embodiment, the overall dimensions of the optical system are approximately 65.8 mm long×37 mm wide×11.4 mm thick for an image size of 8 mm×6 mm. Similarly to the above-described embodiments, in the present embodiment as well, because the optical system has a small thickness and each of the optical elements can be constructed by forming reflecting surfaces on predetermined sides of a plate-shaped block as shown in FIG. 42, it is possible to readily construct a zoom lens which is thin as a whole, by adopting an arrangement which causes two of three optical elements mounted on one base plate to move along a surface of the base plate.

Embodiment 14

FIG. 46 is a view showing an optical cross section taken on the Y, Z plane, of Embodiment 14 of the present invention. The present embodiment is intended for an image pickup optical system which constitutes a three-group zoom lens having a magnification variation ratio of approximately 2×.

Constituent Data for Embodiment 14 are Shown Below

|  | WIDE-ANGLE END | MIDDLE POSITION | TELEPHOTO END |
|---|---|---|---|
| HORIZONTAL HALF-ANGLE OF VIEW | 26.0 | 20.1 | 13.7 |
| VERTICAL HALF-ANGLE OF VIEW | 20.0 | 15.3 | 10.3 |
| APERTURE DIAMETER | 2.0 | 2.5 | 3.0 |

IMAGE SIZE     HORIZONTAL 8 mm x VERTICAL 6 mm
SIZE OF OPTICAL SYSTEM (X x Y x Z) = 11.8 x 57.7 x 53.1

| i | Yi | Zi(W) | θi | Di | Ndi | vdi | AT WIDE-ANGLE END |
|---|---|---|---|---|---|---|---|
| 1 | 0.00 | 0.00 | 0.00 | 5.00 | 1 | | STOP |

FIRST OPTICAL ELEMENT

| i | Yi | Zi(W) | θi | Di | Ndi | vdi | |
|---|---|---|---|---|---|---|---|
| 2 | 0.00 | 5.00 | 0.00 | 5.00 | 1.51633 | 64.15 | REFRACTING SURFACE |
| 3 | 0.00 | 10.00 | 28.00 | 8.94 | 1.51633 | 64.15 | REFLECTING SURFACE |
| 4 | 7.41 | 5.00 | 0.00 | 14.00 | 1.51633 | 64.15 | TOTAL REFLECTING SURFACE |
| 5 | 19.02 | 12.83 | 0.00 | 8.94 | 1.51633 | 64.15 | TOTAL REFLECTING SURFACE |
| 6 | 26.43 | 7.83 | 28.00 | 5.00 | 1.51633 | 64.15 | REFLECTING SURFACE |
| 7 | 26.43 | 12.83 | 0.00 | VARIABLE | 1 | | REFRACTING SURFACE |

SECOND OPTICAL ELEMENT

| i | Yi | Zi(W) | θi | Di | Ndi | vdi | |
|---|---|---|---|---|---|---|---|
| 8 | −26.43 | 18.39 | 0.00 | 5.00 | 1.51633 | 64.15 | REFRACTING SURFACE |
| 9 | −26.43 | 23.39 | −28.00 | 8.94 | 1.51633 | 64.15 | REFLECTING SURFACE |

-continued

| | | | | | | |
|---|---|---|---|---|---|---|
| 10 | −19.02 | 18.39 | 0.00 | 14.00 | 1.51633 | 64.15 TOTAL REFLECTING SURFACE |
| 11 | 7.41 | 26.22 | 0.00 | 8.94 | 1.51633 | 64.15 TOTAL REFLECTING SURFACE |
| 12 | 0.00 | 21.22 | −28.00 | 5.00 | 1.51633 | 64.15 REFLECTING SURFACE |
| 13 | 0.00 | 26.22 | 0.00 | VARIABLE | 1 | REFRACTING SURFACE |

THIRD OPTICAL ELEMENT

| | | | | | | |
|---|---|---|---|---|---|---|
| 14 | 0.00 | 42.19 | 0.00 | 7.00 | 1.51633 | 64.15 REFRACTING SURFACE |
| 15 | 0.00 | 49.19 | −28.00 | 12.52 | 1.51633 | 64.15 REFLECTING SURFACE |
| 16 | 10.38 | 42.19 | 0.00 | 12.52 | 1.51633 | 64.15 TOTAL REFLECTING SURFACE |
| 17 | 20.76 | 49.19 | 28.00 | 7.00 | 1.51633 | 64.15 REFLECTING SURFACE |
| 18 | 20.76 | 42.19 | 0.00 | VARIABLE | 1 | REFRACTING SURFACE |
| 19 | 20.76 | 30.28 | 0.00 | 0.00 | 1 | IMAGE PLANE |

| | WIDE-ANGLE END | MIDDLE POSITION | TELEPHOTO END |
|---|---|---|---|
| D7 | 5.56 | 14.76 | 30.43 |
| D13 | 15.98 | 10.88 | 5.31 |
| D18 | 11.91 | 16.01 | 26.12 |
| D1–D7 | $Zi(M) = Zi(W)$ | | $Zi(T) = Zi(W)$ |
| D8–D13 | $Zi(M) = Zi(W) + 9.20$ | | $Zi(T) = Zi(W) + 24.87$ |
| D14–D18 | $Zi(M) = Zi(W) + 4.10$ | | $Zi(T) = Zi(W) + 14.21$ |
| D19 | $Zi(M) = Zi(W)$ | | $Zi(T) = Zi(W)$ |

SPHERICAL SHAPE $R1 = \infty$
$R2 = \infty$
$R4 = \infty$
$R5 = \infty$
$R7 = \infty$
$R8 = \infty$
$R10 = \infty$
$R11 = \infty$
$R13 = \infty$
$R14 = \infty$
$R16 = \infty$
$R18 = \infty$
$R19 = \infty$

ASPHERICAL SHAPE

| | | | |
|---|---|---|---|
| R3 | $a = \infty$ | $b = \infty$ | $t = 0.$ |
| | $C_{02} = -1.87643e-02$ | $C_{20} = -3.34111e-02$ | |
| | $C_{03} = 1.42969e-05$ | $C_{21} = -3.38035e-04$ | |
| | $C_{04} = -1.49633e-05$ | $C_{22} = -1.70482e-05$ | $C_{40} = -2.85715e-05$ |
| R6 | $a = \infty$ | $b = \infty$ | $t = 0.$ |
| | $C_{02} = 1.03027e-02$ | $C_{20} = 1.02387e-02$ | |
| | $C_{03} = 1.15021e-04$ | $C_{21} = 1.51064e-04$ | |
| | $C_{04} = 8.03984e-07$ | $C_{22} = 1.48807e-05$ | $C_{40} = 1.18655e-06$ |
| R9 | $a = \infty$ | $b = \infty$ | $t = 0.$ |
| | $C_{02} = -7.36823e-03$ | $C_{20} = -6.07848e-03$ | |
| | $C_{03} = -9.76247e-05$ | $C_{21} = -6.77552e-05$ | |
| | $C_{04} = -1.94029e-07$ | $C_{22} = -1.34043e-07$ | $C_{40} = -1.60895e-07$ |
| R12 | $a = \infty$ | $b = \infty$ | $t = 0.$ |
| | $C_{02} = 1.57404e-02$ | $C_{20} = 2.44694e-03$ | |
| | $C_{03} = -7.66458e-06$ | $C_{21} = 5.12655e-04$ | |
| | $C_{04} = 4.46711e-06$ | $C_{22} = 2.53773e-06$ | $C_{40} = 1.17538e-06$ |
| R15 | $a = \infty$ | $b = \infty$ | $t = 0.$ |
| | $C_{02} = -7.52914e-03$ | $C_{20} = -6.13092e-03$ | |
| | $C_{03} = 2.44469e-05$ | $C_{21} = -7.04107e-04$ | |
| | $C_{04} = 4.29594e-06$ | $C_{22} = 4.27184e-05$ | $C_{40} = 9.99696e-05$ |
| R17 | $a = \infty$ | $b = \infty$ | $t = 0.$ |
| | $C_{02} = -7.43703e-03$ | $C_{20} = -1.85311e-02$ | |
| | $C_{03} = 1.19422e-05$ | $C_{20} = 3.37547e-05$ | |
| | $C_{04} = 1.54082e-06$ | $C_{22} = -7.409208e-06$ | $C_{40} = 1.36401e-06$ |

In the present embodiment shown in FIG. 46, the first surface R1 is an aperture plane which is an entrance pupil, and the second surface R2 to the seventh surface R7, the eighth surface R8 to the thirteenth surface R13, and the fourteenth surface R14 to the eighteenth surface R18 respectively constitute the first optical element B1, the second optical element B2 and the third optical element B3 each of which is an integral optical element. The nineteenth surface R19 is an image plane.

An image forming operation for an object lying at infinity will be described below. First, a light beam passes through the first surface R1 and enters the first optical element B1. In the first optical element B1, the light beam is refracted by the second surface R2, then reflected by the third surface R3, then totally reflected by the fourth surface R4 and the fifth surface R5, then reflected by the sixth surface R6, then refracted by the seventh surface R7, and then exits from the first optical element B1. The second surface R2 and the fourth surface R4 are formed as the same surface which serves as both a refracting surface and a total reflecting surface, and the fifth surface R5 and the seventh surface R7 are also similarly formed. The light beam forms an intermediate image between the fourth surface R4 and the fifth surface R5.

Then, the light beam enters the second optical element B2. In the second optical element B2, the light beam is refracted by the eighth surface R8, then reflected by the ninth surface R9, then totally reflected by the tenth surface R10 and the eleventh surface R11, then reflected by the twelfth surface R12, then refracted by the thirteenth surface R13, and then exits from the second optical element B2. The eighth surface R8 and the tenth surface R10 are formed as the same surface which serves as both a refracting surface and a total reflecting surface, and the eleventh surface R11 and the thirteenth surface R13 are also similarly formed. The light beam forms an intermediate image in the vicinity of the twelfth surface R12. The light beam also forms a pupil between the second optical element B2 and the third optical element B3.

Then, the light beam enters the third optical element B3. In the third optical element B3, the light beam is refracted by the fourteenth surface R14, then reflected by the fifteenth surface R15, then totally reflected by the sixteenth surface R16, then reflected by the seventeenth surface R17, then refracted by the eighteenth surface R18, and then exits from the third optical element B3. The fourteenth surface R14, the sixteenth surface R16 and the eighteenth surface R18 are formed as the same surface which serves as both a refracting surface and a total reflecting surface.

The light beam which has exited from the third optical element B3 finally forms an object image on the final image forming surface R19 (the image pickup surface of the image pickup medium such as a CCD).

A magnification varying operation effected by the movements of the respective optical elements will be described below. During variation of magnification, the first optical element B1 is fixed. The second optical element B2 moves in the Z plus direction from the wide-angle end toward the telephoto end. The third optical element B3 moves in the Z plus direction from the wide-angle end toward the telephoto end. The nineteenth surface R19 which is the image plane does not move during the variation of magnification.

Thus, when the variation of magnification from the wide-angle end toward the telephoto end is effected, the distance between the first optical element B1 and the second optical element B2 is increased, the distance between the second optical element B2 and the third optical element B3 is decreased, and the distance between the third optical element B3 and the image plane R19 is increased. In addition, the entire length of the optical path from the first surface R1 to the image plane R19 becomes longer from the wide-angle end toward the telephoto end.

In the present embodiment, the direction of the reference axis which enters the third optical element B3 and the direction of the reference axis which exits from the third optical element B3 are parallel to and opposite to each other, whereas the direction of the reference axis which enters each of the first and second optical elements B1 and B2 and the direction of the reference axis which exits from a respective of the second and third optical elements B2 and B3 are parallel to and the same as each other.

Figure 47:
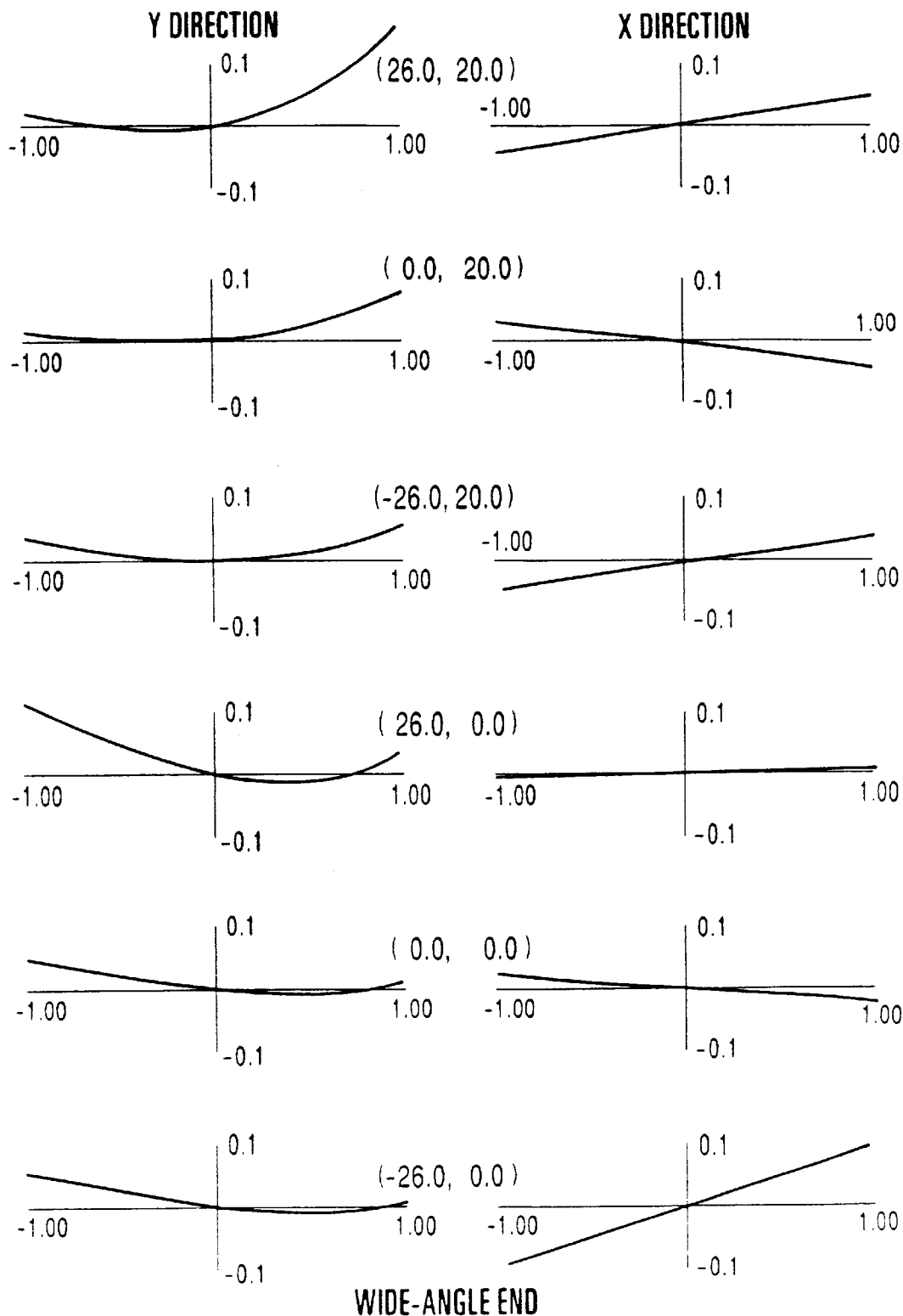
FIG. 47 shows lateral aberration charts of Embodiment 14 (wide-angle end)
Figure 48:
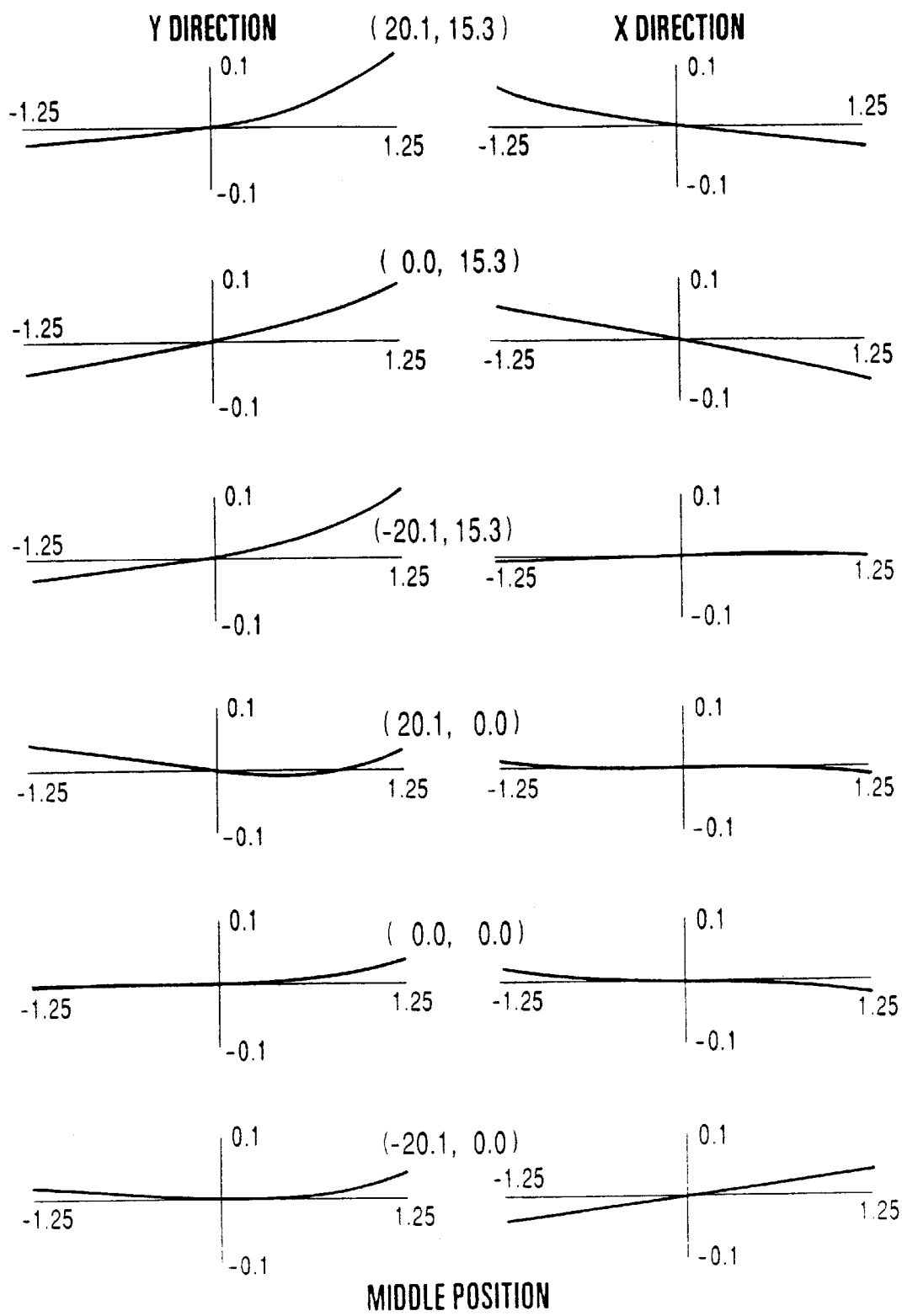
FIG. 48 shows lateral aberration charts of Embodiment 14 (middle position)
Figure 49:
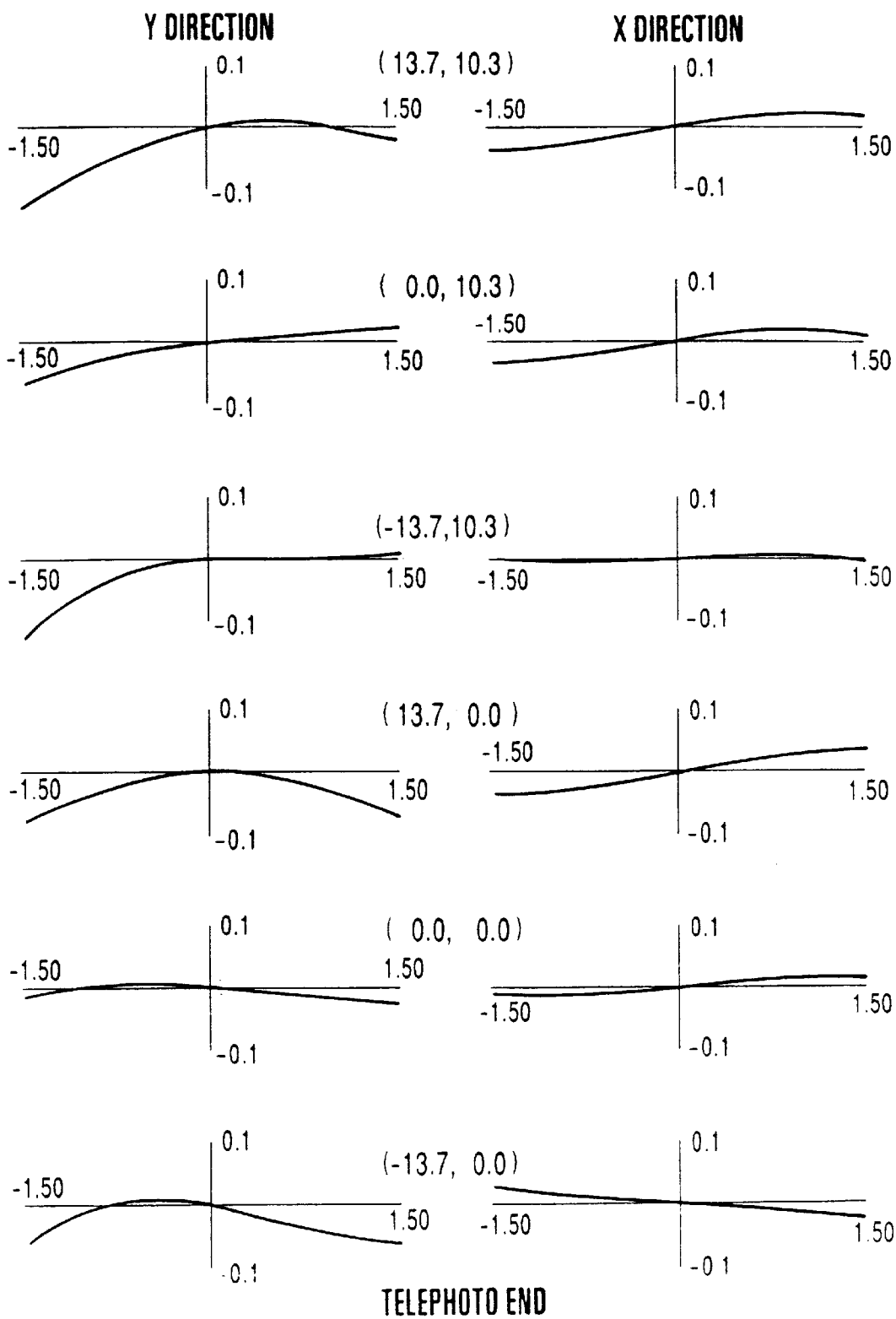
FIG. 49 shows lateral aberration charts of Embodiment 14 (telephoto end)

Each of FIGS. 47, 48 and 49 shows lateral aberration charts of the present embodiment.

Embodiment 15

FIG. 50 is a view showing an optical cross section taken on the Y, Z plane, of Embodiment 15 of the present invention. The present embodiment is intended for an image pickup optical system which constitutes a three-group zoom lens having a magnification variation ratio of approximately 2×.

Constituent Data for Embodiment 15 are Shown Below

|  |  |  |  | WIDE-ANGLE END | MIDDLE POSITION | TELEPHOTO END |
|---|---|---|---|---|---|---|
| HORIZONTAL HALF-ANGLE OF VIEW |  |  |  | 14.0 | 10.6 | 7.1 |
| VERTICAL HALF-ANGLE OF VIEW |  |  |  | 10.6 | 8.0 | 5.3 |
| APERTURE DIAMETER |  |  |  | 2.0 | 3.0 | 4.0 |
| IMAGE SIZE  HORIZONTAL 4.8 mm × VERTICAL 3.6 mm |  |  |  |  |  |  |
| SIZE OF OPTICAL SYSTEM (X × Y × Z) = 12.0 × 58.4 × 30.3 |  |  |  |  |  |  |

| i | Yi | Zi(W) | θ1 | Di | Ndi | vdi |  |
|---|---|---|---|---|---|---|---|
| 1 | 0.00 | 0.00 | 0.00 | VARIABLE 1 |  |  | STOP |

AT WIDE-ANGLE END

FIRST OPTICAL ELEMENT

| 2 | 0.00 | 3.00 | 0.00 | 6.00 | 1.51633 | 64.15 | REFRACTING SURFACE |
|---|---|---|---|---|---|---|---|
| 3 | 0.00 | 9.00 | 28.00 | 10.73 | 1.51633 | 64.15 | REFLECTING SURFACE |

-continued

| | | | | | | | |
|---|---|---|---|---|---|---|---|
| 4 | −8.90 | 3.00 | 0.00 | 10.73 | 1.51633 | 64.15 | TOTAL REFLECTING SURFACE |
| 5 | −17.79 | 9.00 | −28.00 | 6.00 | 1.51633 | 64.15 | REFLECTING SURFACE |
| 6 | −17.79 | 3.00 | 0.00 | VARIABLE | 1 | | REFRACTING SURFACE |

SECOND OPTICAL ELEMENT

| | | | | | | | |
|---|---|---|---|---|---|---|---|
| 7 | −17.79 | −10.58 | 0.00 | 6.00 | 1.51633 | 64.15 | REFRACTING SURFACE |
| 8 | −17.79 | −16.58 | −28.00 | 10.73 | 1.51633 | 64.15 | REFLECTING SURFACE |
| 9 | −26.69 | −10.58 | 0.00 | 10.73 | 1.51633 | 64.15 | TOTAL REFLECTING SURFACE |
| 10 | −35.58 | −16.58 | 28.00 | 6.00 | 1.51633 | 64.15 | REFLECTING SURFACE |
| 11 | −35.58 | −10.58 | 0.00 | VARIABLE | 1 | | REFRACTING SURFACE |

THIRD OPTICAL ELEMENT

| | | | | | | | |
|---|---|---|---|---|---|---|---|
| 12 | −35.58 | −0.24 | 0.00 | 6.00 | 1.51633 | 64.15 | REFRACTING SURFACE |
| 13 | −35.58 | 5.76 | 28.00 | 10.73 | 1.51633 | 64.15 | REFLECTING SURFACE |
| 14 | −44.48 | −0.24 | 0.00 | 10.73 | 1.51633 | 64.15 | TOTAL REFLECTING SURFACE |
| 15 | −53.37 | 5.76 | −28.00 | 6.00 | 1.51633 | 64.15 | REFLECTING SURFACE |
| 16 | −53.37 | −0.24 | 0.00 | VARIABLE | 1 | | REFRACTING SURFACE |
| 17 | −53.37 | −5.09 | 0.00 | 0.00 | 1 | | IMAGE PLANE |

| | WIDE-ANGLE END | MIDDLE POSITION | TELEPHOTO END |
|---|---|---|---|
| D1 | 3.00 | 3.00 | 3.00 |
| D6 | 13.58 | 7.92 | 2.00 |
| D11 | 10.34 | 8.22 | 9.56 |
| D16 | 4.86 | 8.40 | 15.65 |
| D2–D6 | $Zi(M) = Zi(W)$ | $Zi(T) = Zi(W)$ | |
| D7–D11 | $Zi(M) = Zi(W) + 5.66$ | $Zi(T) = Zi(W) + 11.58$ | |
| D12–D16 | $Zi(M) = Zi(W) + 3.54$ | $Zi(T) = Zi(W) + 10.79$ | |
| D17 | $Zi(M) = Zi(W)$ | $Zi(T) = Zi(W)$ | |

SPHERICAL SHAPE $R1 = \infty$
$R2 = \infty$
$R4 = \infty$
$R6 = \infty$
$R7 = \infty$
$R9 = \infty$
$R11 = \infty$
$R12 = \infty$
$R14 = \infty$
$R16 = \infty$

ASPHERICAL SHAPE

| R3 | $a = \infty$ | $b = \infty$ | $t = 0.$ |
|---|---|---|---|
| | $C_{02} = -9.93659\text{e}{-}03$ | $C_{20} = -1.22676\text{e}{-}02$ | |
| | $C_{03} = 7.21398\text{e}{-}06$ | $C_{21} = -1.44539\text{e}{-}04$ | |
| | $C_{04} = 1.48230\text{e}{-}05$ | $C_{22} = -7.24467\text{e}{-}05$ | $C_{40} = 5.24580\text{e}{-}05$ |
| R5 | $a = \infty$ | $b = \infty$ | $t = 0.$ |
| | $C_{02} = -1.00000\text{e}{-}02$ | $C_{20} = -1.46379\text{e}{-}02$ | |
| | $C_{03} = 8.61457\text{e}{-}05$ | $C_{21} = -3.69104\text{e}{-}04$ | |
| | $C_{04} = 9.82308\text{e}{-}05$ | $C_{22} = -2.21626\text{e}{-}05$ | $C_{40} = 7.11988\text{e}{-}06$ |
| R8 | $a = \infty$ | $b = \infty$ | $t = 0.$ |
| | $C_{02} = -1.97738\text{e}{-}03$ | $C_{20} = -2.14999\text{e}{-}03$ | |
| | $C_{03} = -5.95281\text{e}{-}05$ | $C_{21} = -6.08801\text{e}{-}05$ | |
| | $C_{04} = 1.16019\text{e}{-}05$ | $C_{22} = -3.03704\text{e}{-}05$ | $C_{40} = -6.27330\text{e}{-}06$ |
| R10 | $a = \infty$ | $b = \infty$ | $t = 0.$ |
| | $C_{02} = 4.80326\text{e}{-}03$ | $C_{20} = 6.42478\text{e}{-}03$ | |
| | $C_{03} = -2.10929\text{e}{-}05$ | $C_{21} = -7.01246\text{e}{-}05$ | |
| | $C_{04} = -4.89310\text{e}{-}06$ | $C_{22} = 7.92301\text{e}{-}07$ | $C_{40} = -1.37335\text{e}{-}06$ |
| R13 | $a = \infty$ | $b = \infty$ | $t = 0.$ |
| | $C_{02} = -6.79637\text{e}{-}03$ | $C_{20} = -8.35258\text{e}{-}03$ | |
| | $C_{03} = -1.31716\text{e}{-}05$ | $C_{21} = -1.21231\text{e}{-}04$ | |
| | $C_{04} = -2.47265\text{e}{-}06$ | $C_{22} = 5.40094\text{e}{-}06$ | $C_{40} = -1.63241\text{e}{-}07$ |

-continued

| R15 | a = ∞ | b = ∞ | t = 0. |
|---|---|---|---|
| | $C_{02}$ = 3.98146e−03 | $C_{20}$ = 4.12905e−03 | |
| | $C_{03}$ = −8.15022e−05 | $C_{21}$ = −8.04787e−04 | |
| | $C_{04}$ = 2.78836e−07 | $C_{22}$ = −3.52617e−07 | $C_{40}$ = −3.93188e−05 |

In the present embodiment shown in FIG. 50, the first surface R1 is an aperture plane which is an entrance pupil, and the second surface R2 to the sixth surface R6, the seventh surface R7 to the eleventh surface R11, and the twelfth surface R12 to the sixteenth surface R16 respectively constitute the first optical element B1, the second optical element B2 and the third optical element B3 each of which is an integral optical element. The seventeenth surface R17 is an image plane.

An image forming operation for an object lying at infinity will be described below. First, a light beam passes through the first surface R1 and enters the first optical element B1. In the first optical element B1, the light beam is refracted by the second surface R2, then reflected by the third surface R3, then totally reflected by the fourth surface R4, then reflected by the fifth surface R5, and then refracted by the sixth surface R6, and then exits from the first optical element B1. The second surface R2, the fourth surface R4 and the sixth surface R6 are formed as the same surface which serves as both a refracting surface and a total reflecting surface. The first optical element B1 has an intermediate image forming plane in the vicinity of the fifth surface R5.

Then, the light beam which has exited from the first optical element B1 enters the second optical element B2. In the second optical element B2, the light beam is refracted by the seventh surface R7, then reflected by the eighth surface R8, then totally reflected by the ninth surface R9, then reflected by the tenth surface R10, then refracted by the eleventh surface R11, and then exits from the second optical element B2. The seventh surface R7, the ninth surface R9 and the eleventh surface R11 are formed as the same surface which serves as both a refracting surface and a total reflecting surface.

Then, the light beam which has exited from the second optical element B2 enters the third optical element B3. In the third optical element B3, the light beam is refracted by the twelfth surface R12, then reflected by the thirteenth surface R13, then totally reflected by the fourteenth surface R14, then reflected by the fifteenth surface R15, then refracted by the sixteenth surface R16, and then exits from the third optical element B3. The twelfth surface R12, the fourteenth surface R14 and the sixteenth surface R16 are formed as the same surface which serves as both a refracting surface and a total reflecting surface.

The light beam which has exited from the third optical element B3 finally forms an object image on the final image forming surface R17 (the image pickup surface of the image pickup medium such as a CCD).

A magnification varying operation effected by the movements of the respective optical elements will be described below. During variation of magnification, the first optical element B1 is fixed. The second optical element B2 moves in the Z plus direction from the wide-angle end toward the telephoto end. The third optical element B3 also moves in the z plus direction from the wide-angle end toward the telephoto end. The seventeenth surface R17 which is the image plane does not move during the variation of magnification.

Thus, when the variation of magnification from the wide-angle end toward the telephoto end is effected, the distance between the first optical element B1 and the second optical element B2 is decreased, the distance between the second optical element B2 and the third optical element B3 is decreased, and the distance between the third optical element B3 and the image plane R17 is increased. In addition, the entire length of the optical path from the first surface R1 to the image plane R17 becomes shorter from the wide-angle end toward the telephoto end.

In the present embodiment, the direction of the reference axis which enters each of the optical elements B1, B2 and B3 and the direction of the reference axis which exits from the respective one of the optical element B1, B2 and B3 are parallel to and opposite to each other.

Figure 51:
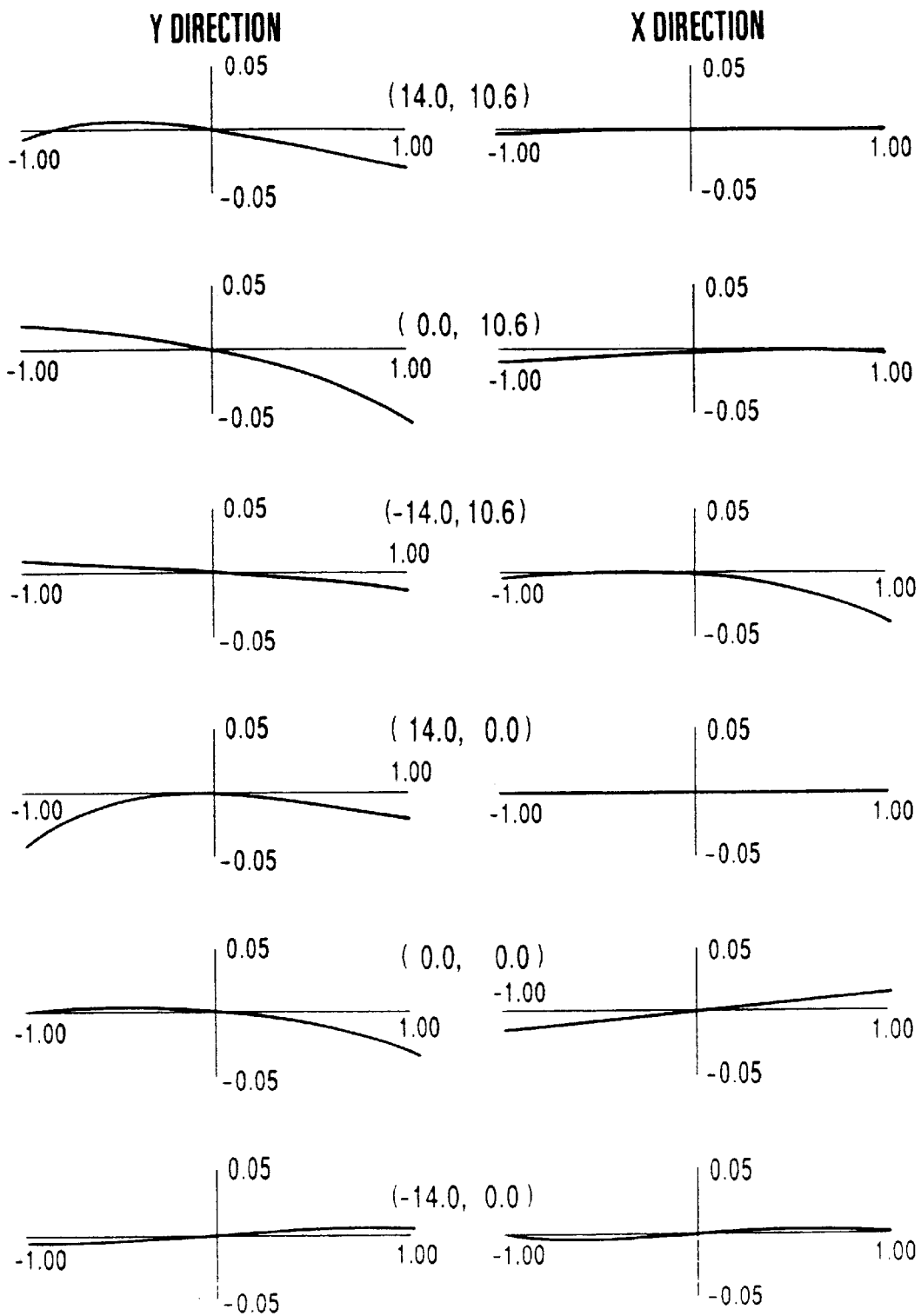
FIG. 51 shows lateral aberration charts of Embodiment 15 (wide-angle end)
Figure 52:
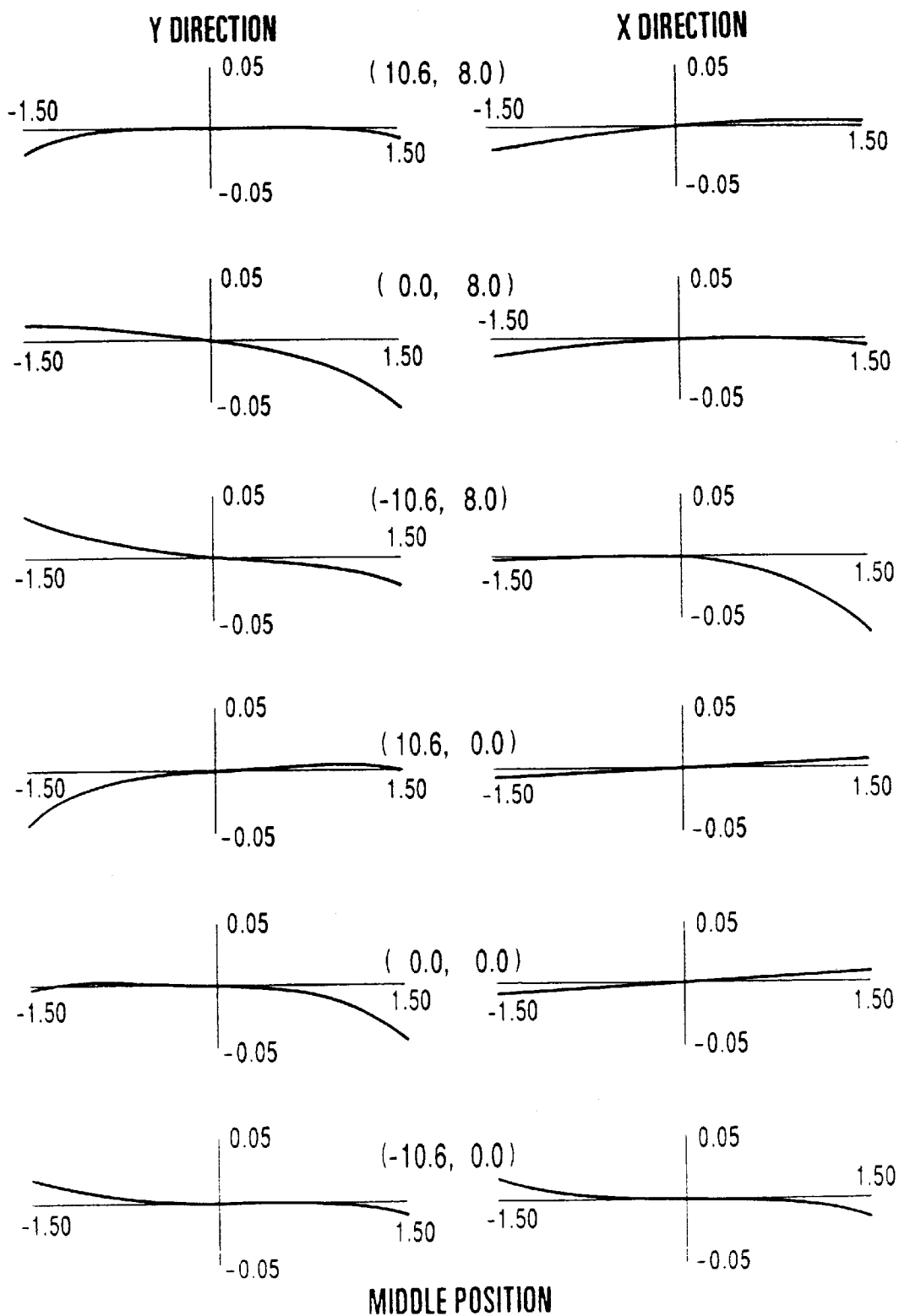
FIG. 52 shows lateral aberration charts of Embodiment 15 (middle position)
Figure 53:
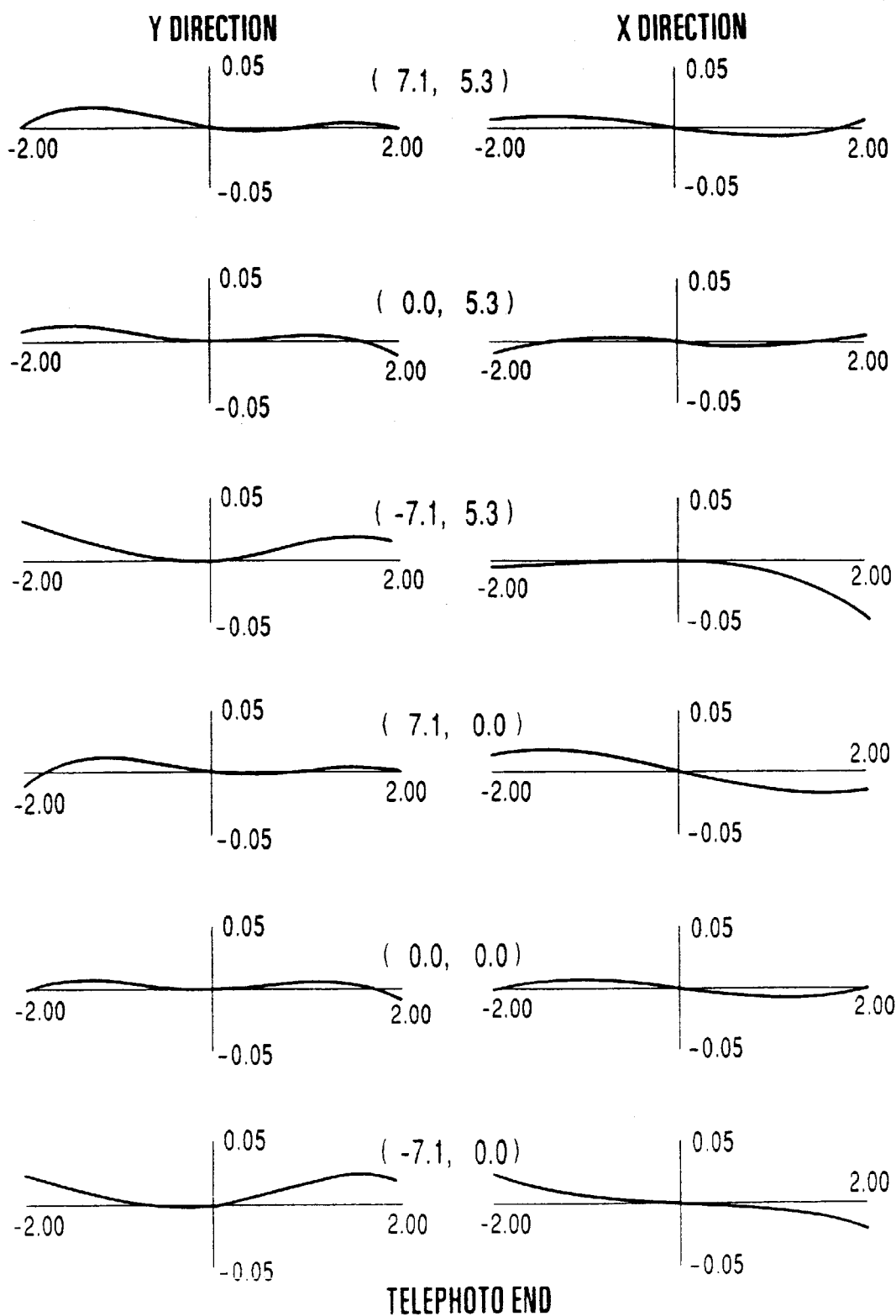
FIG. 53 shows lateral aberration charts of Embodiment 15 (telephoto end)

Each of FIGS. 51, 52 and 53 shows lateral aberration charts of the present embodiment.

Embodiment 16

FIG. 54 is a view showing an optical cross section taken on the Y, Z plane, of Embodiment 16 of the present invention. The present embodiment is intended for an image pickup optical system which constitutes a three-group zoom lens having a magnification variation ratio of approximately 2.9×.

Constituent data for Embodiment 16 are Shown Below

| | WIDE-ANGLE END | MIDDLE POSITION | TELEPHOTO END |
|---|---|---|---|
| HORIZONTAL HALF-ANGLE OF VIEW | 26.0 | 18.0 | 9.2 |
| VERTICAL HALF-ANGLE OF VIEW | 20.0 | 13.6 | 6.9 |
| APERTURE DIAMETER | 2.0 | 2.5 | 3.0 |

IMAGE SIZE    HORIZONTAL 4.6 mm × VERTICAL 3.6 mm
SIZE OF OPTICAL SYSTEM (X × Y × Z) = 10.8 × 93.2 × 39.4

AT WIDE-ANGLE END

| i | Yi | Zi(W) | θi | Di | Ndi | vdi |
|---|---|---|---|---|---|---|
| 1 | 0.00 | 0.00 | 0.00 | −3.00 | 1 | STOP |

-continued

FIRST OPTICAL ELEMENT

| | | | | | | | |
|---|---|---|---|---|---|---|---|
| 2 | 0.00 | −3.00 | 0.00 | 7.00 | 1.51633 | 64.15 | REFRACTING SURFACE |
| 3 | 0.00 | −10.00 | 28.00 | 11.00 | 1.51633 | 64.15 | REFLECTING SURFACE |
| 4 | 9.12 | −3.85 | 14.00 | 11.00 | 1.51633 | 64.15 | REFLECTING SURFACE |
| 5 | 14.28 | −13.56 | 0.00 | 11.00 | 1.51633 | 64.15 | REFLECTING SURFACE |
| 6 | 19.45 | −3.85 | −14.00 | 11.00 | 1.51633 | 64.15 | REFLECTING SURFACE |
| 7 | 28.57 | −10.00 | −28.00 | 7.00 | 1.51633 | 64.15 | REFLECTING SURFACE |
| 8 | 28.57 | −3.00 | 0.00 | VARIABLE | 1 | | REFRACTING SURFACE |

SECOND OPTICAL ELEMENT

| | | | | | | | |
|---|---|---|---|---|---|---|---|
| 9 | 28.57 | 14.26 | 0.00 | 8.00 | 1.51633 | 64.15 | REFRACTING SURFACE |
| 10 | 28.57 | 22.26 | −28.00 | 11.00 | 1.51633 | 64.15 | REFLECTING SURFACE |
| 11 | 37.69 | 16.11 | −14.00 | 11.00 | 1.51633 | 64.15 | REFLECTING SURFACE |
| 12 | 42.85 | 25.82 | 0.00 | 11.00 | 1.51633 | 64.15 | REFLECTING SURFACE |
| 13 | 48.01 | 16.11 | 14.00 | 11.00 | 1.51633 | 64.15 | REFLECTING SURFACE |
| 14 | 57.13 | 22.26 | 28.00 | 10.00 | 1.51633 | 64.15 | REFLECTING SURFACE |
| 15 | 57.13 | 12.26 | 0.00 | VARIABLE | 1 | | REFRACTING SURFACE |

THIRD OPTICAL ELEMENT

| | | | | | | | |
|---|---|---|---|---|---|---|---|
| 16 | 57.13 | 6.28 | 0.00 | 10.00 | 1.51633 | 64.15 | REFRACTING SURFACE |
| 17 | 57.13 | −3.72 | 28.00 | 11.00 | 1.51633 | 64.15 | REFLECTING SURFACE |
| 18 | 66.25 | 2.44 | 14.00 | 11.00 | 1.51633 | 64.15 | REFLECTING SURFACE |
| 19 | 71.42 | −7.28 | 0.00 | 11.00 | 1.51633 | 64.15 | REFLECTING SURFACE |
| 20 | 76.58 | 2.44 | −14.00 | 11.00 | 1.51633 | 64.15 | REFLECTING SURFACE |
| 21 | 85.70 | −3.72 | −28.00 | 8.00 | 1.51633 | 64.15 | REFLECTING SURFACE |
| 22 | 85.70 | 4.28 | 0.00 | VARIABLE | 1 | | REFRACTING SURFACE |
| 23 | 85.70 | 14.95 | 0.00 | 0.00 | 1 | | IMAGE PLANE |

| | WIDE-ANGLE END | MIDDLE POSITION | TELEPHOTO END |
|---|---|---|---|
| D8 | 17.26 | 15.09 | 12.59 |
| D15 | −5.98 | −6.70 | −12.60 |
| D22 | 10.67 | 13.57 | 21.96 |
| D1–D8 | | $Zi(M) = Zi(W)$ | $Zi(T) = Zi(W)$ |
| D9–D15 | | $Zi(M) = Zi(W) - 2.17$ | $Zi(T) = Zi(W) - 4.67$ |
| D16–D22 | | $Zi(M) = Zi(W) - 2.90$ | $Zi(T) = Zi(W) - 11.29$ |
| D23 | | $Zi(M) = Zi(W)$ | $Zi(T) = Zi(W)$ |

SPHERICAL SHAPE $R2 = \infty$
$R8 = \infty$
$R9 = -26.000$
$R15 = -30.000$
$R16 = 30.000$
$R22 = \infty$

ASPHERICAL SHAPE

| R3 | $a = \infty$ | $b = \infty$ | $t = 0.$ |
|---|---|---|---|
| | $C_{02} = 2.42966\text{e-}02$ | $C_{20} = 2.85815\text{e-}02$ | |
| | $C_{03} = 1.27688\text{e-}04$ | $C_{21} = 2.75023\text{e-}04$ | |
| | $C_{04} = 5.94756\text{e-}05$ | $C_{22} = 1.73749\text{e-}04$ | $C_{40} = 9.46028\text{e-}05$ |
| R4 | $a = \infty$ | $b = \infty$ | $t = 0.$ |
| | $C_{02} = 1.36528\text{e-}02$ | $C_{20} = 1.93571\text{e-}02$ | |
| | $C_{03} = -9.46379\text{e-}05$ | $C_{21} = 1.42495\text{e-}04$ | |
| | $C_{04} = 7.52065\text{e-}05$ | $C_{22} = 4.28859\text{e-}05$ | $C_{40} = 3.27579\text{e-}04$ |

-continued

| | | | |
|---|---|---|---|
| R5 | $a = \infty$ | $b = \infty$ | $t = 0.$ |
| | $C_{02} = 2.43496e-02$ | $C_{20} = 3.21846e-02$ | |
| | $C_{03} = 3.81313e-05$ | $C_{21} = 2.30254e-04$ | |
| | $C_{04} = 2.54068e-05$ | $C_{22} = 5.42611e-05$ | $C_{40} = 3.90591e-05$ |
| R6 | $a = \infty$ | $b = \infty$ | $t = 0.$ |
| | $C_{02} = 2.89424e-02$ | $C_{20} = 4.71870e-02$ | |
| | $C_{03} = 8.19002e-04$ | $C_{21} = 5.81365e-03$ | |
| | $C_{04} = 1.13450e-04$ | $C_{22} = 8.53323e-04$ | $C_{40} = 3.25877e-04$ |
| R7 | $a = \infty$ | $b = \infty$ | $t = 0.$ |
| | $C_{02} = 2.25341e-02$ | $C_{20} = 3.27573e-02$ | |
| | $C_{03} = 1.08727e-05$ | $C_{21} = 1.56613e-04$ | |
| | $C_{04} = 9.67596e-06$ | $C_{22} = 1.24266e-05$ | $C_{40} = 1.28975e-05$ |
| R10 | $a = \infty$ | $b = \infty$ | $t = 0.$ |
| | $C_{02} = -1.86873e-02$ | $C_{20} = -3.56693e-02$ | |
| | $C_{03} = -1.16106e-04$ | $C_{21} = -8.55687e-04$ | |
| | $C_{04} = -2.81628e-06$ | $C_{22} = -5.18664e-05$ | $C_{40} = -5.50940e-05$ |
| R11 | $a = \infty$ | $b = \infty$ | $t = 0.$ |
| | $C_{02} = 4.76998e-04$ | $C_{20} = 2.79370e-02$ | |
| | $C_{03} = 2.92315e-04$ | $C_{21} = 1.48850e-03$ | |
| | $C_{04} = -7.01032e-05$ | $C_{22} = 1.18259e-04$ | $C_{40} = 1.15392e-03$ |
| R12 | $a = \infty$ | $b = \infty$ | $t = 0.$ |
| | $C_{02} = -2.02781e-02$ | $C_{20} = -3.32954e-02$ | |
| | $C_{03} = -7.86615e-05$ | $C_{21} = 7.23563e-05$ | |
| | $C_{04} = -1.33285e-05$ | $C_{22} = -1.08129e-04$ | $C_{40} = -3.99671e-05$ |
| R13 | $a = \infty$ | $b = \infty$ | $t = 0.$ |
| | $C_{02} = -3.67572e-03$ | $C_{20} = -1.71026e-02$ | |
| | $C_{03} = -1.50855e-04$ | $C_{21} = -7.37119e-04$ | |
| | $C_{04} = -5.55679e-05$ | $C_{22} = 657743e-05$ | $C_{40} = -1.44357e-05$ |
| R14 | $a = \infty$ | $b = \infty$ | $t = 0.$ |
| | $C_{02} = -2.03776e-02$ | $C_{20} = -1.38465e-02$ | |
| | $C_{03} = -1.65371e-04$ | $C_{21} = -5.01719e-04$ | |
| | $C_{04} = -1.86583e-05$ | $C_{22} = 1.89858e-05$ | $C_{40} = 1.81223e-05$ |
| R17 | $a = \infty$ | $b = \infty$ | $t = 0.$ |
| | $C_{02} = 1.59437e-02$ | $C_{20} = 1.92814e-02$ | |
| | $C_{03} = 8.38086e-05$ | $C_{21} = 2.54581e-04$ | |
| | $C_{04} = 8.30086e-06$ | $C_{22} = -6.10076e-06$ | $C_{40} = 1.46563e-05$ |
| R18 | $a = \infty$ | $b = \infty$ | $t = 0.$ |
| | $C_{02} = 1.68742e-02$ | $C_{20} = 4.67377e-02$ | |
| | $C_{03} = -6.62974e-04$ | $C_{21} = 2.91357e-03$ | |
| | $C_{04} = 1.09154e-04$ | $C_{22} = -5.03477e-04$ | $C_{40} = 7.03141e-04$ |
| R19 | $a = \infty$ | $b = \infty$ | $t = 0.$ |
| | $C_{02} = 2.10551e-02$ | $C_{20} = 2.59965e-02$ | |
| | $C_{03} = -1.65990e-04$ | $C_{21} = 3.76338e-04$ | |
| | $C_{04} = 2.08577e-05$ | $C_{22} = 2.44730e-05$ | $C_{40} = 4.08933e-05$ |
| R20 | $a = \infty$ | $b = \infty$ | $t = 0.$ |
| | $C_{02} = 1.69296e-02$ | $C_{20} = 2.51286e-02$ | |
| | $C_{03} = -7.05425e-04$ | $C_{21} = 1.95982e-03$ | |
| | $C_{04} = 5.91925e-05$ | $C_{22} = 2.78730e-04$ | $C_{40} = 3.81432e-04$ |

In the present embodiment shown in FIG. 54, the first surface R1 is an aperture plane which is an entrance pupil, and the second surface R2 to the eighth surface R8, the ninth surface R9 to the fifteenth surface R15, and the sixteenth surface R16 to a twenty-second surface R22 respectively constitute the first optical element B1, the second optical element B2 and the third optical element B3 each of which is an integral optical element. A twenty-third surface R23 is an image plane.

An image forming operation for an object lying at infinity will be described below. First, a light beam passes through the first surface R1 and enters the first optical element B1. In the first optical element B1, the light beam is refracted by the second surface R2, then reflected by the third surface R3, the fourth surface R4, the fifth surface R5, the sixth surface R6 and the seventh surface R7, the refracted by the eighth surface R8, and then exits from the first optical element B1. The light beam forms an intermediate image in the vicinity of the fourth surface R4, and further forms a secondary image between the first optical element B1 and the second optical element B2.

Then, the light beam enters the second optical element B2. In the second optical element B2, the light beam is refracted by the ninth surface R9, then reflected by the tenth surface R10, the eleventh surface R11, the twelfth surface R12, the thirteenth surface R13 and the fourteenth surface R14, then refracted by the fifteenth surface R15, and then exits from the second optical element B2. The light beam forms an intermediate image in the vicinity of the eleventh surface R11. In addition, the light beam forms a pupil between the twelfth surface R12 and the thirteenth surface R13.

Then, the light beam which has exited from the second optical element B2 enters the third optical element B3. In the third optical element B3, the light beam is refracted by the sixteenth surface R16, then reflected by the seventeenth surface R17, the eighteenth surface R18, the nineteenth surface R19, the twentieth surface R20 and the twenty-first surface R21, then refracted by the twenty-second surface R22, and then exits from the third optical element B3. The light beam forms an intermediate image in the vicinity of the eighteenth surface R18.

The light beam which has exited from the third optical element B3 finally forms an object image on the final image forming surface R23 (the image pickup surface of the image pickup medium such as a CCD).

A magnification varying operation effected by the movements of the respective optical elements will be described below. During variation of magnification, the first optical element B1 is fixed. The second optical element B2 moves in the Z plus direction from the wide-angle end toward the telephoto end. The third optical element B3 moves in the Z plus direction from the wide-angle end toward the telephoto end. The twenty-third surface R23 which is the image plane does not move during the variation of magnification.

Thus, when the variation of magnification from the wide-angle end toward the telephoto end is effected, the distance between the first optical element B1 and the second optical element B2 is decreased, the distance between the second optical element B2 and the third optical element B3 is increased, and the distance between the third optical element B3 and the image plane R23 is increased. In addition, the entire length of the optical path from the first surface R1 to the image plane R23 becomes longer from the wide-angle end toward the telephoto end.

In the present embodiment, the direction of the reference axis which enters each of the optical elements B1, B2 and B3 and the direction of the reference axis which exits from the respective one of the optical element B1, B2 and B3 are parallel to and opposite to each other.

Figure 55:
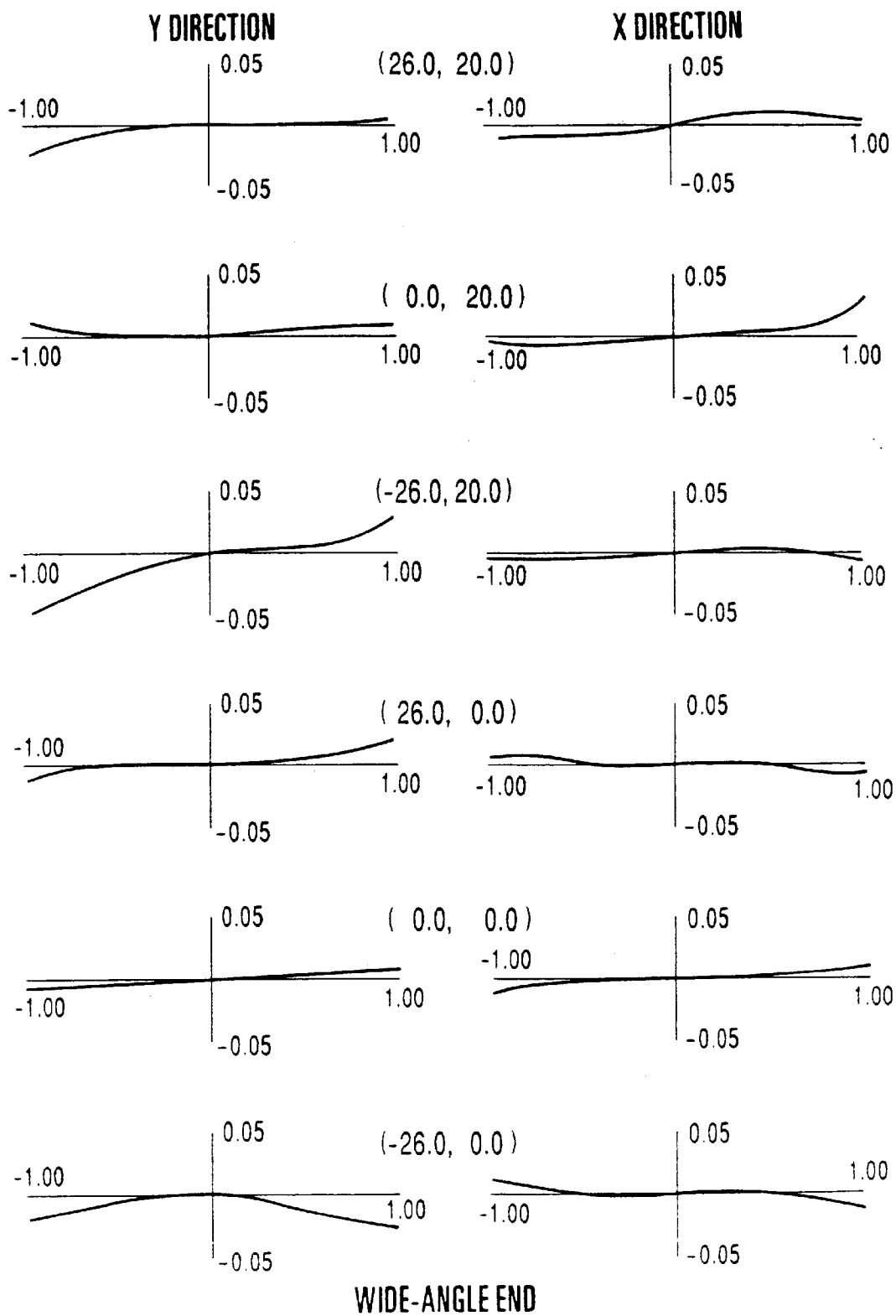
FIG. 55 shows lateral aberration charts of Embodiment 16 (wide-angle end)
Figure 56:
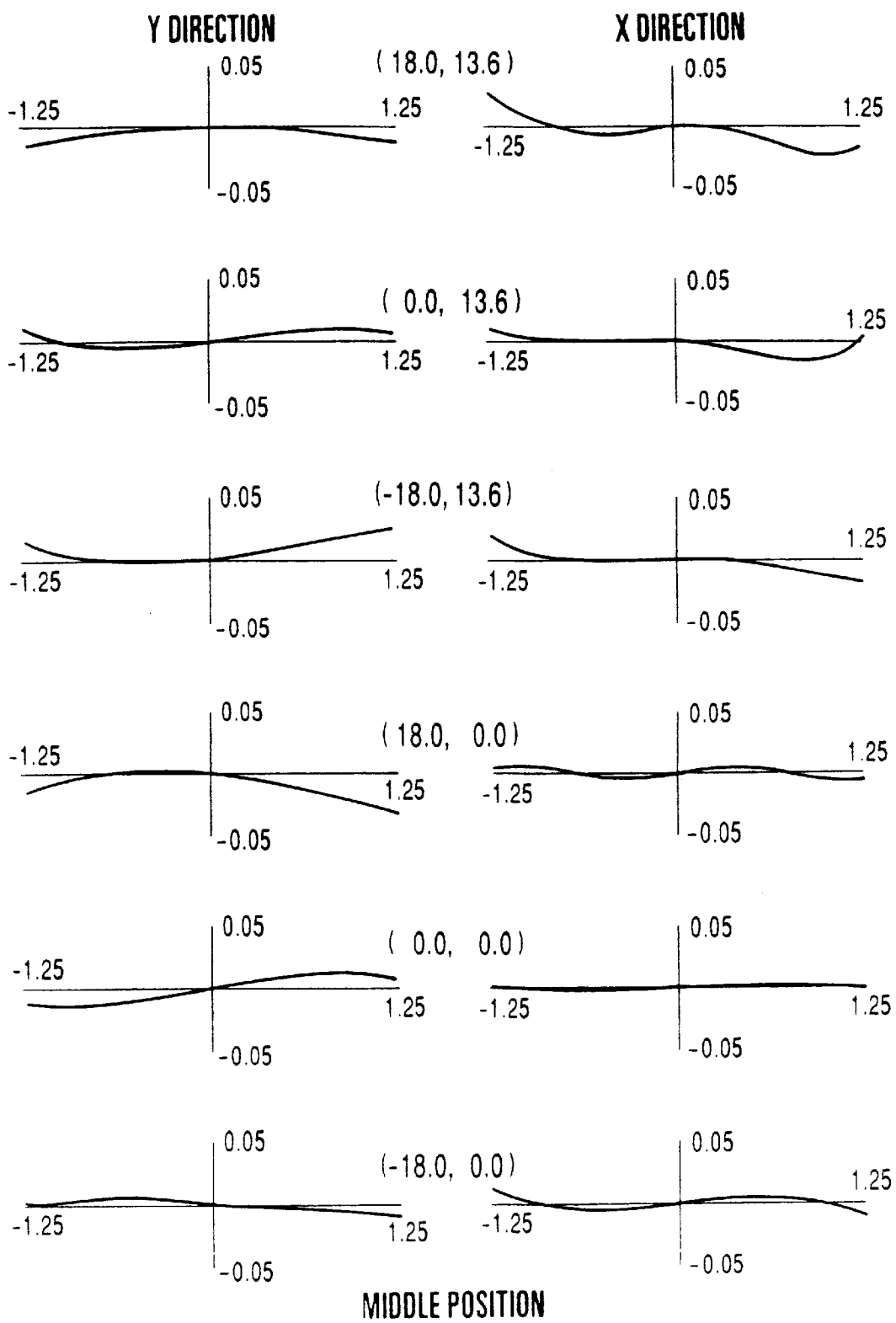
FIG. 56 shows lateral aberration charts of Embodiment 16 (middle position)
Figure 57:
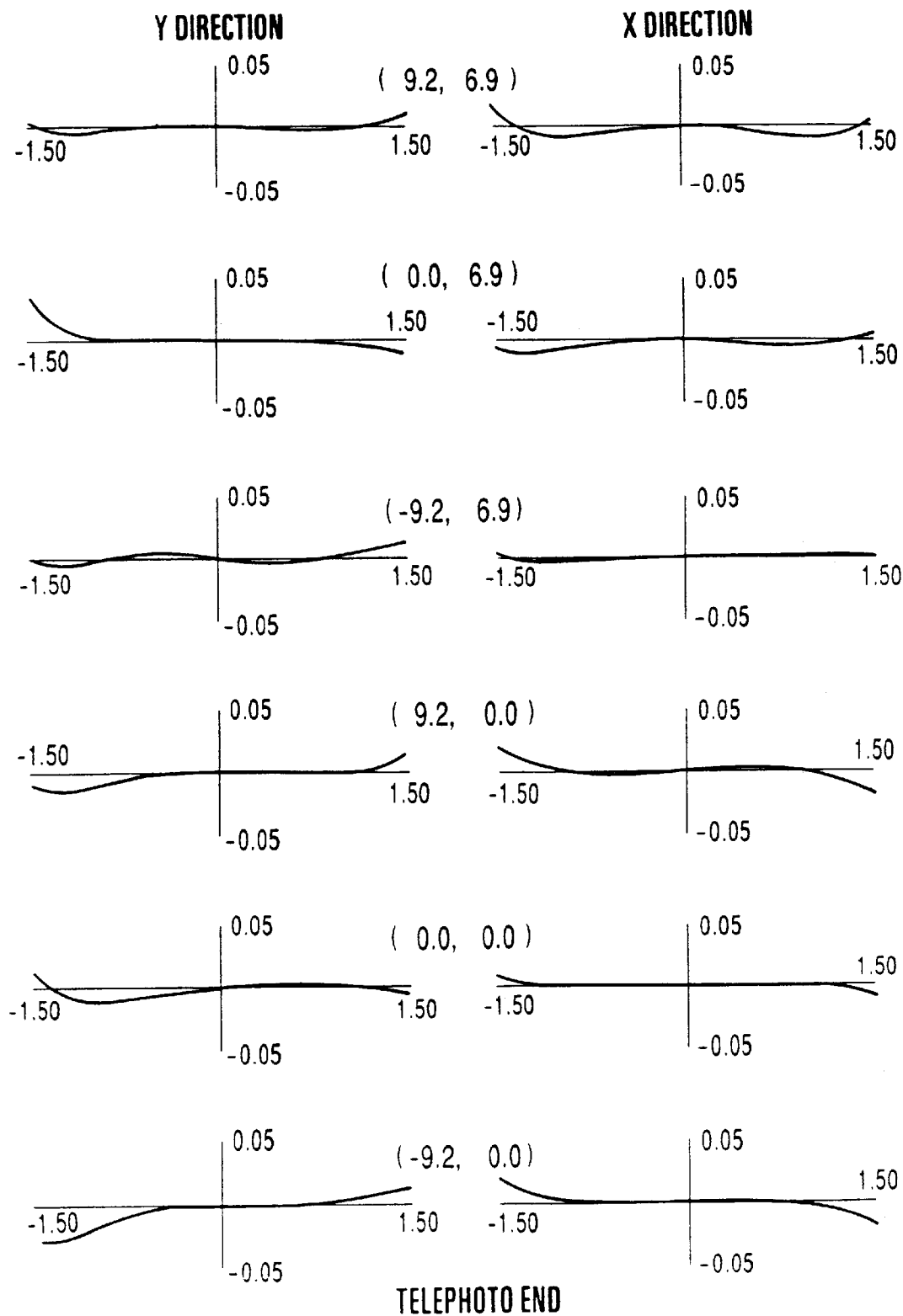
FIG. 57 shows lateral aberration charts of Embodiment 16 (telephoto end)

Each of FIGS. 55, 56 and 57 shows lateral aberration charts of the present embodiment.

In accordance with the present invention, it is possible to provide a reflecting zoom optical system which includes a plurality of optical elements some of which are transparent bodies each having two refracting surfaces and a plurality of reflecting surfaces, similarly to those which constitute part of any of Embodiments 5 to 8 and 13 to 16, and the other of which are optical elements on each of which a plurality of reflecting surfaces made from surface reflecting mirrors are integrally formed, similarly to any of Embodiments 9 to 12. Such reflecting zoom optical system is arranged to perform zooming by varying the relative position between at least two optical elements selected from among such plurality of optical elements. In this case as well, it is possible to provide advantages such as a reduction in the arrangement accuracy (assembly accuracy) of the reflecting mirrors.

Each of Embodiments 1 to 8 and 13 to 16 includes a plurality of optical elements made from thin plate-shaped blocks each of which has two refracting surfaces and a plurality of curved and plane reflecting surfaces formed on its sides, and variation of magnification is effected by relatively moving two of the optical elements with respect to an image plane.

In each of the embodiments, all the curved reflecting surfaces formed on each of the optical elements are decentered curved reflecting surfaces, and all of them are decentered in one plane (Y, Z). Two of the optical elements move in one direction in parallel with the Y, Z plane, thereby effecting variation of magnification.

In accordance with the present invention, an optical system can be composed of thin optical elements, and since a zoom structure in which the optical elements move on one plane can be adopted, it is possible to readily construct a thin zoom lens.

In addition, the direction of a reference axis which enters each optical element and the direction of a reference axis which exits from the same can readily be made the same as or opposite to each other. Accordingly, the freedom of design of the shape of the entire optical system is extremely expanded so that the freedom of design of the forms of cameras can be expanded.

In any of the above-described embodiments, well-balanced aberration correction is achieved at each focal length.

In addition, according to the present invention, it is possible to further expand the freedom of design of the forms of cameras by inclining a reference axis which enters an optical element (first optical element B1), which is fixed during variation of magnification, as in Embodiments 13 to 16, at an arbitrary angle with respect to a movement plane on which other optical elements move during variation of magnification.

Figure 58:
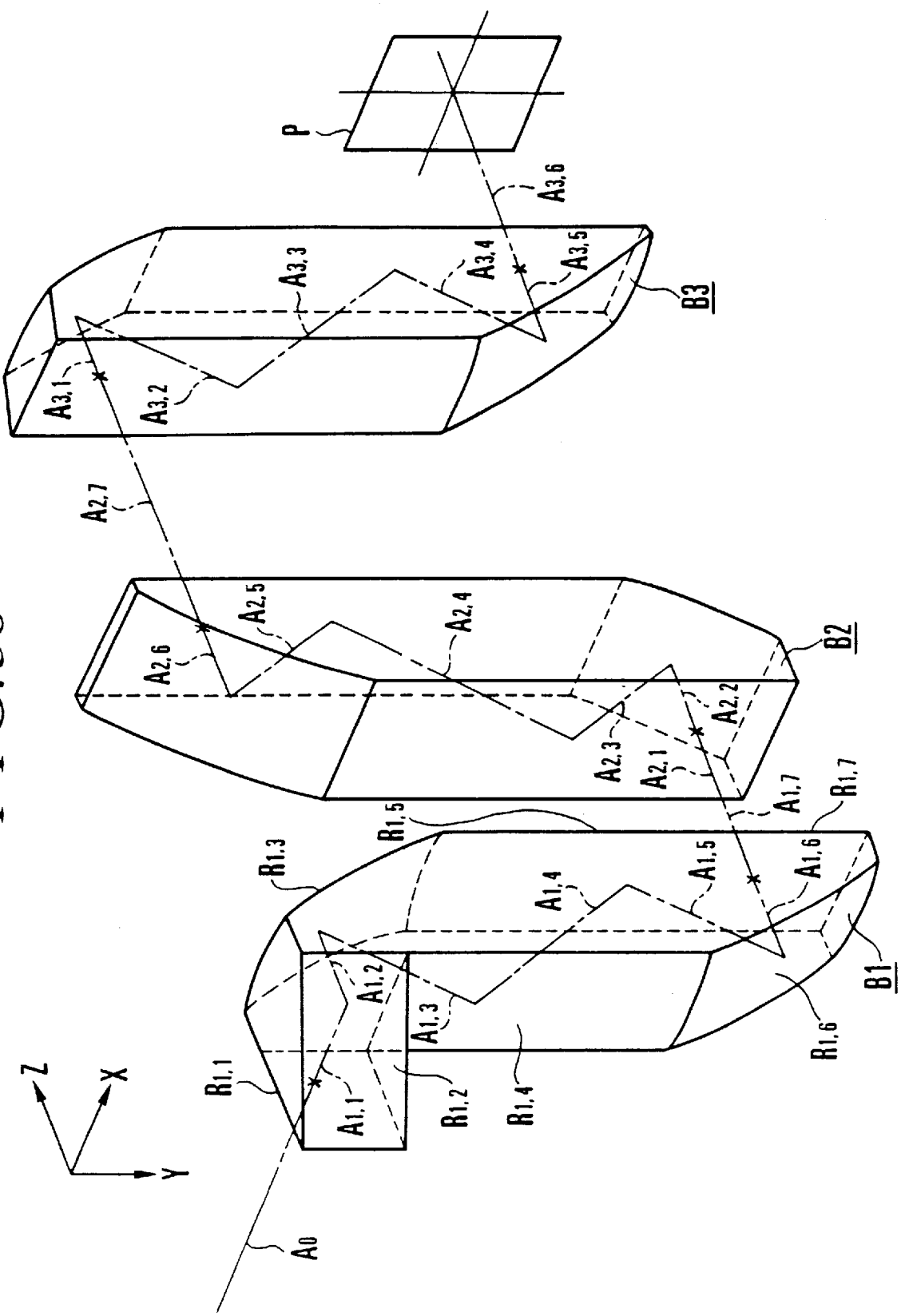
FIG. 58 is a perspective view of an optical system of a three-group zoom lens in which an entering reference axis is inclined at an arbitrary angle with respect to the Y, Z plane.
Figure 59:
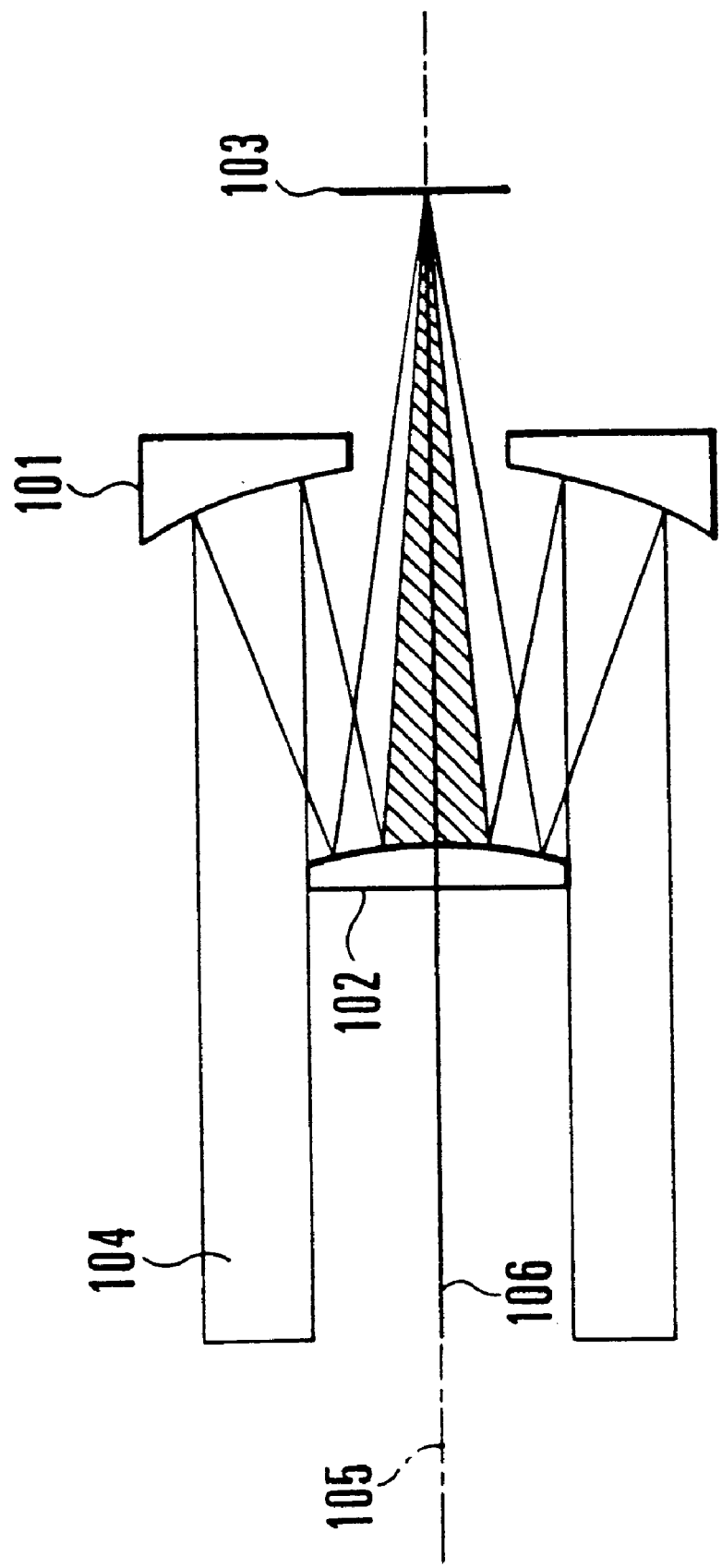
FIG. 59 is a view of the basic construction of a Cassegrainian reflecting telescope.
Figure 60:
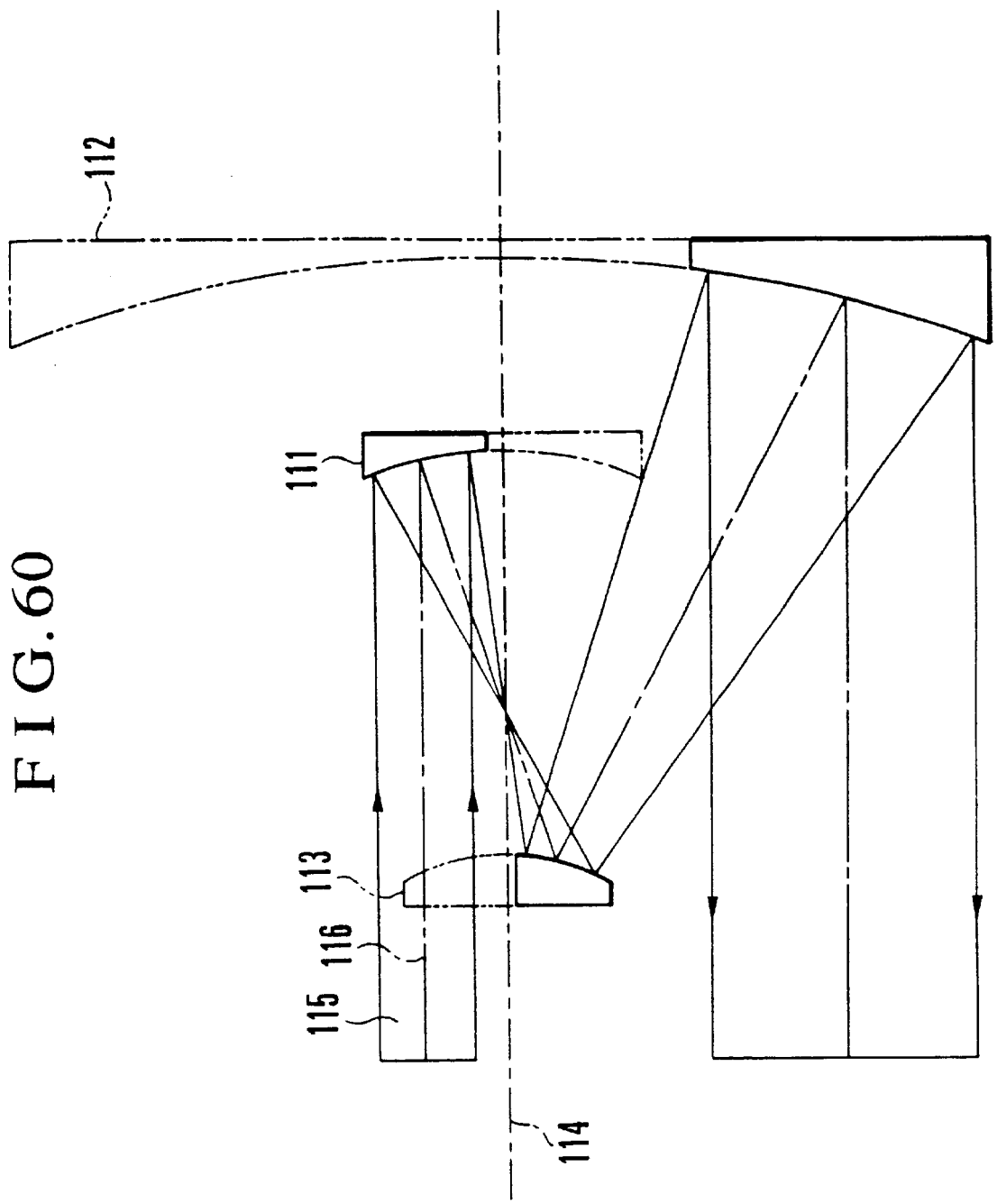
FIG. 60 is an explanatory view aiding in describing a first method of preventing a blocking problem by separating a principal ray from an optical axis in a mirror optical system.
Figure 61:
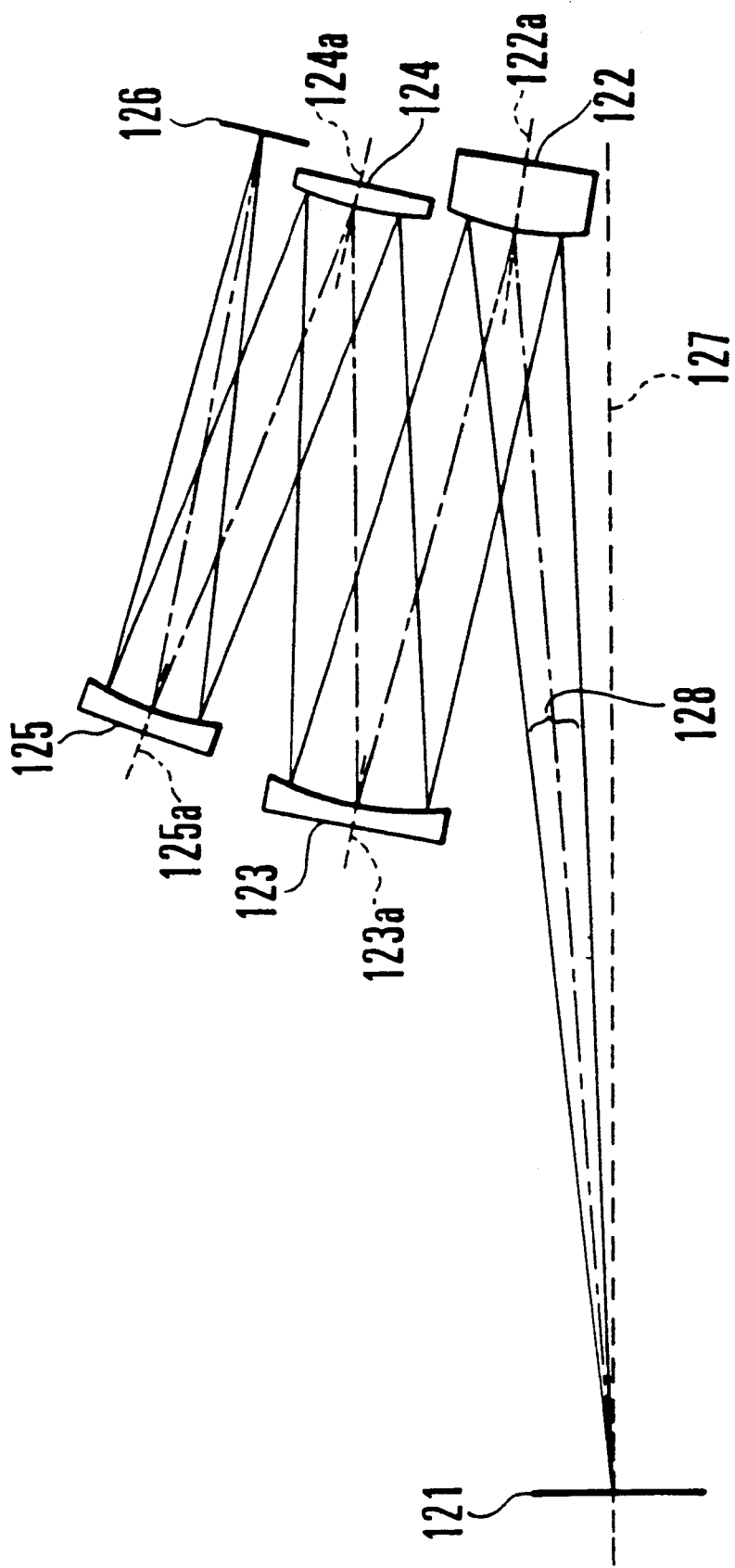
FIG. 61 is an explanatory view aiding in describing a second method of preventing a blocking problem by separating a principal ray from an optical axis in a mirror optical system.
Figure 62:
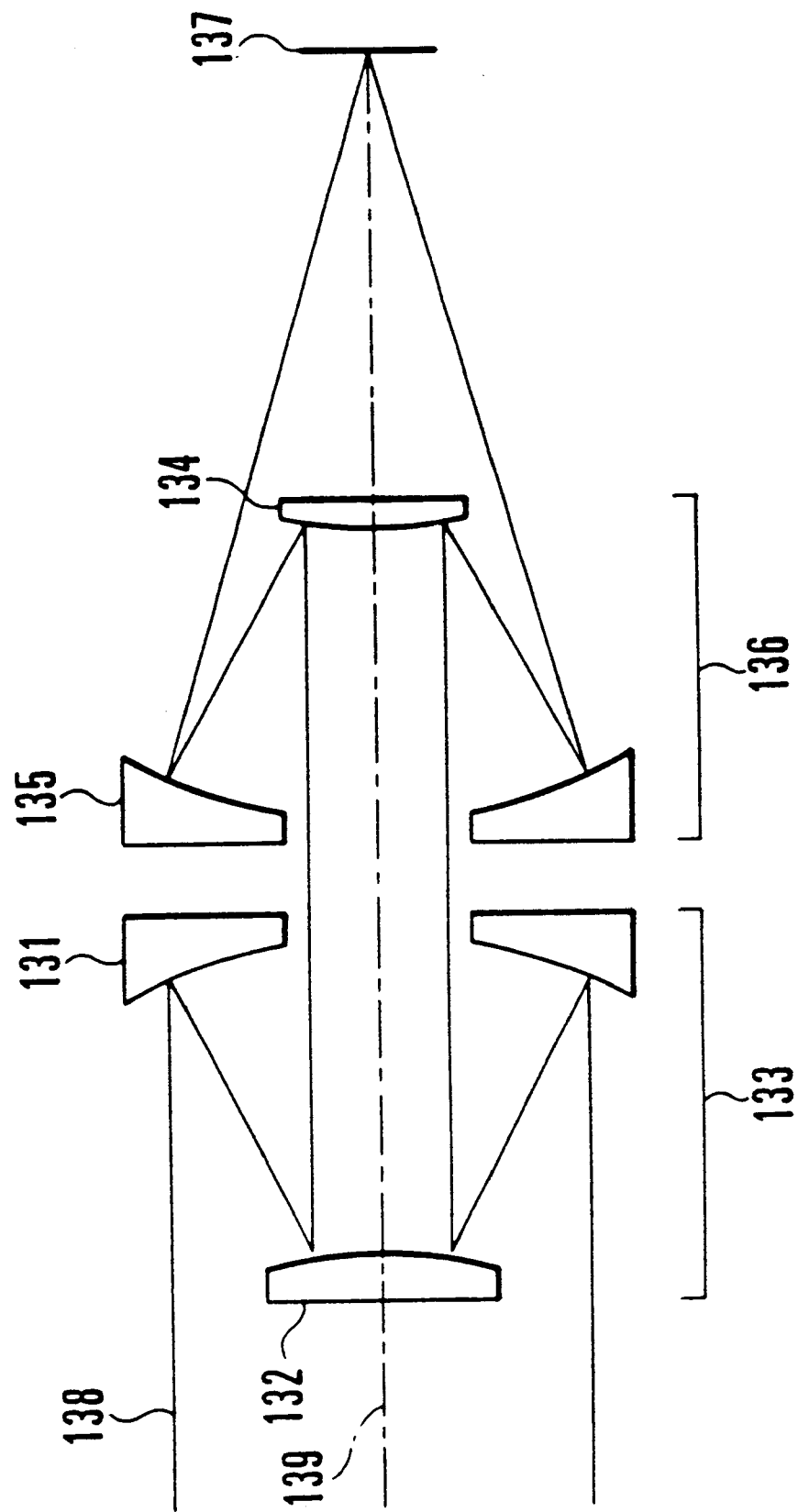
FIG. 62 is a schematic view of a zoom optical system of which employs a conventional reflecting mirror arrangement.
Figure 63:
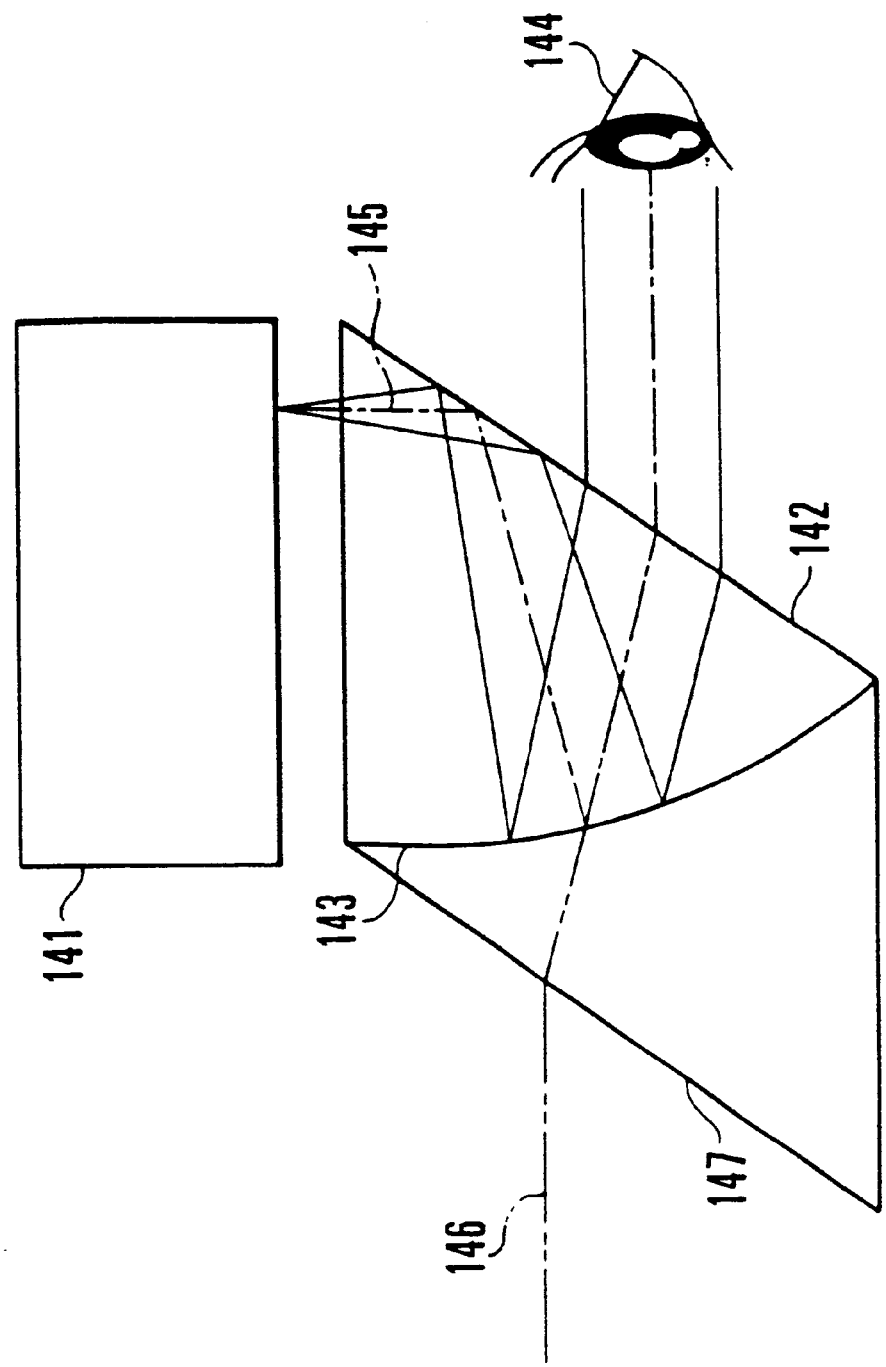
FIG. 63 is a schematic view of an observing optical system in which a prism reflecting surface has a curvature.
Figure 64:
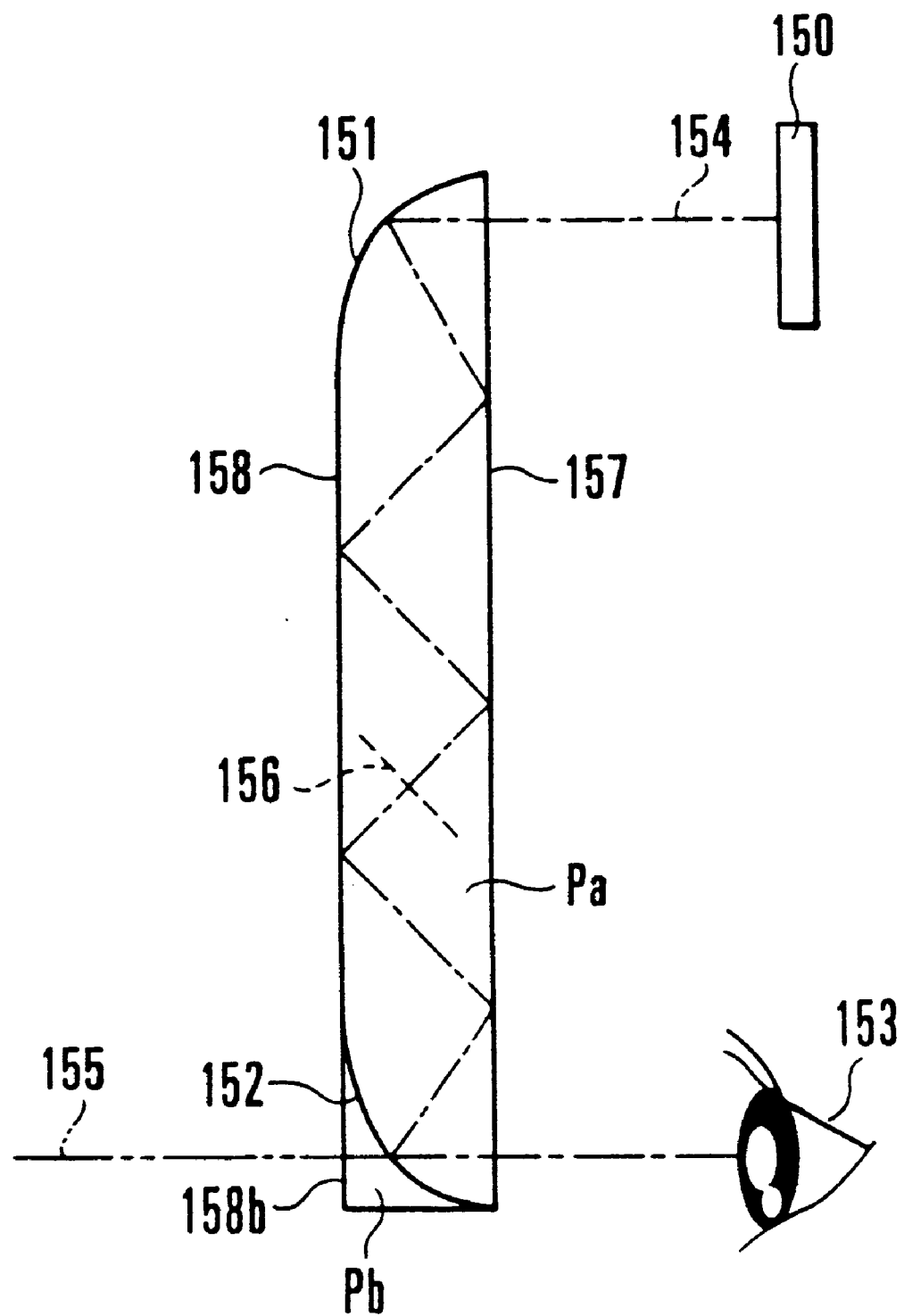
FIG. 64 is a schematic view of another observing optical system in which a prism reflecting surface has a curvature.

FIG. 58 is a perspective view of an optical system in which a reference axis which enters an optical element (first optical element B1) which does not move during variation of magnification is inclined at an arbitrary angle with respect to a movement plane on which second and third optical elements move during variation of magnification. In the optical system shown in FIG. 58, the first optical element B1 does not move during variation of magnification and corresponds to a so-called front element of a photographing optical system. The second and third B2 and B3 move during variation of magnification, and correspond to a so-called variator and a compensator, respectively.

The second and third optical elements B2 and B3 effect variation of magnification by moving on the Y, Z plane of FIG. 58. All the reference axes of each of the second and third optical elements B2 and B3 are present on the Y, z plane.

For the above reason, it is impossible to incline a plane which contains the Y, Z plane and the reference axes of the second and third optical elements B2 and B3 which move during variation of magnification. However, some ($A_{1,2}$ to $A_{1,6}$) of the reference axes of the first optical element B1 which is fixed during variation of magnification must be present in the reference-axis plane (movement plane), but the other reference axes ($A_0$ and $A_{1,1}$) need not be present in the reference-axis plane.

Specifically, in the present embodiment, a reflecting surface $R_{1,2}$ is provided so that the direction of the reference axis $A_0$ which enters the first optical element B1 in the X-axis direction is deflected in the Z-axis direction by the reflecting surface $R_{1,2}$ in the first optical element B1.

By providing the reflecting surface $R_{1,2}$ in this manner, it is possible to freely set the direction of a light beam which enters the photographing optical system so that the freedom of design of the forms of cameras can be further expanded.

A mechanism for moving the above-described optical elements will be described in brief below with reference to FIG. 65.

Figure 65:
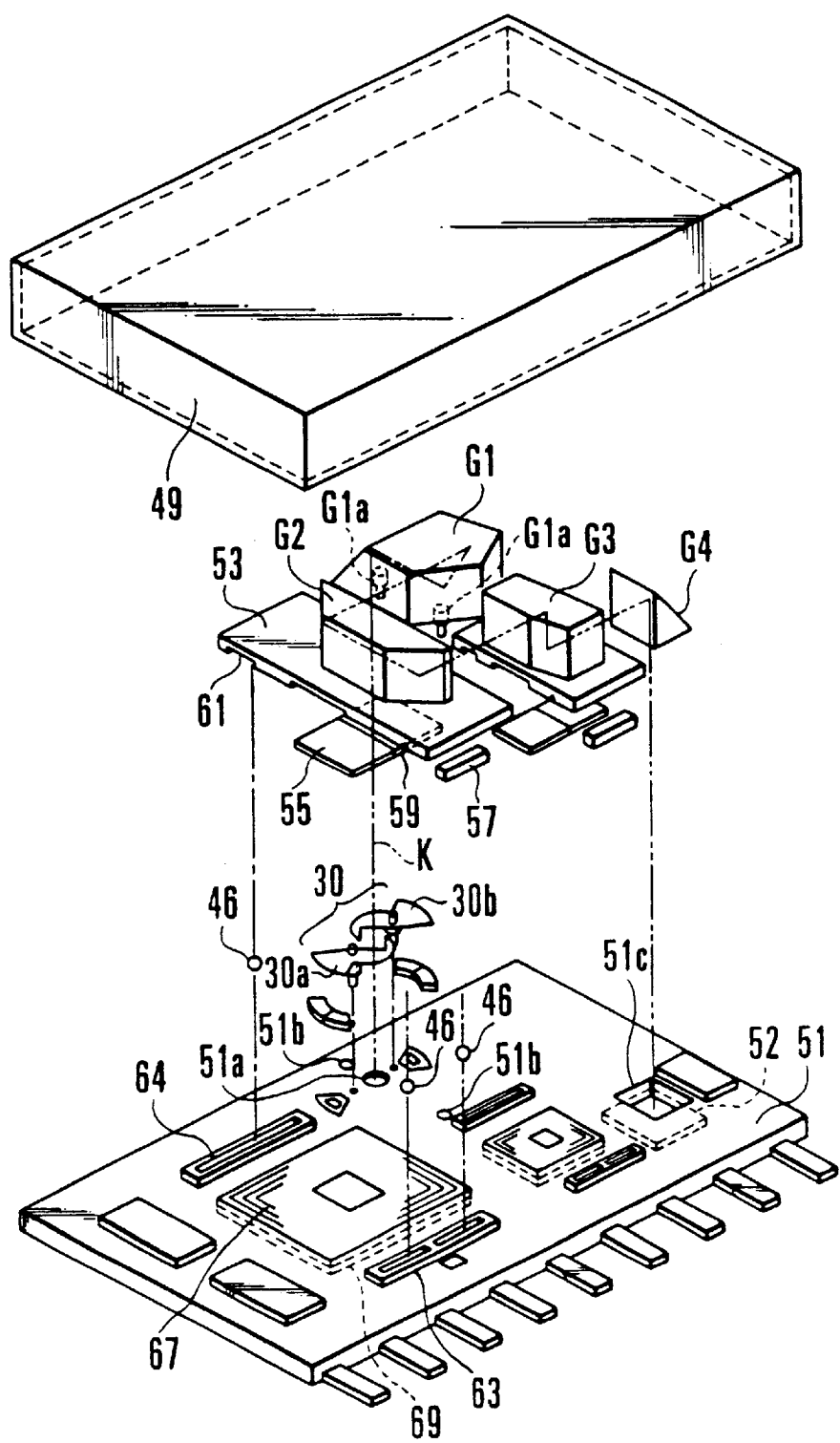
FIG. 65 is a diagrammatic exploded perspective view showing a movement mechanism according to the present invention.

As shown in FIG. 65, the shown optical device includes a base plate 51 having an image pickup optical system and a mechanism system provided on its surface. The base plate 51 has a plurality of openings 51a, 51b and 51c. The opening 51a is sealed by a sealing member, such as glass, in such a manner as to allow passage of a light beam so that foreign matter, such as dust, is prevented from entering the component-accommodating space formed between the base plate 51 and a shield case 49.

By adopting such optical system according to the present embodiment, it is possible to provide an extremely small image pickup device of a card type.

The image pickup optical system provided on the base plate 51 includes an iris part 30 for adjusting the amount of light of an object conducted from the opening 51a, a plurality of prism-shaped optical members G1, G2, G3 and G4, such as glass or plastics members each having reflecting surfaces of free curvature, and a fixed image pickup element 52 for receiving light exiting from the optical member G4 and converting the light into an electrical signal.

The iris part 30 includes two iris blades 30a and 30b which are disposed symmetrically about an optical axis K which coincides with the axis of the opening 51a. The position of an iris opening the size of which is restricted by the rotation of each of the iris blades 30a and 30b and the optical axis K coincide with each other.

The optical member G1 is fixed to the base plate 51. The optical member G1 has a pair of shafts G1a for positioning the optical member GI with respect to the base plate 51, and the optical member G1 is positioned relative to and fixed to the base plate 51 by the shafts G1a being fitted into corresponding openings 51b of the base plate 51. Incidentally, in the present embodiment, the base plate 51 and the optical member G1 are positioned and fixed by the shafts G1a being fitted into the corresponding openings 51b.

Each of the optical members G2 and G3 serves as an optical member which performs a zooming (focal-length adjusting) operation or a focusing (focus adjusting) operation by being moved in parallel with the surface of the base plate 51 in a predetermined direction (in the longitudinal direction of the base plate 51).

The optical member G2 is fixed to a moving base 53 by an adhesive. The moving base 53 is made of a flat plate of highly magnetically permeable material such as iron. The moving base 53 has part of an actuator for moving the moving base 53 in parallel with the base plate 51 in a predetermined direction, a position detecting part for detecting the position of the moving base 53 which is moving, and a position restricting part for guiding the direction of movement of the moving base 53 and restricting the position of the moving base 53 which is moving.

In the present embodiment, as shown in FIG. 65, a permanent magnet 55 is provided as the aforesaid part of the actuator, a magnetic scale 57 is provided as the position detecting part, and a groove portion 59 having a V-shaped cross section and a groove portion 61 having a recess-like shape are provided as the position restricting part in a plane perpendicular to the direction of movement of the moving base 53. The permanent magnet 55 is composed of two magnets which are magnetized in a direction perpendicular to the direction of movement of the optical member G2. Each of the magnets is arrayed in a direction perpendicular to the base plate 51.

A coil 67 and a yoke 69 which constitute the actuator in cooperation with the moving base 53 and the permanent magnet 55 are provided on the base plate 51.

Rail parts 63 and 64 for guiding the direction of movement of the moving base 53 and restricting the position of the moving base 53 which is moving are respectively provided on the base plate 51 at locations corresponding to the groove portions 59 and the groove portion 61. A groove having a V-shaped cross section in a plane perpendicular to the direction of movement of the moving base 53 is formed in each of the rail parts 63 and 64. Balls 46 are inserted between the groove portions 59 and 61 and the corresponding rail parts 63 and 64.

In the actuator which consists of the moving base 53, the permanent magnet 55, the coil 67 and the yoke 69, if a electric current is made to flow through the coil 67, a driving force is generated by the interaction between the electric current and a magnetic circuit which will be described later. The moving base 53, i.e., the optical member G2, is moved along the optical axis (in a longitudinal direction of the rail parts 63 and 64) by the driving force.

The optical member G3 is moved by a substantially similar arrangement, and the optical members G2 and G3 move to perform zooming.

In accordance with the present invention, by setting the individual constituent elements in the above-described manner, particularly by employing a plurality of optical elements in each of which a plurality of curved reflecting surfaces and plane reflecting surfaces are integrally formed, and appropriately varying the relative position between at least two of the optical elements to effect zooming, it is possible to achieve a reflecting type of zoom optical system including a small-sized mirror optical system the reflecting mirrors of which can be arranged with a reduced arrangement accuracy (assembly accuracy), compared to conventional mirror optical systems. In addition, it is possible to achieve an image pickup device employing such a reflecting type of zoom optical system.

It is also possible to achieve a reflecting type of zoom optical system which has a wide angle of view in spite of its reduced effective diameter owing to an arrangement in which a stop is disposed at a location closest to the object side of the optical system and an object image is formed in the optical system at least once, and also which has an entire length which is reduced in a predetermined direction by bending an optical path in the optical system into a desired shape by using optical elements each having a plurality of reflecting surfaces of appropriate refractive powers and decentering the reflecting surfaces which constitute each of the optical elements. In addition, it is possible to achieve an image pickup device using such reflecting type of zoom optical system.

Further, in accordance with the present invention, it is possible to achieve a reflecting type of zoom optical system which has at least one of the following advantages, and an image pickup device using such reflecting type of zoom optical system.

In an optical system which includes a plurality of optical elements in each of which a plurality of reflecting surfaces having predetermined curvatures are integrally formed, reflecting surfaces which move during variation of magnification are formed into a unit. Accordingly, as compared with the magnification varying operation of a conventional mirror optical system, it is possible to ensure the relative position accuracy of each of the reflecting surfaces which requires a highest accuracy, by adopting an arrangement in which the relative position between the plurality of optical elements is varied to effect variation of the magnification (zooming) of the optical system and focusing thereof. Accordingly, it is possible to prevent degradation of optical performance due to variation of magnification.

Since the optical elements on each of which the reflecting surfaces are integrally formed are employed, the optical elements themselves play the role of a lens barrel so that a mount member which is remarkably simple compared to conventional lens barrels can be used.

Since each of the optical elements is formed as a lens unit on which a plurality of surfaces having curvatures are integrally formed, the number of components of the entire photographing system can be reduced compared to a refracting lens system. Accordingly, the cost of the photographing system can be reduced because of the reduced number of components.

In addition, since the number of components of the entire photographing system can be reduced, accumulated errors due to the mounting of other components can be reduced so that it is possible to prevent degradation of optical performance.

Since the reflecting surfaces of each of the optical elements are disposed at appropriate positions in a decentered state, the optical path in the optical system can be bent into a desired shape so that the entire length of the optical system can be reduced.

By providing an optical element which is fixed during variation of magnification, some of reference axes can be inclined at an arbitrary angle with respect to a plane which contains almost all the reference axes so that the freedom of design of the forms of cameras can be expanded.

By adopting an arrangement for transmitting an object image by repeating image formation by a plurality of times, the effective ray diameter of each surface can be reduced so that the entire photographing optical system can be made compact.

Since the image formation size of an intermediate image forming plane is set to be comparatively small with respect to the size of an image pickup surface, it is possible to reduce the effective ray diameter of each surface which is required to transmit the object image.

Since the plane on which the optical elements move is set to be parallel to the plane which contains almost all reference axes, inclusive of the reference axes in the two optical which vary their relative positions, it is possible to readily maintain the parallelism between the plane which contains the reference axes and the plane on which the optical elements move. Accordingly, it is possible to eliminate decentering aberration due to a relative inclination between the movement plane on which the optical elements move during variation of magnification and the plane which contains the reference axes.

Since the optical elements move on one plane during variation of magnification, it is possible to readily prevent parallel decentering from occurring in a direction perpendicular to the direction of movement of the optical elements. In addition, the rotation of each of the optical elements in a plane perpendicular to the movement plane can be eliminated in principle.

Since each of the optical elements is arranged on one plane, both optical elements can be incorporated from one direction, so that assembly becomes easy and assembly cost can be reduced.

Since the stop is disposed on the object side of the optical system, it is possible to achieve a zoom lens the angle of view of which can be made wider without increasing the lens diameter of the zoom lens.

What is claimed is:

1. A reflecting type of zoom optical system comprising:
a plurality of optical elements selected from the group consisting of (a) optical elements each of which includes a transparent body and two refracting surfaces and a plurality of reflecting surfaces formed on the transparent body, and each of which is arranged so that a light beam enters the transparent body from one of the two refracting surfaces, repeatedly undergoes reflection by the plurality of reflecting surfaces, and exits from the other of the two refracting surfaces; and (b) optical elements on each of which a plurality of reflecting surfaces made from surface reflecting mirrors are integrally formed, and each of which is arranged so that an entering light beam repeatedly undergoes reflection by the plurality of reflecting surfaces and exits from the optical element,
wherein an image of an object is formed via said plurality of optical elements and zooming is performed by causing at least two optical elements from among said plurality of optical elements to vary their relative positions.

2. A reflecting type of zoom optical system according to claim 1, wherein a reference axis which enters each of said at least two optical elements which are caused to vary the relative positions is parallel to a reference axis which exits from said each of said at least two optical elements.

3. A reflecting type of zoom optical system according to claim 2, wherein said at least two optical elements which are caused to vary the relative positions move on one movement plane in parallel with each other.

4. A reflecting type of zoom optical system according to claim 2, wherein the reference axis which enters each of said at least two optical elements which are caused to vary the relative positions is the same in direction as the reference axis which exits from said each of said at least two optical elements.

5. A reflecting type of zoom optical system according to claim 2, wherein the reference axis which enters one of said at least two optical elements which are caused to vary the relative positions is the same in direction as the reference axis which exits from said one of said at least two optical elements, while the reference axis which enters another of said at least two optical elements is opposite in direction to the reference axis which exits from said other optical element.

6. A reflecting type of zoom optical system according to claim 2, wherein the reference axis which enters each of said at least two optical elements which are caused to vary the relative positions is opposite in direction to the reference axis which exits from said each of said at least two optical elements.

7. A reflecting type of zoom optical system according to claim 1, wherein focusing is performed by moving one of said at least two optical elements which are caused to vary the relative positions.

8. A reflecting type of zoom optical system according to claim 1, wherein focusing is performed by moving an optical element other than said at least two optical elements which are caused to vary the relative positions.

9. A reflecting type of zoom optical system according to claim 1, wherein an object image is intermediately formed in an optical path at least once.

10. A reflecting type of zoom optical system according to claim 1, wherein the plurality of reflecting surfaces include at least one curved reflecting surface, and each said curved reflecting surface is of a shape having only one plane of symmetry.

11. A reflecting type of zoom optical system according to claim 1, wherein all reference axes of said at least two optical elements which are caused to vary the relative positions are present on one plane.

12. A reflecting type of zoom optical system according to claim 11, wherein at least part of reference axes of an optical element other than said at least two optical elements which are caused to vary the relative positions are present on said one plane.

13. A reflecting type of zoom optical system according to claim 1, wherein at least one of said plurality of optical elements has a reflecting surface in such a manner that a normal to the reflecting surface at an intersection point of a reference axis and the reflecting surface is inclined with respect to a movement plane on which said at least two optical elements which are caused to vary the relative positions move.

14. A reflecting type of zoom optical system according to claim 1, wherein said at least two optical elements which are caused to vary the relative positions respectively move on two movement planes which are inclined with respect to each other.

15. An image pickup device including a reflecting type of zoom optical system according to one of claims 1 to 14, and arranged to form an image of the object on an image pickup surface of an image pickup medium.

16. An optical device for forming an image of an object, comprising:
  a first optical unit having a reflection surface of rotational asymmetry; and
  a second optical unit having a reflection surface having a curvature,
  wherein a relative distance between said first and second optical units is varied to change a focal distance or to perform focusing.

17. An optical device, comprising:
  a first optical unit having an optical medium which has (a) a surface which is a refractive surface and (b) a reflection surface having a curvature, said first optical unit forming an image of an object in said optical medium; and
  another optical unit,
  wherein a final image is formed by relaying light by said first optical unit and said another optical unit, and wherein a distance between said first optical unit and said another optical unit is varied to perform magnification variation or focusing.

18. An optical device, comprising:
  an optical unit having an aspherical reflection surface of rotational asymmetry in which there exists no more than one plane of symmetry,
  wherein a position of said optical unit is varied to change a focal length or to perform focusing.

19. An optical device comprising:
  an optical unit having an optical medium which has a first surface having an optical power and a second surface having an optical power, said optical unit forming an intermediate image in said optical medium between said first and second surfaces,
  wherein each of said first and second surfaces is an aspherical surface of rotational asymmetry,
  wherein a position of said optical unit is varied to change a focal length or to perform focusing.

20. A phototaking optical system comprising:
  a first optical surface that is an aspherical reflection surface of rotational asymmetry in which there exists no more than one plane of symmetry,
  a second optical surface that is an aspherical reflection surface of rotational asymmetry in which there exists no more than one plane of symmetry,
  wherein an image of an object is formed at an image pickup medium by way of both said first optical surface and said second optical surface.

21. A phototaking optical system comprising:
  an optical surface that is an aspherical reflection surface of rotational asymmetry in which there exists no more than one plane of symmetry; and
  means for changing an optical path length between said optical surface and an image pickup medium.

22. A device according to claim 18, wherein said optical unit has at least three aspherical surfaces of rotational asymmetry in which there exists no more than one plane of symmetry.

23. A device according to claim 18, wherein said optical unit has a refractive surface.

24. A device according to claim 18, wherein said optical unit has a stop which is disposed on the object side of a front surface of said optical unit.

25. A device according to claim 18, wherein said optical unit forms an intermediate image.

26. An optical device, comprising:
  an optical unit having an aspherical surface of rotational asymmetry in which there exists no more than one plane of symmetry,
  wherein a position of said optical unit is varied in an optical axis direction to change a focal length or to perform focusing.

27. An optical device comprising:
  an optical unit having an optical medium which has a first surface having an optical power and a second surface having an optical power, said optical unit forming an intermediate image in said optical medium between said first and second surfaces,
  wherein each of said first and second surfaces is an aspherical surface of rotational asymmetry,
  wherein a position of said optical unit is varied in an optical axis direction of said device to change a focal length or to perform focusing.

28. A phototaking optical system for use with an image pickup medium, said system comprising:
  an optical surface that is an aspherical surface of rotational asymmetry in which there exists no more than one plane of symmetry; and
  means for changing a distance between said optical surface and the image pickup medium.

29. A device according to claim 26, wherein said aspherical surface is a reflecting surface.

30. A device according to claim 26, wherein said optical unit has at least three aspherical surfaces of rotational asymmetry in which there exists no more than one plane of symmetry.

31. A device according to claim 26, wherein said optical unit has a refractive surface.

32. A device according to claim 26, wherein said optical unit has a stop which is disposed on the object side of a front surface of said optical unit.

33. A device according to claim 26, wherein said optical unit forms an intermediate image.

34. An apparatus, comprising:
  an optical element composed of a solid transparent body, having two refraction surfaces and a plurality of aspherical reflection surfaces, whereby a light beam entering said transparent body from one of said two refraction surfaces is reflected by said plurality of aspherical reflection surfaces in order and then is projected from the other refraction surface, wherein each of said plurality of aspherical reflection surfaces has such a shape that there is no more than one symmetry plane which can define one pair of symmetrical surfaces.

35. An apparatus according to claim 34, wherein there are a plurality of said optical elements, and the light beam passes through said plurality of optical elements in order.

36. An apparatus according to claim 35, wherein magnification is varied by changing a spacing of said plurality of optical elements.

37. An apparatus according to claim 34, further comprising a plurality of optical elements including said optical element, wherein the light beam passes through said plurality of optical elements.

38. An apparatus according to claim 37, wherein magnification is varied by changing a spacing of said plurality of optical elements.

39. An apparatus comprising:
  an optical element having an aspherical reflection surface which decenters a light beam entering therethrough, and an aperture diaphragm located at a light incidence side of said optical element, wherein the aspherical reflection surface is tilted relative to a reference axis and has such a shape that no more than one plane of symmetry exists which can define a pair of symmetrical surfaces.

40. An apparatus according to claim 39, wherein the shape of the aspherical reflection surface is defined by the following formula:

$$z = A/B + C_{02}y^2 + C_{20}x^2 + C_{03}y^3 + C_{21}x^2y + C_{04}y^4 + C_{22}x^2y^2 + C_{40}x^4$$

wherein A and B are defined by the following formulas:

$$A = (a+b)\cdot(y^2\cdot\cos^2 t + x^2), \quad B = 2a\cdot b\cdot\cos t[1\{(b-a)\cdot y\cdot\sin t/(2a\cdot b)\} + [1\{(b-a)\cdot y\cdot\sin t/(a\cdot b)\} - \{y^2/(a\cdot b)\} - \{4a\cdot b\cdot\cos^2 t + (a+b)^2\sin^2 t\}x^2/(4a^2b^2\cos^2 t)]^{1/2}].$$

41. An apparatus according to claim 40, wherein the aspherical reflection surface is a surface designed by using the formulas.

42. An apparatus according to claim 40, wherein said optical element has a plurality of the aspherical reflection surfaces, which decenter the light beam in order.

43. An apparatus according to claim 42, wherein there are a plurality of said optical elements, through which the light beam passes in order.

44. An apparatus according to claim 43, wherein said plurality of optical elements are changed in their spacing to change magnification.

45. An apparatus according to claim 41, wherein there are a plurality of said optical elements, and the light beam passes through said plurality of optical elements in order.

46. An apparatus according to claim 45, wherein said plurality of optical elements are changed in their spacing to change magnification.

47. An apparatus according to any of claims 41 through 46, wherein said optical element is a hollowed element through which hollow the light beam propagates, and on an outer surface of which the aspherical reflection surface is formed.

48. An apparatus according to any of claims 41 through 46, wherein said optical element is a solid element through which the light beam propagates and on a surface of which the aspherical reflection surface is formed.

49. An apparatus according to claim 48, wherein the light beam which has passed through said optical element forms an image of an object.

50. An apparatus, comprising:

an optical element composed of a solid transparent body, having two refraction surfaces and a plurality of reflection surfaces comprising a plurality of aspherical reflection surfaces, whereby a light beam entering said transparent body from one of said two refraction surfaces is reflected by said plurality of aspherical reflection surfaces in order and then is projected from the other refraction surface, wherein each of said plurality of aspherical reflection surfaces has such a shape that there is only one symmetry plane which can define one pair of symmetrical surfaces.

51. An apparatus according to claim 50, wherein there are a plurality of said optical elements, through which the light beam passes in order.

52. An apparatus according to claim 51, wherein said plurality of optical elements are changed in their spacing to change magnification.

53. An apparatus according to claim 50, further comprising a plurality of optical elements including said optical element, wherein the light beam passes through said plurality of optical elements.

54. An apparatus according to claim 53, wherein said plurality of optical elements are changed in their spacing to change magnification.

55. An apparatus comprising:

an optical element having an aspherical reflection surface which decenters a light beam falling incident on the surface, and an aperture diaphragm located at a light beam incidence side of said optical element, wherein the aspherical reflection surface has only one plane of symmetry which can define a pair of symmetrical surfaces.

56. An apparatus according to claim 55, wherein the aspherical reflection surface has a shape defined by the following formula:

$$z = A/B + C_{02}y^2 + C_{20}x^2 + C_{03}y^3 + C_{21}x^2y + C_{04}y^4 + C_{22}x^2y^2 + C_{40}x^4$$

wherein A and B are defined by the following formulas:

$$A = (a+b)\cdot(y^2\cdot\cos^2 t + x^2),$$

$$B = 2a\cdot b\cdot\cos t[1\{(b-a)\cdot y\cdot\sin t/(2a\cdot b)\} + [1\{(b-a)\cdot y\cdot\sin t/(a\cdot b)\} - \{y^2/(a\cdot b)\} - \{4a\cdot b\cdot\cos^2 t + (a+b)^2\sin^2 t\}x^2/(4a^2b^2\cos^2 t)]^{1/2}].$$

57. An apparatus according to claim 56, wherein the aspherical reflection surface is designed by using the formulas.

58. An apparatus according to claim 55, wherein said optical element has plural aspherical reflection surfaces, which decenter the light beam in order.

59. An apparatus according to claim 55, wherein there are a plurality of said optical elements, through which the light beam passes in order.

60. An apparatus according to claim 59, wherein said plurality of optical elements are changed in their spacing to change magnification.

61. An apparatus according to claim 57, wherein there are a plurality of said optical elements, through which the light beam passes in order.

62. An apparatus according to claim 61, wherein said plurality of optical elements are changed in their spacing to change magnification.

63. An apparatus according to any of claims 57 through 62, wherein said optical element is a hollowed element through which hollow the light beam propagates and on an inner wall of which the aspherical reflection surface is formed.

64. An apparatus according to any of claims 57 through 62, wherein said optical element is a solid element through which the light beam propagates, and on a surface of which the aspherical reflection surface is formed.

65. An apparatus according to claim 64, wherein the light beam which has passed through said optical element forms an image of an object.

66. A photographic device, comprising:

an optical system comprising first and second units, and an image pickup surface on which said optical system projects an image, wherein each of said first and second units has a curved reflecting surface inclined relative to a reference axis so as to deflect a light beam falling thereon, the curved reflecting surface being an aspherical surface in which there exists no more than one plane of symmetry which can define a pair of symmetrical surfaces, and wherein two of said first and second units and said image pickup surface move in the optical axis direction during zooming.

67. A device according to claim 66, wherein said first unit is an optical system which once forms an image in said first unit.

68. A device according to claim 66, wherein said first and second units once form an image in said first and second units, respectively.

69. A device according to claim 66, wherein said second unit is located between said first unit and said image pickup surface, and wherein said first unit does not move in the optical axis direction and said second unit and said image pickup surface move in the optical axis direction during zooming.

70. A device according to claim 66, wherein said second unit is located between said first unit and said image pickup surface, and wherein said image pickup surface does not move in the optical axis direction and said first and second units move in the optical axis direction during zooming.

71. A device according to claim 69 or 70, wherein a refractive member is located between said second unit and said image pickup surface, and wherein said refractive member does not move relative to said image pickup surface.

72. A device according to claim 69 or 70, wherein each of said first and second units have a plurality of the curved reflecting surfaces in which there exists only one plane of symmetry, and wherein the curved reflecting surfaces of each of said first and second units are provided on a common transparent member of said respective unit.

73. A photographic device, comprising:

an optical system comprising a first unit, a second unit, and a third unit; and an image pickup surface on which said optical system forms an image, wherein each of said first, second, and third unit has a curved reflecting surface inclined relative to a reference axis so as to deflect a light beam falling thereon, the curved reflecting surface being an aspheric surface in which there exists no more than one plane of symmetry which can define a pair of symmetrical surfaces, and wherein two of said first, second, and third unit and said image pickup surface move in the optical axis direction.

74. A device according to claim 73, wherein said first unit is an optical system which once forms an image in said first group.

75. A device according to claim 73, wherein each of said first and second units is an optical system which once forms an image in said respective unit.

76. A device according to claim 73, wherein each of said first, second, and third unit is an optical system which once forms an image in said respective unit.

77. A device according to claim 73, wherein said second and third unit are located between said first unit and said image pickup surface, and wherein during zooming, said first unit and the image pickup surface do not move in the optical axis direction and said second and third units move in the optical axis direction.

78. A device according to claim 77, wherein a refractive surface which does not move relative to said image pickup surface is located between said third unit and said image pickup surface.

79. A device according to claim 73 or 77, wherein each of said first, second, and third units have a plurality of the curved reflecting surfaces in which there exists only one plane of symmetry, and wherein in each of said first, second, and third units, the plural curved reflecting surfaces are provided on a surface of a transparent member of said respective unit.

* * * * *

UNITED STATES PATENT AND TRADEMARK OFFICE
CERTIFICATE OF CORRECTION

PATENT NO. : 6,639,729 B2
DATED : October 28, 2003
INVENTOR(S) : Tsunefumi Tanaka et al.

It is certified that error appears in the above-identified patent and that said Letters Patent is hereby corrected as shown below:

Title page,
Item [56], References Cited, FOREIGN PATENT DOCUMENTS, reference "JP 48-24057", "3/1973" should read -- 7/1973 --.

Column 28,
Line 13, "of FIG." should read -- of --.

Column 33,
Line 9, "R3 = -20.000" should read -- R5 = -20.000 --.

Column 35,
Line 58, "$C_{21}$ =4.50703e-05" should read -- $C_{21}$ = -4.50703e-05 --.

Column 38,
Lines 43 and 45, "10.00" should read -- -10.00 --.

Column 52,
Line 22, "VERTICAL 6 imu" should read -- VERTICAL 6 mm --.

Column 56,
Line 53, "7.41" should read -- -7.41 --.
Line 56, "19.02" should read -- -19.02 --.
Line 59, "26.43" should read -- -26.43 --.
Line 61, "26.43" should read -- -26.43 --.

Column 57,
Line 5, "7.41" should read -- -7.41 --.
Lines 13 and 15, "0.00" should read -- -0.00 --.
Line 72, "$C_{22}$ = -7.409208e-06" should read -- $C_{22}$ = -7.40920e-06 --.

Column 67,
Line 29, "$C_{22}$ = 657743e-05" should read -- $C_{22}$ = 6.57743e-05 --.

UNITED STATES PATENT AND TRADEMARK OFFICE
CERTIFICATE OF CORRECTION

PATENT NO.   : 6,639,729 B2
DATED        : October 28, 2003
INVENTOR(S)  : Tsunefumi Tanaka et al.

It is certified that error appears in the above-identified patent and that said Letters Patent is hereby corrected as shown below:

<u>Column 71</u>,
Line 7, "member GI" should read -- member G1 --.

Signed and Sealed this

Twentieth Day of April, 2004

JON W. DUDAS
*Acting Director of the United States Patent and Trademark Office*